Oct. 24, 1939.  C. SMITH  2,176,931
CALCULATING AND ACCOUNTING MACHINE
Filed Oct. 30, 1931  60 Sheets-Sheet 1

INVENTOR
Clyde Smith
BY
ATTORNEY

Oct. 24, 1939.    C. SMITH    2,176,931
CALCULATING AND ACCOUNTING MACHINE
Filed Oct. 30, 1931    60 Sheets-Sheet 4
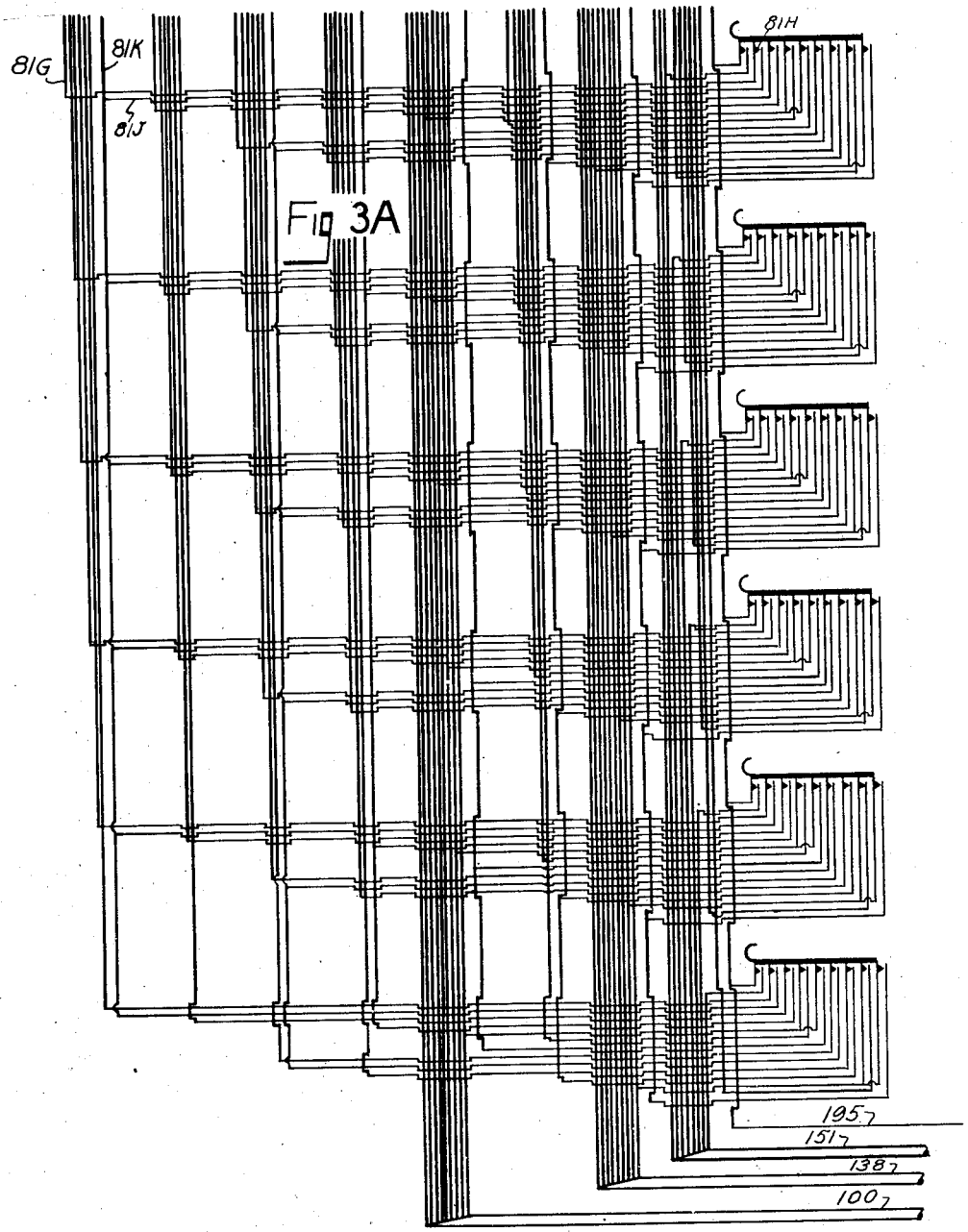
INVENTOR
Clyde Smith
BY
ATTORNEY

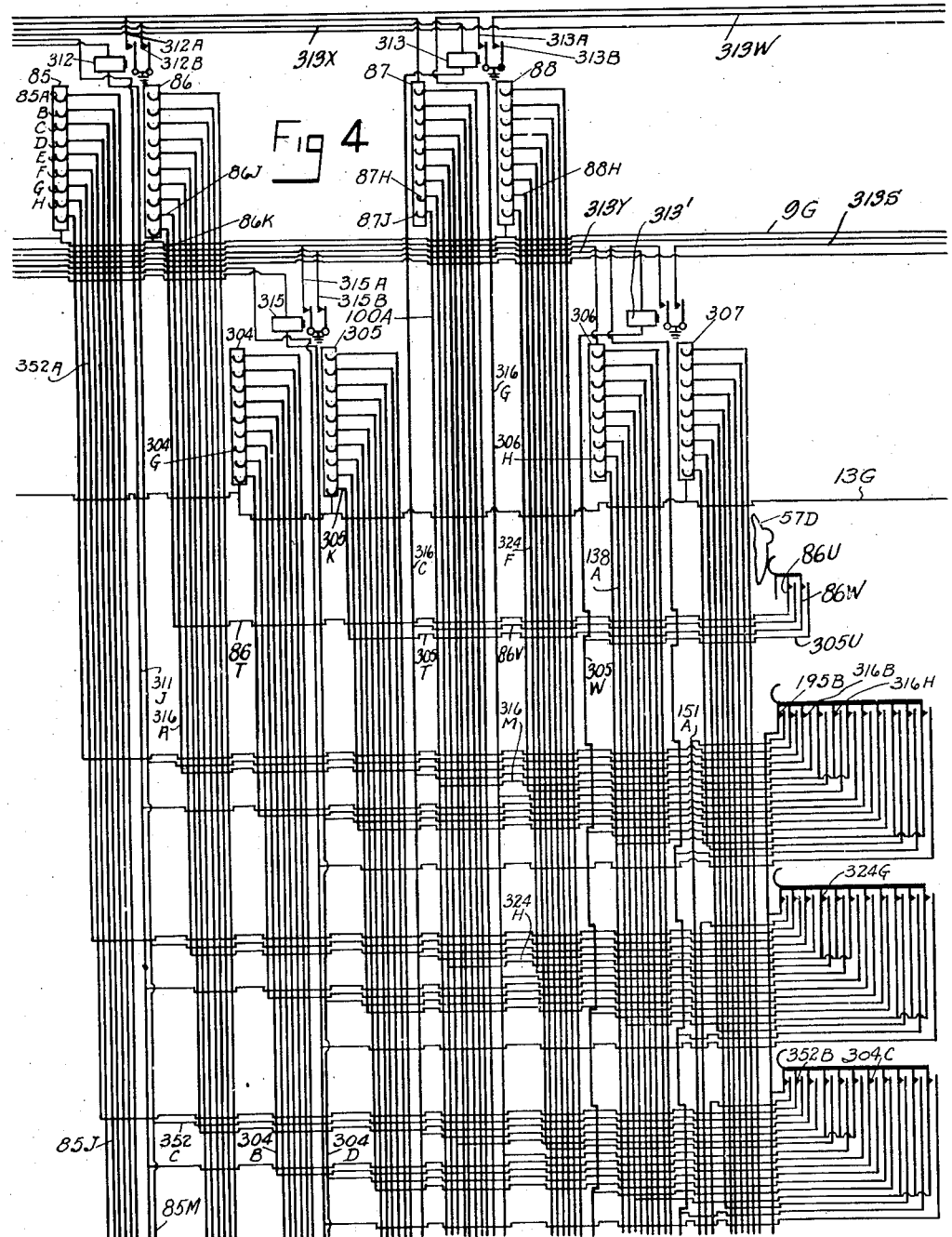

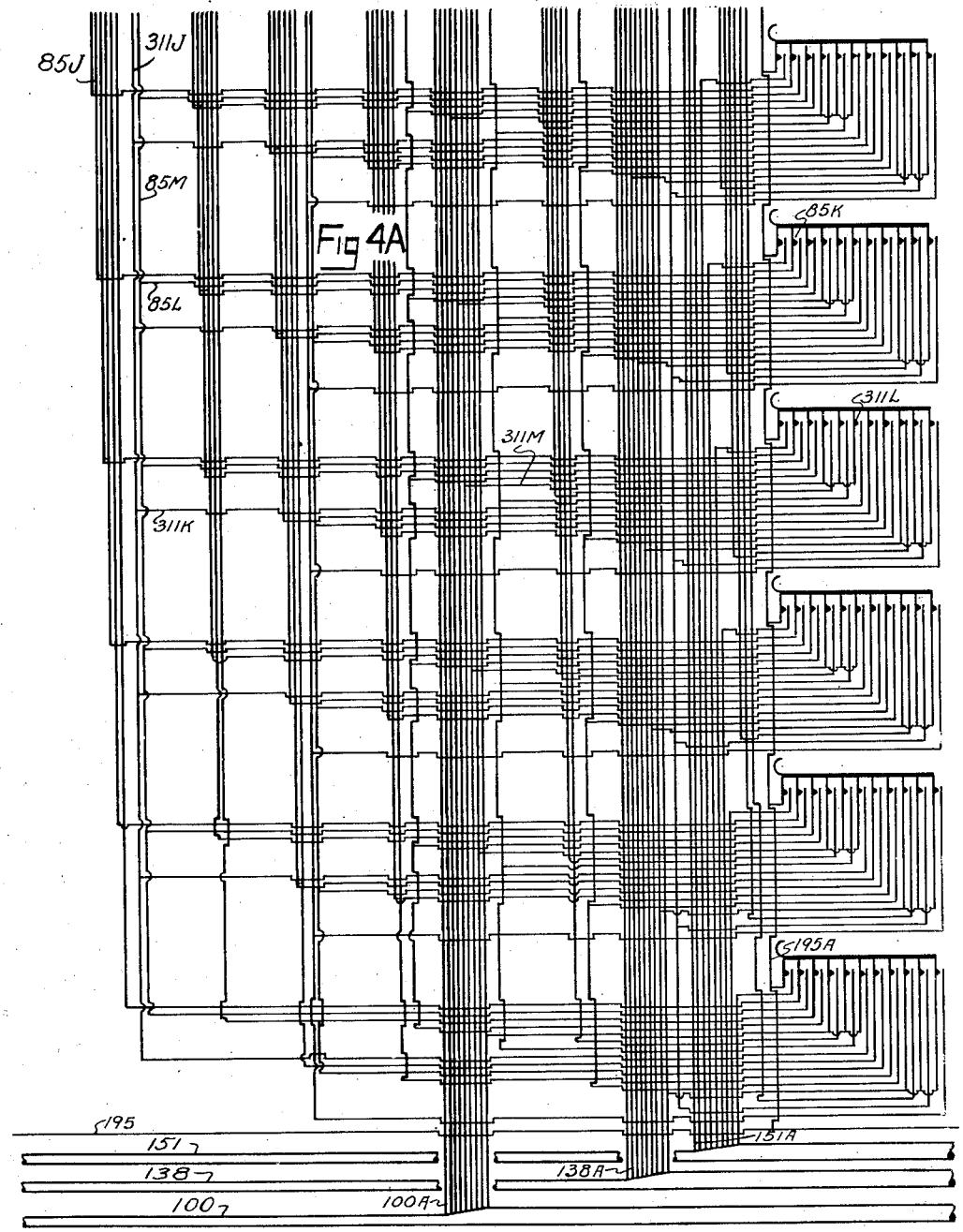

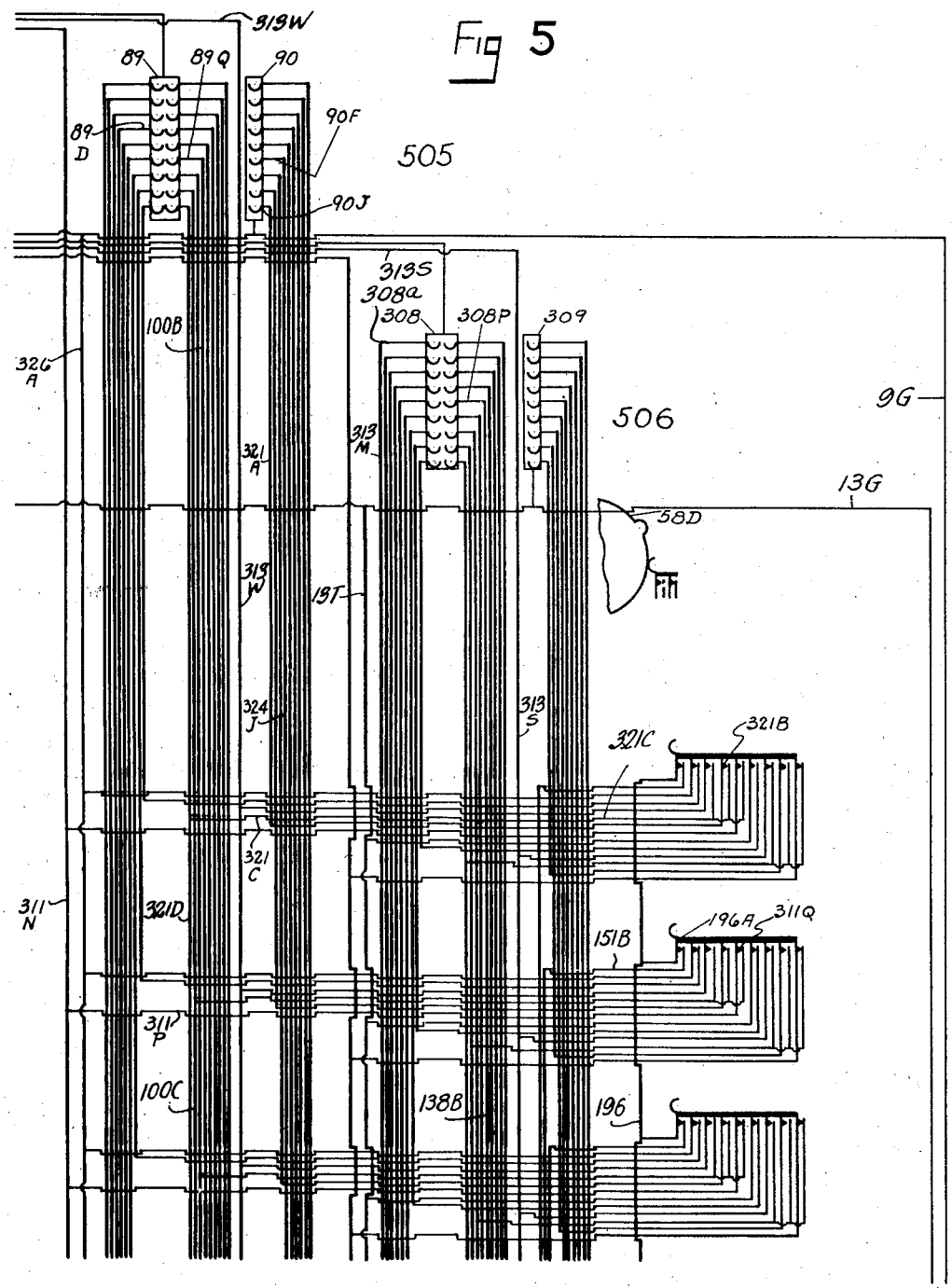

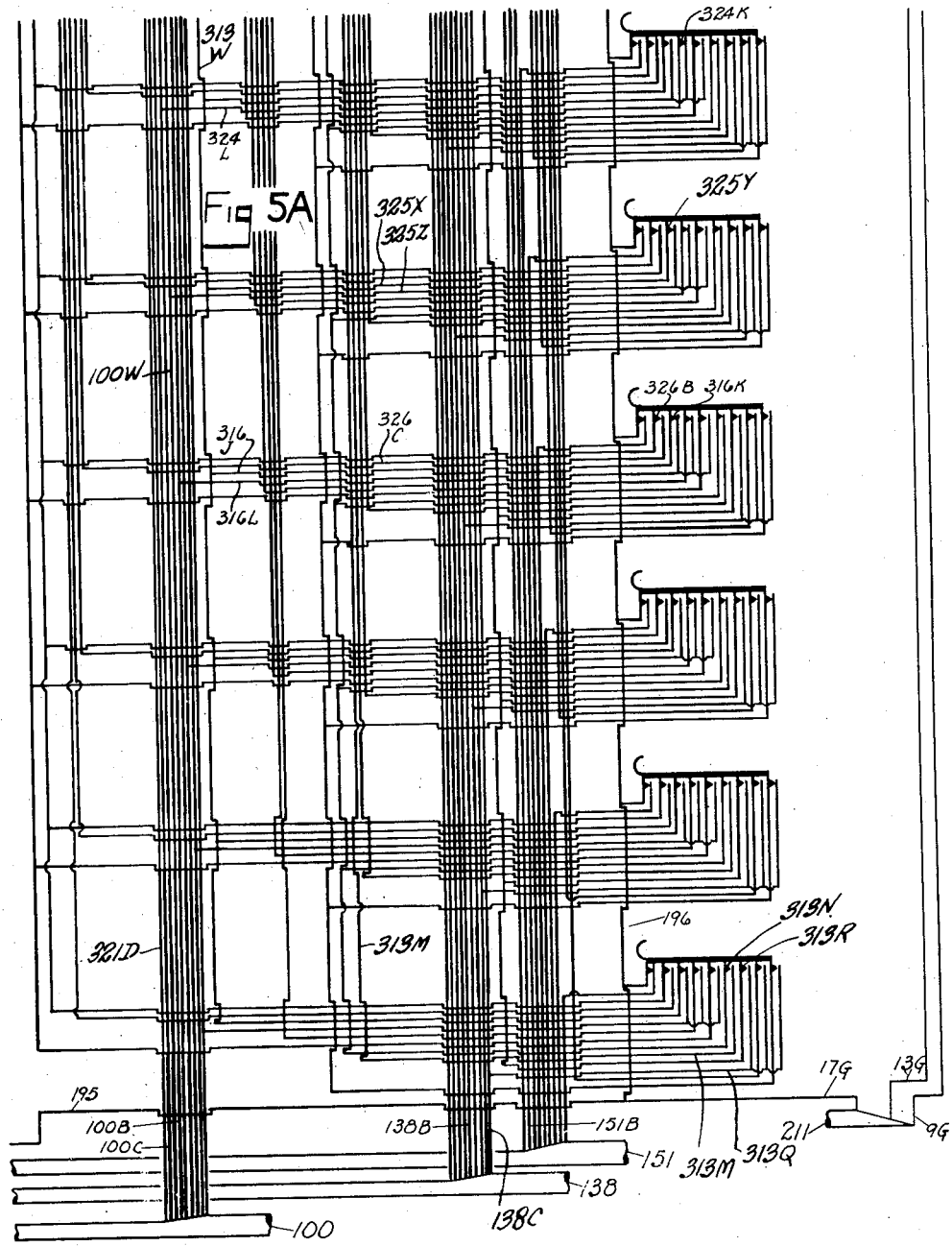

Oct. 24, 1939.  C. SMITH  2,176,931
CALCULATING AND ACCOUNTING MACHINE
Filed Oct. 30, 1931  60 Sheets-Sheet 9
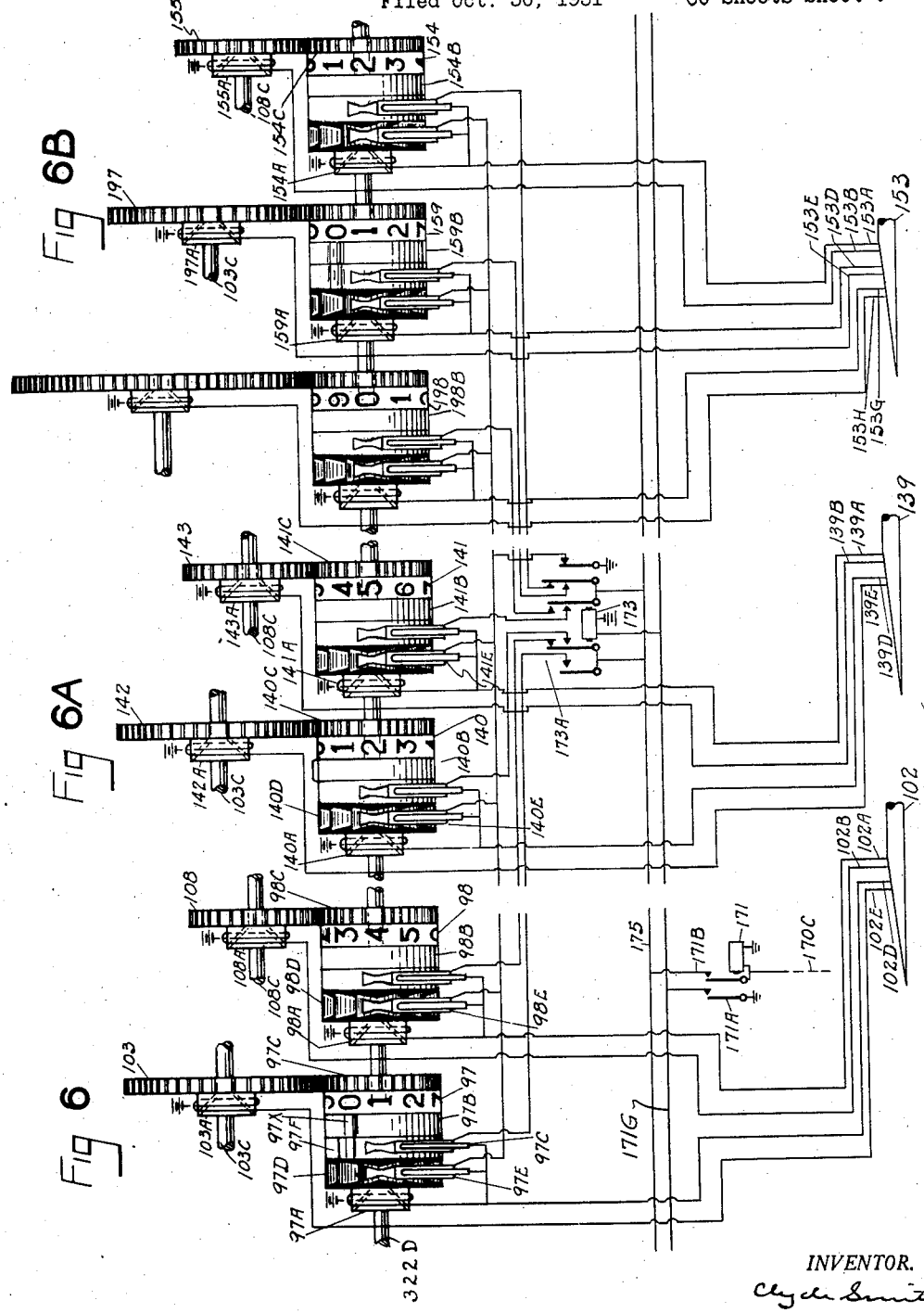
INVENTOR.
Clyde Smith
BY
ATTORNEYS.

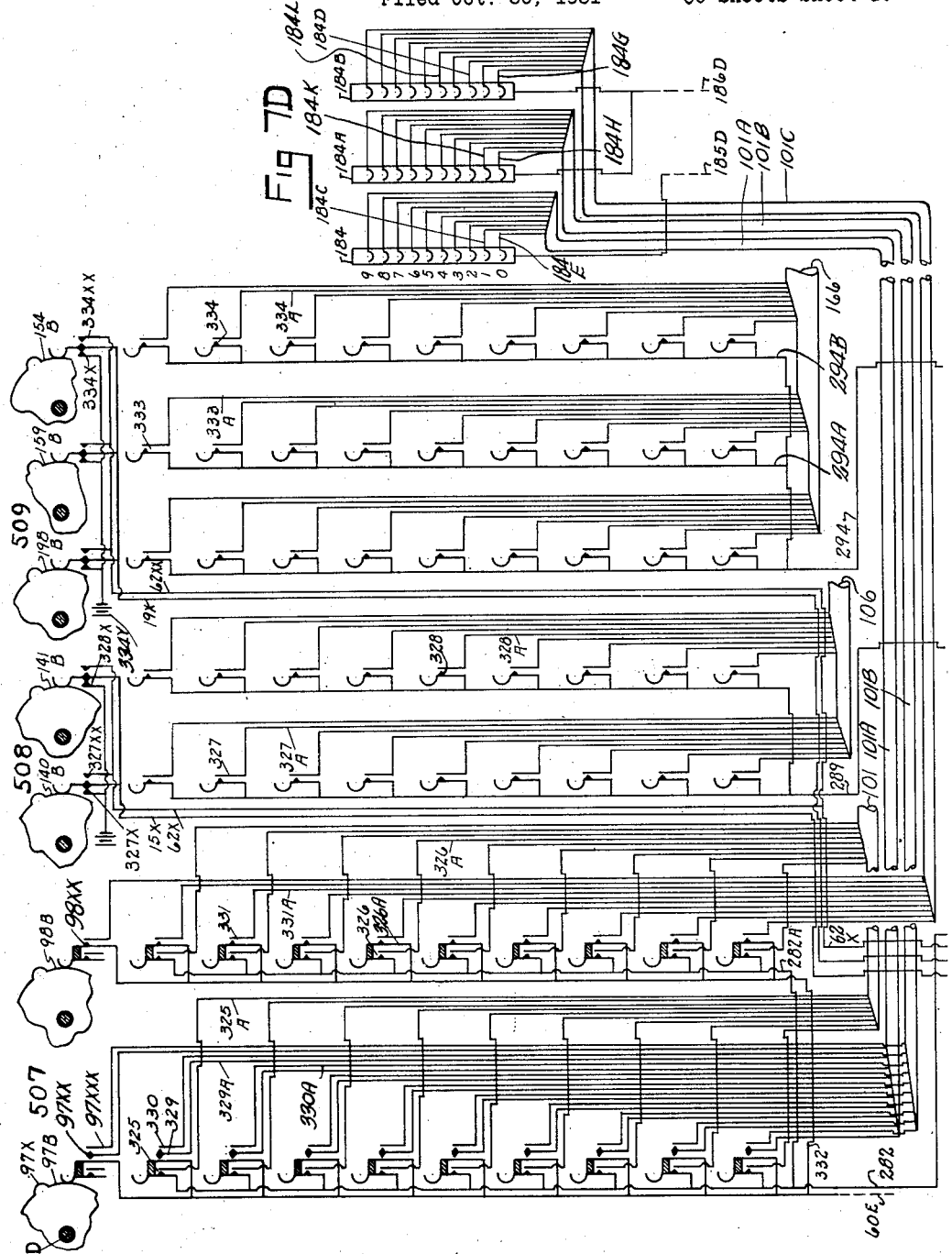

Oct. 24, 1939.  C. SMITH  2,176,931
CALCULATING AND ACCOUNTING MACHINE
Filed Oct. 30, 1931   60 Sheets—Sheet 11
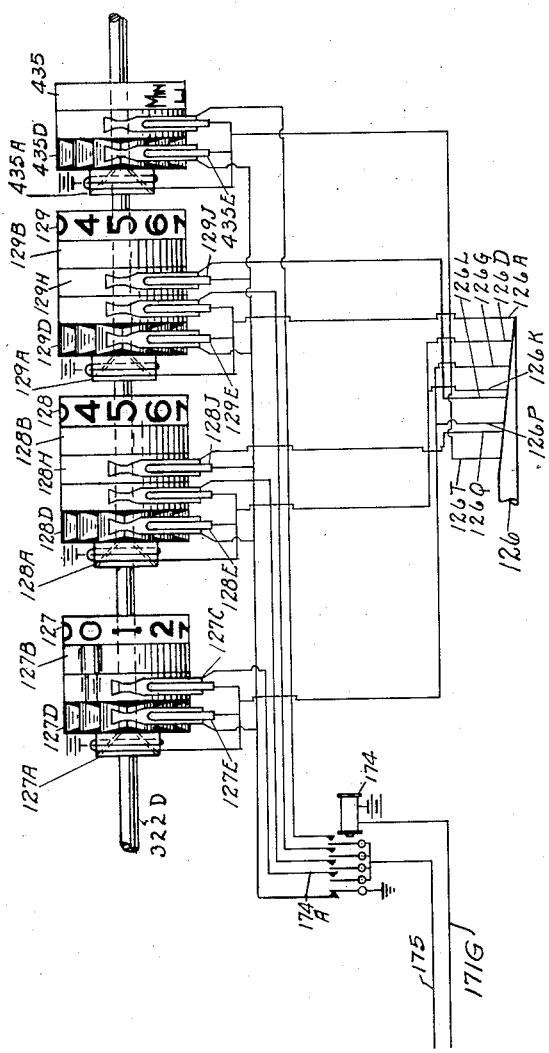
*INVENTOR*
Clyde Smith
BY
*ATTORNEY*

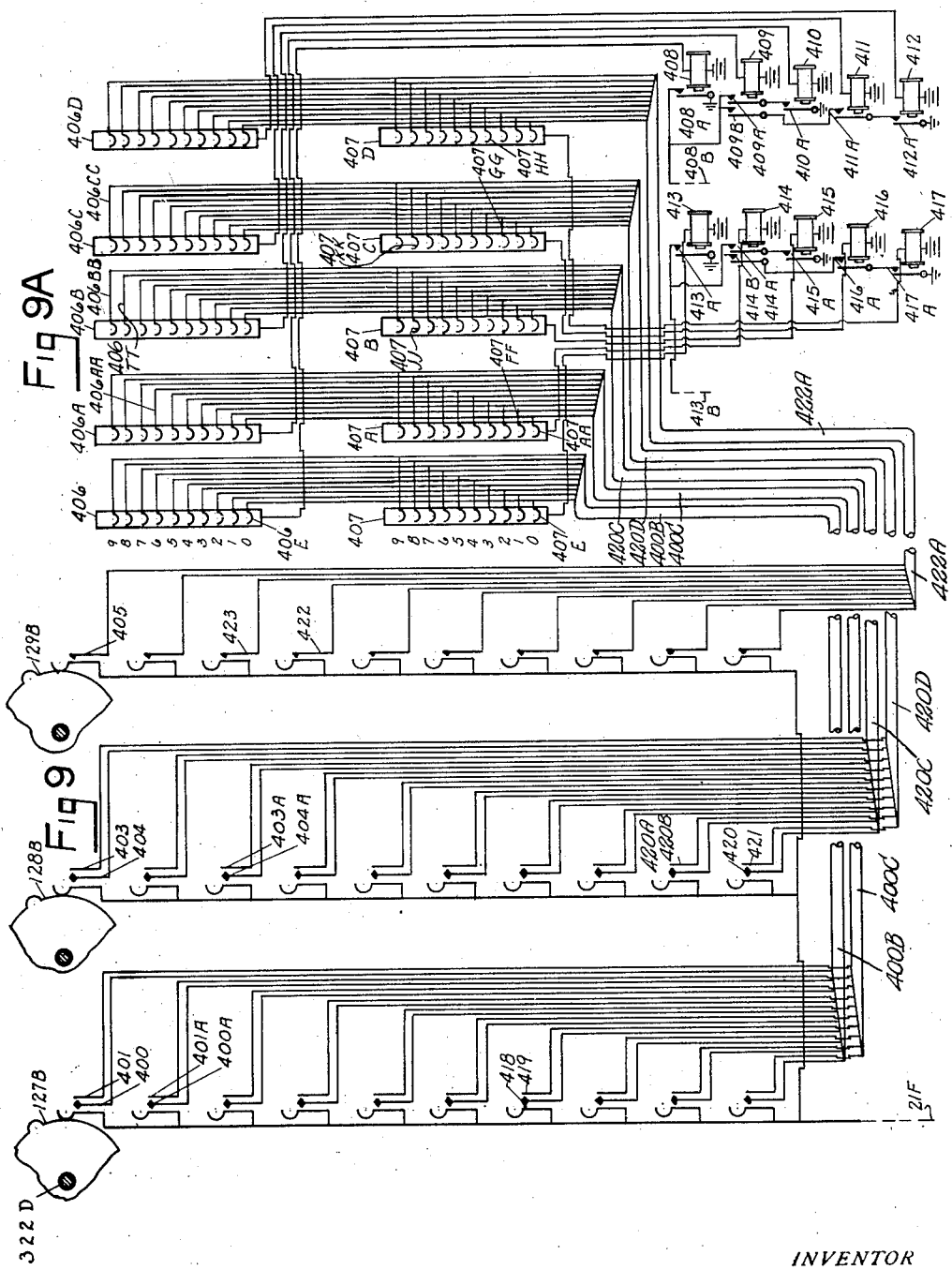

Oct. 24, 1939.  C. SMITH  2,176,931
CALCULATING AND ACCOUNTING MACHINE
Filed Oct. 30, 1931    60 Sheets-Sheet 13
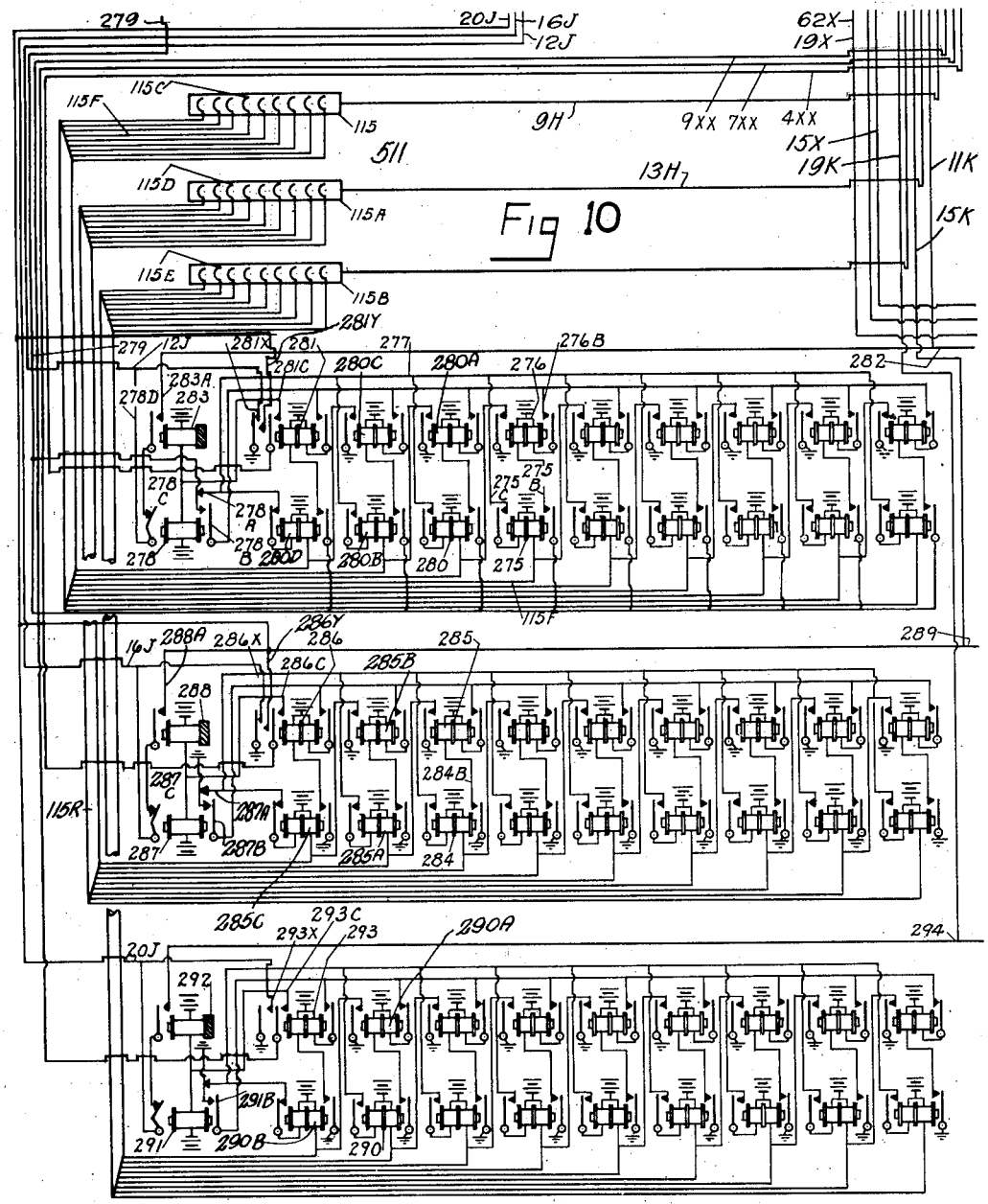
INVENTOR
Clyde Smith
BY
ATTORNEY Oct. 24, 1939.                    C. SMITH                    2,176,931
                      CALCULATING AND ACCOUNTING MACHINE
                      Filed Oct. 30, 1931        60 Sheets-Sheet 14

INVENTOR
Clyde Smith
BY
ATTORNEY

Oct. 24, 1939.    C. SMITH    2,176,931
CALCULATING AND ACCOUNTING MACHINE
Filed Oct. 30, 1931    60 Sheets-Sheet 15
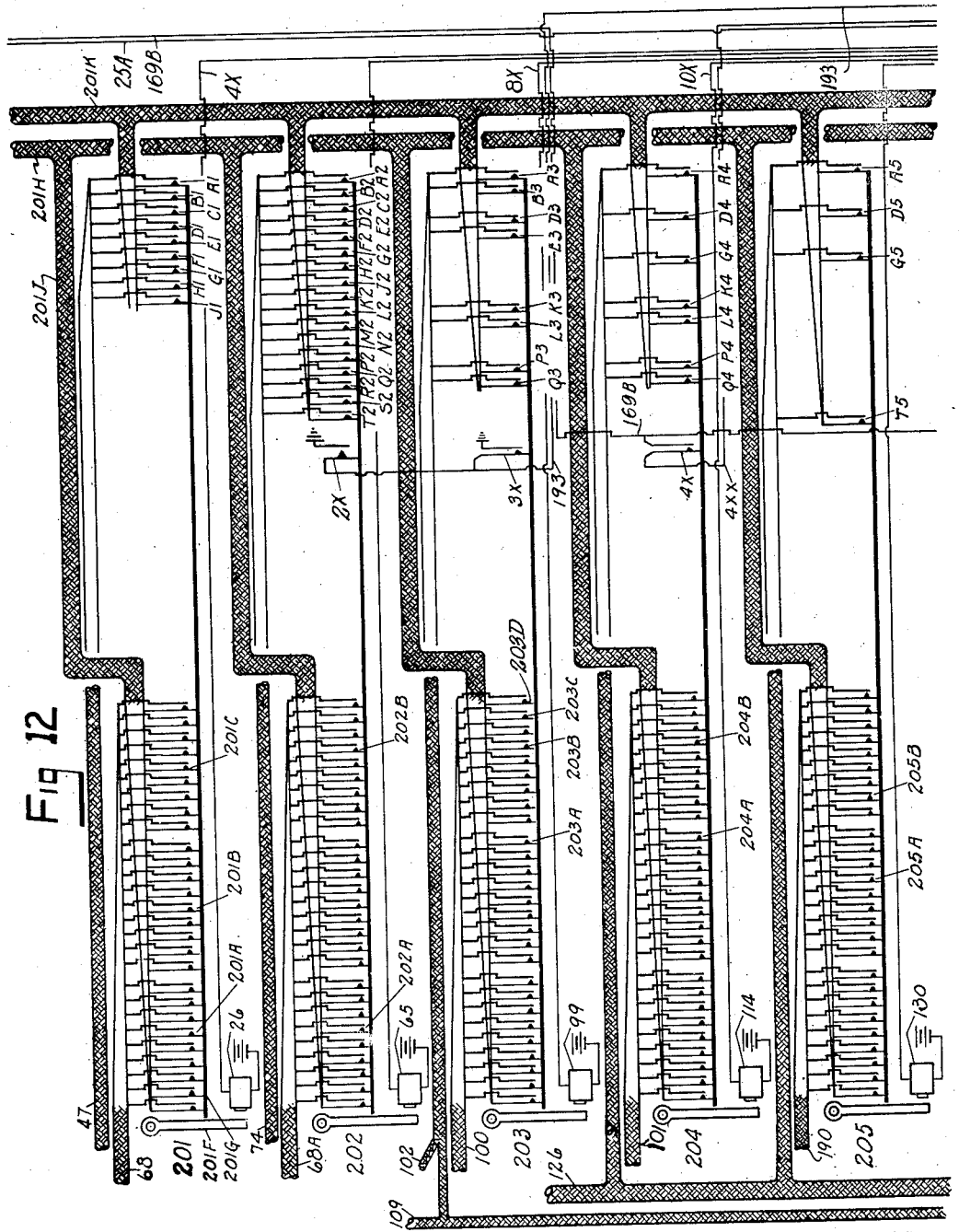
INVENTOR
Clyde Smith
BY
ATTORNEY Oct. 24, 1939.  C. SMITH  2,176,931
CALCULATING AND ACCOUNTING MACHINE
Filed Oct. 30, 1931   60 Sheets-Sheet 16
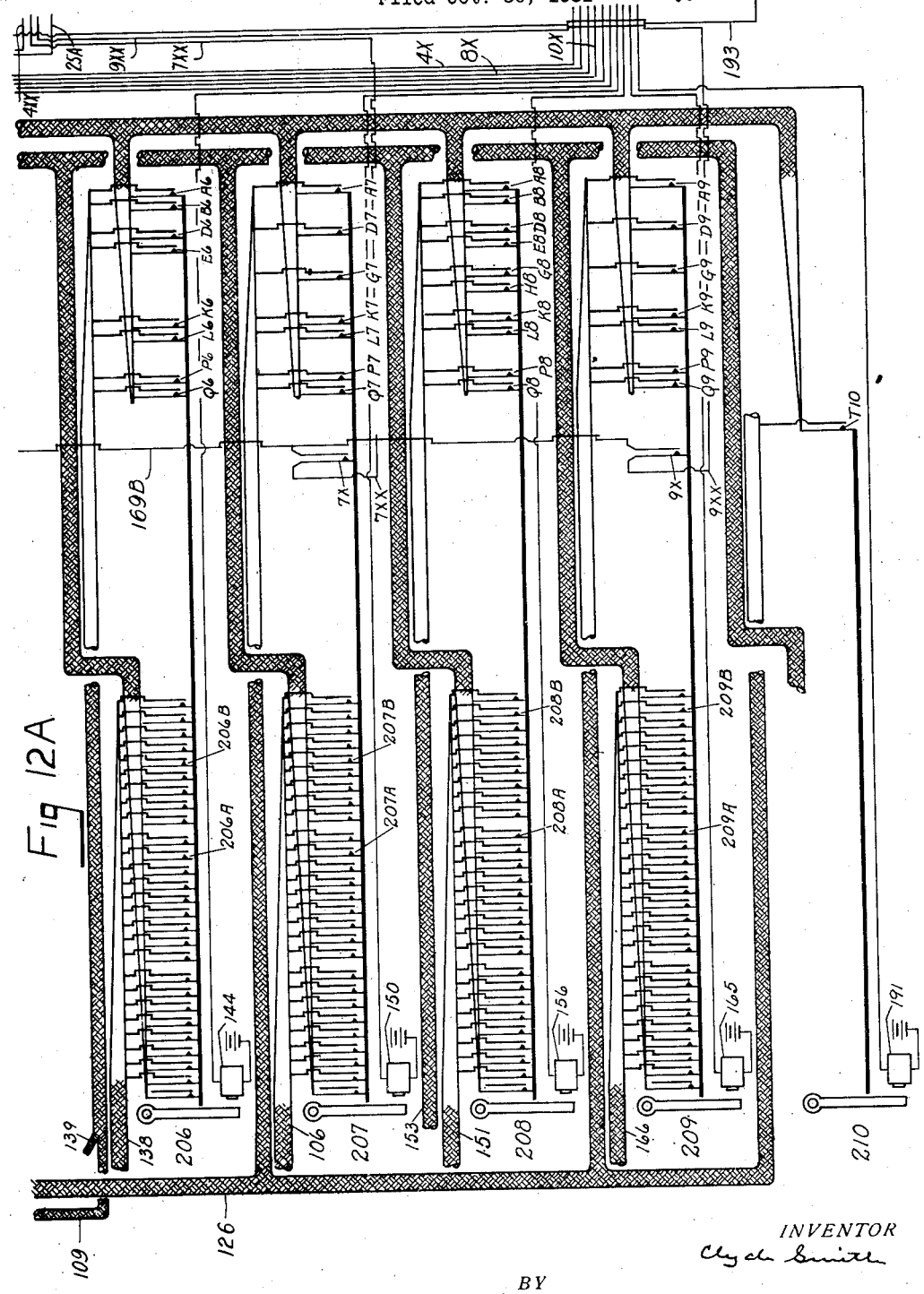
INVENTOR
Clyde Smith
BY
ATTORNEY Oct. 24, 1939.        C. SMITH        2,176,931
CALCULATING AND ACCOUNTING MACHINE
Filed Oct. 30, 1931        60 Sheets-Sheet 17
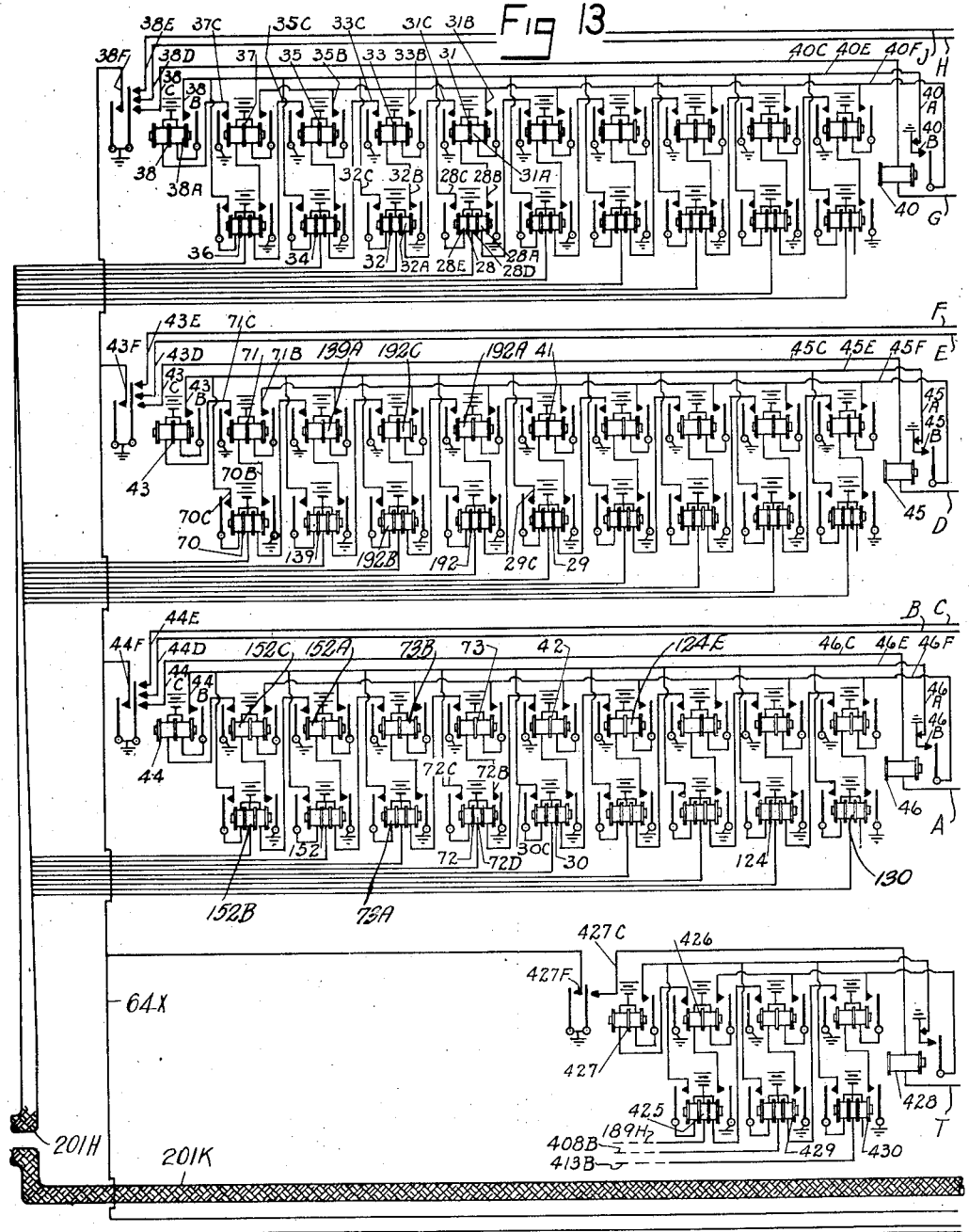
INVENTOR
Clyde Smith
BY
ATTORNEY Oct. 24, 1939.  C. SMITH  2,176,931
CALCULATING AND ACCOUNTING MACHINE
Filed Oct. 30, 1931   60 Sheets-Sheet 18

INVENTOR
Clyde Smith
BY
ATTORNEY

Oct. 24, 1939.  C. SMITH  2,176,931
CALCULATING AND ACCOUNTING MACHINE
Filed Oct. 30, 1931   60 Sheets-Sheet 19
Fig 15
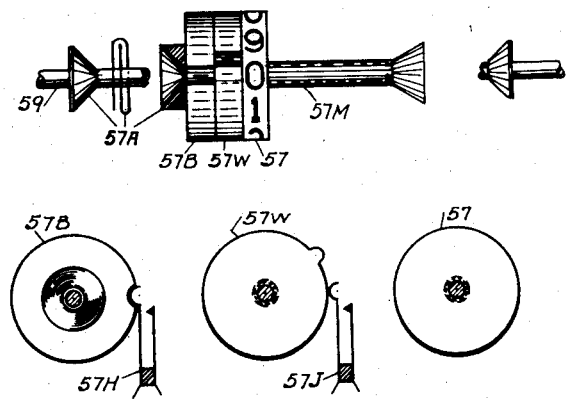
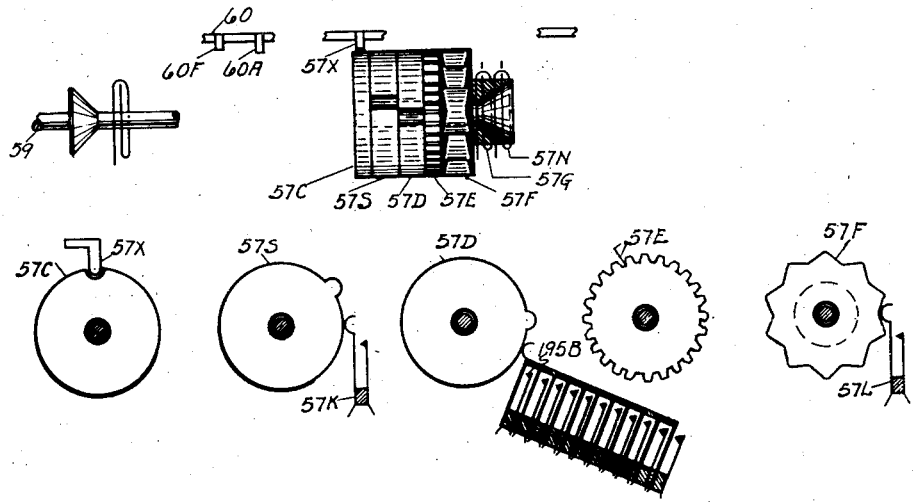
INVENTOR
Clyde Smith
BY
ATTORNEY Oct. 24, 1939.                    C. SMITH                      2,176,931
                    CALCULATING AND ACCOUNTING MACHINE
                    Filed Oct. 30, 1931      60 Sheets-Sheet 20

INVENTOR
Clyde Smith
BY
ATTORNEY

Fig. 19

Oct. 24, 1939.   C. SMITH   2,176,931
CALCULATING AND ACCOUNTING MACHINE
Filed Oct. 30, 1931   60 Sheets-Sheet 23

INVENTOR
Clyde Smith
BY
Belt and Wallace
ATTORNEYS

Oct. 24, 1939.   C. SMITH   2,176,931
CALCULATING AND ACCOUNTING MACHINE
Filed Oct. 30, 1931   60 Sheets-Sheet 24

INVENTOR
Clyde Smith
BY Bilt and Wallace
ATTORNEYS

Oct. 24, 1939.  C. SMITH  2,176,931

CALCULATING AND ACCOUNTING MACHINE

Filed Oct. 30, 1931  60 Sheets-Sheet 25

INVENTOR
Clyde Smith.
BY Belt and Wallace
ATTORNEYS

Oct. 24, 1939.    C. SMITH    2,176,931
CALCULATING AND ACCOUNTING MACHINE
Filed Oct. 30, 1931    60 Sheets-Sheet 28

INVENTOR
Clyde Smith
BY Belt and Wallace
ATTORNEYS

Fig. 29.

Oct. 24, 1939.  C. SMITH  2,176,931
CALCULATING AND ACCOUNTING MACHINE
Filed Oct. 30, 1931  60 Sheets-Sheet 34

INVENTOR
Clyde Smith,
BY Belt and Wallace
ATTORNEYS

Oct. 24, 1939.    C. SMITH    2,176,931
CALCULATING AND ACCOUNTING MACHINE
Filed Oct. 30, 1931    60 Sheets-Sheet 35

INVENTOR
Clyde Smith,
BY Belt and Wallace
ATTORNEYS

Oct. 24, 1939.　　　　　C. SMITH　　　　　2,176,931

CALCULATING AND ACCOUNTING MACHINE

Filed Oct. 30, 1931　　　60 Sheets-Sheet 37

INVENTOR
Clyde Smith,
BY Belt and Wallace
ATTORNEYS

Oct. 24, 1939.    C. SMITH    2,176,931
CALCULATING AND ACCOUNTING MACHINE
Filed Oct. 30, 1931    60 Sheets-Sheet 43

INVENTOR
Clyde Smith
BY Belt and Wallace
ATTORNEYS

Oct. 24, 1939.    C. SMITH    2,176,931

CALCULATING AND ACCOUNTING MACHINE

Filed Oct. 30, 1931    60 Sheets-Sheet 44

INVENTOR
Clyde Smith,
BY Belt and Wallace
ATTORNEYS

Oct. 24, 1939.                    C. SMITH                    2,176,931
                    CALCULATING AND ACCOUNTING MACHINE
                    Filed Oct. 30, 1931        60 Sheets-Sheet 45

Fig. 44.

Oct. 24, 1939.  C. SMITH  2,176,931
CALCULATING AND ACCOUNTING MACHINE
Filed Oct. 30, 1931  60 Sheets-Sheet 50

INVENTOR
Clyde Smith
BY
Belt and Wallace
ATTORNEYS

Oct. 24, 1939.　　　　C. SMITH　　　　2,176,931
CALCULATING AND ACCOUNTING MACHINE
Filed Oct. 30, 1931　　60 Sheets-Sheet 56

INVENTOR
Clyde Smith.
BY Belt and Wallace
ATTORNEYS

Oct. 24, 1939.   C. SMITH   2,176,931
CALCULATING AND ACCOUNTING MACHINE
Filed Oct. 30, 1931   60 Sheets-Sheet 57

INVENTOR
Clyde Smith
BY Bilt and Wallace
ATTORNEYS

Oct. 24, 1939.   C. SMITH   2,176,931
CALCULATING AND ACCOUNTING MACHINE
Filed Oct. 30, 1931   60 Sheets—Sheet 59
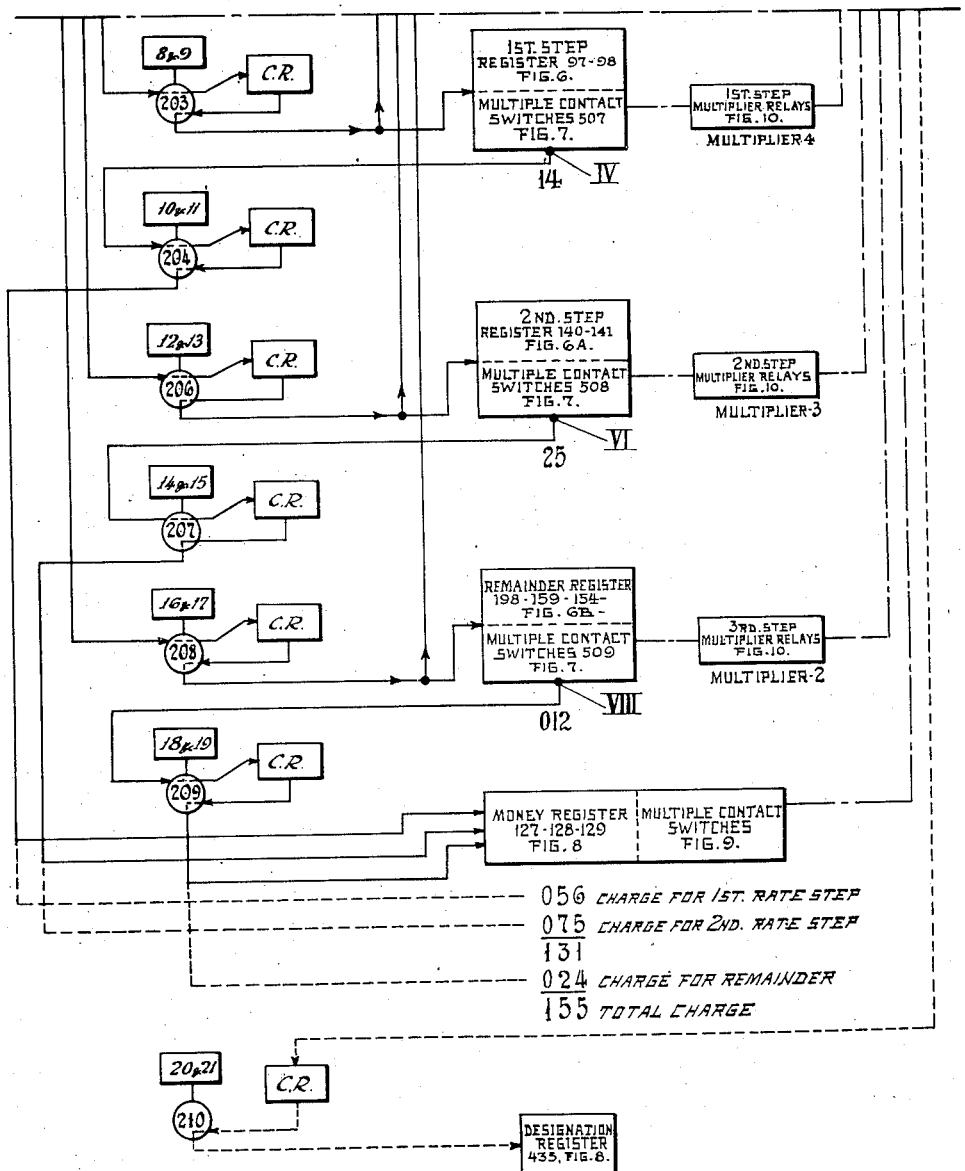
Fig. 57.
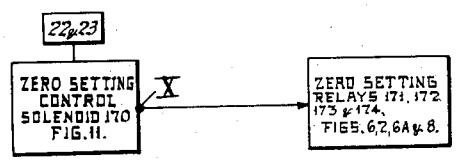
Inventor:
Clyde Smith,
By: Belt & Wallace
Attorneys Oct. 24, 1939.　　　　　C. SMITH　　　　　2,176,931

CALCULATING AND ACCOUNTING MACHINE

Filed Oct. 30, 1931　　　60 Sheets-Sheet 60

Inventor:
Clyde Smith,
By: Belt & Wallace
Attorneys

Patented Oct. 24, 1939

2,176,931

UNITED STATES PATENT OFFICE 2,176,931

CALCULATING AND ACCOUNTING MACHINE

Clyde Smith, near Hopkinsville, Ky., assignor to Addressograph-Multigraph Corporation, Cleveland, Ohio, a corporation of Delaware Application October 30, 1931, Serial No. 572,075

46 Claims. (Cl. 235—61.7)

The object of the invention as a whole is to provide a completely automatic machine for computing amounts to be billed, with registration of the essential bases of computation, for commodities measured by meter, as electricity, gas, and water. The registrations and computations are in part from cards perforated according to meter readings and to various plans and rates of charge, and in part from conditions set up within the machine itself.

As not essential to the inventive features of the machine, or because means are implied in the devices described, the specification does not contain descriptions of elements that would be included in a commercial machine of the kind, such as card-feeding and printing mechanism, discount computing mechanism, circuits for demand or service charges.

The machine registers the meter readings for the last and previous periods (always assumed as months), and subtracts to determine the consumption quantity. This quantity, according to its amount in relation to certain numerical card perforations, is subject to successive subtractions; the subtracted amounts and the final remainder, so far as they may be found, are registered and multiplied by respective rates of charge, and the products accumulated for the money charge.

If, however, the quantity should be less than the amount perforated for a minimum money charge (which may be arbitrary), the quantity is registered and the minimum charge amount registered as the billing amount.

An important object of the invention is the comparison of numbers, in order to determine which of several actions shall follow. The consumption quantity, if it comes within a certain range, is multiplied by a rate multiplier as perforated in the card. A minimum charge registration is substituted for such a rate-quantity product when the consumption quantity as registered is less than a minimum consumption quantity according to card perforations. A succession of multiplications by different rate multipliers is to follow registration of consumption quantity above predetermined potential portions thereof. This is known commercially as "breaking down" the consumption quantity into rate steps. The consumption quantity is registered as a whole or in such portions as may be.

Another object of the invention is the comparison of the amount of money charge on each bill with numbers respectively so much higher and so much lower than normal for the customer that they represent either a notably excessive or diminished consumption. A special indication is made for such exceptional amounts.

These alternative actions are selected through systems of electrical contacts and circuits arranged in such wise as to provide instantaneously and without other movement than contact closures the proper path for electrical action due from any combination of figures brought into comparison.

The registering equipment includes conventional number wheels moved independently and simultaneously in the different orders under electrical control, with carry-over actions also under such control.

Another object of the invention is the provision of an automatic electrical control of the sequence of the several operations, whether necessary or alternative, in due order and with due omissions. This is accomplished mainly through a chain of sequence relays, under control of one relay, which is energized or deenergized immediately upon the completion of each operation that is to be followed by another under such control.

The sequence control relay is protected against prematurely starting a following operation, as through the series circuit of the several cut-off relays that are deenergized at the close of the respective simultaneous actions within a representative operation; and is also arranged for the due starting of a following operation without such delay as is usual in the sequence of operations in a machine for setting to zero, completing cycles, and the like.

With several alternatives contingent upon the numerical relations as they may happen to come for successive bills, there must be provision within the machine for alternative operations or series of operations. It is also an object of the invention to provide in due sequence for each particular contingency, and also to eliminate automatically and immediately the provision for each potential operation when it becomes inapplicable through the exhaustion of the principal amount in computation; and instead to proceed with the due operation.

Particularly as a certain succession of operations, registering and multiplying in successive steps, depends upon the amount of consumption of the metered commodity being sufficient for the application of such operations, it is an object of the invention to provide for the elimination of any steps not entered upon at the exhaustion of this amount. This is accomplished through the energization of the sequence relays controlling such operations upon the movement of such register from its zero position for the registration of the consumption amount and their deenergization upon the return of the register to zero at any stage of operation.

In general it is an object of the invention to eliminate idling movements or waits and to make as many effective movements simultaneous as computative conditions permit. Control of registration, for example, is by setting up relays corresponding to the number to be registered and running them down to the cut-off as the number wheel advances, with nowhere a cycle to complete, so that, for example, it takes a fraction of the time to register or to multiply 3 as 9. Sundry circuits may be prepared in advance for potential action, as for a multiplier, and released if not required, both actions being simultaneous with necessary actions—time-saving if used, not time-consuming if not needed. Necessary final zero-setting and clearing is simultaneous for all elements, and is prepared for in the initial operation.

The various objects of the invention are effected by the mechanisms and circuits illustrated in the accompanying drawings.

Figure 1, at 500, shows two sets of monthly contact bars and fingers, respectively for the last and previous meter readings; and at 501, a set of contact bars and fingers for the minimum money charge.

Figure 2 contains the registers for the last meter reading, the previous reading, and the consumption quantity, with motor and driving shafts and gears.

Figures 3, 3A, 4, 4A, 5, 5A, show the contact bars, contact fingers, and the wiring for the comparison of the consumption quantity, according to contact-closing wheels, with quantities for the first and second rate steps, according to special card perforations.

Figures 6, 6A, 6B, show the first and second step and remainder registering wheel assemblies.

Figures 7 and 7D show the minimum consumption circuits and the multiplicand circuits, including fragmentary side views of the first and second step and remainder contact-closing wheels and developed views of their contacts; and the minimum consumption contact bars and fingers.

Figure 8 shows the money register and the designation wheel.

Figure 9 shows the money contact-closing wheels, in fragmentary side view, and wiring to the fingers of the High and Low comparison bars. In Figure 9A appear the contact bars and fingers and the relays for setting up the circuits to register the designations H and L.

Figure 10 shows the three chains of multiplier relays and the three contact bars and fingers for selecting the rate-multipliers for the three steps.

Figures 12 and 12A illustrate the ten shift relays, for connecting contact fingers to counting and carry-over relays.

Figure 13 shows the three groups of counting relays, a group for each order of numbers to be registered, and a fourth group to govern the designation wheel, together with associated cut-off and stepping relays.

Figure 15 includes several views of consumption wheel assembly.

Figure 16 illustrates a card for governing the machine action, with perforations for the examples of operation as described. Contact bars are shown in dotted outline.

Figure 17 illustrates a portion of a card as perforated for the more comprehensive examples included under the heading of Comparison of Numbers.

Figure 18 is a schematic diagram showing the manner in which certain of the wiring diagram figures of the drawings should be joined for convenient examination.

Figures 19 to 42 constitute a timing chart illustrating the first described and typical operation of the machine, Figures 19 to 26 forming the upper section of said chart when placed end to end from left to right in the order named, Figures 27 to 34 forming the central section of said chart when placed end to end from left to right in the order named and respectively below the figures in the upper chart section, and Figures 35 to 42 forming the lower section of said chart when placed end to end from left to right in the order named and respectively below the figures in the central chart section.

Figure 43:
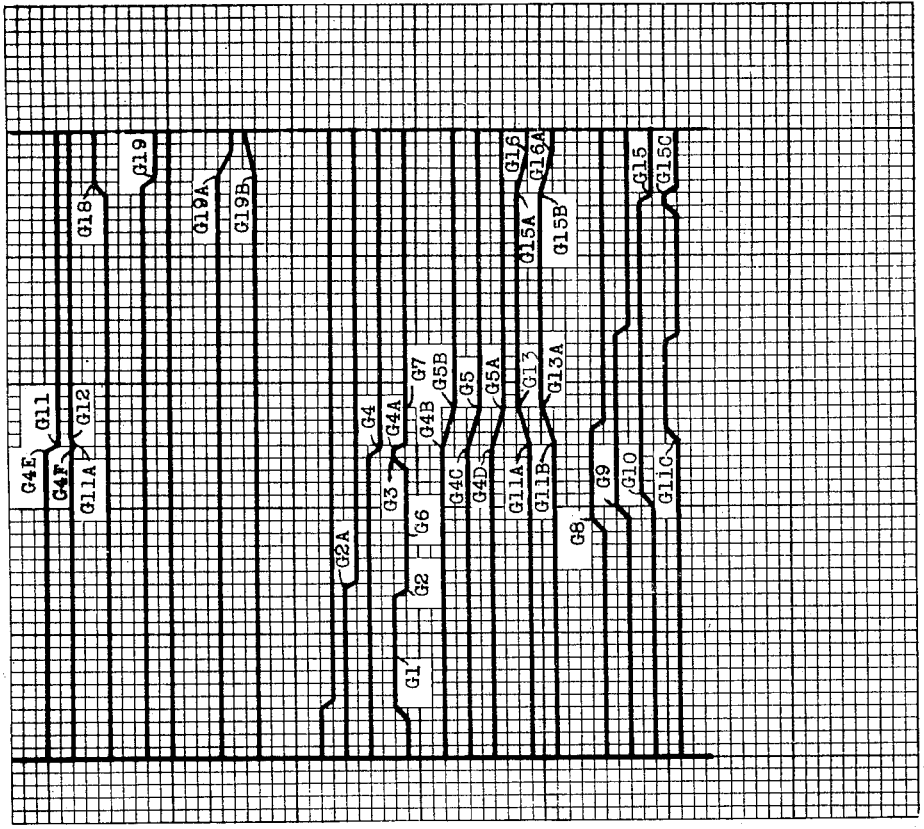

Figure 43 is a timing chart graphically illustrating that part of a machine operation involving a carry-over in consumption quantity subtraction.

Figure 45:
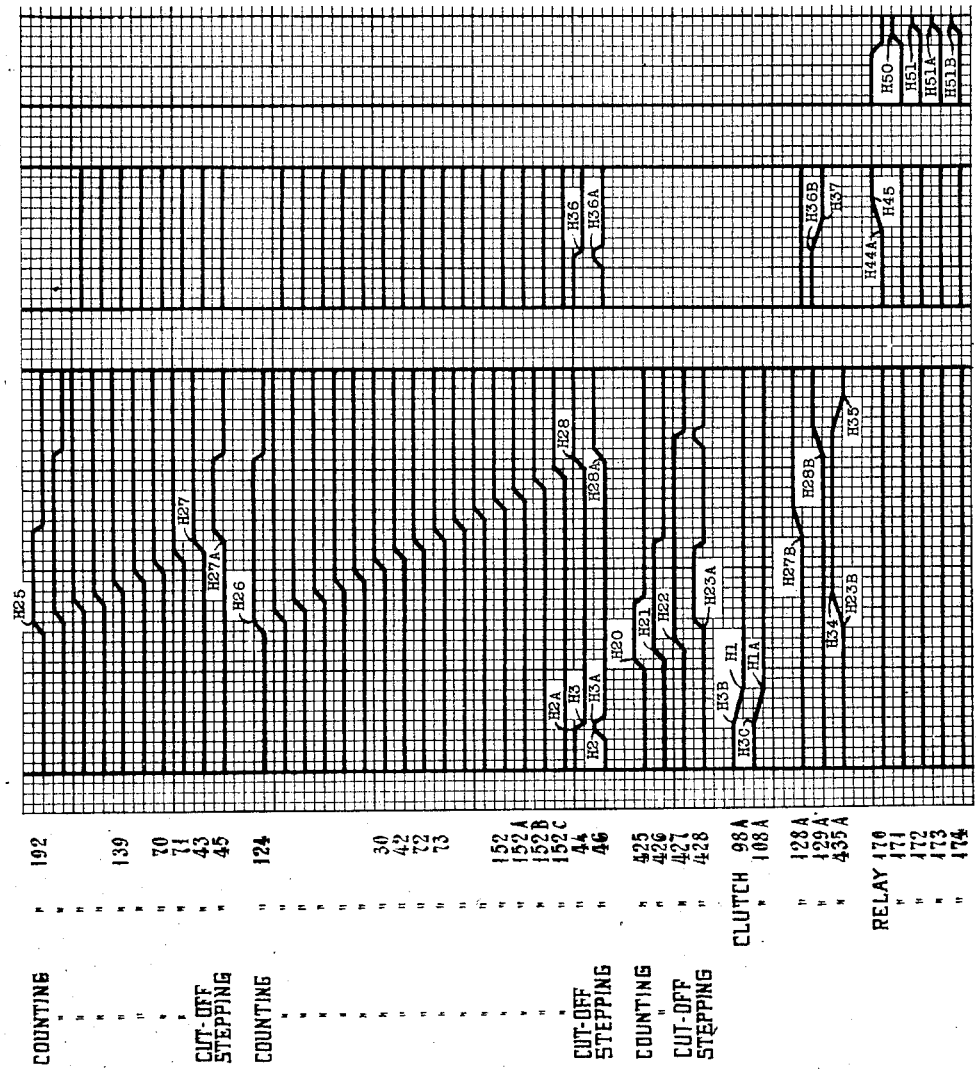

Figures 44 and 45 form a timing chart illustrating a minimum charge operation.

Figure 46:
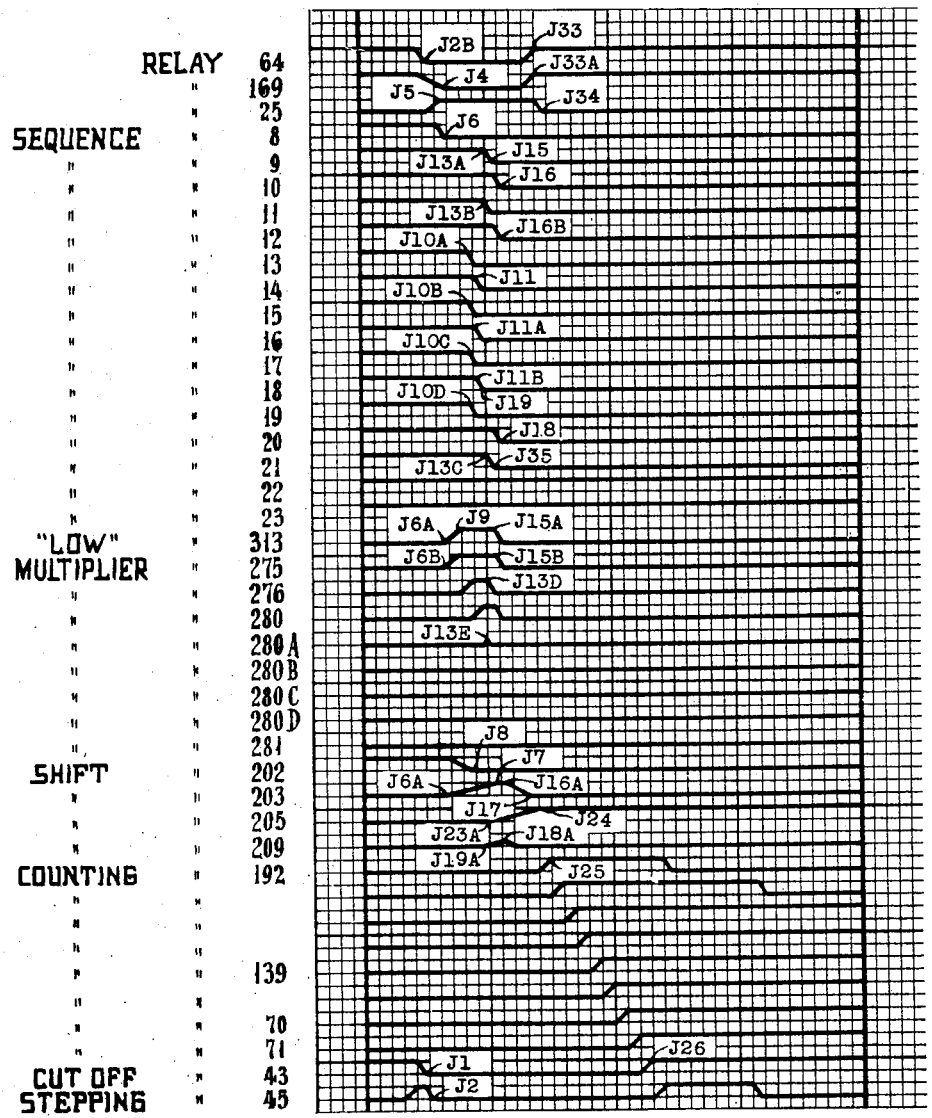
Figure 47:
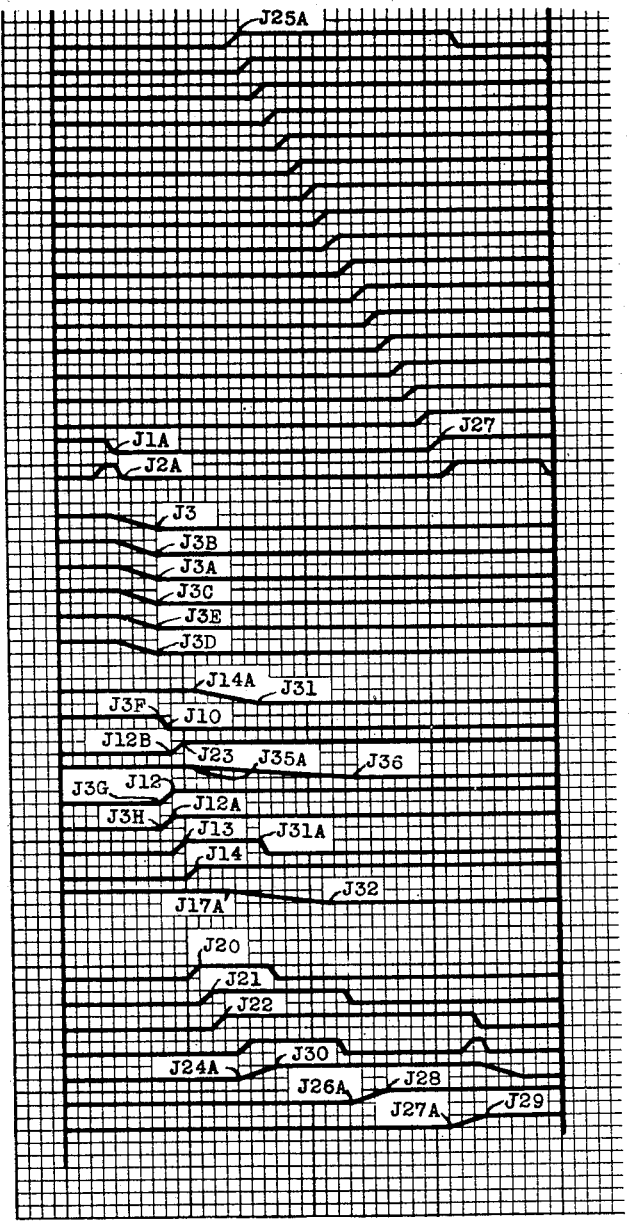
Figure 48:
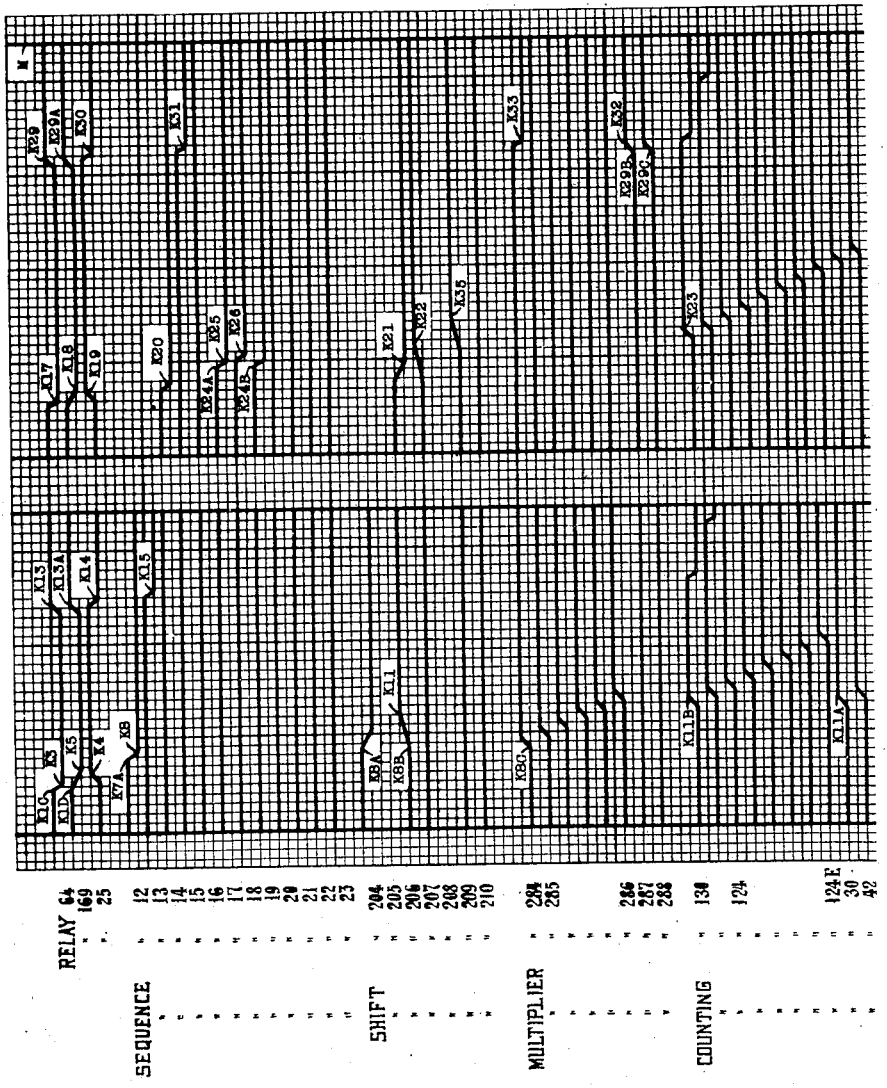
Figure 49:
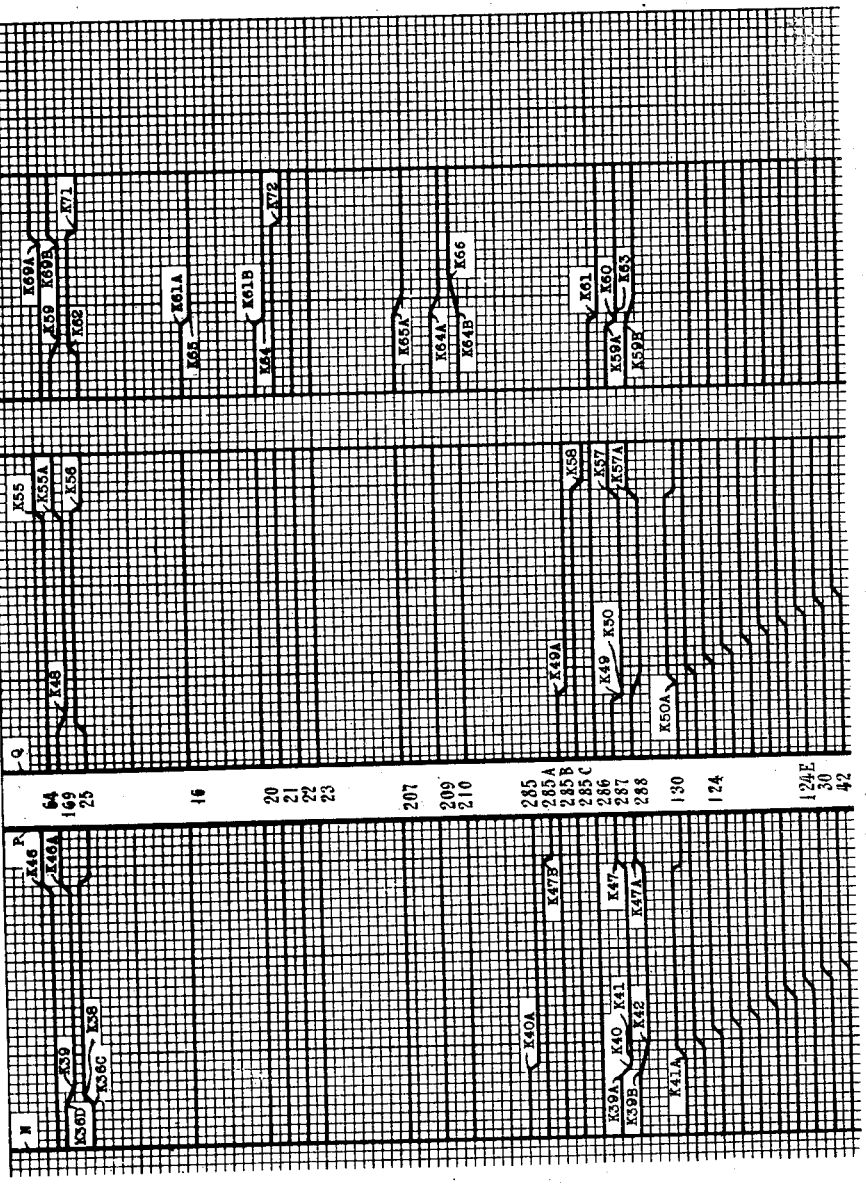
Figure 50:
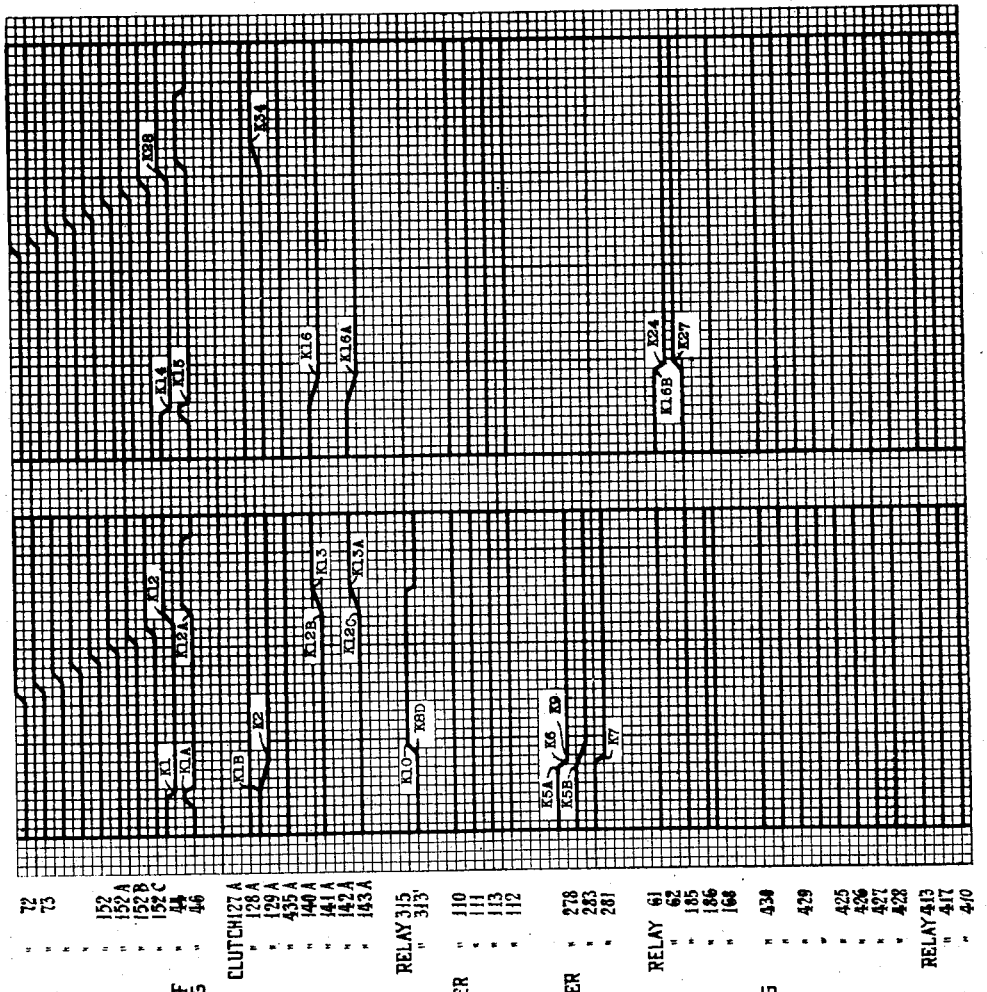
Figure 51:
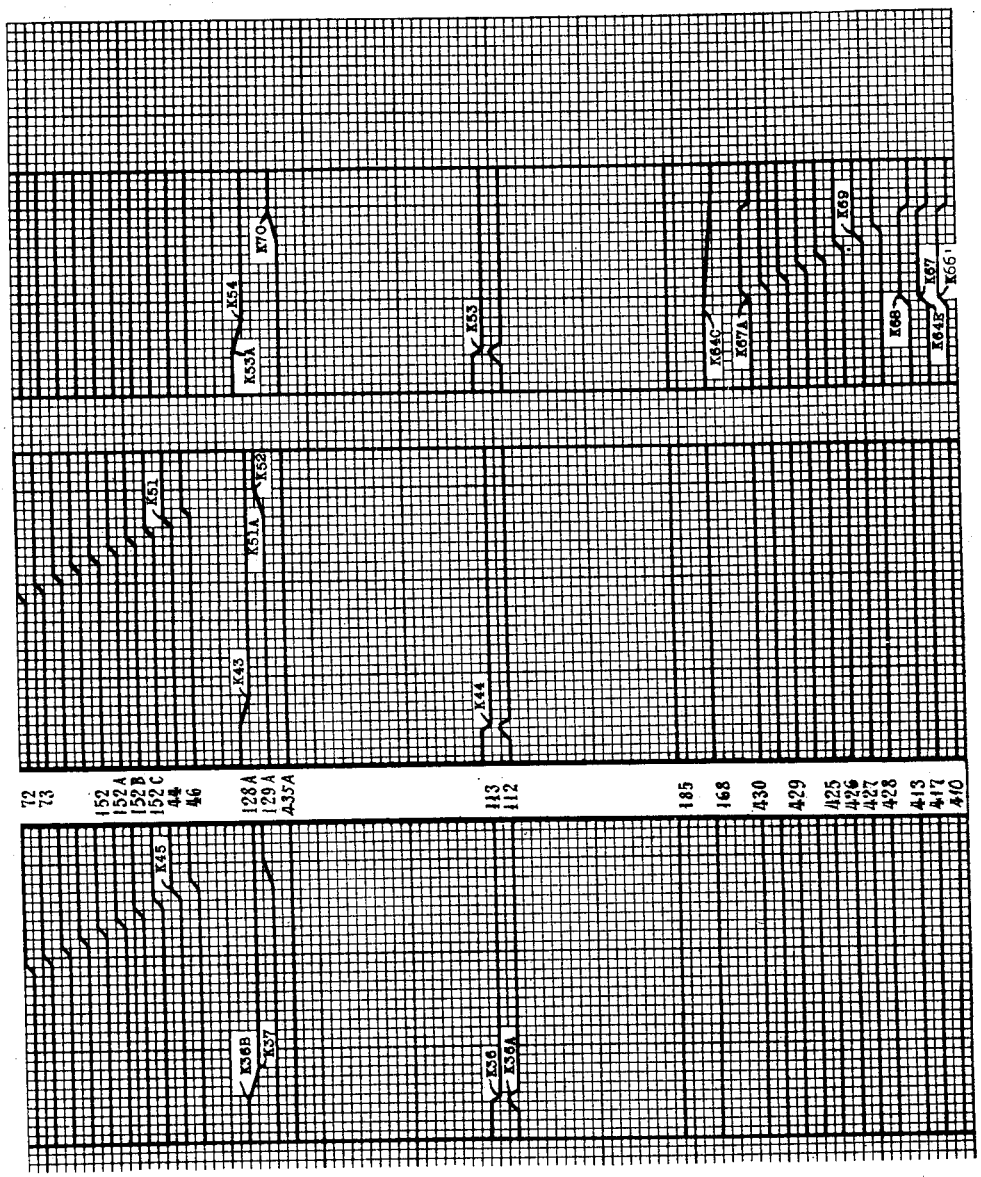

Figures 46 and 47 form a timing chart illustrating an operation involving a zero consumption.

Figures 48 to 51 form a timing chart illustrating a typical operation involving a consumption quantity of such magnitude as to include the whole of the first rate step quantity and a portion of the second rate step quantity.

Figure 52:
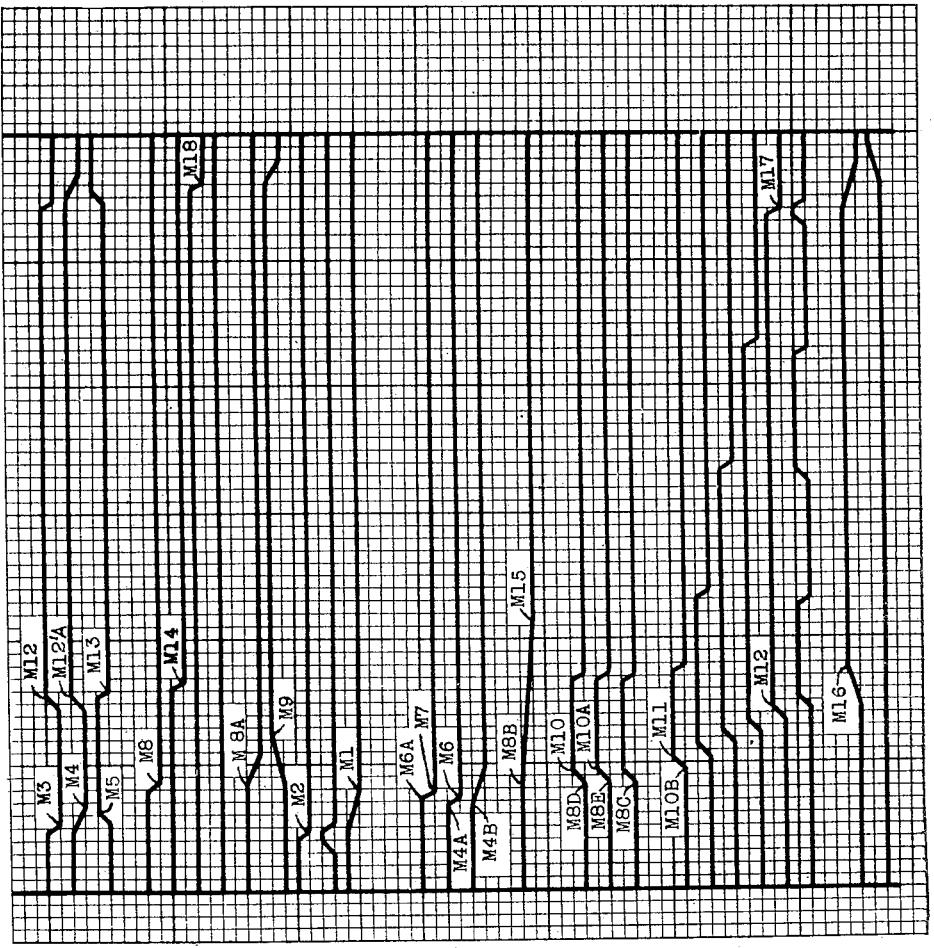

Figure 52 is a timing chart illustrating that part of an operation in which the designation wheel is rotated to signify that the amount charged the customer is higher than normal.

Figure 53:
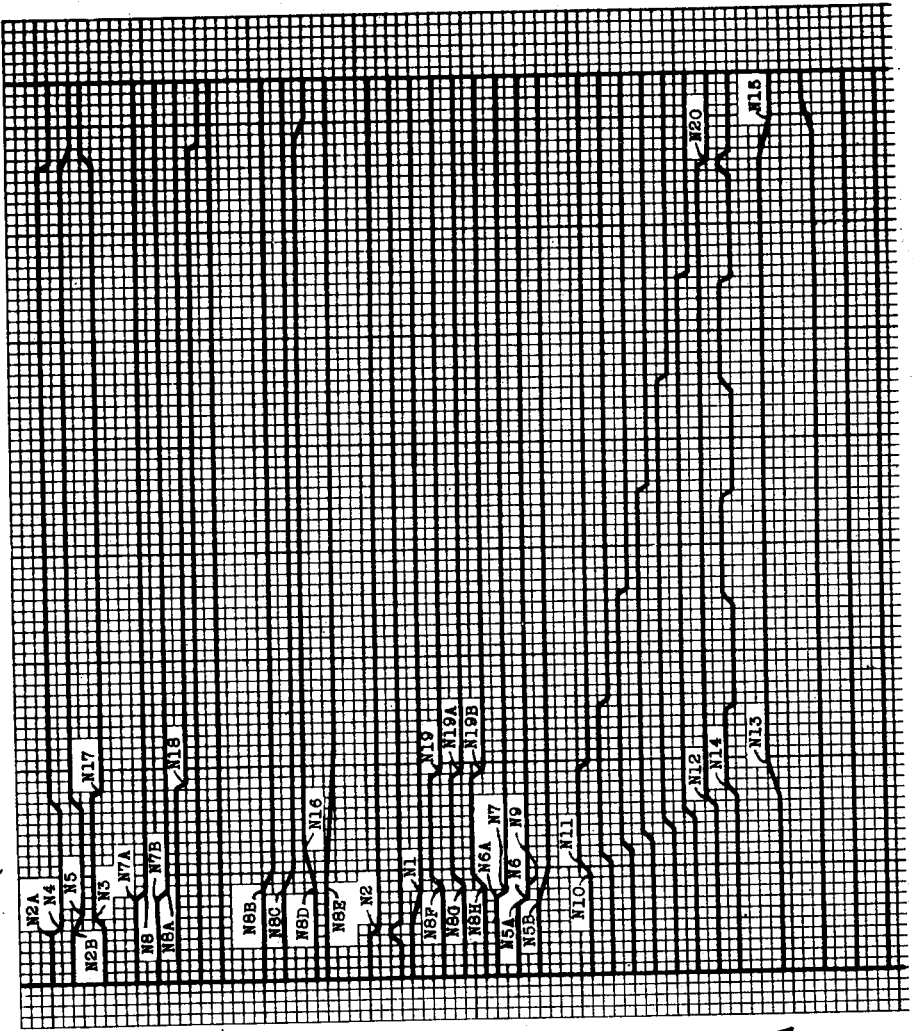

Figure 53 is a timing chart illustrating that part of an operation in which the designation wheel is rotated to signify that the amount charged the customer is lower than normal.

Figure 54:
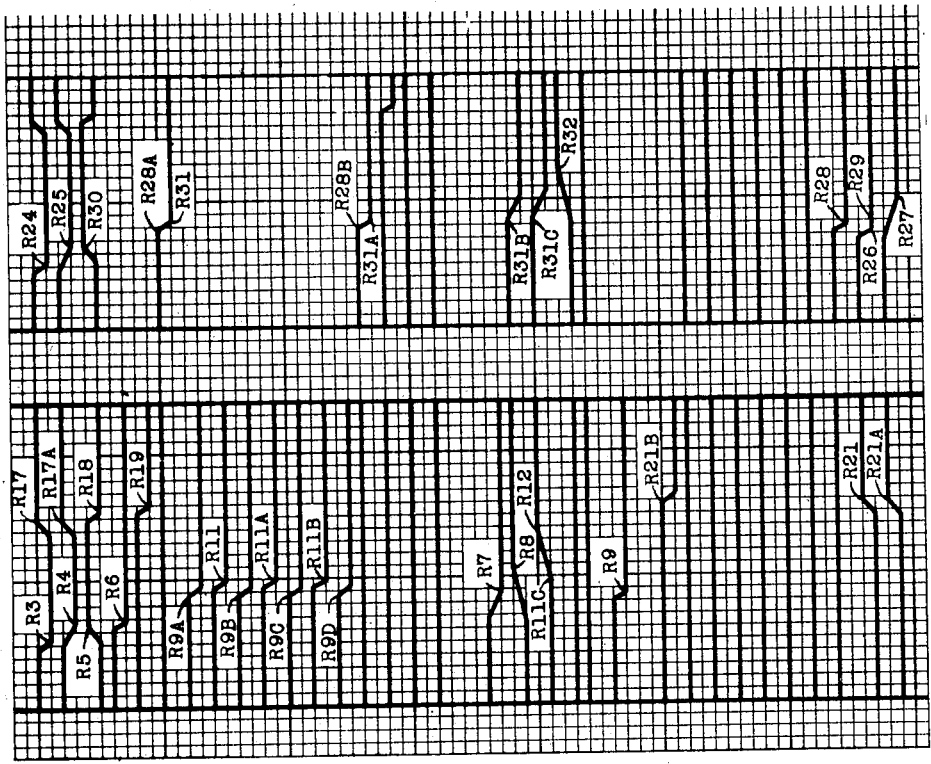
Figure 55:
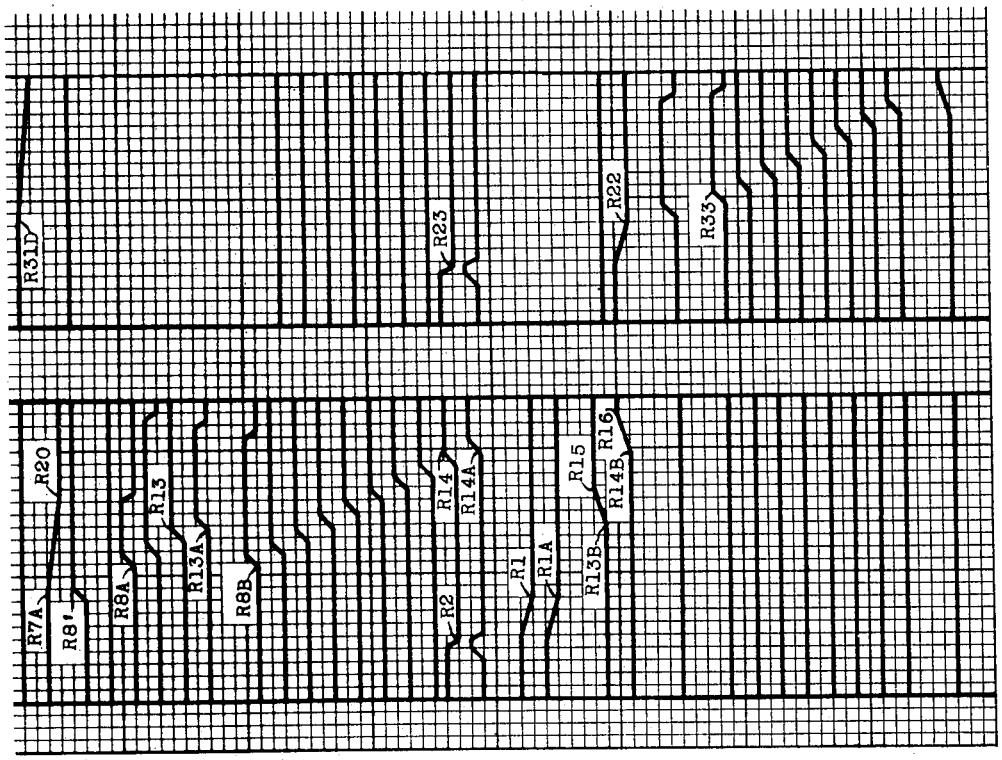

Figures 54 and 55 form a timing chart illustrating an operation involving a consumption quantity that is equal to the first rate step quantity.

Figure 56:
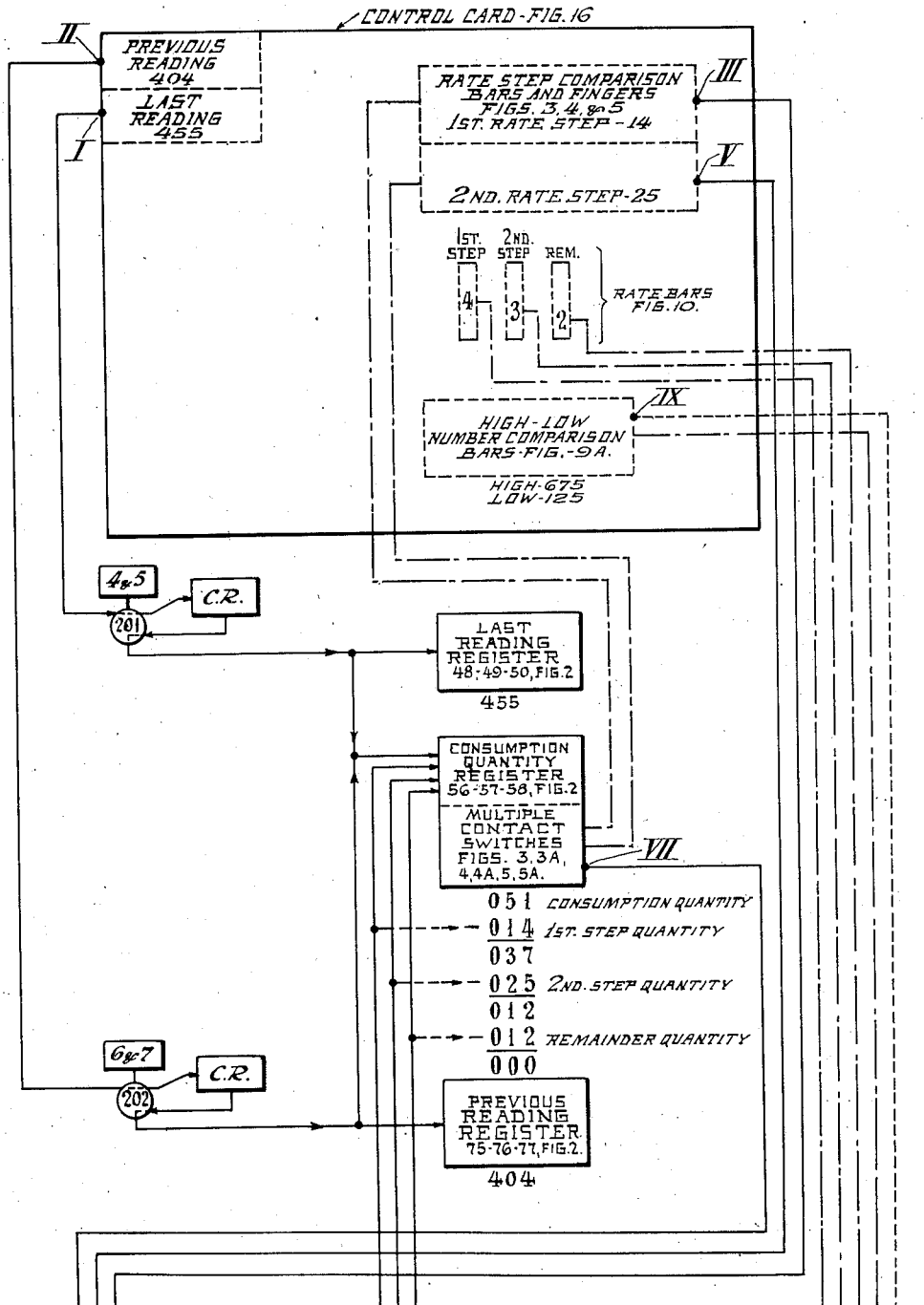

Figures 56 and 57 form a flow chart illustrating the sequential order and character of the actions entailed in the first described operation of the machine.

Figure 58:
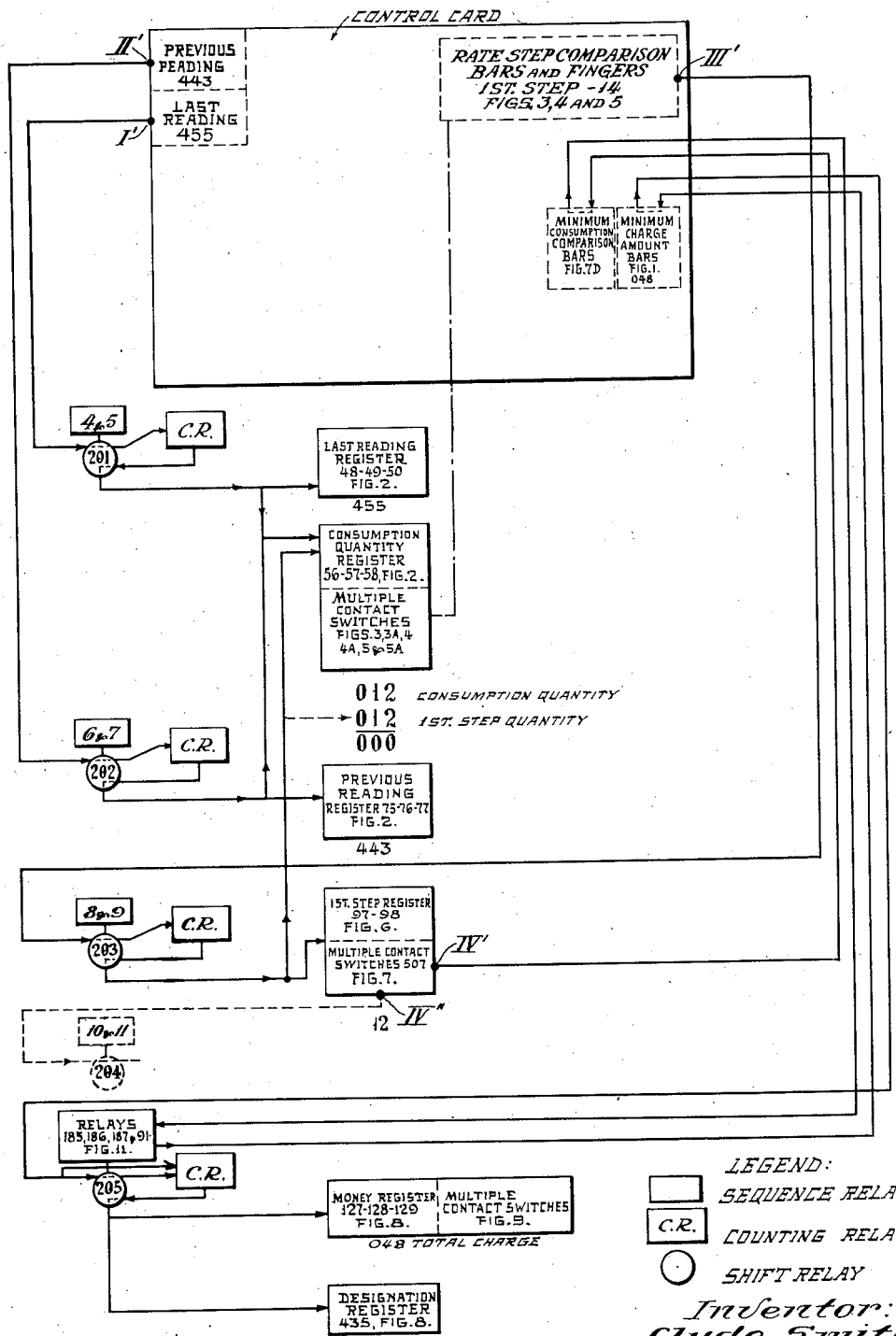

Figure 58 is a flow chart illustrating the sequential order and character of actions entailed in a minimum charge operation of the machine.

It will be observed that sundry conductors are broken, without extension from one sheet of drawings to another. Such have the same reference character in all places, and are referred to by repetition, for example, as "conductor 5G, 5G (Fig. 1)."

PRELIMINARY STATEMENTS

Following is an outline of the mechanisms and operations. References are made to subdivisions of the descriptions of Operation, where details are explained.

The automatic machine operation as a whole for a given bill begins with meter quantity readings for the last period and the previous period;

it ends with the registration of these readings, of their difference which is the consumption quantity, and alternatively of the minimum charge if the consumption quantity is less than a set amount, or the charge due to the multiplication of the quantity by a set rate, or the charge due to such multiplication in the several steps of a sliding scale of rates. In the last event, the registration includes the quantity for each of such steps, with the cumulated total charge. There may be a designation of H or L.

The operation as a whole includes: the control of the sequence of the various subordinate operations, with immediate switching from each to the next as soon as the due setting or computation, according to the particular readings and the consumption, is completed in any alternative; registration, subtraction, multiplication, and addition, through the number wheels, separately and simultaneously driven, of a given register, with due carry-over movements; comparisons of numbers to determine the selection of alternative or additional actions according to whether one is greater or less than another.

Practically all of the mechanisms and many of the circuits are conventional. The invention resides in combination and interrelation of means.

In the preferred form of the description, the first selections of circuits are through conventional contact bars and fingers, made electrically effective through cards perforated in numerical positions. Number wheel setting is controlled by a chain of counting relays for each order of numbers (hundred, tens, units), energized in pairs in number corresponding to an effective contact position; the wheel is magnetically clutched to a revolving shaft, and as it moves from digit to digit shunts out a stepping relay which on each energization and deenergization releases a pair of relays in the chain; on the last release, the clutch and wheel are released, having registered the due figure.

This method of registration is described and claimed in my application for patent filed May 31, 1932, and assigned Serial Number 614,411.

In much the same way the sequence relay chain governs the sequence of the various subordinate operations. The entire chain is energized practically at the outset; with deenergization of a relay an operation is started, through an application of current to a particular circuit or circuits; with the deenergization of its mate in the pair, such current is removed; with the completion of the operation, deenergization of the first relay of the next pair starts the following operation; and so on throughout. The sequence relay chain includes a sub-chain governing contingent operations, as multiplication (dependent upon the consumption quantity exceeding the set minimum quantity); this sub-chain is brought into control only when, and any of its several pairs are retained in control only so long as, the due computative conditions obtain. It is energized only when the consumption wheels are off zero. On its deenergization through their return to zero, the sequence relays which govern a necessary step, that of holding all registration wheels for reading and returning them to zero for the next billing, are put immediately into control. The successive sequence relay deenergizations are governed by a sequence control relay energized and deenergized by action of one or another relay at proper stages of operation, duly safeguarded by combination circuits when simultaneous actions irregularly completed occur within a sequence.

As outlined, number wheels are set by counting relays, to register the last reading of the meter and, later, the previous reading. (First and second sequences of Operation.) As the last reading wheels advance, they drive forward by gears the consumption number wheels; and as the previous reading wheels advance they drive the consumption number wheels backward to register the difference between the last and previous readings. On such a subtractive drive, a carry-over may be necessary, and, if such is the case it is effected by a modification of the chain relay action, as briefly outlined below for multiplication.

In each of these first two sequences of operation, and in other sequences wherein register movement is controlled by counting relays, one lot of such relays serves. Between the circuits electrified through the card perforations and the counting relays is interposed a multi-contact shift relay for each operating sequence, through which the connection is made.

The consumption reading appearing at the end of the second sequence may be less than the minimum quantity for which a charge is made, or it may exceed one or more of the quantities for which several multipliers are respectively applicable in a sliding scale of rates. This involves a comparison of numbers, which is effected through a system of electrical contacts so arranged as to provide a predetermined path for every possible position of the number wheels in relation to effective bar contacts. The system (as outlined under its special heading) includes ten groups of contacts for each of the number wheels involved in comparison—a group for each numerical position. All such contacts at a given position are closed as the wheel stands in such position; their conductors are related to corresponding positions on regular and special contact bars and numerically positioned relays. Contacts are closed on such bars according to a system of perforations in all equal, higher, and lower positions, as related to predetermined or standard numbers with which the computed consumption numbers are to be compared. The system provides combination circuits effective or ineffective according to the comparative numerical status of the wheels and the perforation positions.

In the first step comparison there are three alternatives: (1) the consumption quantity may be equal to or less than the minimum quantity as predetermined; (2) it may be more than the minimum quantity and less than or equal to the first step rate quantity; or, (3) it may be more than the first step quantity.

The path provided by circuits prepared when the first step quantity register is set for the minimum quantity, or less, of actual consumption effects the starting of registration of the minimum money charge, shown as effected from card perforations by like means as the last reading registration, the turning of a designation wheel to display the abbreviation MIN, and the release of all intermediate sequence relays to the last pair. (Detailed under the Operation heading relating to Minimum charge.)

When the consumption quantity exceeds the selected minimum quantity, other circuit paths will provide for the starting of subtractions from the computed consumption quantity of the successive step quantities or a portion thereof embraced in the consumption quantity, according to the perforations for such quantities; the registration of such quantities; and their multiplication according to the respective rate perforations, with provision for terminating the registration and computation with the exhaustion of the consumption quantity at any step.

The consumption wheels are left in position for reading. First step registering wheels are driven forward, by counting relay action, to take the position determined by the card perforations (third sequence). As they advance, they drive divisions of the consumption wheel assemblies backwardly, each including a contact-closing wheel, a back stop wheel, and a carry-over wheel. It is through these contact-closing wheels that the comparisons are effected.

When all the back stop wheels as 56C associated with the consumption quantity register (Fig. 2) reach zero, they adjust the contacts 60B and 60D (Fig. 2) which condition the control circuits for omission of any sequential operations then unnecessary to completion of the proper entries and computations, thus avoiding idling cycles as fully described hereinafter under the sub-heading Operation for minimum charge. For instance, in the present example, where the control card is perforated for a first rate step of 14 and a minimum consumption of 12, if the actual consumption is but 12 the comparison circuits will detect this fact and cause the entry of 12 (as distinguished from 14) upon the first rate step register concurrently with the movement of the contact closing wheels and said back stop wheels of the consumption register backwardly from 12 to zero, whereby the contacts 60B and 60D are adjusted to condition the control circuits so as to proceed immediately with the sequential operation for entry of the minimum charge amount in the money register and to omit entry and multiplication sequential operations pertaining to the second and remainder rate steps.

A chain of multiplier relays, similar to the counting relays, is initially energized to a numerical position determined by card perforations. These are released pair by pair, however, by successive rounds of action by the counting relays which represent the multiplicand, as will appear in the next (the fourth) sequence.

(Fourth sequence.) Associated with the number wheels of the first step register are contact-closing wheels, the circuits related to which effect the energization, through a shift relay, of counting relay chains in the several orders of numbers, according to the register wheel positions. Through additional contacts of this shift relay, the counting relay chains govern registrations on money charge wheels (Fig. 8), which have the regular shunting-stepping-relay-clutch combination.

After the relays representing the multiplicand are energized, they are deenergized pair by pair in each order of notation as the respective number wheels advance, effecting the first registration according to the number of pairs thus deenergized. On the deenergization of the cut-off relay, following that of the last No. 1 counting relay pair, instead of the conditioning of the relays controlling the next sequential operation, there is immediate reenergization of these counting relay chains and deenergization of the pair of multiplier relays in the highest numerical position. The final deenergization of these relay chains is determined by deenergization of the No. 1 pair of multiplier relays. Thus the number represented by the first step wheels (whether all or part of the consumption quantity) is repeatedly added to the money wheels (Fig. 8), as many times as there were multiplier relay pairs energized under control of the card.

This mode of multiplication is also described and claimed in my co-pending application, Serial Number 614,411.

In the multiplications, due carry-overs are effected between successive reenergizations of the counting relays. On each money number wheel between the 9 and the 0 positions is a contact-closing stud. The contact, if closed by number wheel movement, energizes a pair of relays similar to the counting relays and related in like manner to the clutch of the number wheels of next higher order, there being a shunting contact, and stepping relay, associated with the number wheel. While said number wheel of next higher order is clutched and advanced to its due digit, the relay pair is released through the shunting contact and the stepping relay and the clutch is disengaged, whereupon the counting relay chains are reenergized if any multiplier relays remain energized.

(Fifth and sixth—contingent sub-chain—sequences.) The second step registering is effected by the counting relays energized from the comparing circuits through a shift relay, as is the first step registering, and, as in the first step registration, if the consumption quantity falls short of supplying the complete rate step there will be entered only so much of the rate step as exists. When the rate step falls short of its whole, the contact closing wheels as 58D of the consumption quantity register will be returned to zero simultaneously with the completion of such rate step entry. Such an operation involving a consumption quantity that consists of the whole of the first rate step and but a portion of the second rate step is fully explained hereinafter under the sub-heading Consumption consisting of first rate step and part of second rate step. Irrespective of whether this entry is coextensive with the second rate step, the second step contact-closing wheels control the set up of counting relays, as before, representing a multiplicand. Card perforations control the set up of multiplier relays, and the multiplying action proceeds as in the first step. Multiplier relays are shown in three lots, for convenience of illustration; one lot with three shift relays would serve the purpose.

(Seventh and eighth—sub-chain—sequences.) The remainder of consumption quantity above the second step is not predetermined, though the rate multiplier is. The latter is represented by a card perforation, and the multiplier relays are energized accordingly. The relays in this step for the multiplicand are set up according to the position of the consumption contact-closing wheels. Multiplication proceeds as before.

(Ninth sequence.) Sequence relay 20 and its mate 21 are not both released for eliminating the comparison of the money charge amount with the special card perforations for unusually high and low standard figures, through any operation except that for a minimum charge. When sequence relay 20 alone is released in due operating course, it may find a path prepared from the money contact-closing wheels through the bars for which the perforations have been made. If it does, an operation proceeds, under control of the special group of counting relays, at the bottom of Fig. 13, to move the designation wheel to exhibit H or L. If no such path is found, the sequence relays 21 and 22 are immediately thereafter released, for initiating the next and final action.

(Tenth sequence.) At whatever stage the consumption wheels reach zero, the computation then under way becomes the last, except for a possible H or L registration. The last of the sequence relays are deenergized to effect, through slow solenoid action, the holding of the number wheels for reading (or it might be printing) and the eventual energization of a zero-setting circuit whereby all off-zero number wheels are clutched to their moving shafts and returned to zero.

DESCRIPTION OF APPARATUS

In describing the apparatus, which is made up very largely of conventional elements, I indicate the functions of many of the parts and circuits. A full account of the operation follows in which the circuits are traced in detail.

Figure 1:
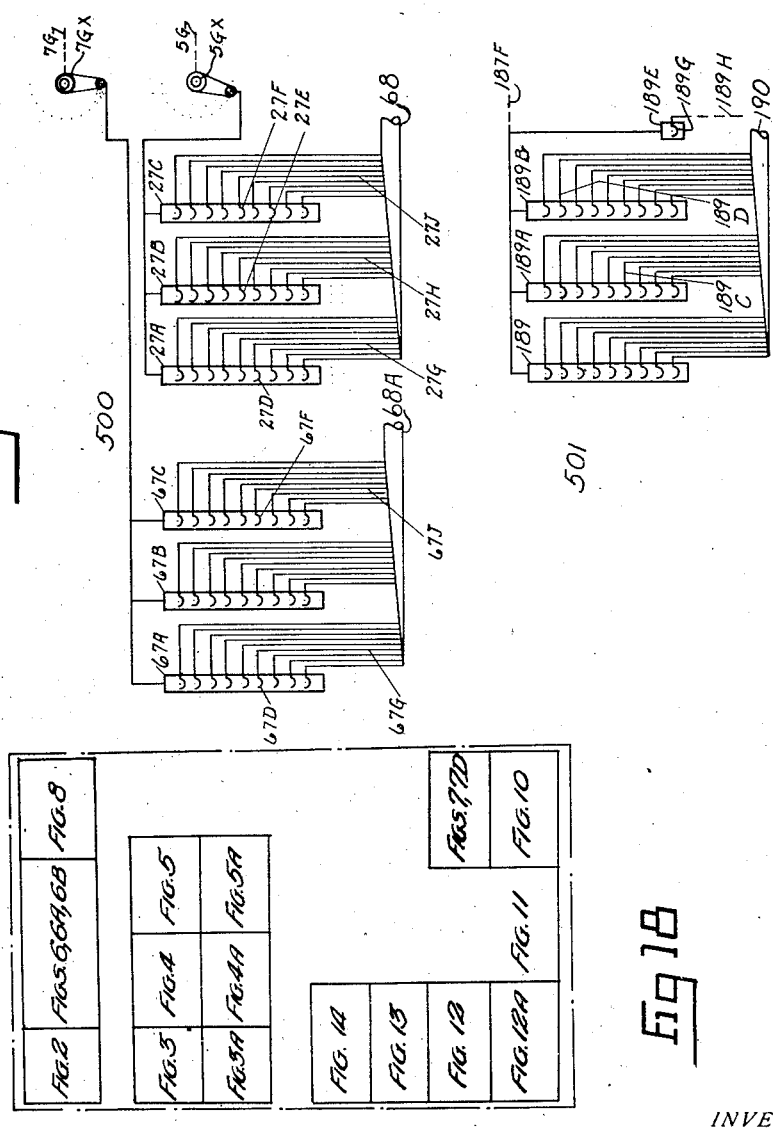

*Contact bars and fingers for last reading, previous reading, and minimum money charge. Figure 1*

All contact bars and fingers of the machine are of conventional form. Their purpose is to complete selected electrical paths through the various card perforations. The wiring of each set of fingers is made up to form a cable; the cable is shown as broken off at a point near the fingers and at a point near the other terminus —at both places bearing the same reference character. Each finger is wired to a correspondingly positioned contact in a shift relay (Figs. 12 and 12A).

At 500 in Fig. 1 there are shown the last and previous meter reading bars, 27A, 27B, 27C, and 67A, 67B, 67C, and their fingers. They are for the purpose of grounding, through the perforations, the selected contact fingers, and thereby setting up circuits to position the last reading wheels (Fig. 2 at 502—502) and the previous reading wheels (Fig. 2 at 504—504), numerically according to the figures represented by the perforations.

Two switches 5GX and 7GX are provided. The blade of switch 5GX is connected to conductor 5G, which is momentarily grounded by the action of sequence relay pair 4—5 (Fig. 11) on a last reading operation. Switch 7GX is wired to conductor 7G, and is momentarily grounded by the action of sequence relay pair 6—7 on a previous reading operation.

At 501 are shown the minimum money charge bars, 189, 189A, 189B, and MIN designation bar, 189E. They are for the purpose of setting up circuits to register on the money wheels (Fig. 8) the amount of the minimum money charge as represented by card perforations and to move the designation wheel, 435, to display MIN if the consumption quantity is within the figures represented by perforations for the minimum comparison bars (Fig. 7D).

Figure 2:
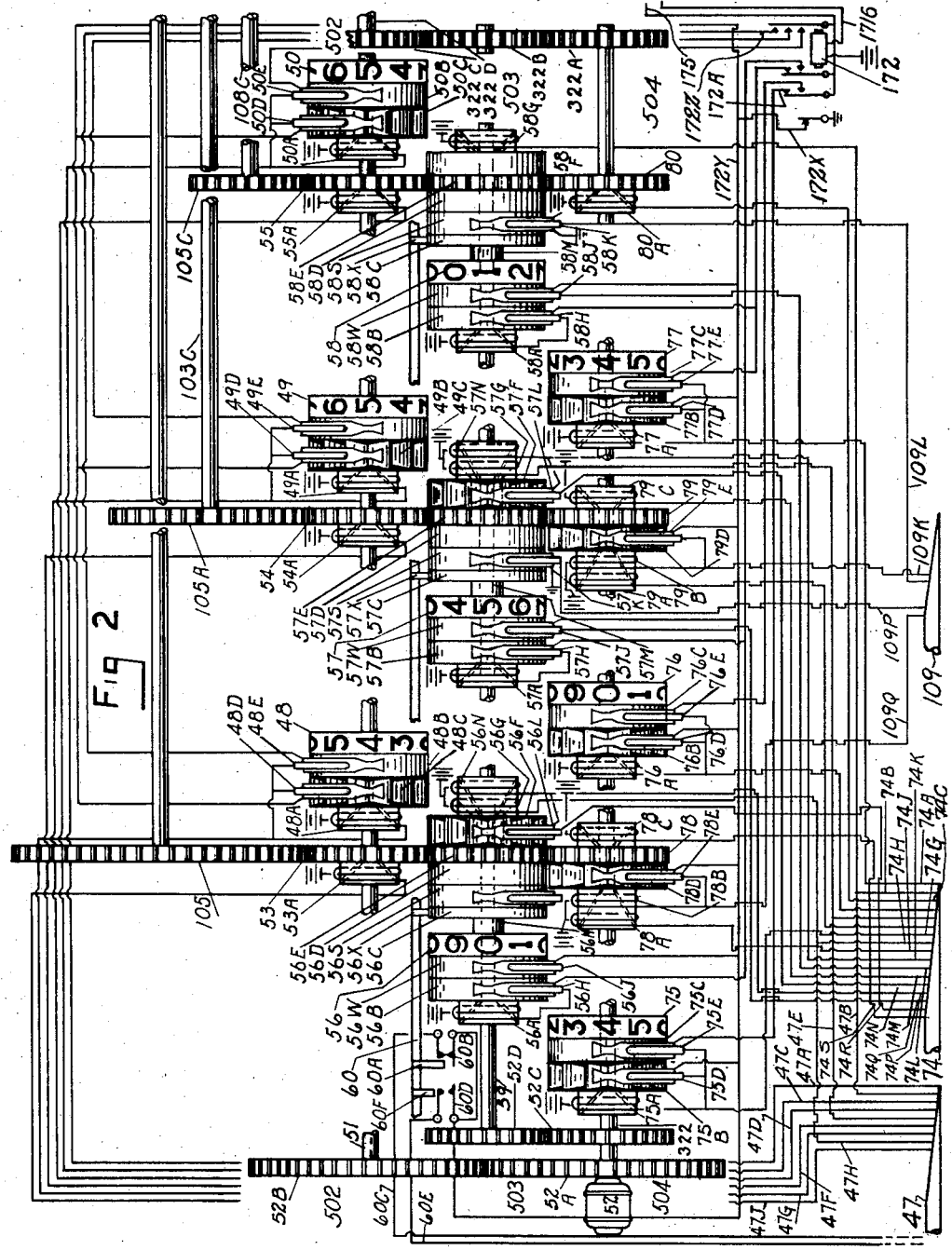

*Registering wheels for last reading, previous reading, and consumption quantity. Figure 2*

In Figure 2 are shown three registers driven by motor 52 and its associated gears and shafts. The three number wheels shown in line with 502—502 are for the purpose of registering the last meter reading, in hundreds, tens, and units, and indirectly of computing the consumption quantity; they are advanced to their numerical positions, according to card perforations, by the action of counting relays (Fig. 13) as will be described in the first sequence of Operation. The three in line with 504—504 are for a like purpose in relation to the previous meter reading and the consumption; they are likewise governed by the counting relays. The three in line with 503—503 are gear-driven forward in connection with the last reading wheels, and backward in connection with the previous reading wheels, for the purpose of registering their numerical difference, which is the consumption quantity, and, through contact-closing wheels, of setting up circuits for further operations.

Each registering wheel assembly, alike for the last and previous readings, includes for each order of numbers, a number wheel, or band, as 49 (in the tens order of last reading register 48—49—50), a zero-setting wheel, as 49B, a zero-setting contact, as 49E, a shunting wheel, as 49C, a shunting contact, as 49D, and a conventional magnetic clutch, as 49A. These wheels ride freely on their several shafts; they are moved forward by their shafts when connected by a clutch, as 49A, under control of the counting relays of the order, as 29 and its mate 41 (Fig. 13). The armature of the clutch is attached to the shaft; the field piece is formed by the hub of the wheel; the coil is stationary.

The clutch coils, as 49A, are connected through the contacts of the shift relays (Fig. 12), and are in series with the stepping relays, as 45 (Fig. 13), and are connected to contacts, as 43C of cut-off relay 43 (Fig. 13), where the circuit is closed. When clutch 49A is energized, the wheel takes motion; and on each movement from digit place to digit place, shunting wheel 49C closes and opens shunting contact 49D, grounding it upon closing and shunting out stepping relay 45.

All number wheels except the consumption wheels (at 503—503) operate in like manner.

Details of a consumption wheel assembly are shown in Figure 15. The assembly for each order of numbers is composed of two divisions. After the entire assembly has been driven forward and backward, as mentioned above, the left-hand division shown in detail at 512 in Fig. 15, remains stationary to display the consumption quantity reading, and the right-hand division shown in detail at 513 in Fig. 12, is driven backward, in one or more steps, to zero.

The left-hand division includes a number wheel, as 57 (in the tens order), a zero-setting wheel, as 57B, zero-setting contacts, as 57H, a zero-setting clutch, as 57A, a carry-over wheel, as 57W, and contact, as 57J, and a sleeve, as 57M. The right-hand division includes a carry-over clutch, as 57N, a carry-over shunting wheel, as 57F, and contacts, as 57L (effective for a carry-over on both units in subtractive movement) a gear wheel, as 57E, a contact-closing wheel (shown without contacts), as 57D, a carry-over contact-closing wheel, as 57S, and contact, as 57K, effective for this division only, a back stop wheel, as 57C, and a back stop, as 57X. Fragmentary side views of contact-closing wheels 56D, 57D, 58D, and their contacts, are shown in Figures 3, 3A, 4, 4A, 5, 5A.

The sleeve, as 57M, and a clutch, as 57G, serve to bind the two divisions together, riding freely on shaft 59, when driven successively with the last and previous reading wheels. The sleeve also serves as a bearing for the right-hand division when it is driven independently of the left-hand division, successively with the first step, second step, and remainder registering wheels (Figs. 6, 6A, 6B).

The three back stops, 56X, 57X, 58X, are joined to bar 60, which is for the purpose of closing contact 60B by pin 60A when any back stop wheel is off zero, and closing contact 60D by pin 60F when all back stop wheels are at zero. Sundry effects are produced by all the consumption wheels returning to zero, according to operating conditions, particularly detailed in the description of the sequence relays (Fig. 10), and with the electrical paths traced in the several descriptions of Operation.

The consumption contact-closing wheels, in connection with the bars and circuits of Figures 3, 3A, 4, 4A, 5, 5A, and the card perforations of Figure 16, set up circuits to position the first step, second step, and remainder wheels for registration and multiplication or alternatively for the minimum charge registration.

Operating in connection with the last reading wheels, 48, 49, 50, are gear wheels, 53, 54, 55, each of which has a clutch, as 54A, energized at the same time as and so long as the energization of clutches as 49A. Such a clutch is energized through the contacts of the shift relay and from contacts as 43E of cut-off relay 43 (Fig. 13). These gears are for the purpose of advancing the complete consumption wheel assemblies, through gears as 54 and 57E. Gears 53, 54, 55, also serve as idlers between gears 56E, 105, 57E, 105A, and 58E, 105C, on subtractive connections of the consumption contact-closing wheels with the advancing first step, second step, and remainder registering wheels.

The previous reading wheels, 75, 76, 77, are of the same construction and operation as the last reading wheels. Operating in connection with these are gears 78, 79, 80, which have clutches 78A, 79A, 80A, for driving all consumption wheels backward. Gears 78 and 79, for hundreds and tens, also have clutches, 78B and 79B, and shunting wheels 78D and 79D, for shunting out the carry-over stepping relays, as 162 (Fig. 14), when a carry-over is due on a subtractive movement of the consumption contact-closing wheel (right-hand) division in connection with advancing first step, second step, or remainder registering wheels. Clutches 78C and 79C are for the purpose of effecting a carry-over on both consumption wheel divisions in a subtractive operation on their driving with the previous reading wheels.

Cables 47, 74, 109, terminate in like-numbered cables in the shift relay drawings (Figs. 12 and 12A), being there wired to contacts bearing the same reference letter.

Relay 172 is for zero-setting the several number wheels in Fig. 2 when energized in the final operating sequence. Zero-setting contacts as 75E are closed by wheels as 75C when they leave their zero positions, and are opened upon the return of such wheels to such positions; on the energization of zero-setting relays as 172, contacts as 172A and 75E are grounded, energizing clutches as 75A, and causing the wheels to take motion until zero-setting wheels as 75C return to their zero positions and open contacts as 75E.

The driving mechanism as shown, motor 52 and its associated gears, 52A, 52B, 52C, 52D, shafts 322, 59, 51, and the various magnetic clutches, is merely illustrative; the parts being arranged to indicate the several movements without undue complications. Gears 322A, 322B, 322C, are for the purpose of driving shaft 322D (Figs. 6, 6A, 6B), and 322D (Fig. 8).

Contact-closing wheels and contacts. Sundry figures

Certain wheel assemblies include contact-closing wheels, conventional in form, for single and multicontacts. Such contact closing wheels are associated with the consumption wheels (Fig. 2, 503—503), the first step, second step, and remainder registering wheels (Figs. 6, 6A, 6B), and money wheels (Fig. 8). The purpose of the multi-contact-closing wheels is to establish circuits according to numerical position, to govern succeeding operations. The contacts closed by these in their rounds of numerical position can not well be shown in circular arrangement for the wheels in the figures mentioned; accordingly the wheels are shown elsewhere in fragmentary side view, with the groups of contacts, one for each digit position, shown in developed view, with the several groups for each order of digits arranged vertically. In practice they would be arranged in a circle, or, preferably, closed by multi-contact relays energized through single contacts arranged in such a circle.

Consumption contact-closing wheels 56D, 57D, 58D, are shown less contacts in Figure 2. Fragmentary side views of these wheels and developed views of the wiring are shown in Figures 3, 3A, 4, 4A, 5, 5A; while for the first step, second step, and remainder registers, the contact-closing wheels, respectively 97B, 98B, and 140B, 141B, and 198B, 159B, 154B, are thus shown in Figure 7; and the contact closing wheels 127B, 128B and 129B for the money wheels, 127, 128, 129, in Figure 9.

Figure 3:
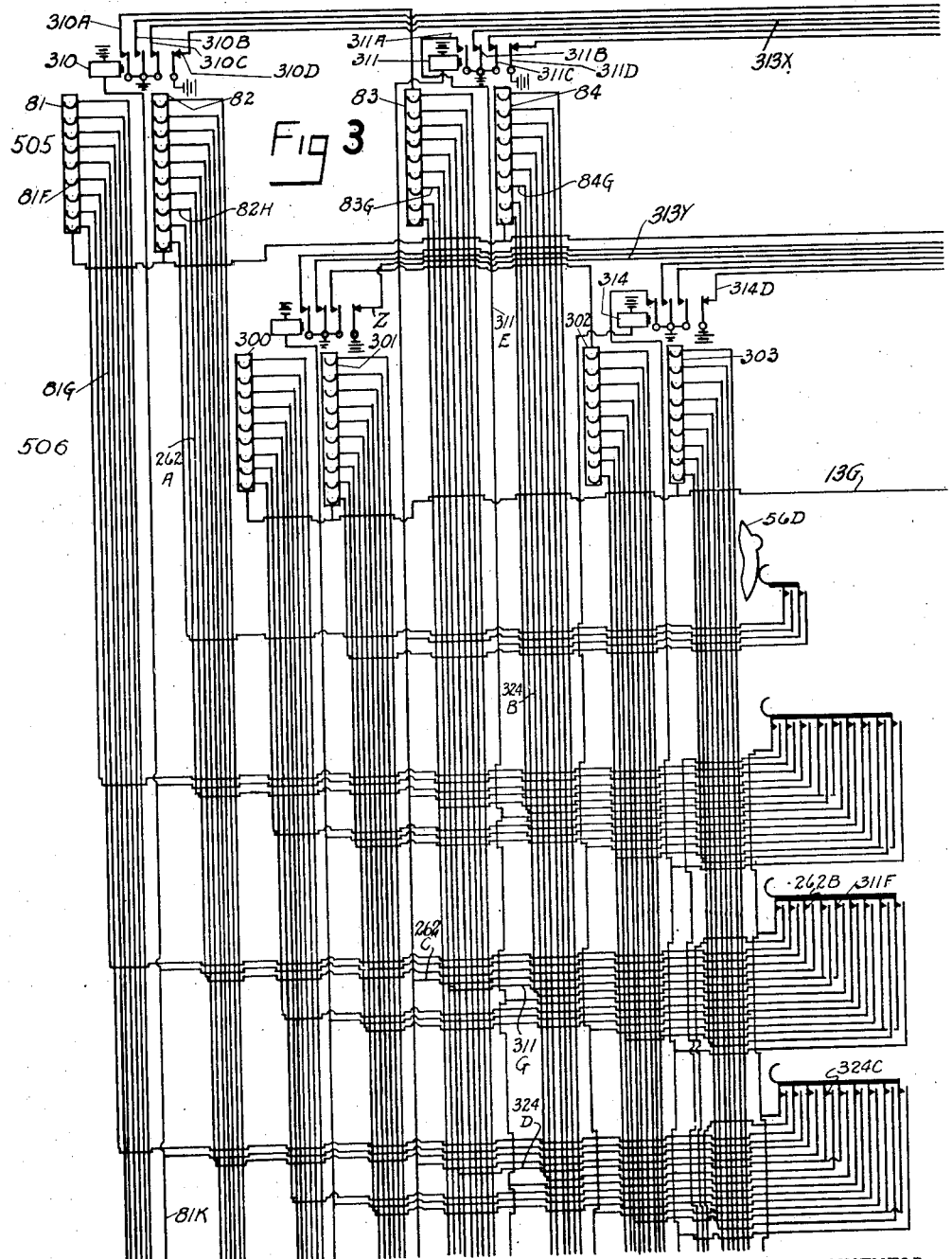

Each such wheel has a stud, as 97X (Fig. 7), situated as at zero, which in any numerical position of its associated number wheel closes all of a series of contacts. In Figures 3 and 3A, for example, are shown ten such series, with contact-closing wheel 56D in fragmentary side view (Fig. 3) for the hundreds; in Figures 4 and 4A, wheel 57D and a like series are shown for the tens; in Figures 5 and 5A, wheel 58D and a like series are shown for the units. The wheels are shown in neutral position. These figures also show the circuit connections of these contacts with fingers of contact bars and with cables leading to shift relays; which bars and shift relays are described under respective headings.

The mode of operation of all the contact-closing wheels and related contacts, with tracing of the circuits, will appear under various Operation headings.

Wheels closing single contacts are illustrated in connection with their respective registers, with their contacts shown in place; as, carry-over contact-closing wheel 56W and its contact 56J, and zero-setting wheel 56B and its contact 56H, in Figure 2 at 503—503. Wheels referred to herein as contact-closing wheels without other designation are multi-contact-closing wheels as identified under this heading.

Contact bars, contact fingers, and wiring, for comparison of numbers for step registrations. Figures 3, 3A, 4, 4A, 5, 5A The bars and circuits of these figures are for the purpose of "breaking down" the consumption quantity into steps, as determined by perforations, for rate multiplication.

The actual consumption quantity, according to the position of the consumption contact-closing wheels, is termed the comparison number; the number for which perforations have been arranged is termed the standard number. The quantity is to be registered for what it is if no more than the standard number (as of the first step); if it is more, the standard number is to be registered in its step (first or second), and the remainder of the quantity carried to the next step. Added explanation of such comparisons and others is included under the special heading of Comparison of numbers.

The hundreds bars are shown with their circuit connections in Figure 3, the tens bars and connections in Figure 4, the units in Figure 5; all for the first step in line with 505—505, and for the second step in line with 506—506.

First step bars are numbered 81, 82, 83, 84, for hundreds; 85, 86, 87, 88, for tens; 89 and 90, for units; the second step bars are, correspondingly, 300, 301, 302, 303 for hundreds; 304, 305, 306, 307 for tens; and 308 and 309 for units. Special perforations for such bars are illustrated in Figures 16 and 17.

Fingers associated with the bars are connected by conductors to counting relays (Fig. 13) through the contacts of shift relays (Figs. 12 and 12A), and contacts of the cut-off relays associated with said counting relays are selectively connectable through said shift relays with the clutches for advancing the registers in Figs. 6, 6A and 6B.

Operations, with tracing of circuits, are described under Operation headings below.

Briefly, as to the perforations and their effects: In the tens order of the first step, the bar 85 is a high bar, 86 (with a zero space) a low bar, 87 a maximum bar, and 88 an equal bar. Those for the hundreds correspond to those for the tens. Of those for the units, 89 is a combined high and maximum bar; 90, a combined equal and low bar. The function of the maximum bars is to determine the contact through which may be registered the maximum amount (in the example of 14, 1 in the tens) when this is exceeded. Equal figures are registered through equal bar contacts when the standard and actual digits are the same; lower figures are registered through low bar contacts when the actual digit is below the standard and the consumption quantity does not include a digit of higher order.

In the tens order for the first step, with the example of 14, the perforations for the high bar are in every position above the standard figure (1), as 85AA to 85HH (Fig. 16), the lowest being in position 2; the perforations for the low bar are in every position below the standard figure, or, in this case, 0 only; for the equal bar and for the maximum bar, in the position of the standard figure, as 88JJ and 87JJ respectively, in position 1. For the units combined low and equal bar, 90, is a perforation in the position of the standard figure and every lower position; for the combined high and maximum bar 89, there is a perforation on the right-hand, or maximum, side, in the position of the standard figure, and on the left-hand, or high, side, in every position above.

Fingers positioned numerically on all of these first step bars are connected with conductors extending to contacts closable by the consumption contact-closing wheels in corresponding numerical positions. From certain of such contacts conductors extend to prepare circuits through shift relay contacts to counting relays of like numerical significance. From the fingers of the maximum bars 83, 87, 89, circuits extend likewise to such relays. Like arrangements apply to the second step bars and fingers.

From the sequence relay controlling the operating sequence (the third) for the first step, all these first step bars are grounded except the maximum bars. According to the standing of the contact-closing wheels for the several orders, certain of the fingers which register with card perforations are grounded and utilize one bar in each order for registration. High bars can not be made effective for energizing counting relays and producing registrations except indirectly through maximum bar fingers and their circuits. Low and equal bars may, according to relay actions, effect such results through contact-closing wheels.

Associated with high bars 81 and 85 are high relays, respectively 310 and 312. Relay 310 is energized from bar 81, through a finger, as 81F, a conductor, as 81G, a contact, as 81H, conductors, as 81J and 81K (Figs. 3A, 3), when the hundreds wheel stands in a higher position than the standard figure. When energized, relay 310 grounds the three maximum bars 83, 87, 89, from its contacts 310A, 310C, 310B, and energizes directly through card perforations in the equal positions the corresponding counting relays. Through its contact 310D, relay 310 prevents the energization of tens low relay 313, which under certain circumstances would cause energization of units order counting relays of greater numerical significance than the units order digit of the rate step to be entered and thus result in a misentry. For example, in the present illustration where it has been assumed that the hundreds order digit of the actual consumption is 4 (since the No. 4 contact finger 81F was said to be effective through the contact 81H of the No. 4 multiple contact switch for energizing the high relay 310), it will be further assumed that the tens and units order digits of the actual consumption quantity are 0 and 5. Therefore, the hundreds order No. 4 multiple contact switch (Fig. 3A) will be closed, the tens order No. 0 multiple contact switch (Fig. 4) will be closed and the units order No. 5 multiple contact switch (Fig. 5A) will be closed. The existence of the first rate step quantity, 14, is being ascertained and inasmuch as the consumption quantity 405 exceeds the first rate step 14, the amount of such rate step exists and is to be stored in the counting relays preparatory to entry in the first rate step register. The low bar 86 (Fig. 4), grounded through conductor 9G as hereinafter explained, will impress ground through the now closed contact 86U of the tens order No. 0 switch and vertical conductor 316C (Fig. 4) upon one side of the low relay 313 which would energize from battery at high relay contact 310D if such relay were not energized as above described. Assuming for the moment that the low relay 313 had been permitted to energize, it would have closed its right-hand contact 313B and impressed ground through conductor 313W (Figs. 4, 5 and 5A), conductor 325X, contact 325Y of the now closed units order No. 5 multiple contact switch, conductor 325Z and the No. 5 vertical conductor 100W for causing energization of the No. 5 pair of units order counting relays. This operation, prevented by the energization of high relay 310 as above explained would cause a misentry since the No. 4 pair of such relays is to be energized. On the other hand, if the hundreds order digit of the actual consumption quantity had been 0 so that the consumption quantity would have been 005, the high relay 310 would not have energized, wherefore the low relay 313 would have been permitted to energize in the manner just described and set up the 5 in the tens order of the counting relays, and this time correctly since the quantity 5 would be as much of the first rate step quantity as exists.

Associated with low bars 82 and 86 are low relays 311 and 313. Relay 311 is energized from bar 82 when the hundreds wheel stands in a lower position than the standard figure. When energized, it grounds through contacts 311A, 311B, 311C, conductors, as 311E, and contacts, as 311F, energizing counting relays directly from contact-closing wheel contacts. Also it opens contact 311D and prevents energization of relay 312. Relay 313, when energized, serves in like manner for the tens.

Thus when the hundreds wheel stands in a position either higher or lower than the standard figure, it controls registration of the standard number or alternatively of the comparison number throughout every order below. If it stands in the equal position, this control is transferred to the tens order. In the units order there is no comparing function that can affect any lower order; and there is need only for the two bars that provide for the alternative registrations.

Interrelations of the bars, relays, and registration circuits are exemplified in every arithmetical variety for three orders under the heading Comparison of numbers.

*Step registering wheels. Figures 6, 6A, 6B*

First step, second step, and remainder registering wheel assemblies, as associated with number wheels 97, 98 (Fig. 6), 140, 141 (Fig. 6A), and 198, 159, 154 (Fig. 6B), include shunting wheels, as 97D, zero-setting wheels, as 97F, and contact-closing wheels (less contacts), as 97B, as mentioned in relation to Figure 2. When driven forward, successively, under control of counting relays, they drive backward through gears, as 97C and 103, the consumption contact-closing and associated wheels, with the effect of subtraction and of preparing the starting of the next operation due soon after the consumption wheels reach zero; at the stopping place of each, they register the actual consumption quantity in each of the first and second steps, whether all or part of the allowance as perforated, and the actual remainder, if any.

Their structure is similar to that of the meter reading registering wheels as previously described. Their operation is detailed under several Operation headings below. The contact-closing wheels are also shown in Figure 7 together with the contacts adapted to be closed thereby.

*Minimum consumption circuits. Multiplicand circuits. Figures 7, 7D*

Figure 7 shows fragmentary side views of the first step contact-closing wheels, 97B and 98B, at 507; of the second step like wheels, at 508; and of the remainder like wheels, at 509. At its 0 position, each wheel has a stud, as 97X, here shown in neutral relation to the contacts. The various groups of contacts, one for each digit position, are shown in developed view, with the several groups for each order of digits arranged vertically and numbered downward, 0, 1, 2 . . . 9. In practice they would be arranged in a circle, or closed by multi-contact relays energized through single contacts arranged in such a circle.

The first step wheels have two functions: setting up circuits to register the minimum money charge if the consumption is within the minimum range, or to energize multiplicand relays if the consumption quantity is higher. Contacts as 330, 329, for the tens wheel, contacts as 331 for the units wheel, are for the former; contacts as 325 and 326 are for the latter. The minimum contacts of the contact-closing wheels are wired to correspondingly positioned fingers of the minimum consumption bars (Fig. 7D).

The second step contact-closing wheels, 140B and 141B, and the remainder wheels, 198B, 159B, 154B, have the function only of setting up multiplicand circuits, through contacts as 327, 328, and 333, 334.

At least two sets of bars and fingers are involved in a minimum operation, besides the first step contact-closing wheels. The minimum consumption bars (Fig. 7D) and fingers set up circuits to the auxiliary relays (Fig. 11 at 510) to register the money charge through the minimum money bars (Fig. 1 at 501).

In Figure 7 at 507 and in Figure 7D are shown only portions of the minimum circuits. The purpose of these circuits and their connections is to register the minimum money charge in accordance with the perforations for bars 189, 189A, 189B (Fig. 1) when the consumption quantity is no more than the figures represented by the perforations for the minimum consumption (or comparison) bars 184, 184A, 184B (Fig. 7D). These latter perforations are illustrated in Figure 16, and their principle is explained under the heading of Comparison of numbers.

The minimum consumption and charge circuits are related to the third sequence of operation. They are made effective by the return of all consumption contact-closing wheels (Fig. 2, 503—503) to zero with the first step contact-closing wheels at a numerical position represented in the perforations for the minimum consumption bars. They are related also to the auxiliary relays which initiate the money charge operation, as hereinafter described in connection with Figure 11. The money charge is made effective on the counting relays through shift relay 205 (Fig. 12). A detailed description of the operation of these circuits appears in a following portion of this specification under the heading Operation for minimum charge.

For setting up the minimum consumption circuit, contacts as 329 for the tens wheel, 97B, are wired to correspondingly positioned fingers on bar 184, and contacts as 330 to correspondingly positioned fingers on bar 184A. For the units wheel, 98B, contacts as 331 are wired to fingers on bar 184B. The bars through their conductors 185D and 186D and relays 186 and 185 (Fig. 11 at 510) set up circuits to register through the perforations for minimum money bars 189, 189A, 189B (Fig. 1) the set charge in the event of such coincidence between the contact-closing wheels' positions and the perforations for the minimum consumption bars which indicates that the consumption quantity is no more than is represented by the perforations.

When the consumption quantity is more than the minimum quantity setting, i. e., when there is no such coincidence as just mentioned, it is to be multiplied for registration of the money charge. Contacts as 325, 327, 333, closed respectively by first step, second step, and remainder wheels, are for selecting the counting relays (Fig. 13) which serve as multiplicands in the multiplying operations. The multiplier relays which electrify these contacts repeatedly for the rounds of registration, are described in connection with Figure 10; their number is selected according to perforations, representing rates, for bars as 115, there described also. The contacts are here shown wired in the several cables, as 101 and 106, to the contacts of the several shift relays, as 204 (Fig. 12) and 207 (Fig. 12A), where they can be connected to the counting relay circuits.

The second step and remainder contact-closing wheels, 140B, 141B, and 198B, 159B, 154B (Fig. 7 at 508 and 509), have at their zero positions contacts as 327X and 334X, respectively for the purpose of supplying battery to relay 15 of the second step multiplier sequence pair if the consumption ends in the second step, and to relay 19 of the remainder multiplier pair if the consumption extends into the third step.

Money and designation wheels. Figure 8

Wheels 127, 128, 129, are for the purpose of registering the final money charge of the bill. They are of the same construction as other registering wheels, as those in line with 502—502 of Figure 2. They are provided with contact-closing wheels and carry-over contact-closing wheels, as are elsewhere described. They are driven in sundry operations under control of the counting relays (Fig. 13), according to the minimum money charge perforations or the rate multiplication or multiplications in one or more steps.

Their contact-closing wheels, as 127B, and contacts, as shown in fragmentary side view in Figure 9, are for the purpose of governing the movement of wheel 435, as described below.

Because of successive independent registrations, the money wheels must be equipped for carry-over. Carry-over contact-closing wheels, as 128H, and contacts, as 128J, operate in connection with the carry-over relays of Figure 14, which are common for the several registers of like nature.

Designation wheel 435 is for the purpose of indicating, for the proper bills, that the charge is the minimum, or that it is unusually high or low. The designations are respectively shown as "MIN", "H", and "L". The first, if stamped on a bill, is for the customer's information; the other two, being for the company's information, might be represented by arbitrary symbols. Additional designations might be adopted in practice, as for "Meter sealed", "No access", and moved for display from a single perforation by such means as are herein described.

Apparatus and circuits for designating unusually high and low money charges. Figures 9 and 9A In Figure 9 are shown in fragmentary side view the contact-closing wheels associated with the money wheels of Figure 8. In Figure 9A are shown the contact bars, fingers, relays and conductors. These are for the purpose of setting up circuits to turn designation wheel 435 (Fig. 8) to display H or L, signifying High or Low, if the figures represented on the money wheels are above or below the normal range of charge as represented by perforations for the bars and fingers.

Contact-closing wheels 127B, 128B, 129B, take positions corresponding to the settings of the money wheels 127, 128, 129. The hundreds wheel, 127B, and the tens wheel, 128B, have each two contacts for each numerical position; the units wheel, 129B, has one such contact. These contacts are for the purpose of closing circuits to correspondingly numerically positioned fingers on bars as 406, 407, 406A, 407A.

Contact 400, which is in the 0 position of the hundreds wheel, is wired to fingers 406E and 407E, the 0 position fingers for bars 406 and 407. Contact 401 is wired to the zero-positioned fingers for bars 406A and 407A. A like system of wiring, as contacts 403, 404, to bars 406B, 407B, 406C, 407C, is used for the tens wheel 128B. For the units wheel, 129B, the single contact in each position, as 405, is wired to the correspondingly positioned finger on bars 406D and 407D. With this system of wiring, the hundreds and tens wheels will always each ground four fingers, two for High and two for Low, and the units wheel one for High and one for Low.

For the High registration, five bars are provided, 406, 406A, 406B, 406C, 406D; for the Low, a like number, 407, 407A, 407B, 407C, 407D. Each bar, as 406, is directly connected to a relay, as 408, which will be energized when the bar is grounded by reason of a perforation in the card permitting a grounded finger, as 406E, to contact with the bar. These relays and the controlled circuits are effective in moving the designation wheel under certain combinations of grounded bars.

The perforations shown in the card of Figure 16 for contacting selected fingers with the bars for the number comparisons taken for examples, 675 for High and 125 for Low, are characteristic of any such perforations.

For the High standard number of 675, the perforations are: for the units bar, 406D, in the position of the standard figure and all higher positions, 5, 6, 7, 8, 9; for the tens equal bar, 406C, in the position of the standard figure, 7; for the tens high bar, 406B, in all positions higher than the standard figure, 8 and 9; for the hundreds equal bar, 406A, in the position of the standard figure, 6; for the hundreds high bar, 406, in all positions higher than the standard figure, 7, 8, 9.

For the Low standard number of 125, the perforations are: for the units bar, 407D, in the position of the standard figure and all lower positions, 5, 4, 3, 2, 1, 0; for the tens equal bar, 407C, in the position of the standard figure, 2; for the tens low bar, 407B, in all positions lower than the standard figure, 1, 0; for the hundreds equal bar, 407A, in the position of the standard figure, 1; for the hundreds low bar, in all positions lower than the standard figure—in this example, 0 only.

Relays associated with the bars for the High comparison, i. e., bars 406, 406A, 406B, 406C, 406D, are, respectively, 408, 409, 410, 411, 412. For the Low comparison bars, 407, 407A, 407B, 407C, 407D, like relays are, 413, 414, 415, 416, 417.

The grounded bar combinations, to effect a High registration, are, hundreds high bar 406, through relay 408; or hundreds equal bar 406A and tens high bar 406B, through relays 409 and 410; or hundreds equal bar 406A and tens equal bar 406C and units bar 406D, through relays 409, 411, 412. These relay combinations ground conductor 408B. The grounding of any additional bars is superfluous.

Like combinations, grounding conductor 413B, to effect a Low registration, are, hundreds low bar 407, through relay 413; or hundreds equal bar 407A and tens low bar 407B, through relays 414 and 415; or hundreds equal bar 407A and tens equal bar 407C and units bar 407D, through relays 414, 416, 417.

Multiplier bars and fingers. Multiplier relays. Figure 10

The contact bars for selecting the rate-multiplier are of the conventional type, with conventional numerically positioned contact fingers. The multiplying relays are of essentially the same construction and operation as the counting relays (to be described in detail in connection with Figure 13). The multiplying relays, however, all have two windings, and they are released pair by pair by the action of control relays, as 278, on successive energizations and deenergizations of the chain of counting relays when representative of a multiplicand. The multiplicand registration is repeated as many times as the count of multiplier relay pairs energized from a contact finger.

Three bars and three chains of multiplier relays are shown. Bar 115 and its fingers, and the upper chain, or group, of two rows of relays, are for multiplying the first step of consumption quantity; bar 115A with its fingers, and the middle group of relays, are for multiplying the second step; bar 115B with its fingers, and the lowest group of relays, are for multiplying the remainder.

Each bar, as 115, has nine fingers, one for each pair of relays, in corresponding numerical positions; as, the No. 4 finger, 115C, is connected, through conductor 115F, to the first relay, 275, of the No. 4 pair, 275—276.

Each group of relays has a pair of control relays, as 283 and 278. Both are energized and deenergized on each round of multiplication. Relay 278 is for the purpose of releasing, when energized, the relays of the lower row, as 275, through its break contact 278A and contact 275C; and through its make-before-break contact 278B holding energized, through contacts as 276B, the mate relays, as 276. Contact 278C is for grounding contact 283A on each round of registration; said contact 278C is adapted to receive ground from contact 281X on the energization of multiplier relay 281.

Figure 11:
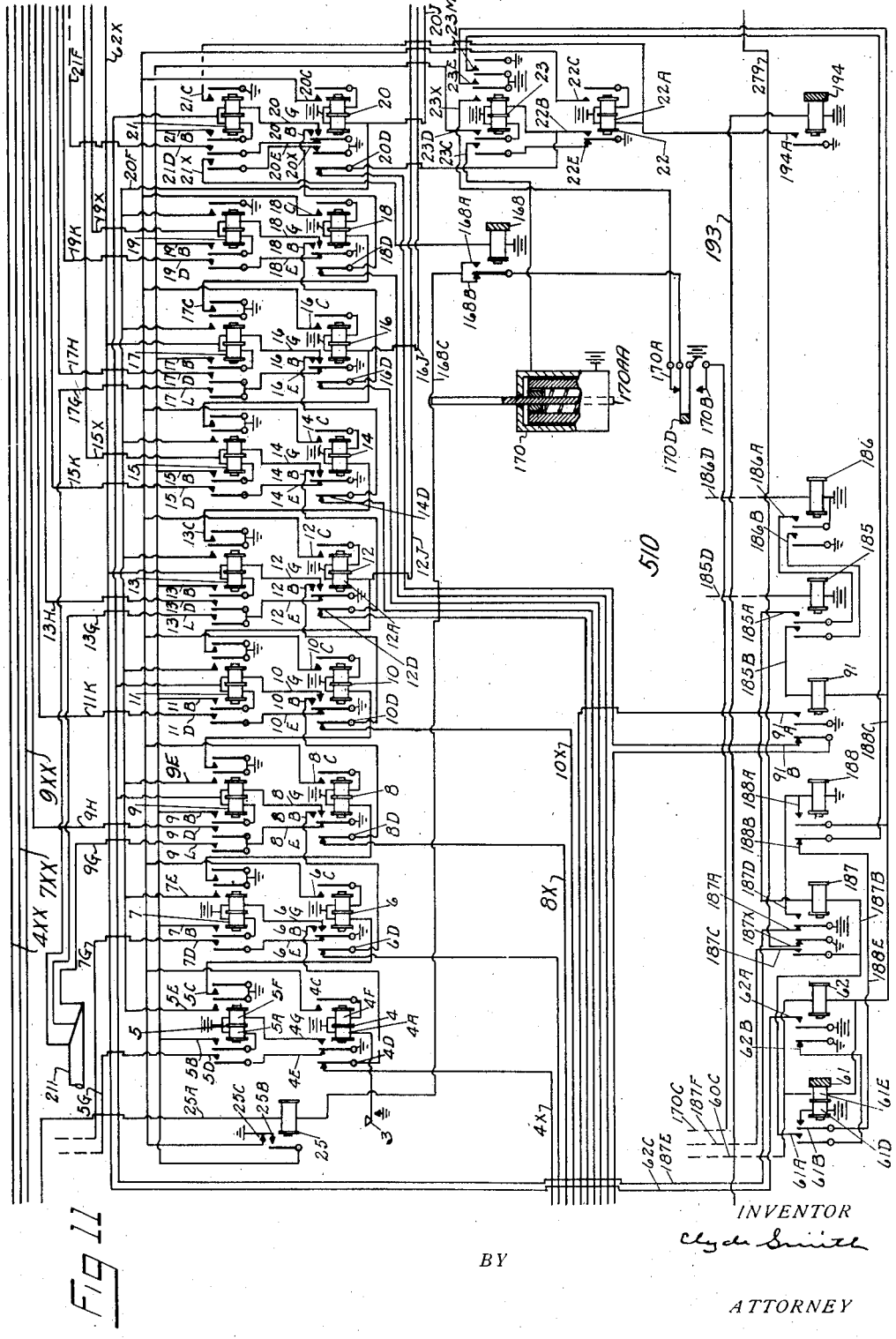
Figure 11 shows the sequence relays; and at 510 certain auxiliary relays related to the minimum charge.

Slow-to-release relay 283 is for the purpose of reenergizing the counting relays for repeated registration, by momentarily grounding contact 283A, conductor 282, and the multiplicand contacts (Fig. 7). Relays 278 and 283 are energized on the first round of registration, which is initiated by sequence relays 10—11 (Fig. 11). Sequence relays 14—15 initiate multiplication of the second step quantity, and sequence relays 18—19 initiate the multiplication for the remainder step quantity.

The selected multiplier relay, as 275, for the first step, is energized by contact 9D of sequence relay 9, conductor 9H (Figs. 11, 10), bar 115, perforation 115CC (Fig. 16), and finger 115C, at the beginning of the first step registering operation; when energized, contact 275B is grounded, energizing relay 276, and all other like relays of lower value in the chain.

Relays as 281 are the last in the chain to be energized; these have special contacts, as 281C, 281X, and 281Y; when energized, relay 281 closes these contacts; 281C closes a circuit from relays 278 and 283, conductor 4XX, contact 4X (Fig. 12), conductor 169B (Fig. 14), to contact 169A, to energize control relays as 278 and 283 on the energization of relay 169 (Fig. 14) in a multiplying operation. Contact 281X is for the purpose of grounding, through conductor 278D, contact 278C, and through conductor 12J, 12J (Fig. 11) holding sequence relay 12 (which with its mate 13 controls the second step registering operation) against release during the first step multiplication. Contact 281Y impresses ground on conductor 20J for preventing premature deenergization of the sequence relay 20 during a multiplying operation when the consumption quantity exceeds the minimum consumption quantity but is no more than the first rate step, and the contact closing wheels of the consumption quantity register (Fig. 2) are returned to zero upon the entry in the first rate step register (Fig. 6).

On the first energization of relays 278 and 283, contact 278A releases relay 275; on completion of the first round of registration, relays 278 and 283 are deenergized; relay 278 opens contact 278B and releases multiplier relay 276. Contact 278C closes. As relay 283 is slow to release, contact 283A is grounded, momentarily grounding conductor 282 for the second round. Contact 278A has as a ground connection conductor 279, 279 (Fig. 11 at 510), and contact 187X (Fig. 11), for the purpose of releasing such first step multiplier relays as may have been energized in a first step registering operation, when the consumption is within the minimum range and is not to be multiplied.

Sequence relays. Figure 11

The sequence relays are of a conventional double-wound type, with conventional contacts, in a chain of pairs. Each pair governs an operation, not in an invariable succession, but with provision for eliminations in certain computative contingencies, without loss of time or cycle-completing movements. The circuits and actions of particular sequence relays are detailed in the descriptions of the sequences of Operation.

These relays are numbered 4 and 5, 6 and 7, successively to 22 and 23. Relays 4—5, 6—7, 8—9, 10—11, 12, 20—21, 22—23, are in the main chain. Relays 13, 14—15, 16—17, 18—19, are in a sub-chain. The main chain is first energized by the closing of key 3. This energizes relay 4, closing contact 4G, energizing winding 5F of relay 5, which grounds contact 5C, energizing relay 6, and so on until the chain to pair 10—11 and relay 12 is energized. The sub-chain relays, for contingent operations, are always energized with the first movement of any consumption contact-closing wheel (Fig. 2, 503—503) from the zero position. On the energization of relay 62, which puts battery on contact 62A and conductor 62C, relay 13 is energized, and relay 17 prepared for energization. Relays 15 and 19 are prepared for energization from conductors 62C, 62X, 62X (Fig. 7), contacts as 327XX, conductor 15X (Figs. 7, 11), for relay 15, and contacts as 334XX (Fig. 7) and conductor 19X (Figs. 7, 11) for relay 19. On the energization of relay 13, it energizes relay 14 as relay 4 energizes relay 5, and so on to the energization of relay 19.

Pair 20—21 is energized from relay 5, contact 5E, conductor 20F, and in turn energizes through contact 21C relays 22—23. Relay 23 energizing closes a circuit from contact 23X, contacts 170A, 168A, through conductor 168C sequence control relay 25, conductor 25A (Figs. 11, 12A, 12, 13 and 14), contacts W, X (Fig. 14), conductor 25D, contact Y, energizing relay 25. This relay is energized by the closing of all three contacts W, X, Y, (Fig. 14) and is deenergized by the opening of any one of them.

Features of odd-numbered sequence relays having the same letter in their reference characters serve like purposes; likewise as do the even-numbered relays; letter X, used for special purposes, is an exception.

The release of the relays of the chain one by one is controlled by relay 25 and its make-before-break contacts 25B and 25C. The even-numbered relay of each pair is the first to be released, upon the energization of relay 25; it initiates, through a contact of the odd-numbered relay, the electrification of circuits according to card perforations, and through such circuits deenergizes relay 25, whereupon the odd-numbered relay is released and removes the initiating condition. The operation proceeds, and upon its completion relay 25 is reenergized and deenergizes the next due even-numbered sequence relay for its initiation of the next action.

Specifically, the energization of relay 25 closes contact 25B before opening contact 25C, and deenergizes through contact 4C relay 4 of the pair 4—5. Relay 5 has heretofore been held energized by contact 4G and winding 5F; on the release of relay 4, relay 5 is held energized through winding 5A, contact 5B, and contact 25B, so long as relay 25 remains energized. Contact 5C of relay 5 holds relay 6 energized against the action of contact 25C so long as relay 5 remains energized; on deenergization of relay 5, control of relay 6 passes to contact 25C.

The action of pair 4—5 is typical of that of other pairs as they relate to the different operations. Pair 4—5 governs the last reading registration. Relay 4 electrifies the circuits, including counting relays (Fig. 13), for the number wheel operations, grounding through contacts 4E and 5D, conductor 5G (Fig. 11, Fig. 1), the last reading contact bars 27A, 27B and 27C, and through their perforations setting up independently the three rows of counting relays, as elsewhere described. Through the first completed counting relay set-up and its cut-off relay, as 43, relay 25 is deenergized, releasing relay 5 through contacts 25B and 5B, and through contact 5D removing the ground from the bars. This release of relay 5 must come after every one of the several circuits has received an adequate electrification from the contact bars, and before any circuit has received an unduly prolonged and possibly harmful electrification.

In the registering operations of this machine, which include several independent simultaneous and variable actions, it may not be a predetermined contact always to effect the removal of the electrifying source, but needs be a contact selected according to internal conditions. In every sequence of operations herein described, except the final sequence, the safeguarding conditions for acting neither too soon nor too late are found in the first counting cut-off relay to be energized. In the final sequence there is an allowance of predetermined time, governed by solenoid 170, for reading the registers prior to zero-setting, and this solenoid at the end of its stroke releases the odd-numbered sequence relay, which frees the solenoid from energization.

Pairs 4—5 and 6—7, through contacts 4E, 5D, and 6E, 7D, start the last and previous reading registering operations; 8—9, through contacts 8E, 9L, start the first step registering operation, and contact 9D, through conductor 9H and multiplier bar 115 (Fig. 10), energizes the selected multiplier relay. Pair 10—11 starts the first step multiplying operation, by grounding contacts 10E and 11D, conductors 11K (Fig. 11, Fig. 10) and 282 (Fig. 10, Fig. 7), and such multiplicand contacts as 325A (Fig. 7 at 507) as may be closed. Pairs 12—13, 14—15, 16—17, 18—19, through like contacts, serve a like purpose for the second step and remainder. Pair 20—21 is for the purpose of registering H or L (for high or low), by grounding contacts 20E and 21D, conductor 21F, 21F (Fig. 9), with the aforedescribed effect. Relay pair 20—21, when energized, energizes relay 168 from contacts 20X and 21X. Relay 168 is a slow-to-release relay, which momentarily opens the sequence control relay circuit on its deenergization when the armature passes from contact 168A to contact 168B if there is no H or L operation.

Pair 22—23 governs the final holding and zero-setting operation. It becomes immediately effective either upon the completed operation of pair 20—21 or upon the release of all pairs intervening between the last completed registration and this final pair.

In each sequence, the final effect is the closing of contacts W, X, Y (Fig. 14), and the consequent energization of control relay 25, which deenergizes the even-numbered sequence relay for the next operation.

Pairs 4—5 and 6—7 are directly connected to battery, as the last and previous readings are always to be registered.

The consumption contact-closing wheels, 56D, 57D, 58E (Figs. 2, 3, 4, 5), may be returned to zero at any one of several rate stages, for each of which a condition must be created in order both to effect the due registration and (except in the last stage) to eliminate actions not due but for which sequence relays have been prepared. Following the enumeration of these stages is an account of the relation to the eliminations of the sequence relays and certain auxiliary relays (Fig. 11 at 510).

1. The contact-closing wheels referred to may stop at zero because the last and previous meter readings are the same. There are no counting relays to be set up, and all sequence relay pairs from 8—9 to 20—21 (inclusive) are to be released. The minimum money charge is to be registered independently, under control of relays 185 and 186.

2. The contact-closing wheels may be returned to zero within the minimum range. The consumption quantity is to be registered under control of sequence relay pair 8—9 (and independently the minimum money charge), and the sequence relay pairs 10—11 to 20—21, inclusive, are to be released.

3. The contact-closing wheels may be returned to zero within the first step and above the minimum quantity. The action of relay pair 8—9 is required for registering and of 10—11 for multiplication, and the higher sequence relays to 18—19, inclusive, are to be released.

4. The contact-closing wheels may be returned to zero within the second step. The action of relay pairs 12—13 and 14—15 is required for registering and multiplication, and pairs 16—17 and 18—19 are to be released.

5. When the contact-closing wheels represent a number that will carry them into the third, or remainder, step, they are sure to be returned to zero within that step, and sequence relay pairs 16—17 and 18—19 are to govern the completed quantity and money charge registrations.

The odd-numbered relays of sequence relay pairs 8—9 and 10—11 have as a source of battery supply contact 187A Fig. 11 at 510) of auxiliary relay 187.

When the contact-closing wheels at zero signify no consumption within the billing period (condition 1), the minimum consumption circuit, as before described, is effective, energizing relay 187, opening contact 87A, and removing battery from relays 9, 11, and 12. Odd numbered relays 13 to 19, inclusive, are deenergized when relay 62 (Fig. 11) deenergizes and opens contact 62A upon return of the contact closing wheels and back stop wheels of the consumption quantity register (Fig. 2) to zero. Relay 25 is now energized (from the completion of the previous reading registration), which opens contact 25C, releasing relays 8 to 20, inclusive.

When there is a consumption quantity within the minimum range (condition 2), it is registered under control of relays 8 and 9, the contact-closing wheels returning to zero, whereupon the minimum consumption circuit and relays 62 and 25 release relays 11 to 21, as above.

When the contact-closing wheels stop at zero within the first step and above the minimum range, relay pairs 8—9 and 10—11 are both operative for the registering and multiplying operations. (Condition 3.)

The odd-numbered relays of pairs 12—13, 14—15, 16—17, 18—19, have as a source of battery supply contact 62A (Fig. 11 at 510) of auxiliary relay 62, which is closed so long as any consumption contact-closing wheel is off its zero position and is opened upon the return of all to zero, through back stop bar 60 reaching its downward position and pin 60A (Fig. 2) opening contact 60B, freeing conductor 60C (Figs. 2, 11) from ground. It is in this manner that positioning of the contact-closing wheels at zero under condition 1, 2, or 3, removes battery from relays 13, 15, 17, 19, releasing them, and that relay 25 being energized, releases their even-numbered relays energized from their contacts as 13C.

Likewise, with the return of the contact-closing wheels to zero within the second step (condition 4), pairs 12—13 and 14—15 are operative, and pairs 16—17 and 18—19 are released.

Relays 15 and 19, for second step and remainder multiplication, have each another source of battery, respectively conductors 15X and 19X (Fig. 11, Fig. 7) and contacts as 327X and 334X. These relays must not be released by the return of the contact-closing wheels to zero within their respective steps, since the amount of consumption within the step is to be multiplied. (Conditions 4 and 5.) When second step contact-closing wheels (Fig. 7 at 508) are off zero, contacts as 327X are closed, putting battery on conductor 15X. When the remainder contact-closing wheels (Fig. 7 at 509) are off zero, contacts as 334X are closed, putting battery on conductor 19X. Both relays 15 and 19 are released if the contact-closing wheels return to zero and release relay 62, provided there has been no entry in either of these registers so that all wheels as 140B and 154B stand at zero and thus open all contacts as 327X and 334X to isolate the local battery shown adjacent thereto. It follows that only the relay 19 will be deenergized when the consumption quantity contact closing wheels return to zero and cause deenergization of the relay 62, provided the second step register has received an entry but the remainder or third step register has received no entry.

For the multiplying operations of the three steps, two sets of chain relays are operative in each step, the counting relays (Fig. 13) representing the multiplicand, and the multiplier relays (Fig. 10). The multiplying effect is had, as elsewhere described, by repeating on the money wheels the registration of the multiplicand, as determined by the position of the step contact-closing wheels in connection with the comparison bars, as many times as there may be multiplier relay pairs locked up according to perforations. In the absence of special provision, a sequence relay pair would be supplied to serve for the counting relays as set up, and another pair for the multiplier relay set-up. By special provision, however, the multiplier relays are selected and prepared for action in each case in the preceding sequence, thereby saving three sequence relay pairs and in operation their time of action.

Sequence relay pairs 8—9, 12—13, 16—17, controlling the consumption registering steps, each set up circuits to perform two operations. Relay 8, for example, besides starting the registering operation, also through contact 8E grounds contact 9D, conductor 9H, first step multiplier bar 115 (Fig. 10 at 511) and the selected contact finger, as 115C, energizing the multiplier relays as 275 (Fig. 10), its mate, and the lower relays in the chain. These are held locked up, however, until during the following sequence. If the consumption is either zero or above zero in the minimum range, relay 187 is energized, opening contact 187X, freeing conductor 279, contact 278A (Fig. 10) from ground, releasing without time loss such multiplier relays as may have been set up, as well as higher sequence relays as before described. Like preliminary energization of multiplier relays for second step and remainder may be effected by relays 12 and 16, only, however, after it may have been determined that there will be no minimum operation.

In each multiplying operation, sequence control relay 25 is energized and deenergized (as is usual in counting relay operations) on each round of multiplication, and in the absence of special provision would release sequence relays as 12 prematurely. By special provision, however, when multiplier relays as 275 and others in the chain are energized, as in the preceding example, relay 281 is also energized. This grounds contact 281X, conductor 12J, and serves as another source of energization for winding 12A of relay 12, which is the even-numbered relay of the sequence pair controlling the second step recording. This is for the purpose of preventing release of relay 12 against the successive energizations and deenergizations of relay 25 during the multiplication.

If the operation extends to the first step of multiplication, the several multiplier relays will be deenergized, each pair in turn, and at the last, contact 281X is freed from ground and places relay 12 under control of relay 25.

In second and third step multiplications, sequence relays 16 and 20 are protected in the same manner as explained for relay 12 in the first step.

Solenoid 170 is for the purpose of holding the several number wheels for reading, and of starting the releasing operation. It is energized on the release of sequence relay 22, which grounds contacts 22E and 23C. On the downward movement of its plunger-rod, contact 170A is opened, opening through contact 168B the circuit of the sequence control relay 25, releasing sequence relay 23. Contact 170B is momentarily closed when contact 170A is opened, putting battery on conductor 170C (Fig. 11, Fig. 6), energizing relay 171 (Fig. 6) to start the zero-setting operation.

Of the sequence relay pair 20—21, for an H or L operation, relay 21 has as a source of battery, as have relays 9 and 11, contact 187A of auxiliary relay 187, and is released when a minimum charge is to be registered (conditions 1 and 2), it being assumed that there is no occasion for registering L in addition to MIN.

Each even-numbered relay, as 4, and excepting 22, has a contact, as 4D, for energizing a shift magnet, as 26, through a conductor as 4X (Figs. 11, 12A and 12) on each sequence of operation. When closed, it is grounded from a contact, as 6B, from the beginning of one sequence to the beginning of the next, at which time relays such as 6 are deenergized.

*Auxiliary relays. Figure 11 at 510*

Certain relays have special functions in relation to the sequence relays.

Relay 61 is for the purpose of setting up a circuit from contacts 62B and 61A to condition relay 187 for operation in event of a minimum charge operation. It is prepared for energization by contact 23E, and is energized by contact 60B (Fig. 2) on the movement of the consumption contact-closing wheels from zero. It is held energized through contact 61B until a minimum operation is started, or until the beginning of the zero-setting operation.

Relay 62 is for the purpose of supplying battery, when energized, through contact 62A, conductor 62C, directly to sequence relays 13 and 17 and indirectly to sequence relays 15 and 19, through conductor 62X, contacts as 327XX and 334XX (Fig. 7 at 508 and 509), and conductors 15X and 19X, when contact-closing wheels as 140B and 154B are in their zero positions. When deenergized, by the return of consumption contact-closing wheels (Fig. 2, 503—503) to zero, relay 62, through contact 62B, grounds contact 61A, as above described.

Relay 62 is prepared for energization on the closing of contact 23E; it is energized on the movement of any of the consumption contact-closing wheels from zero; it is deenergized on the return of all such wheels to zero. On its deenergization, contact 62A opens, releasing sequence relays 13, 15, 17, 19, or 17 and 19, if such return is within the first or second steps, as before explained.

Relay 188 is for the purpose of releasing relay 61 by opening contact 188B on a minimum operation. Once energized, relay 188 remains energized, through contact 188A, conductor 188C, contact 23E, until the end of a round of operation.

Relay 187 is for the purpose of setting up circuits to effect the minimum operation. It is prepared for energization by the deenergization of relay 62 and the closing of contact 26B, on the return of the consumption contact-closing wheels to zero. It is energized from contacts 186A and 185A when the consumption is less than the first step. When it is energized, contact 187A, through conductor 187E, releases relays 9, 11, 21, if the consumption is zero, and relays 11 and 21 if the consumption is above zero and within the minimum range; contact 187X releasing such first step multiplier relays as 275 (Fig. 10) as may have been energized. Contact 187C momentarily grounds minimum money bars 189, 189A, 189B, and MIN designation bar 189E (Fig. 1 at 501), setting up circuits to register the charge according to the perforations and to make the MIN display. Contact 187D energizes relay 188.

Relays 185 and 186 are the minimum control relays. They are energized from the minimum consumption bars 184, 184A, 184B Fig. 7D); they can be effective only when the consumption contact-closing wheels return to zero from an original reading which is within the limits of the perforations for these bars and thereby energize both relays. If the first step quantity is 14 and the consumption figure is in units, say 1 to 9, bars 184 and 184A are grounded and relays 186 and 185 energize; if the consumption is in two digits, say 11, bars 184 and 184B are grounded, and relays 186 and 185 energize. They establish at contacts 186A and 185A one leg of a circuit to energize relay 187 on a minimum operation; also through contacts 185B and 186B, realy 91 is energized.

Relay 91 is for the purpose of preventing energization of shift magnet 191 (Fig. 12A) on a minimum charge operation, by opening contact 91B, and energizing through contact 91A shift magnet 130 (Fig. 12). It is effective through the closing of contacts 185B and 186B.

Slow relay 194 is for the purpose of preventing premature release of sequence relay 22 during a minimum charge operation, through contact 194A and winding 22A of relay 22.

*Shift relays. Figures 12 and 12A*

The ten shift relays, 201 to 210, are for the purpose of momentarily connecting, in due order of use, the several groups of fingers to energize the counting relays and the carry-over relays, and to connect the operating circuits of the counting relays to the several clutches of the number wheels.

There is one multi-contact shift relay for each of the ten operations governed by counting relays: respectively, last reading, previous reading, first step registering, first step multiplication, minimum money charge, second step registering, second step multiplication, remainder registering, remainder multiplication, and High or Low designation. These relays are alike in construction and use, except that the number of contacts in the right-hand portion varies with the number of circuits to be established.

Each shift relay, as 201, consists of an operating magnet, as 26, and two groups of normally open contacts, as 201A. The left-hand group contains a pair of contacts for each counting relay, arranged in three sub-groups of nine pairs each (Fig. 13); the right-hand group a pair of contacts for each branch of the circuit from the operating contacts of the counting relays and their conductors (Fig. 14) and to the clutches and other parts of the number wheels (in the several figures).

These relays are controlled from the sequence relays (Fig. 11), and each in turn is energized so long as its operation is in progress. When energized, armatures, as 201F, close all contacts by means of bars, as 201G. The right-hand contact of each pair of contacts, in the left-hand group, is wired to a cable, as 68, which terminates in a like-numbered cable in Figure 1. A like contact in the right-hand group is wired to a cable, as 47, which also terminates in a like-numbered cable in Figure 2. Other like relays have other like cables terminating near their connecting apparatus. The left-hand contact of each pair of contacts, as 201A, is wired to cable 201H, through branches, as 201J, to counting relays, as 30 (Fig. 13); and each such contact of each pair in each shift relay is likewise multipled to each other in cable 201H and to relay 30.

Figure 14:
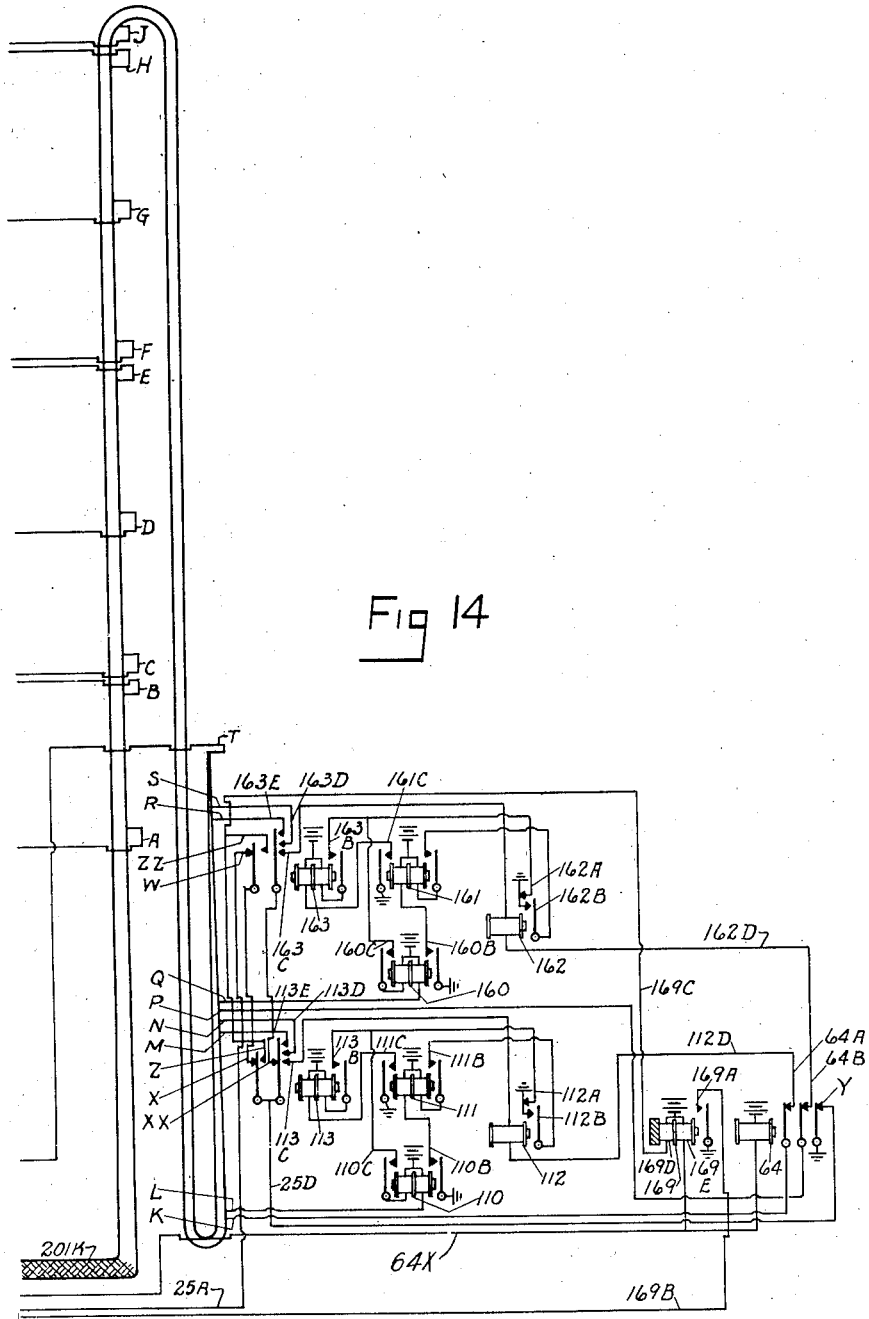
Figure 14 illustrates the group of carry-over relays, connectable in turn with any register for addition or subtraction, as may be required.
Figure 20:
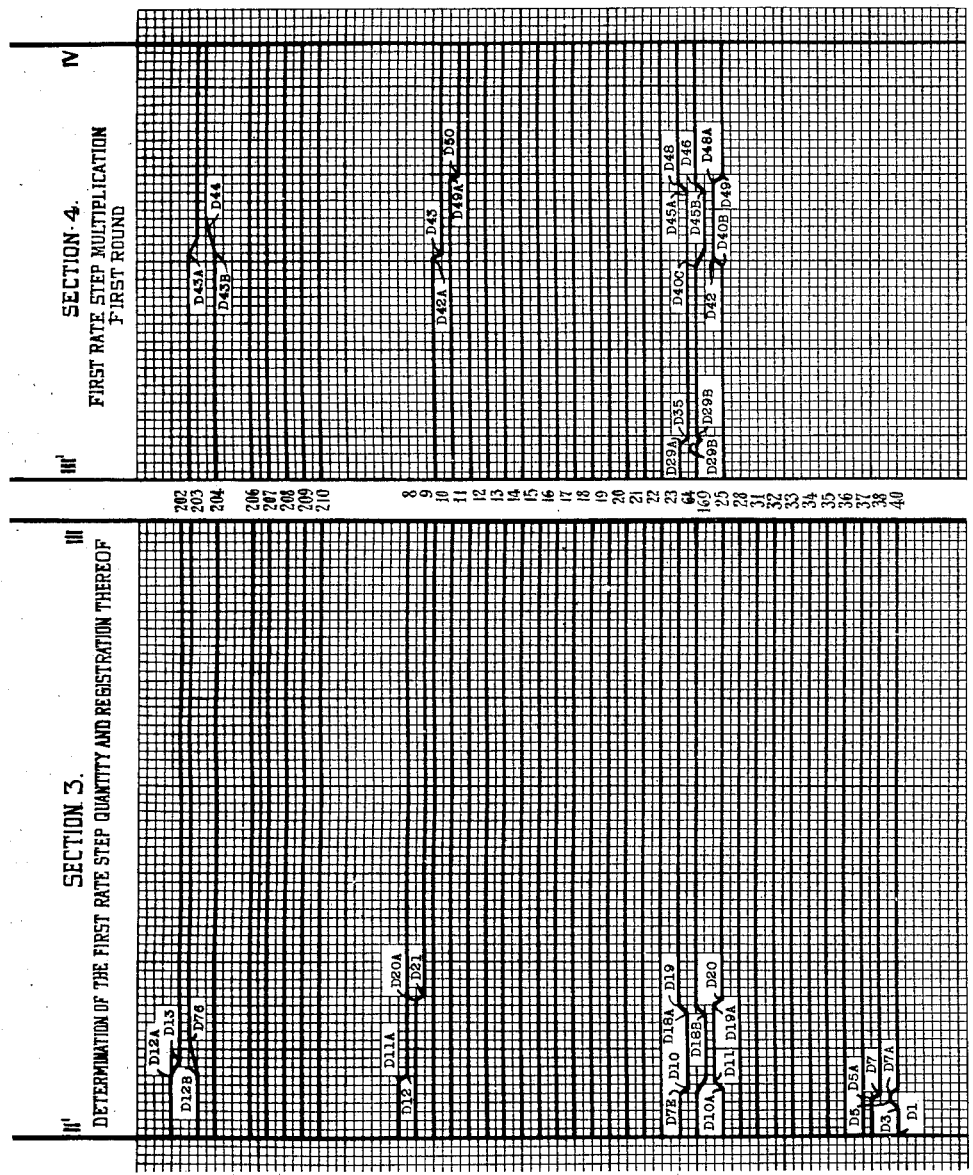
Figure 21:
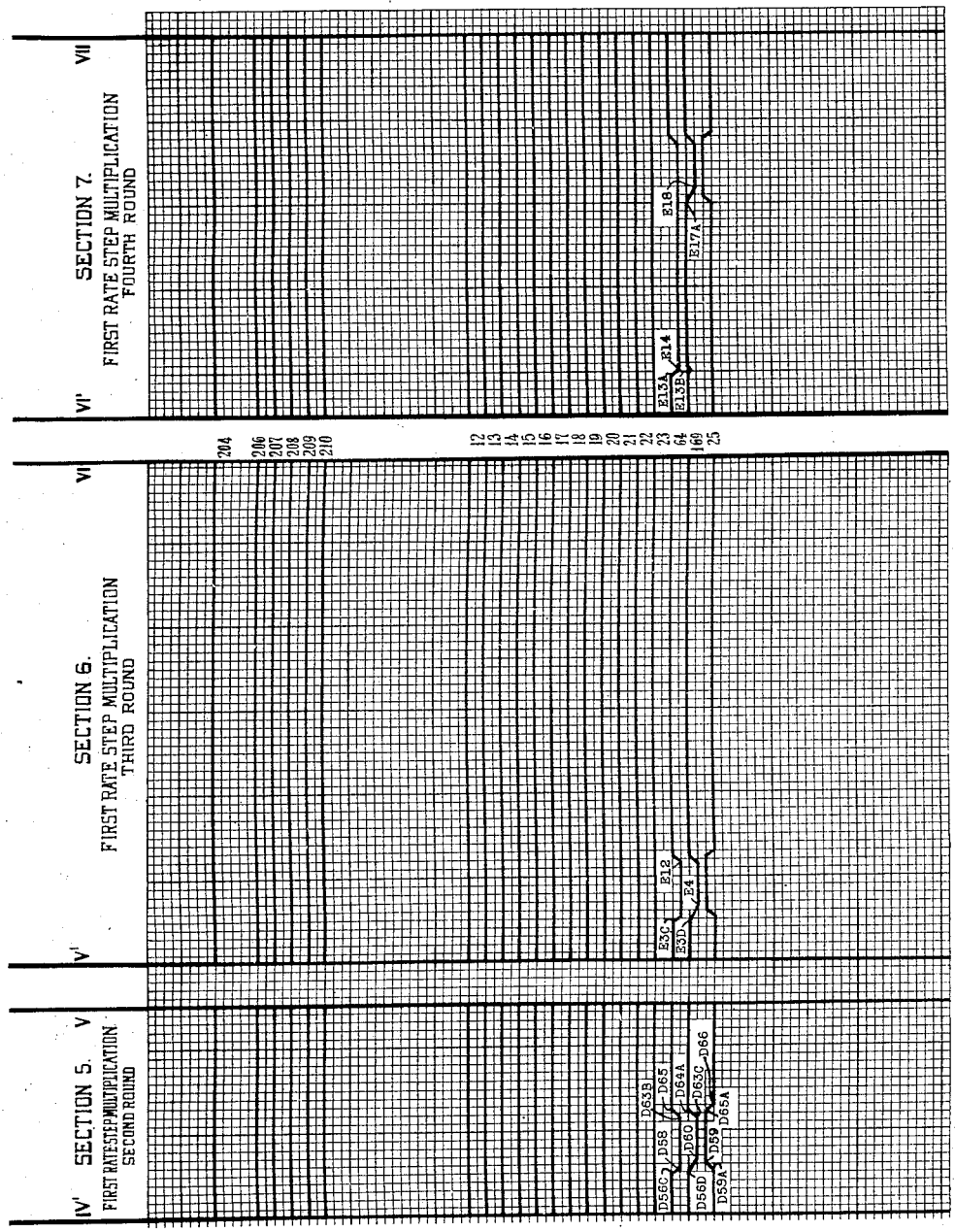
Figure 22:
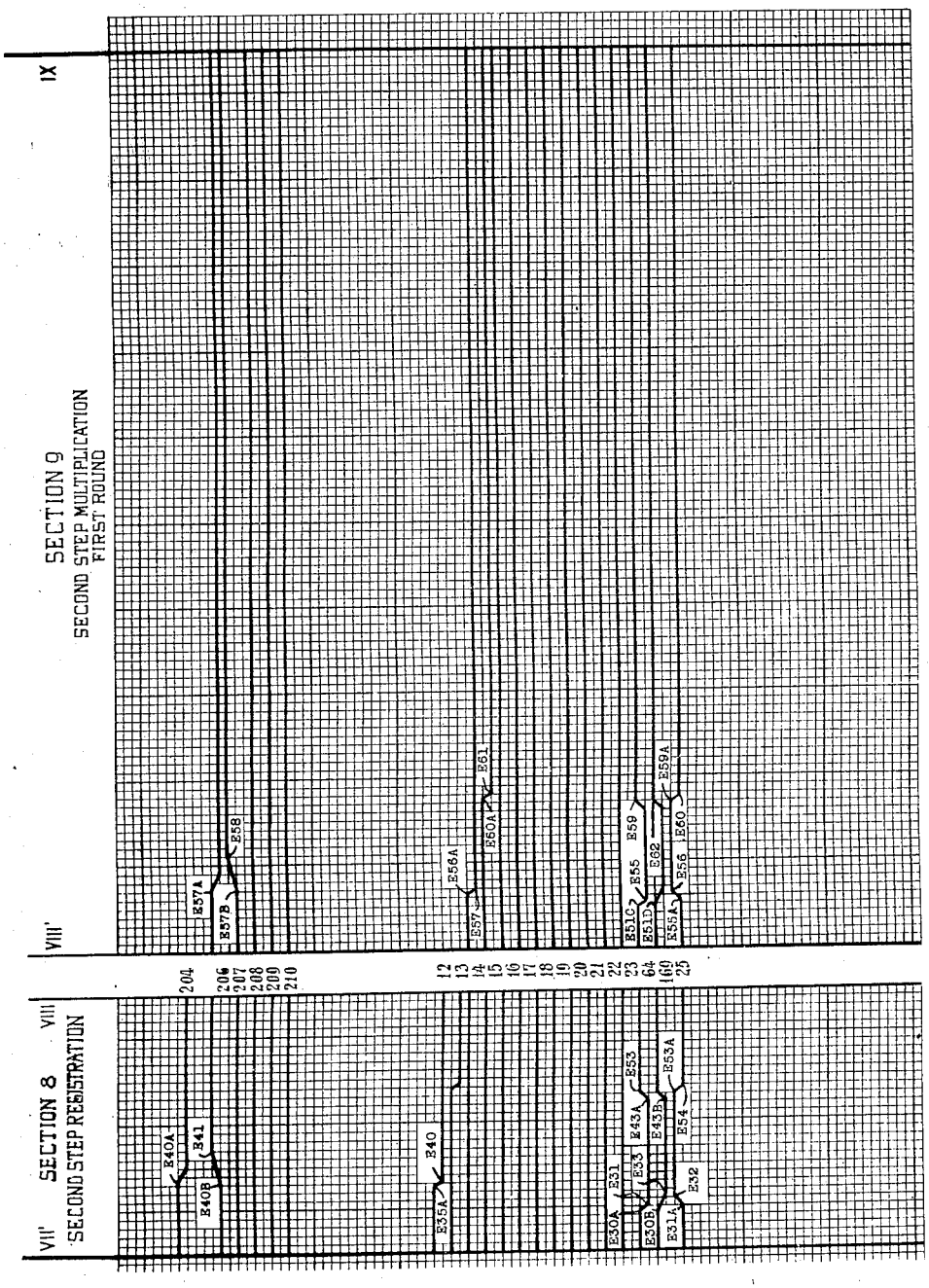
Figure 23:
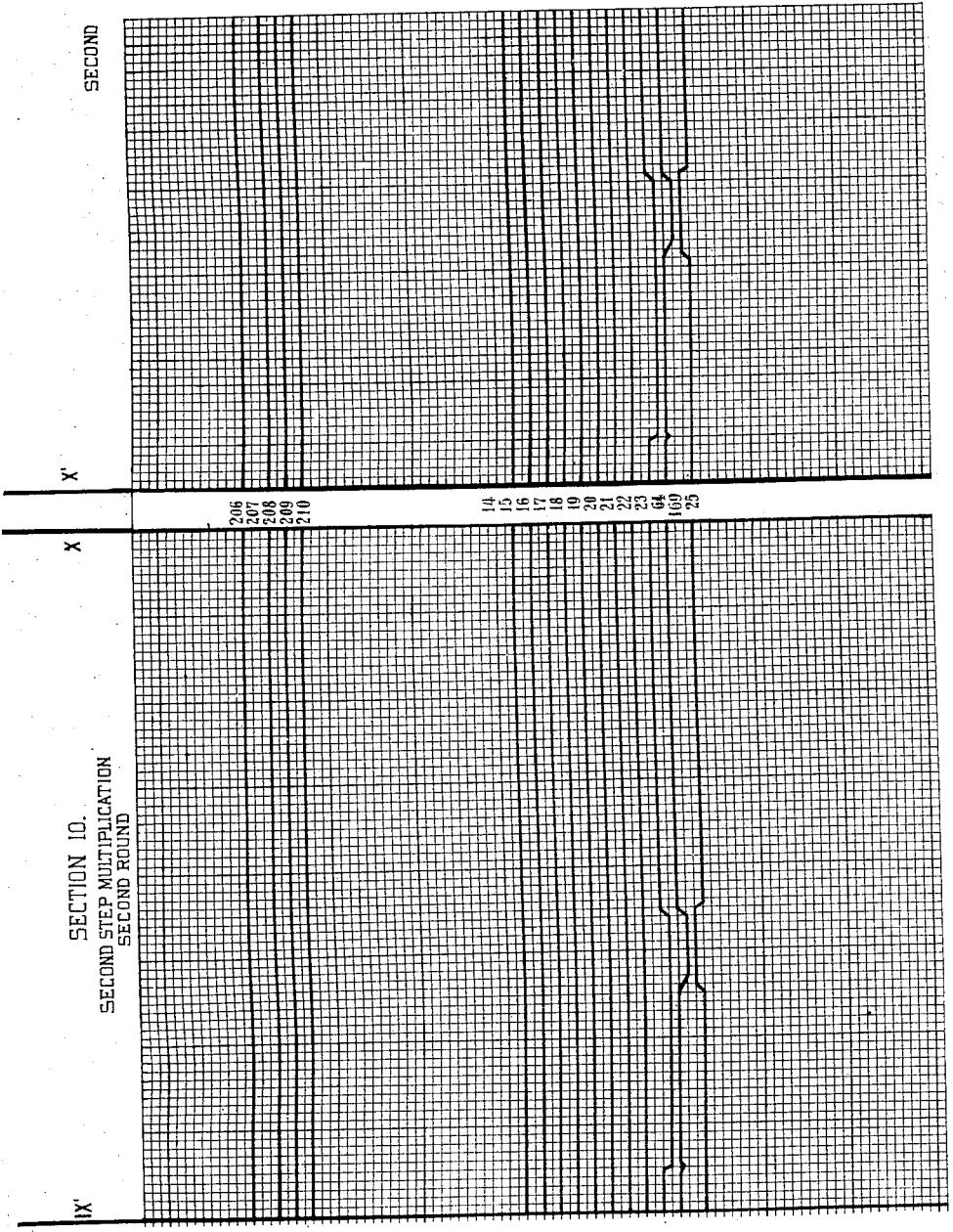
Figure 24:
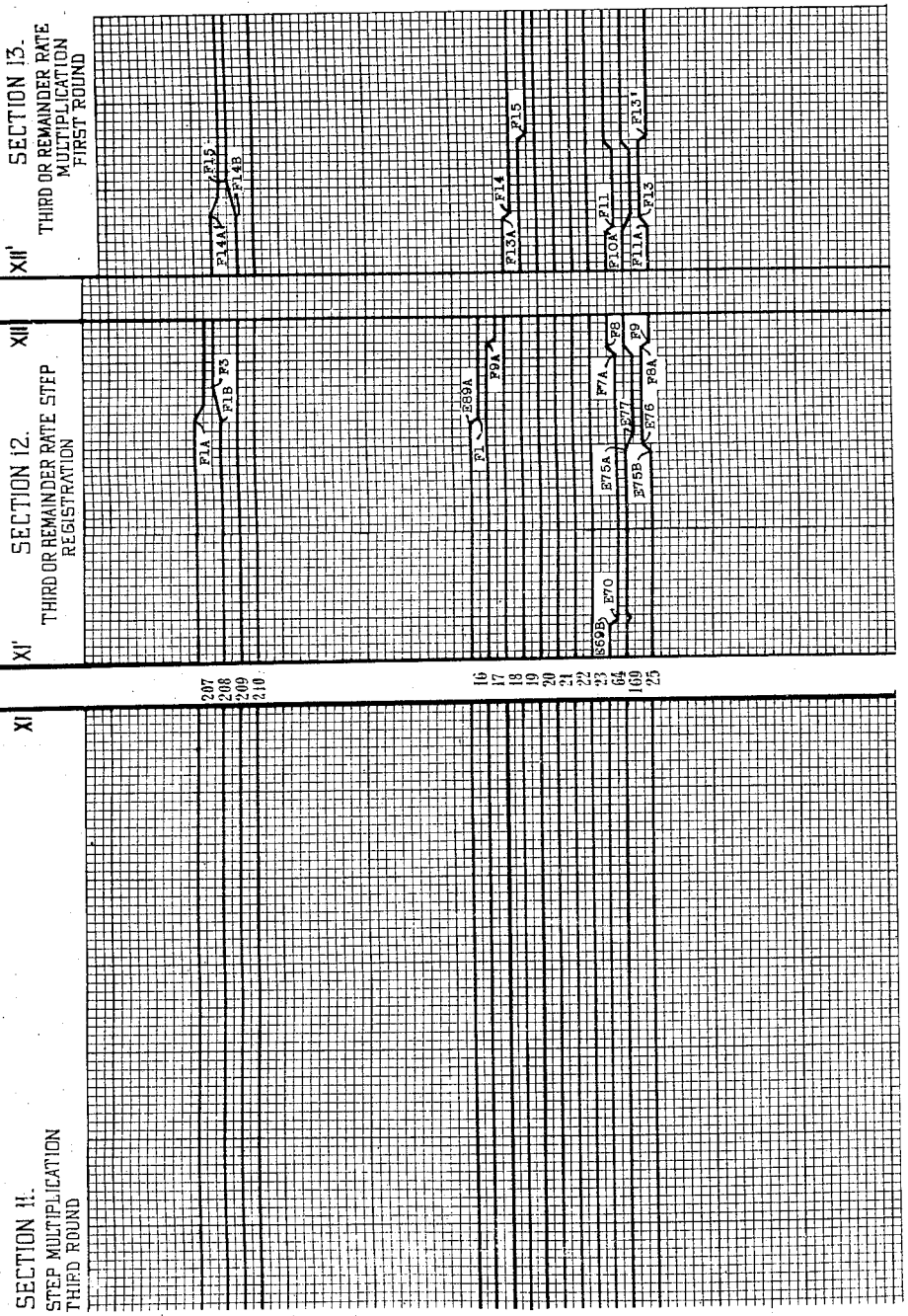
Figure 25:
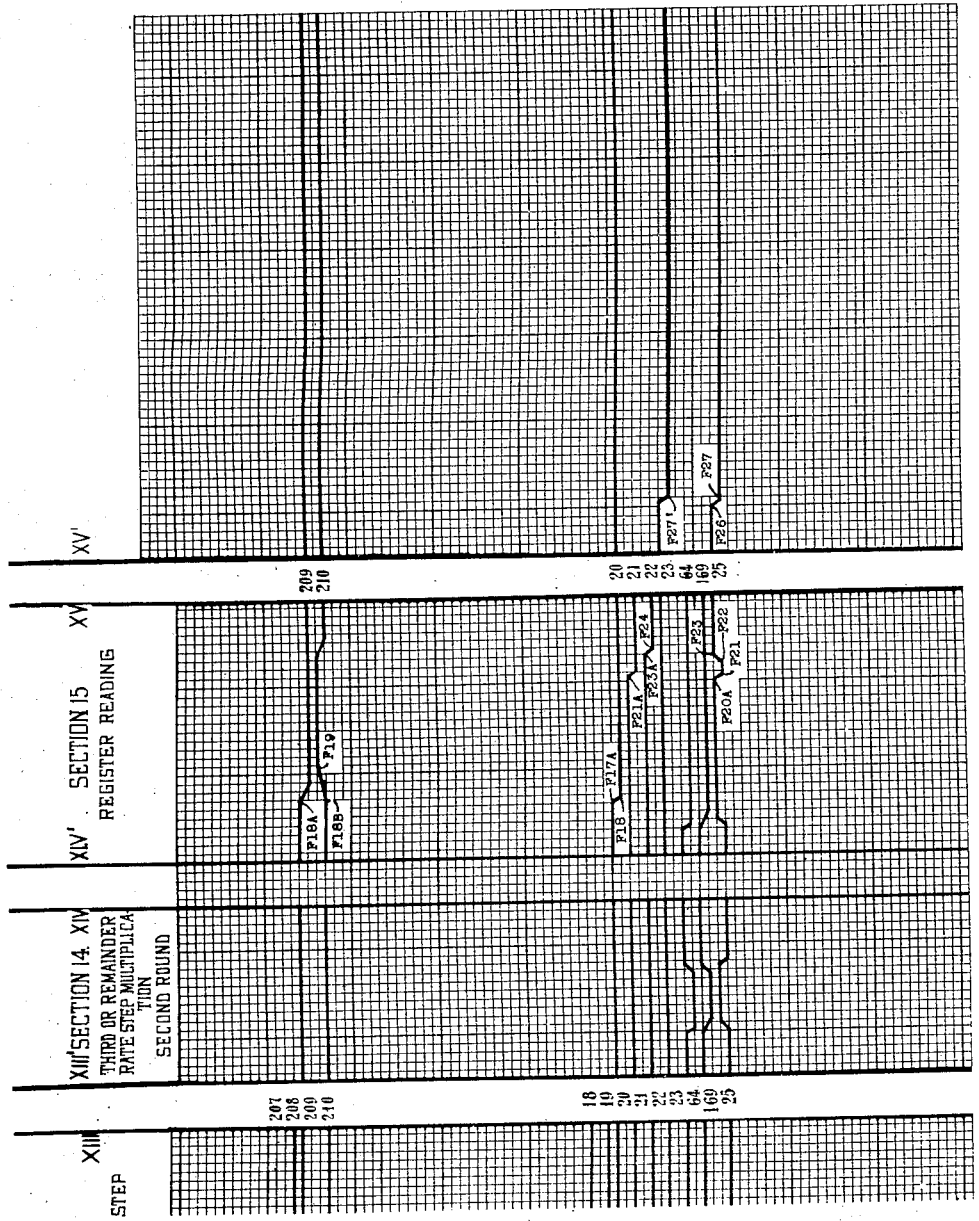
Figure 26:
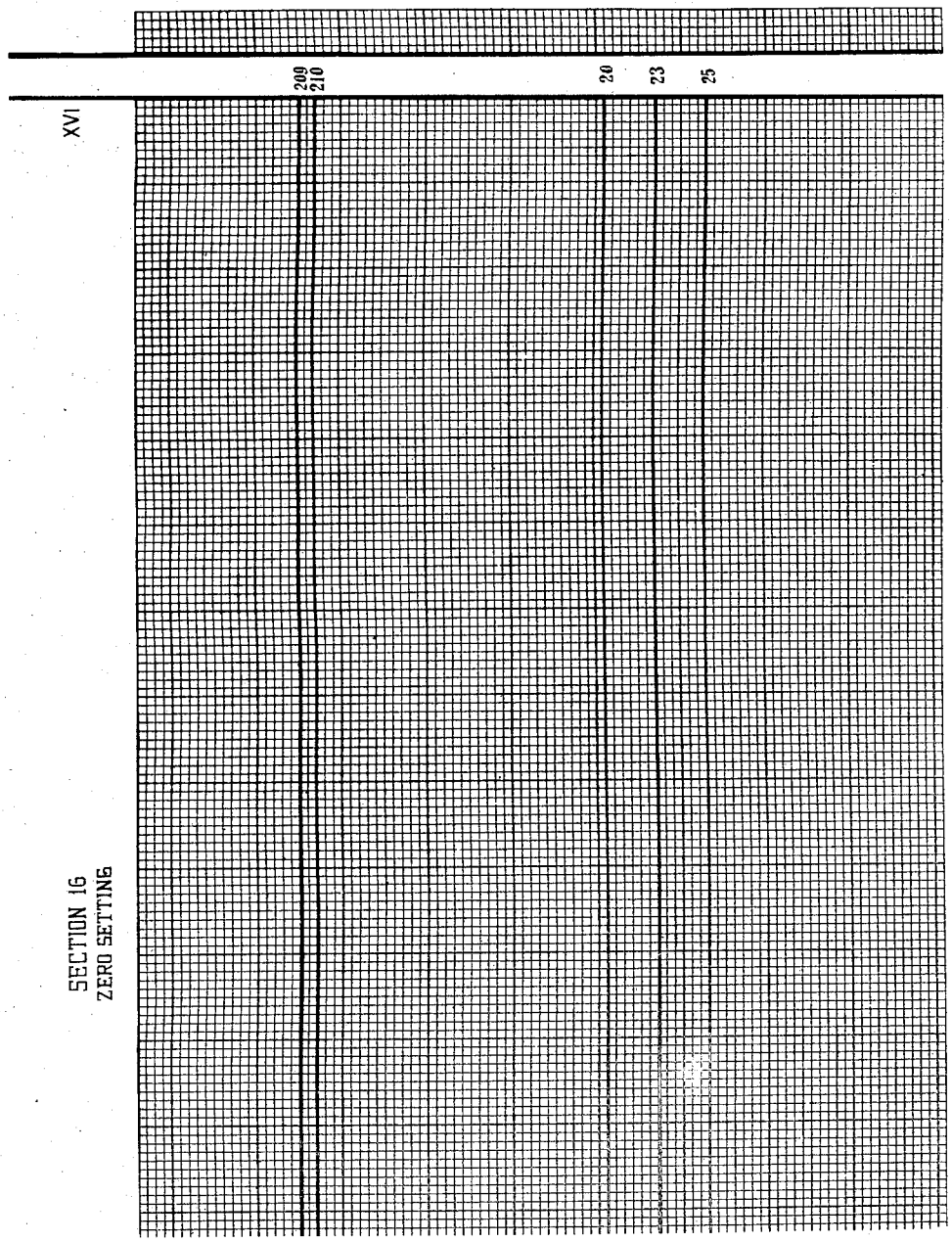
Figure 21:
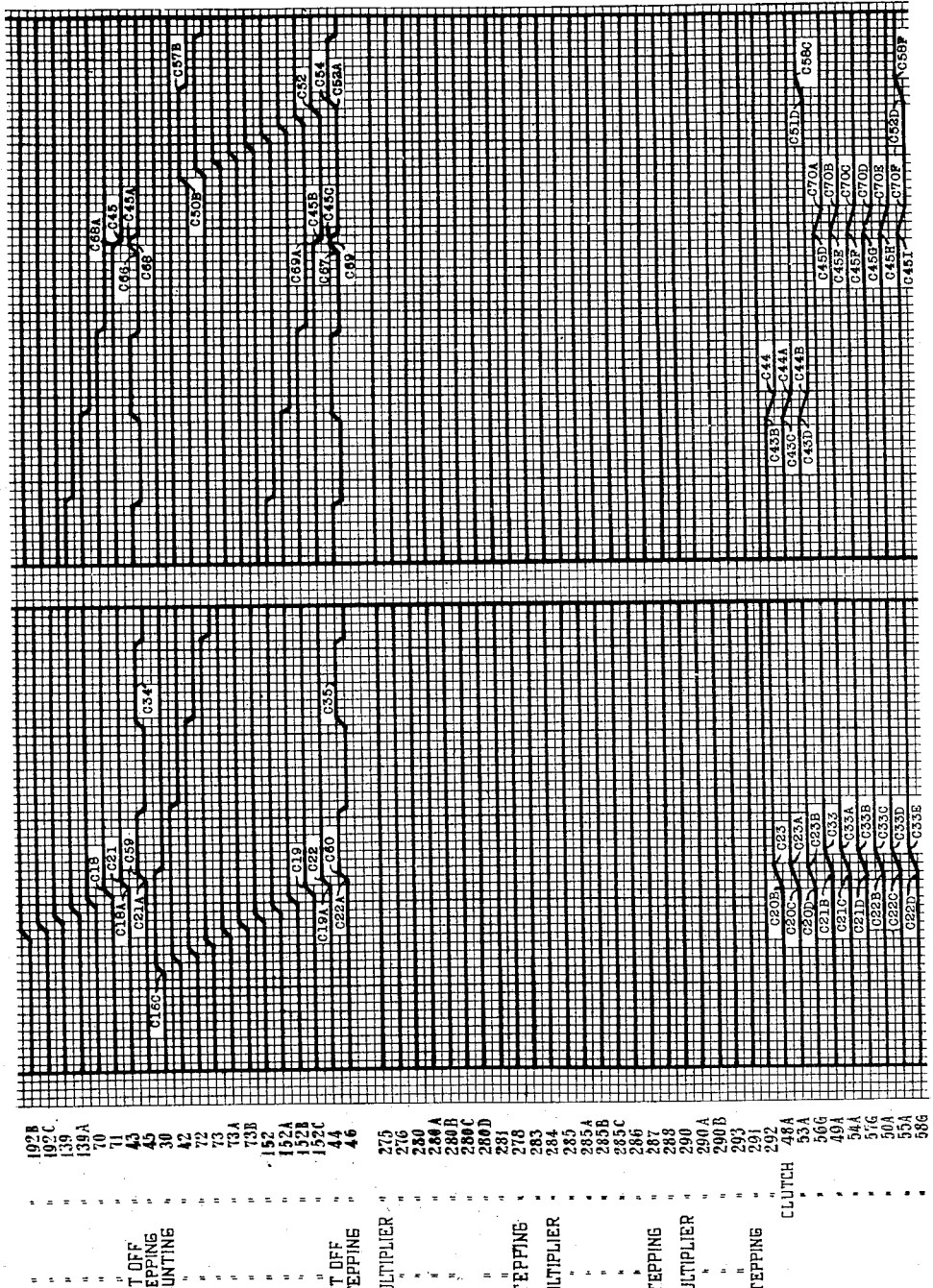
Figure 28:
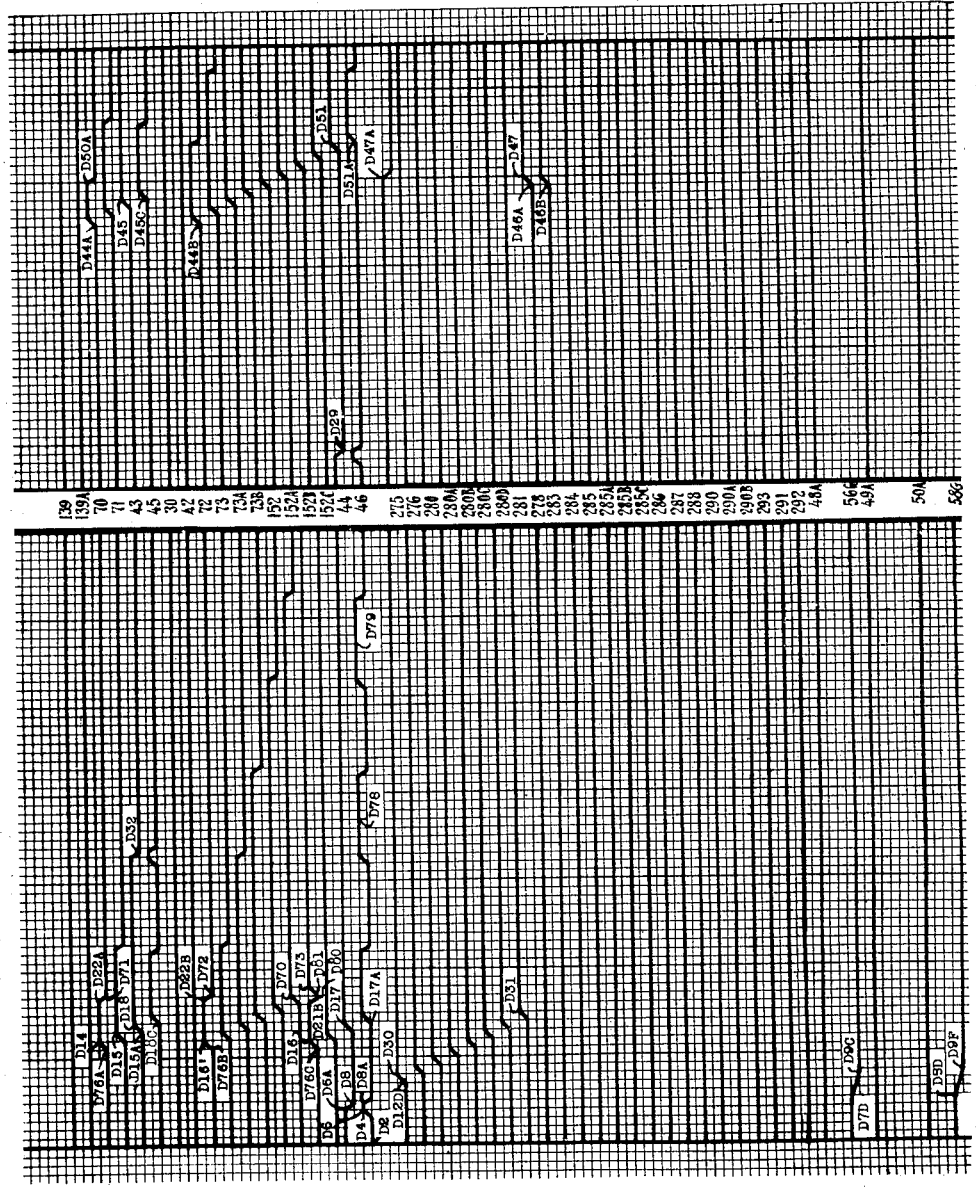
Figure 30:
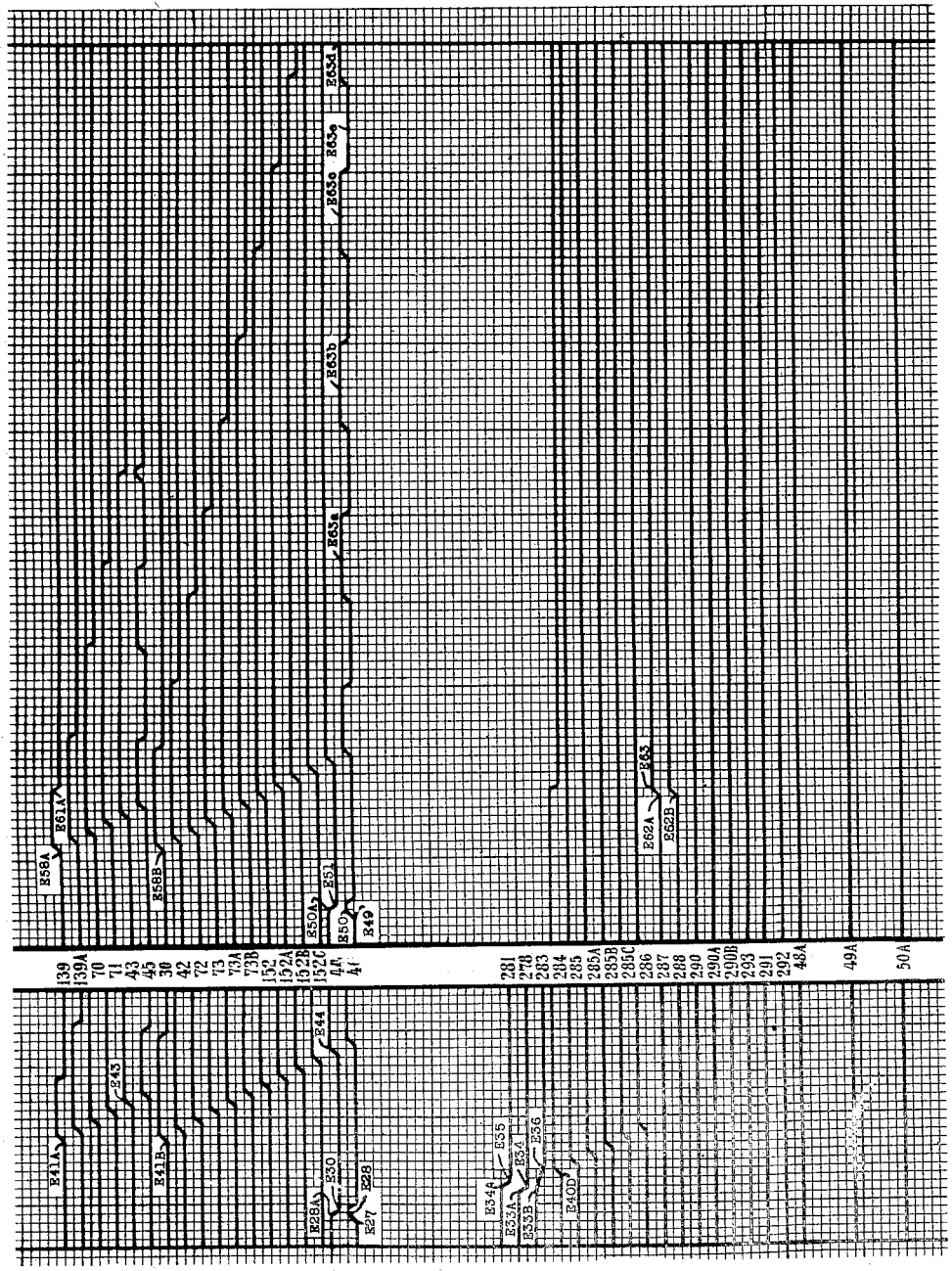
Figure 31:
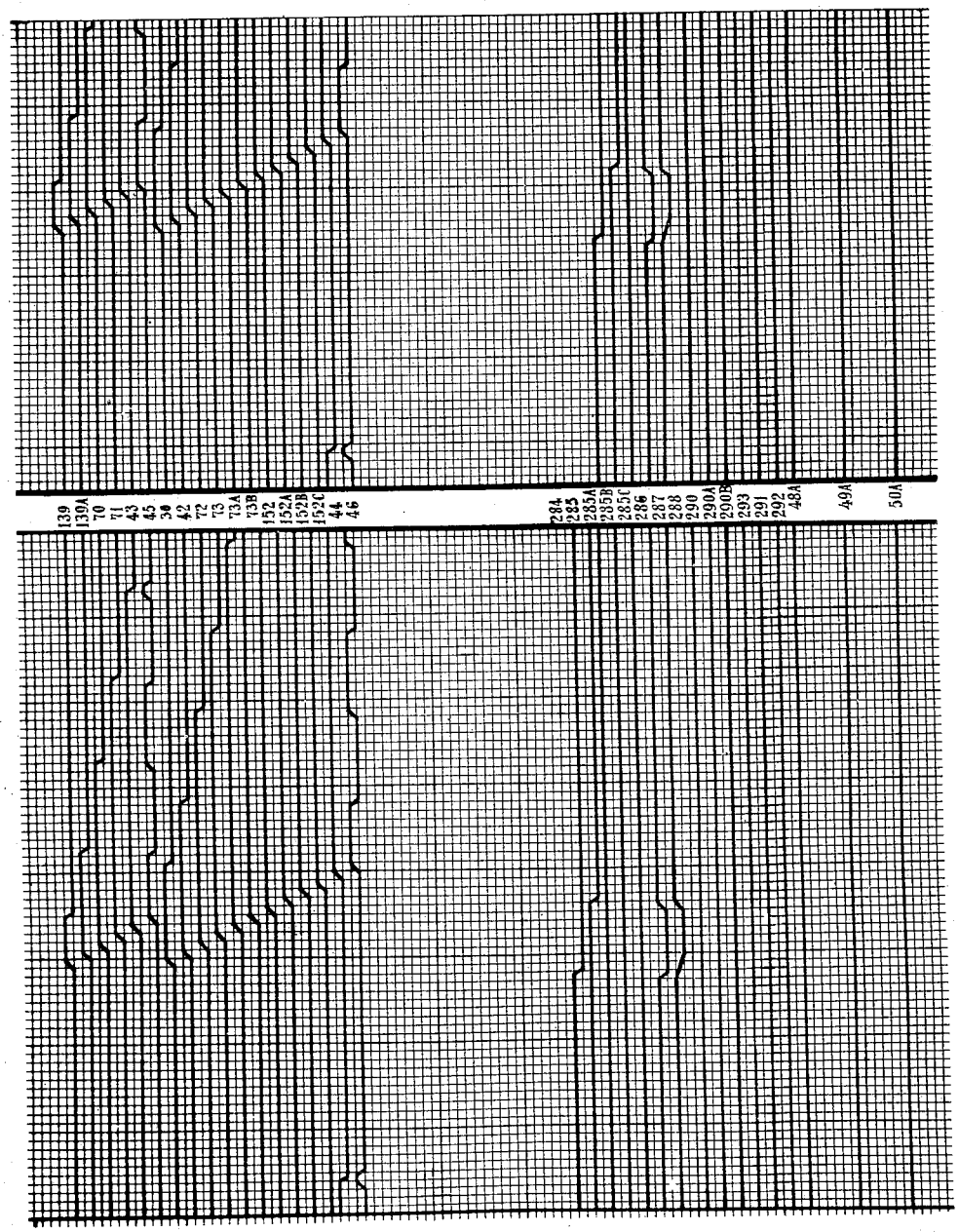
Figure 32:
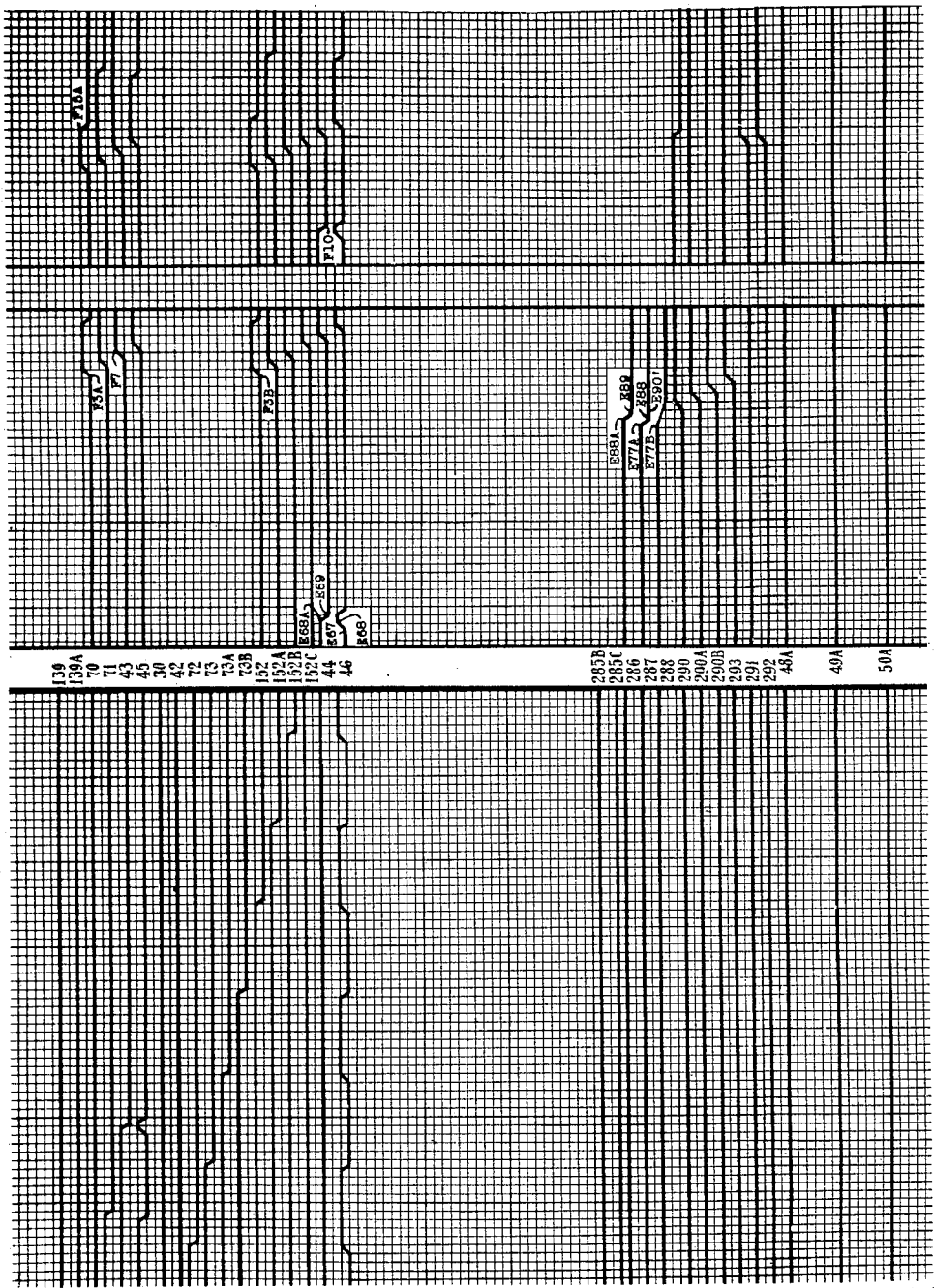
Figure 33:
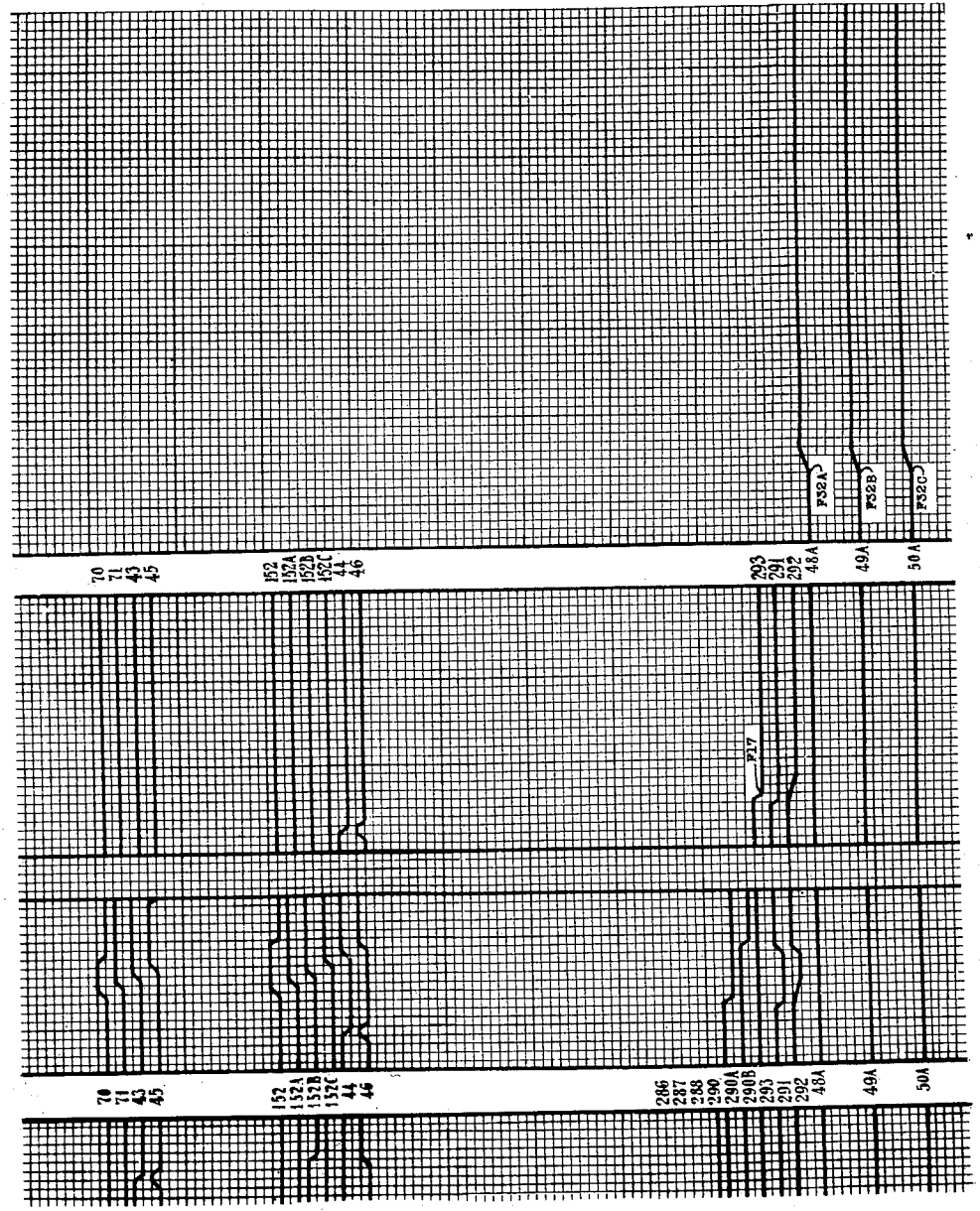
Figure 34:
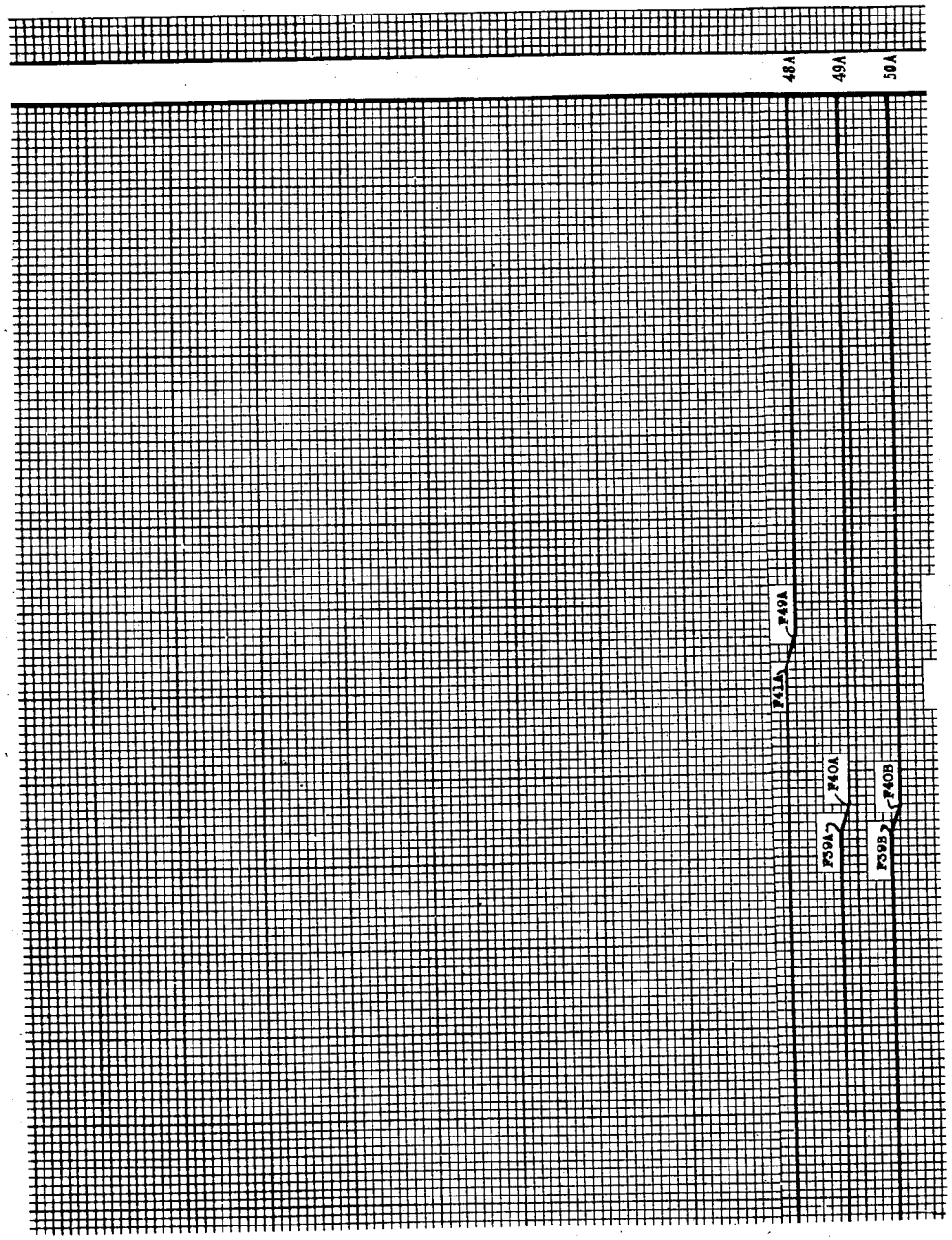
Figure 35:
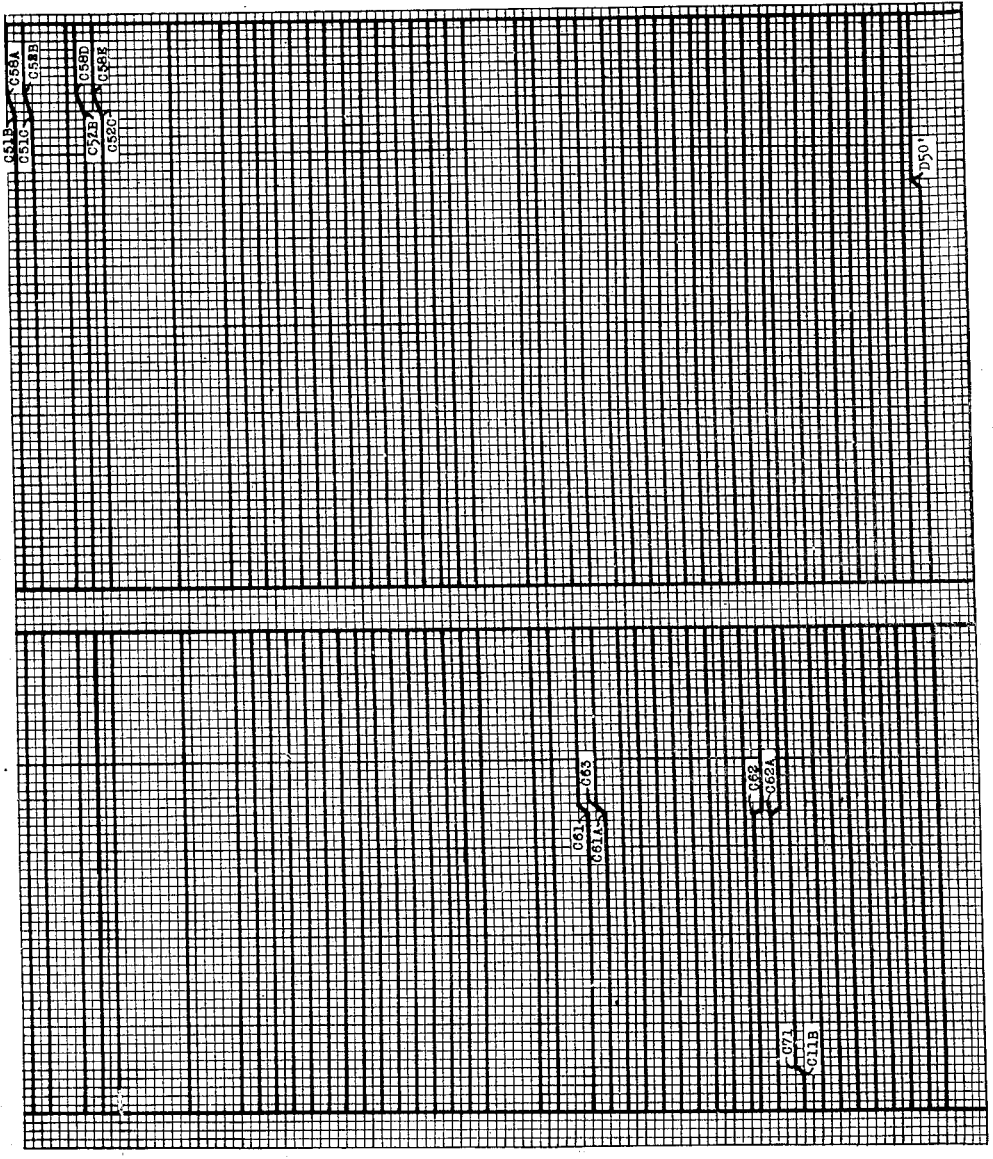
Figure 36:
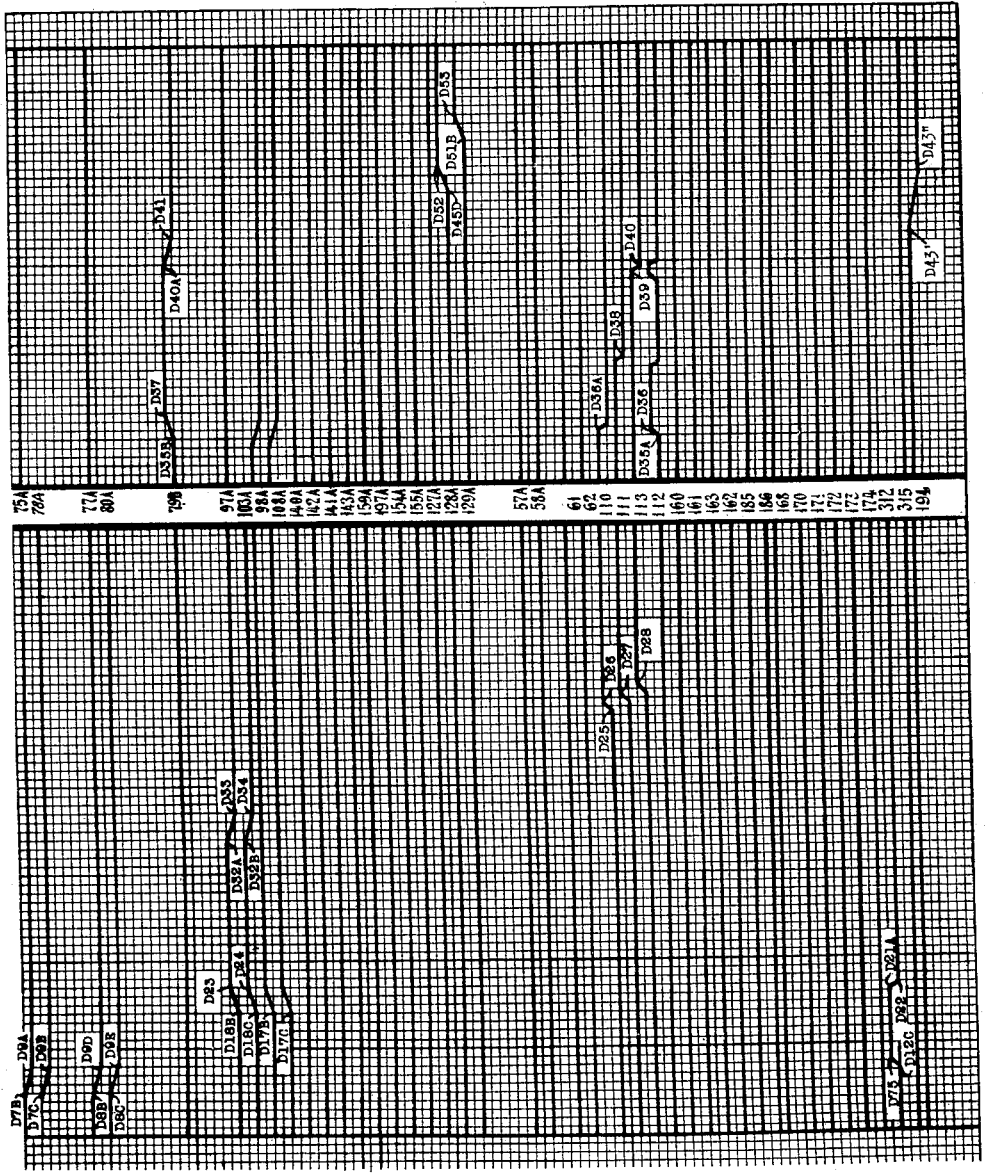
Figure 37:
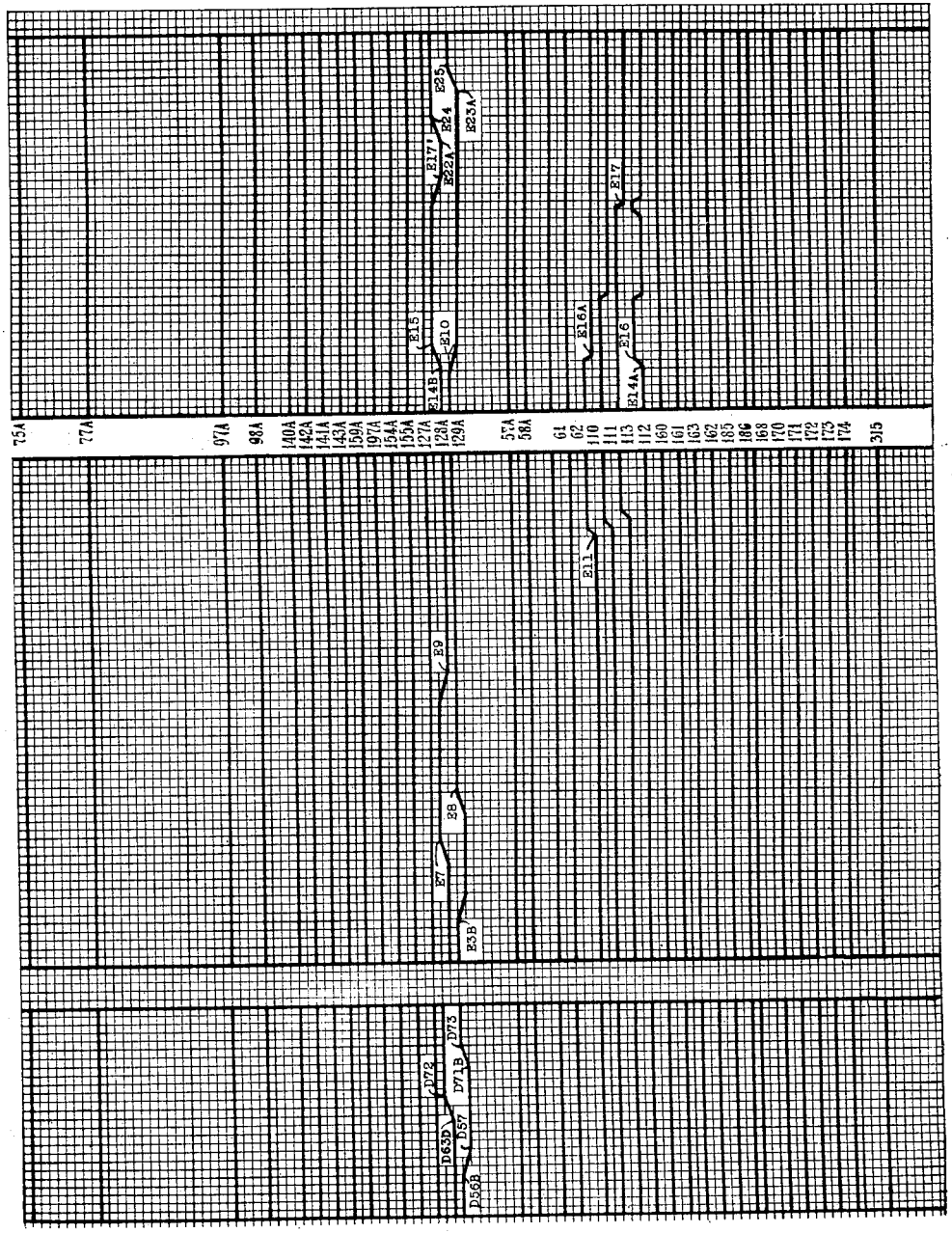
Figure 38:
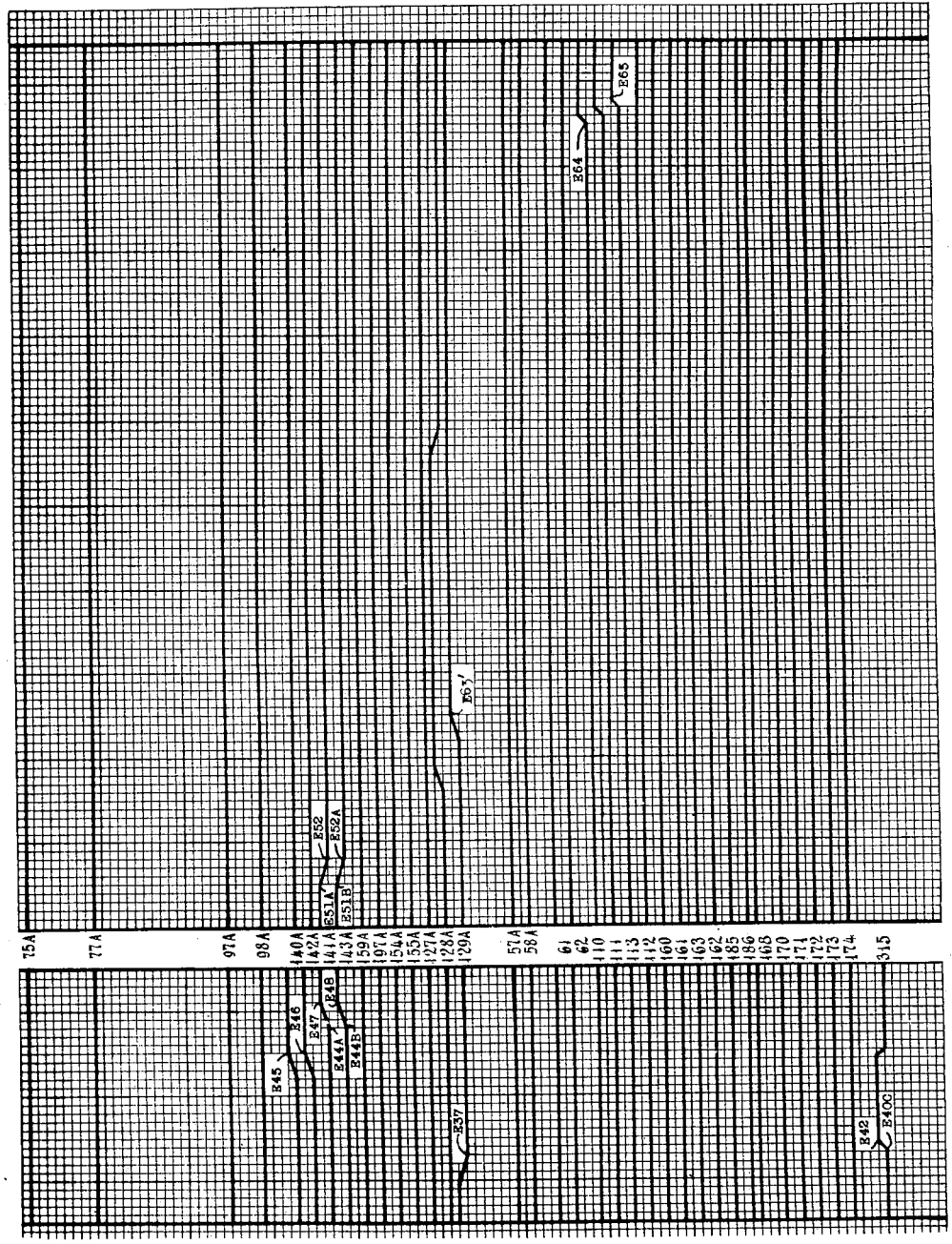
Figure 39:
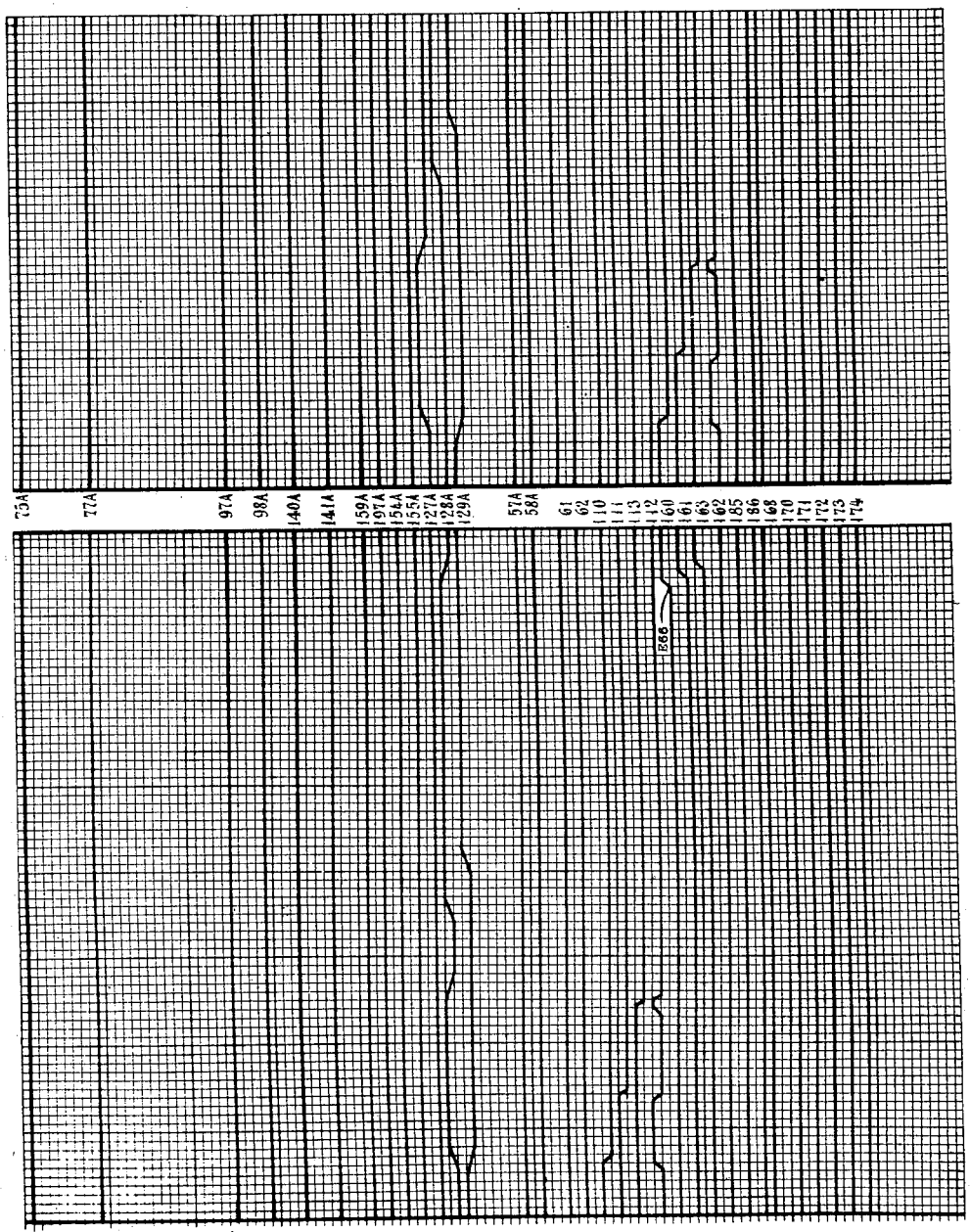
Figure 40:
Figure 41:
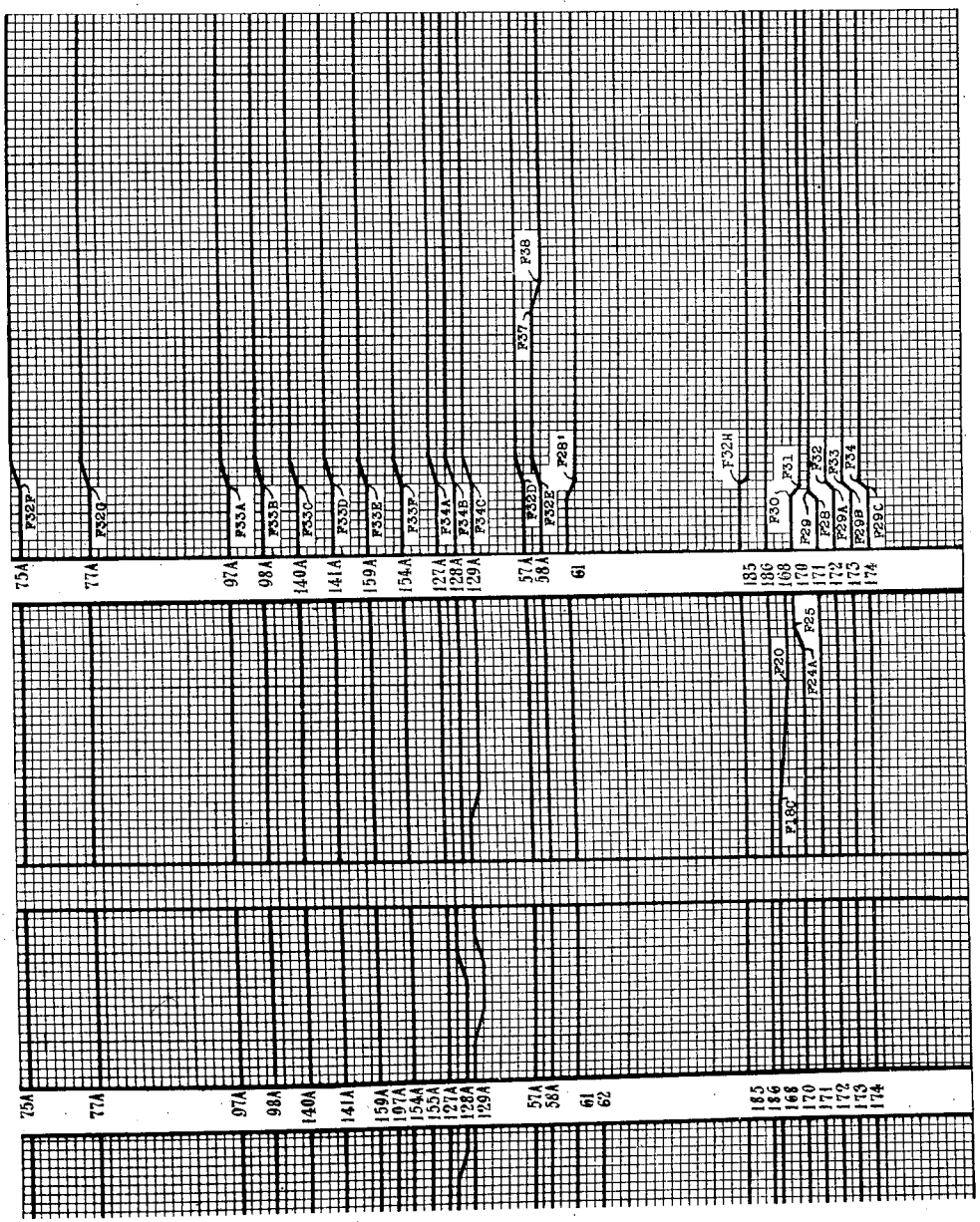
Figure 42:
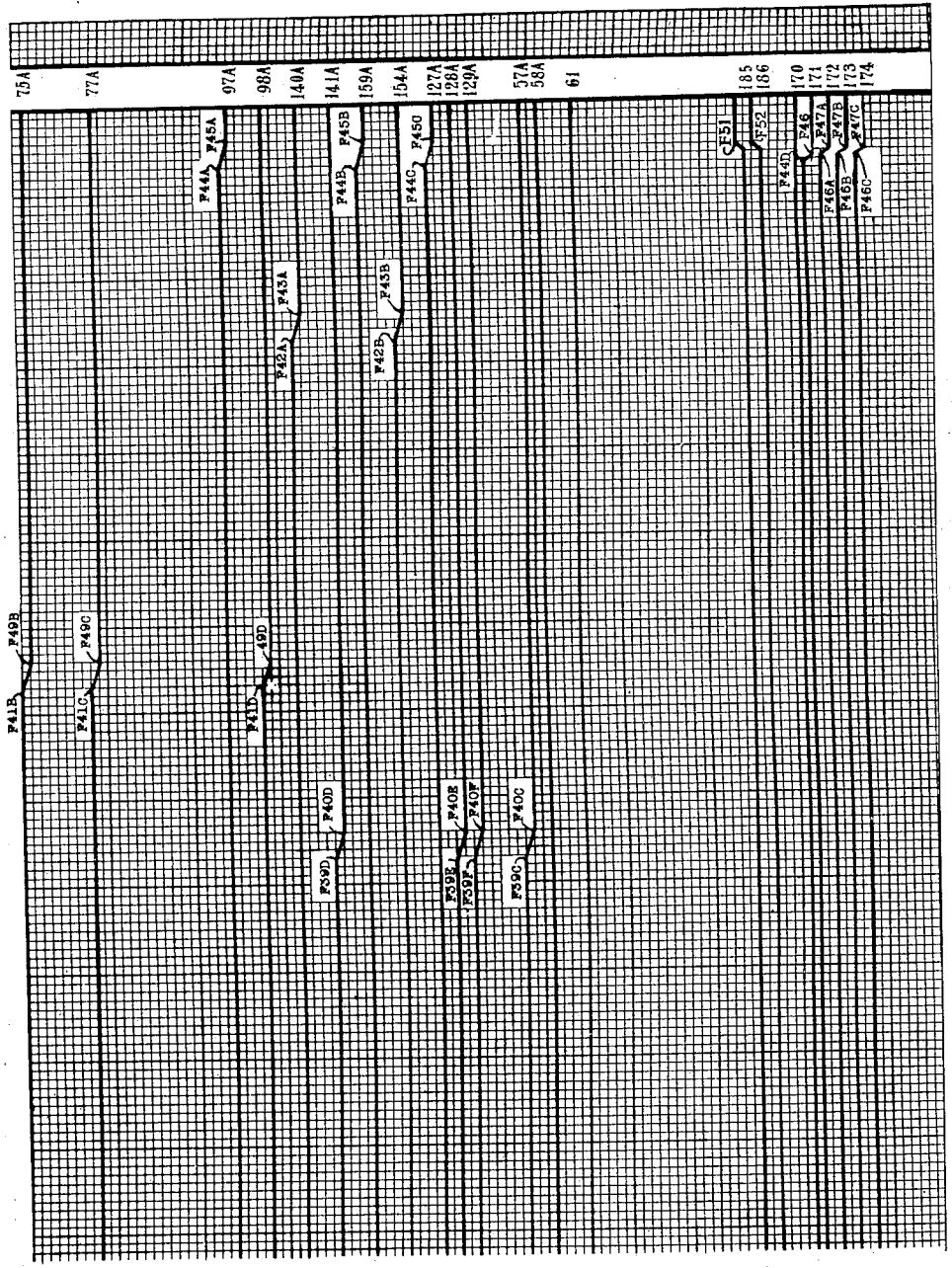

The right-hand contacts of the contact pairs L3, K3, Q3, P3, L6, K6, Q6, P6, are multipled in cable 109 (Figs. 12A, 12 and 2), to provide for carry-over operations on the consumption wheels (Fig. 2 at 503—503) when these wheels are driven subtractively by the first and second step registering wheels (Figs. 6 and 6A) on registering operations. The right-hand contacts of the right-hand groups of relays 204, 205, 207, 209, 210, are multipled in cable 126, as all five relays have access to the money wheels or designation wheel, or both, (Fig. 8). All of the left-hand contacts of the contact pairs in the right-hand group are multipled in cable 201K and fanned out (Fig. 14) to their respective positions in the counting relays (Fig. 13) and carry-over relays (Fig. 14).

The shift relay for each operation is energized at the beginning of the operation, and so continues until the beginning of the next. If there is a full round of operations, these relays operate in their order as here numbered from 201 to 210, omitting relay 205, which is for the purpose of connecting the minimum money bars to the counting relays in the alternative minimum operation. If the consumption is more than the minimum but no more than the first step, then only relays 201, 202, 203, 204, operate. Relay 210 is effective only in an operation to designate a money charge as High or Low.

Contacts 2X and 3X are for the purpose of energizing slow relay 194 (Fig. 11), in order to prevent the premature release of relay 22 in a minimum operation which may be initiated near the end of the second sequential operation if the consumption quantity is zero, or, near the end of the third sequential operation if the consumption quantity exceeds zero but fails within the limits of the selected minimum consumption quantity. Contacts 4X, 7X, 9X, are for completing circuits between contact 169A of the control relay 169 (Fig. 14) and the control relays as 278 and 283 (Fig. 10) whereby the energization and deenergization of the relay 169 incident to each round of multiplication causes like action of the relays 278 and 283 wherefore the energized of the multiplier relays are succcessively deenergized as the multiplication proceeds.

*Counting relays. Figure 13*

These relays, all of which are shown in Figure 13, are for the purpose of positioning the several sets of number wheels shown in Figures 2, 6, 6A, 6B, and 8, directly or indirectly. There are three groups illustrated, respectively for hundreds, tens, and units orders of numbers, with nine pairs in each group for the digits 1 to 9; and a fourth group of three pairs, for positioning the designation wheel (Fig. 8). Each group is arranged in a chain of two rows. Relays 28 and 31 as a pair represent 4 in the hundreds order; 29 and 41, 5 in the tens; 30 and 42, 5 in the units; 425 and 426, the MIN designation.

Each relay in the lower row, as 28, 29, 30, has three windings, as 28A, 28D, 28E. The first relay in the row to be energized will be energized from a like-positioned contact finger, as 27D (Fig. 1 at 500), through windings as 28D. This source of energization is used only momentarily. Once energized, relays as 28 lock up through windings as 28E, contacts as 28C and 40A, so long as contact 40A is closed.

On energization of such a relay as 28 from the fourth finger as 27D, on the associated contact bar, as 27A, its mate, 31, is energized through contact 28B; relay 31 in its turn energizes relay 32 through contact 31C; and in like manner all relays representing lower numerical values in the chain are energized.

Relay 38, designated a cut-off relay, is in addition to the paired relays. It is for the purpose of closing the several operating circuits to the number wheeel clutches, and of energizing relays 64 and 169 (Fig. 14), which has the effect of cutting the ground off the contact bars. Relay 38 is first energized by contact 37C of the No. 1 pair of counting relays, and remains energized so long as contact 37C is closed. On deenergization of relay 37, control of relay 38 passes to contact 40A, through contact 38B and winding 38A.

On energization of relays as 38, contacts as 38F are grounded, energizing relay 64 through conductor 64X, opening sequence control contact Y, deenergizing the sequence control relay 25 (Fig. 11). This caused deenergization of sequence relay 5 and thus removes ground from all the associated contact bars, 27A, 27B, 27C, and frees relays 28, 29, 30, from this source of energization. When these latter relays become energized, they are locked up through contacts as 28C and 40A, and hold their mates, as 31, energized through contacts as 28B. Thus the operation prepared for through the card perforations becomes independent of the perforations and the bars.

In Figure 13, for each group of counting relays is shown one stepping relay, 40 for the hundreds, 45 for the tens, 46 for the units, and 428 for the designations. They are for the purpose of releasing one pair of counting relays for each advance of the connected number wheel by one digit place.

On the energization of a cut-off relay, as 38, contacts as 38C, 38D, 38E, 38F, are grounded. Contact 38C completes a circuit to energize stepping relay 40, through a number wheel clutch, as 48A (Fig. 2), closing contact 40B and opening contact 40A with a make-before-break effect. On the opening of contact 40A, relay 28 is deenergized, through contact 28C and winding 28E; and on the closing of contact 40B, relay 31 is held energized through contact 31B and winding 31A so long as relay 40 is energized.

The energization of stepping relays, as 40, is effected initially from a cut-off relay and through a number wheel clutch, as 48A (Fig. 2), and the deenergization by a number wheel, as 48 (Fig. 2), in moving its contact-closing wheel, as 48C, from digit to digit, closing and opening a shunting contact, as 48D, on each movement.

The result is to count the number represented by the position of the effective finger on the contact bar and of the first-energized relay, and to advance the number wheel accordingly. This one lot of counting relays is the means of positioning all number wheels except the consumption quantity wheels 56, 57, 58 (Fig. 2).

The counting relays are shown wired to a common cable, 201H; they are connected to correspondingly positioned contacts in the left-hand group of shift relays (Figs. 12 and 12A). The contacts of the several relays, as 44D and 44E, are wired by conductors, as B and C, the cable 201K, and are multipled to the contacts in the right-hand group of shift relays. Such conductors are lettered A, B, C . . . to J, in a series which occupy respective positions in the shift relays corresponding to the letter, beginning with A as the first right-hand pair, and T, which occupies the last position.

The designation relays, 425 for MIN, 429 for H, 430 for L, are energized through conductors 189H, 189H (Fig. 1), 408B, 408B (Fig. 9A), and 413B, 413B (Fig. 9A).

*Carry-over relays. Figure 14*

The carry-over relays are essentially of the same design and operation as the counting relays. They are for the purpose of effecting due arithmetical carry-overs in either direction of number wheel movement, in addition or subtraction. The same set is illustrated as operating in addition and subtraction.

Additive carry-over action may be required on money wheels (Fig. 8) in connection with successive registrations; subtractive action, on the consumption wheels (Fig. 2 at 503—503) as complete assemblies, or on the contact-closing wheel (right-hand) division, as the former are driven backward by the previous reading wheels (Fig. 2, 504—504), or the latter by the first and second step wheels (Figs. 6 and 6A). The wheels of the different orders in these registers are driven separately and simultaneously, and any carry-over action must be effective after stoppage in any such driving.

Associated with the necessary wheels are conventional carry-over contact-closing wheels, as 57W with consumption number wheel 57 (Figs. 2, 503—503), and 57S with consumption contact-closing wheel 57D, and 128H with money wheel 128 (Fig. 8), to initiate a due carry-over action.

The relays and connections are shown in two orders, to carry over from units to tens and from tens to hundreds. Relays 110, 111, 113, are for the former, 160, 161, 163, for the latter. The operation is essentially the same as for the counting relays, and cut-off relays 113 and 163 have contacts X and W for opening the circuit of the sequence control relay 25 on a carry-over operation and contact XX for preventing carry-over action by the hundreds cut-off relay 163 before the tens operation is completed. Contacts X and W close on the completion of a carry-over operation, energizing relay 25 for the next operation.

There is but one carry-over equipment for all registers and purposes. This is made selectively available for any required carry-over action through conductors K to S, cable 201K, and like-lettered contacts of shift relays (Figs. 12 and 12A).

Operations additive and subtractive are included in the descriptions of operation below.

Relay 64 is for the purpose of opening the sequence control contact Y on the energization of cut-off relays 38, 43, 44, 427. Contact Y is in series with sequence control contacts X and W to prevent energization of sequence control relay 25 before a carry-over operation is completed. Contacts 64A and 64B are for the purpose of opening the circuit of the stepping relays 112 and 162 to prevent their energization before the completion of the original movement of the number wheels under control of the stepping relays of Figure 13. Contact Y also grounds, on deenergization of relay 64, contacts 113C, 113D, 113E, if relay 113 is energized for a carry-over in the tens order; if relay 113 is not energized and cut-off relay 163 is energized, contact XX transfers the ground to contacts 163C, 163D, 163E. If relays 113 and 163 are both energized, contact XX withholds ground from contacts 163C, 163D, 163E, until the carry-over in the tens order is completed.

Slow-to-release relay 169 is for the purpose of grounding through contact 169A, conductor 169B, contacts 4X (Fig. 12), 7X, 9X, (Fig. 12A), conductors 4XX, 7XX, 9XX, and contacts 281C, 286C, 293C (Fig. 10), on first step, second step, and remainder multiplying operations, for energizing and deenergizing the multiplier control relays, as 283 and 278, on each round of registration.

Relay 169 has two sources of energization: winding 169E, energized from contacts 38F, 43F, 44F, if relays 38, 43, 44, are energized; and winding 169D, energized through conductor 169C, contacts ZZ and Z, if relay 163 or 113 is energized. The first source of energization is for a multiplying operation, and the second for restraining the multiplying operation until a carry-over (if there be one) is completed. Contacts 427F also energizes winding 169E on a designation operation.

*Register wheel details. Figure 15*

In Figure 15 are shown front views of the tens consumption wheel assembly—at 512 the left-hand, and at 513 the right-hand, division; and side views of the several members. These are described in their relations in connection with Figure 2, and here bear the same reference characters as in that figure. Each assembly and each part is typical for the several orders of numbers of the consumption register, and, so far as each applies, for other like registers.

*Perforated cards. Figures 16 and 17*

In Figure 16 is shown in outline a combined meter and office card, and in Figure 17 a card with perforations to illustrate the examples included under the heading of Comparison of numbers.

These cards have their conventional use of insulating sets of numerically positioned contact fingers from contact bars at all points except as contact is permitted through correspondingly positioned perforations. Through such sets of bars and fingers are led the potential electrical paths for many of the machine operations; current is directed into the paths determined by the perforations and the circuit arrangements.

The cards are shown in outline, with their perforations shown as on bars which are indicated in dotted lines. These bars bear the same reference characters as appear for them in Figures 1, 3, 4, 5, 7D, 9A, 10. The perforations are such as apply to the examples included in descriptions of operation.

In practice, the card of Figure 16 would be divided; the left-hand section would be for the meter reader's use; the right-hand would be retained in the office; and the two would be fed into the machine together.

The left-hand side of Figure 16 corresponds to the meter card. It is shown with holes, as from a meter reader's perforation, for January and February; the former, at 67DD and 67FF, representing here the previous reading of 404 (there being no perforation for the 0); the latter, at 27DD, 27EE, 27FF, representing the last reading 455.

The right-hand side of Figure 16 corresponds to the office card. This contains conventional perforations for three rates—115CC for 4, 115DD for 3, and 115EE for 2; for a minimum money charge of 48—189CC and 189DD; and for registering the designation MIN—189GG.

Perforations are indicated in special positions, for the minimum consumption bars, 184, 184A, 184B, for the comparison of numbers and circuit selection, and for the first step bars (in line with 514—514) and second step bars (515—515) for the comparison of numbers and selection of limited registrative and computative actions, as explained at length under the heading of comparison of numbers and in connection with Figures 3, 4, 5. Special perforations, explained under the same heading and in connection with Figures 9 and 9A, are related to bars 406, 406A, 406B, 406D, for the designation H (to indicate a money charge unusually high) and to bars 407, 407A, 407B, 407C, 407D, for the designation L, indicating an unusually low charge.

The perforations of Figure 17 are for a first rate step quantity of 324.

Flow charts

Before proceeding with a detailed description of the principal machine operation, a general perspective will be given of the nature and order of sequential or sub-operations of the machine with reference to Figs. 56, 57, and 58. Figs. 56 and 57 constitute a flow chart illustrating the principal operation of the machine; that is, an operation in which there is an execution of all sequential operations with the exception of one in which a minimum charge is initiated and the further exception of one in which there is registration of a High or Low on the designation wheel. Said flow chart, does, however, indicate the sequential position of the time when a comparison of numbers is made to cause the entry of a High or Low registration, if such were proper under the conditions assumed.

Fig. 58 is a flow chart which illustrates the sequence of operation and the flow of energy occurring during a minimum charge operation.

The principal operation of the machine will be illustrated first with reference to the flow chart shown in Figs. 56 and 57. In Fig. 56 the control card, also shown in Fig. 16, is indicated as being perforated for a previous reading of 404 and a last reading of 455 respectively in the previous reading and last reading fields in the upper left-hand corner of such card. These amounts 404 and 455 correspond to those indicated by card perforations in Fig. 16. Likewise, the other numerical data fields illustrated elsewhere on the card in Fig. 56 correspond both in position and numerical amount to those indicated by the card perforations shown in Fig. 16.

The machine operation is picked up immediately following energization of the sequence relays in Fig. 11. Following such energization of the sequence relays, the sequence relay 4 is caused to deenergize and impress ground from its contact 4E through contact 5D of sequence relay 5 and the conductor 5G (Figs. 11 and 1) upon the last reading bars in Fig. 1. Thus the last reading field of the card, which is perforated for 455, becomes effective for controlling the entry of this amount in the last reading register 48—49—50 in the consumption quantity register 56—57—58 in Fig. 2. In Fig. 56, the sequence relays 4 and 5, pertaining to the first sequential operation are shown associated with the shift relay 201 which also pertains to the first sequential operation. Such deenergization of sequence relay 4, in closing its contact 4B impressed ground upon the shift relay 201 to cause the same to close its contacts. Therefore, the intelligence picked up at point I (Fig. 56) is carried over conductors and through certain contacts of the shift relay 201 to the counting relays which are generally designated C. R. In this manner the counting relays are energized in an arrangement representative of the amount 455.

Following energization of the counting relays, the cut-off relays 38, 43 and 44 (Fig. 13) are energized and establish circuits through other contacts of the shift relay 201 to the last reading register 48—49—50 and to the consumption quantity register 56—57—58, wherefore these registers are caused to set up the reading 455. The sequence relay 5, shown associated with the shift relay 201 is deenergized subsequent to the start of counting relay energization, thus breaking the original source of energization for these relays and permitting their deenergization as the sequential operation proceeds. This is the effect of each of the odd numbered sequence relays. During the entry of the amount 455 in said two registers the counting relays are caused to successively deenergize because of the action of the shunting wheels 48C, 49C and 50C which rotate with the number wheels of the last reading register. Upon completion of the entry in these registers all of the counting relays will be deenergized and conditioned for reenergization and use during a succeeding sequential operation.

Near the end of the entry of 455 in the last reading register and in the consumption quantity register, sequence relay 6, shown in relation with the shift relay 202 in Fig. 56, is caused to deenergize and impress ground upon the meter reading bars in registry with the previous reading field of the control card. Inasmuch as this field of the card is perforated for the amount 404, circuits representative of this amount are there established as indicated at the point II and lead through conductors to certain contacts of the shift relay 202. Deenergized sequence relay 6 caused deenergization of shift relay 201 and the energization of the shift relay 202. Therefore, the circuits from point II are completed through certain contacts of the shift relay 202 to the counting relays C. R. to cause their reenergization, this time in an arrangement representative of the amount 404.

When the cut-off relays associated with the counting relays energize, the circuits closed by their contacts are this time effective through other contacts of the shift relay 202 inasmuch as this is the only shift relay of which the contacts are now closed. The circuits leading from the cut-off relays of the counting relays through such contacts of the shift relay 202 are continued through conductors which lead to the previous reading registry 75—76—77 which has a geared connection with the consumption quantity register 56—57—58. The previous reading register is advanced in the amount 404 whereas, through paired gears as 78 and 56E (Fig. 2), the consumption quantity register is moved backwardly in the amount 404. Inasmuch as the reading 455 stood upon the consumption quantity register at the end of the first sequential operation, this subtractive entry of 404 in the said register will leave it standing at 051 which amount is the consumption quantity of the customer, this being the difference between the last month's reading, 455, and the previous month's reading, 404. The consumption quantity 051 appears in Fig. 56 below the consumption quantity register and at the head of an arithmetical column of which the remaining numbers will be acounted for presently.

It is the function of the machine during the next, or third, sequential operation to ascertain whether the consumption quantity is equal to or exceeds the first rate step quantity which in the present instance is 14. If it is found equal to or to exceed the amount of the first rate step, the amount of such rate step will be caused to be entered in the first step register 97—98 (Figs. 57 and 6). If the consumption quantity is less than the amount of the first rate step, such lesser amount will be entered in said first step register.

This analysis of the consumption quantity is performed by the electric circuits associated with the first step comparison bars (Figs. 3, 4, 5 and 56) and determined by card perforations and by the multiple contact switches (Figs. 3, 3A, 4, 4A, 5, 5A and 56) which are closed in an arrangement representative of the amount standing upon the consumption quantity register.

Near the completion of the second sequential operation, sequence relay 8 (Figs. 11 and 57) is deenergized to cause the opening of the contacts on shift relay 202, the closing of the contacts on shift relay 203 and the impression of ground upon certain of the first step comparison bars (Figs. 3, 4, 5 and 56). Thus energized, these break down consumption bars and fingers establish circuits, determined by the card perforations and the setting of said multiple contact switches, and which circuits emerge at point III in an arrangement representative of the first rate step amount, 14, since the consumption quantity 051 exceeds the amount of said rate step. These circuits are carried through a portion of the contacts of the shift relay 203, which is now energized, to the counting relays which are therefore energized in an arrangement representative of the amount 14.

Upon the energization of these counting relays, their cut-off relays energize and establish circuits through other contacts of the shift relay 203 to the first step register 97—98. As will be seen in Figs. 6 and 2, while the number wheels of the first step register 97—98 are advanced, the gearing inter-connecting these wheels and the right-hand sections of the tens and units orders of number wheels in Fig. 2 of the consumption quantity register will be rotated backwardly. Said right-hand sections include the contact closing wheels which control the setting of the multiple contact switches in Figs. 3, 3A, 4, 4A, 5 and 5A. It will be observed in Fig. 2 that these right-hand sections also include the back stop wheels 56C, 57C and 58C. When the amount 14 (the first rate step quantity) is entered upon the first step register 97—98, the contact closing wheels of the consumption quantity register will be moved backwardly in the amount 14 so that at the end of the present sequential operation when the first step register reads 14, the contact closing wheels of the consumption quantity register associated with the consumption quantity register will stand at 037, the difference between 051 and 014.

During the third sequential operation, deenergized sequence relay 8 impressed ground upon the first step rate bar illustrated by dotted lines in Fig. 56, and since a card perforation in the No. 4 position registers with this bar, a circuit is established for setting up four pairs of multiplier relays in the group of such relays (Figs. 10 and 57) which are for controlling the multiplication of the first step quantity. The four pairs of multiplier relays energized in this group of relays are associated with the multiple contact switches (Figs. 7 and 57) which are closable by the first step register 97—98 in an arrangement representative of the reading of such register.

During the fourth sequential operation, which involves multiplication of the amount standing upon the first rate register, the number of rounds of multiplication corresponds in number with the number of pairs of said multiplier relays that are thus locked up, and since there are four pairs of said multiplier relays locked up, four rounds of multiplication will ensue.

At the inception of the fourth sequential operation, sequence relay 10 deenergizes to cause deenergization of the shift relay 203 and the energization of the shift relay 204. Ground is applied from sequence relay 10 onto the multiple contact switches controlled by the first step register wherefore circuits representative of the first step quantity 14 standing upon this register emerge at the point IV and are extended through certain contacts of the shift relay 204 to the counting relays, which are thus caused to energize in an arrangement representative of 14. Upon the energization of the counting relays, circuits are completed from the cut-off relays associated therewith through other contacts of the shift relay 204 to the money register 127—128—129 (Figs. 8 and 57) to cause the entry of 14 in such register. As soon as this entry is completed, ground is again impressed upon the multiple contact switches associated with the first step register, this time from the first step multiplier relays, wherefore the circuits originating at point IV are again energized to cause a second energization of the counting relays in an arrangement representative of 14 and a second entry of 14 in the money register 127—128—129. With each round of multiplication, a pair of the first step multiplier relays is deenergized, and after the fourth and last round of such multiplication all of the multiplier relays will be deenergized so that no additional rounds are initiated. At this time the money register will stand at 056 which is the sum of four entries of 14, or the product of the first rate step rate, 4, by 14. This amount, 056, is shown in Fig. 57 immediately below the money register and where it is designated as the charge for the first rate step.

Upon the completion of the fourth sequential operation, the sequence relay 12 deenergizes for initiating the fifth sequential operation, which is a comparison operation that is effected similarly to that occurring during the third sequential operation. This operation is for ascertaining whether the consumption quantity extends sufficiently over and above the first step quantity to completely provide the second step quantity, and is for entering in the second step register the entire second step quantity or any part thereof which exists.

Deenergized sequence relay 12 causes opening of the contacts on shift relay 204 and closing of the contacts on shift relay 206. Said deenergized sequence relay also serves to impress ground upon the second rate step comparison bars which are beneath that card field which is perforated for a second rate step quantity of 25, and inasmuch as the multiple contact switches under control of the contact closing wheels of the consumption quantity register 56—57—58 are now closed in an arrangement representative of 037, a quantity no less than the second rate step quantity, conductors emerging from the second rate step circuits at the point V (Fig. 56) will be energized in an arrangement representative of the complete second rate step, 25. These conductors extend through now closed contacts of the shift relay 206 to the counting relays for causing their energization in an arrangement representative of 025.

When the cut-off relays of these counting relays energize, they complete circuits through other contacts of the shift relay 206 to the second step register 140—141 (Figs. 6A and 57) and because of the gear trains inter-connecting the register wheels of this register with the contact closing wheels in the tens and units orders of the consumption quantity register (Figs. 2 and 56), said contact closing wheels will be moved backwardly. The second step register is advanced from zero to 25 and simultaneously the consumption quantity register contact closing wheels are moved backwardly in the amount 025 from 037 to 012.

Deenergized sequence relay 12 also impresses ground upon the second step rate bar shown in dotted outline in Fig. 56, and since there is a card perforation in the No. 3 position registering with this bar, three pairs of the second step multiplier relays (shown in block in Fig. 57) will be energized and lock up preparatory to use during the succeeding sequential operation.

At the beginning of the next sequential operation the sequence relay 14 is deenergized to open the contacts of shift relay 206 and to close the contacts of shift relay 207. Ground is impressed upon the switches which are controlled by the contact closing wheels of the second step register, and since these contact closing wheels now stand at 25, the energized circuits leading from such switches at point VI are representative of the amount 25 and extend through certain contacts of the shift relay 207 for causing energization of the counting relays in an arrangement representative of 025. Following energization of the counting relays their cut-off relays energize and complete circuits through other contacts of the shift relay 207 to the money register 127—128—129 whereby the wheels of this register are advanced in the amount 025. Inasmuch as three pairs of multiplier relays were locked up in the second step bank of such relays the circuits controlled by the multiple contact switches associated with the second step register will have ground impressed thereon two more times so that the amount 025 will be entered three times in all in the money register so that at the end of the present sequential operation the amount 075 will have been added onto the reading 056 in the money register and said register will then read 131.

After the third round of multiplication of the second step quantity the sequence relay 16 is deenergized, opening the contacts of shift relay 207, closing the contacts of shift relay 208, impressing ground upon the multiple contact switches associated with the consumption quantity register, and impressing ground upon the remainder rate bar shown in dotted outline in Fig. 56. Since the contact closing wheels of the consumption quantity register now stand at 12, the energized circuits energizing at the point VII from the said switches are representative of 12 and extend through certain contacts of the shift relay 208 to the counting relays to cause their energization in an arrangement representative of 012. Therefore, the cut-off relays of the counting relays are energized and establish circuits through other contacts of the shift relay 208 to the clutches of the remainder register 198—159—154 (Figs. 6B and 57). In this manner said remainder register is advanced to read 012 and concurrently the gear trains between this register and the contact closing wheels of the consumption quantity register are effective for moving the contact closing wheels backwardly in the amount of 012 to zero.

At the completion of this sequential operation during which the remainder register is set up and the contact closing wheels of the consumption quantity register are moved backwardly to zero, sequence relay 18 is deenergized to start the next sequential operation by causing the opening of the contacts on shift relay 208 and the closing of the contacts on the shift relay 209. Deenergized sequence relay 18 also impresses ground upon the switches controlled by the contact closing wheels of the remainder register, wherefore, at the point VIII, energized circuits representative of the amount 012 emerge from said switches and are effective through certain contacts of the shift relay 209 for energizing the counting relays for the extension of other circuits through the shift relay 209 to the money register whereby this register is advanced in the amount of 012.

During the preceding sequential operation when ground was impressed upon the remainder bar shown in dotted outline in Fig. 56, a card perforation in the No. 2 position enabled energization of the No. 2 contact finger associated with this bar and the No. 2 pair of third step multiplier relays (Figs. 10 and 57). These two pairs of multiplier relays determine that the amount of the reading standing in the remainder register shall be entered twice in the money register 127—128—129. Therefore, following the first described entry of 012 in the money register, the multiplier relays effect a second impression of ground upon the circuits conditioned by the contact closing wheels associated with the remainder register so that for the second time at the point VIII the circuits representative of 012 are energized to cause reenergization of the counting relays and a second entry of the amount 012 in the money register. It follows that at the end of this sequential operation the amount 024, the charge for the remainder quantity of consumption units, will have been entered in the money register and the register will therefore stand at 155, the sum of 131 and 024.

The next sequential operation is initiated by the deenergization of sequence relay 20 whereby the contacts in the shift relay 209 are opened and the contacts in the shift relay 210 are closed. The deenergized relay 20 also impresses ground through the conductor 21F upon the switches (Figs. 9 and 57) which are controlled by the contact closing wheels of the money register 127—128—129, and through these contacts the ground is so impressed upon the high and low number comparison bars (Figs. 9A and 56) that if the reading standing upon the money register should fall above or below the limits of a charge range represented by card perforations in registry with the bars (Fig. 9A), circuits would be extended from said bars as indicated at the point IX to the fourth and lowest bank of counting relays in Fig. 13 to cause their energization in an arrangement representative of a high or low designation depending upon whether or not the charge upon the money wheels was above or below the selected charge range. Following the energization of these counting relays and their cut-off relay 427 (Fig. 13), a circuit would be completed through the shift relay 210 for energizing the clutch associated with the designation register comprising a single indicator wheel 435 in Figs. 8 and 57. However, in the present example, since the consumption charge was 155 and the upper limit of the charge range is perforated for 675 and the low limit for such charge range is perforated for 125, said charge 155 falls within the range and fails to complete circuits leading from the high or low number comparison bars for causing energization of said counting relays. Consequently, in Figs. 56 and 57, the energy flow line from said number comparison bars through the counting relays and shift relay 210 to the designation register 435 is shown dotted.

Since no counting relays were energized as a result of deenergization of the sequence relay 20, for causing an entry in the designation register 435, the sequence control relay 25 (Fig. 11) remained energized, and when the slow-to-release relay 168 (Fig. 11) eventually deenergized following the opening of contact 20X of the deenergized sequence relay 20, the contact 168A first opened to cause deenergization of the sequence relay 25 and thereafter the contact 168B closed to cause reenergization of the sequence relay 25. This deenergization of the sequence control relay 25 caused deenergization of sequence relay 21 and said subsequent reenergization of the sequence control relay 25 caused deenergization of sequence relay 22 to start the final sequential operation in which the number wheels are held sufficiently long for reading and thereafter returned to zero.

Deenergized sequence relay 22 closed its contact 22E for establishing the energization circuit for the solenoid 170 (Fig. 11). While the plunger 170AA of this solenoid is descending, the number wheels of the various registers may be read, and when said plunger reaches the lower limit of its stroke it establishes circuits (indicated at X in Fig. 57) for energizing the zero setting relays 171, 172, 173 and 174 (Figs. 6, 2, 6A, 8 and 57). Circuits, in turn established by the energization of these relays, energize the zero setting clutches of those number wheels standing off zero, to cause return of such number wheels to zero, thereby placing the apparatus in condition for the starting of another machine operation under control of a different card or cards.

Reference should now be had to Fig. 58 which is a flow chart illustrating a minimum charge operation. Fig. 58 shows a control card perforated for a previous reading of 443 and a last reading of 455. The card perforations representing these meter readings correspond to the perforations assumed in the machine operation hereinafter described in detail under the heading Operation for minimum charge. The perforations assumed elsewhere in the card are the same as those illustrated in Fig. 16.

Subsequent to energization of the sequence relays in Fig. 11, sequence relay 4 is deenergized to cause the impression of ground upon the last reading bars in registry with the control card whereby at the point I' circuits are energized under control of the card perforations to represent the amount 455. As before, deenergized sequence relay 4 causes the contacts of the shift relay 201 to be closed so that the circuits from the point I' are carried through certain contacts on this shift relay to the counting relays to cause their energization in an arrangement representative of 455, and, as before, the cut-off relays of these counting relays are effective through circuits passing through other contacts of the shift relay 201 for causing entry of the amount 455 in the last reading register 48—49—50 and in the consumption quantity register 56—57—58.

Near the end of the first sequential operation the sequence relay 6 is deenergized, resulting in the opening of the contact of the shift relay 201, the closing of the contacts of the shift relay 202 and the impression of ground upon the bars in registry with the previous reading section of the control card. And since the previous reading section of the card is perforated for 443, circuits at the point II' are energized to represent 443 and extend through certain contacts of the shift relay 202 for energizing the counting relays in accordance with the reading 443. In turn the cut-off relays of these counting relays are effective through other contacts of the shift relay 202 to cause the additive entry of the amount 443 in the previous reading register 75—76—77 and the subtractive entry of such amount in the consumption quantity register so that at the end of this sequential operation the consumption quantity register will stand at 012 which is the difference between the last reading 455 and the previous reading 443.

At the beginning of the next, or third, sequential operation the sequence relay 8 deenergizes, causing the opening of the contacts on the shift relay 202, the closing of the contacts on the shift relay 203 and the impression of ground upon the first rate step comparison bars in Figs. 3, 4 and 5. Inasmuch as the consumption quantity register and the contact closing wheels associated therewith now stand at 012, an amount less than the first rate step quantity 14, the multiple contact switches for controlling the circuits associated with said comparison bars will be closed in an arrangement representative of 012, wherefore said grounded bars will result in the energization of conductors representative of 012 leading from said circuits at the point III'. These conductors complete circuits through certain contacts of the shift relay 203 to the counting relays and cause energization of these counting relays in an arrangement representative of 012. The cut-off relays of these counting relays are thus energized to complete circuits through other contacts of the shift relay 203 to clutches for driving the first step register 97—98 (Figs. 6 and 58). This register will be advanced from zero to 12, and because of the power trains inter-connecting the number wheels of this first step register and the tens and units orders contact closing wheels of the consumption quantity register, said contact closing wheels will be rotated backwardly from 12 to zero concurrently with the advancement of the first step register wheels to 12.

Concurrently with the return of the contact closing wheels of the consumption quantity register 56—57—58 to zero, the back stop wheels 56C, 57C and 58C were all stationed at zero to permit movement of the back stop bar 60 (Fig. 2) in such a manner as to close contacts 60D and open contacts 60B.

Contacts 60B in opening remove ground from conductor 60C (Figs. 2 and 11) to cause deenergization of the control relay 62 whereby the source of energization is removed for the sequence relays pertaining to the second step registration and multiplication and the remainder step registration and multiplication, it being ascertained at this time that no second step nor remainder step portions of the consumption quantity exist.

The contacts 60D (Fig. 2) in closing when the back stop wheels returned to zero impressed ground upon conductor 60E (Figs. 2 and 7) to ground certain contacts of the multiple contact switches closable by the contact closing wheels associated with the first step register. Since this register now stands at 12 the grounded or energized conductors leading from said switches at the point IV' are representative of 12. These conductors ground certain of the contacts associated with the minimum consumption comparison bars (Figs. 7D and 58), and inasmuch as the card perforations in registry with said minimum consumption comparison bars are representative of a minimum consumption of 12, the conductors emerging at the point IV' are effective for grounding such of the minimum consumption comparison bars as will cause energization of the control relays 185 and 186 (Figs. 11 and 58). These relays 185 and 186 are effective for energizing the relay 91 to cause the shift relay 205 (Figs. 12 and 58) to close its contacts, and are also effective for energizing the relay 187 which then impresses ground upon the minimum charge bars (Figs. 1 and 58) so that the card perforations representative of 048 and in registry with said minimum charge amount bars are effective for causing the energization of conductors in an arrangement representative of the amount 048, and these latter energized conductors complete circuits through certain contacts of the shift relay 205 for causing energization of the counting relays in an arrangement representative of said amount 048.

An examination of Fig. 1 will show that the bar 189E is grounded simultaneously with the minimum charge bars, said bar 189E being cooperative with the contact associated therewith for completing a circuit independently of the shift relay 205 to cause energization of the first pair of designation counting relays in Figs. 13 and 58, there being no distinction in Fig. 58 between any of the counting relays shown in detail in Fig. 13.

Upon energization of the counting relays and their associated cut-off relays as 44 and 427 (Fig. 13), circuits are completed through contacts of the shift relay 205 to the money register 127—128—129 to cause the entry of 048 therein, and a circuit is completed from the cut-off relay 427 to the designation register 435 (Figs. 8 and 58). The single indicator wheel of the designation register is thus caused to advance a single position to display the character MIN which indicates that a minimum charge is entered upon the money register.

It has been explained just previously that when the contact closing wheels and back stop wheels of the consumption quantity register were returned to zero during the third sequence, when it was ascertained there is no second step or remainder step quantities of consumption, the control relay 62 deenergized to deenergize the uneven numbered sequence relays 13 to 19, inclusive, which in a complete machine operation are for controlling the operation sequences pertaining to the entry in the second step register, the multiplication of the second step quantity, the entry in the remainder step register, and the multiplication of the remainder step quantity. Later, when the control relay 187 energized to impress ground on the minimum charge amount bars, said relay 187 also opened its contact 187A to remove battery from the sequence relays 9, 11 and 21 of which the relays 11 and 21 deenergize, relay 9 being already deenergized. And since this action occurs at the end of the third sequence after deenergization of the counting and cut-off relays (Fig. 13) the sequence control relay 25 will have already energized to break the holding circuit at contact 25C for the even numbered sequence relays so that the sequence relays 11, 13, 15, 17 and 19, deenergized as above explained, will permit deenergization of the even numbered sequence relays 12, 14, 16, 18 and 20 through contacts as 13C. Sequence relay 9 was deenergized near the beginning of the third sequence wherefore the sequence relay 12 was permitted to deenergize immediately upon energization of the relay 25 at the end of the third sequence. Sequence relay 22 is held energized from slow relay 194 (Fig. 11) until after deenergization of the relay 25 which follows the energization of the designation cut-off relay 427 (Fig. 13) and the consequent energization of relay 64 (Fig. 14) and the opening of contact Y.

It will be seen, therefore, that the conditioning of the machine at the end of the third sequence for a minimum charge operation entails the deenergization of all sequence relays from 11 to 21 inclusive, and since the relays 4 to 10, inclusive, have already been deenergized, this leaves energized only the sequence relays 22 and 23 for initiating and controlling the number wheel holding and zero-setting sequential operation. Such number wheel holding and zero-setting operation takes place immediately following the entry of the minimum charge because all sequence relays for controlling other sequential operations have just been disabled by deenergization.

If the first step register 97—98 had displayed a reading in excess of 12, the card perforations effective for 12 or less in registry with the minimum consumption comparison bars would not have been effective to permit completion of the circuits which caused energization of the control relays 185 and 186 for bringing about the above described minimum charge entries. Sequence relay 11 would not have been deenergized wherefore the sequence relay 10 would then have been effective, upon deenergizing, for completing a circuit through the contact 11D and the conductor 11K for impressing ground upon the multiple contact switches (Figs. 7 and 58) controlled by the first step register. In such an event the multiplying operation involving the amount set up in the first step register as a multiplicand would have been under way. Such multiplicand would have been represented by the energized of conductors emerging from said switches at the point IV'' and forming part of a circuit passing through the shift relay 204 to the counting relays.

But inasmuch as such multiplying sequential operation pertaining to the sequence relay pair 10—11 is eliminated from the present operation, this relay pair, the shift relay 204 and the power flow line are all indicated with dotted lines, and the other parts and circuits normally associated therewith are omitted.

*Description of a typical complete operation*

Figure 19:
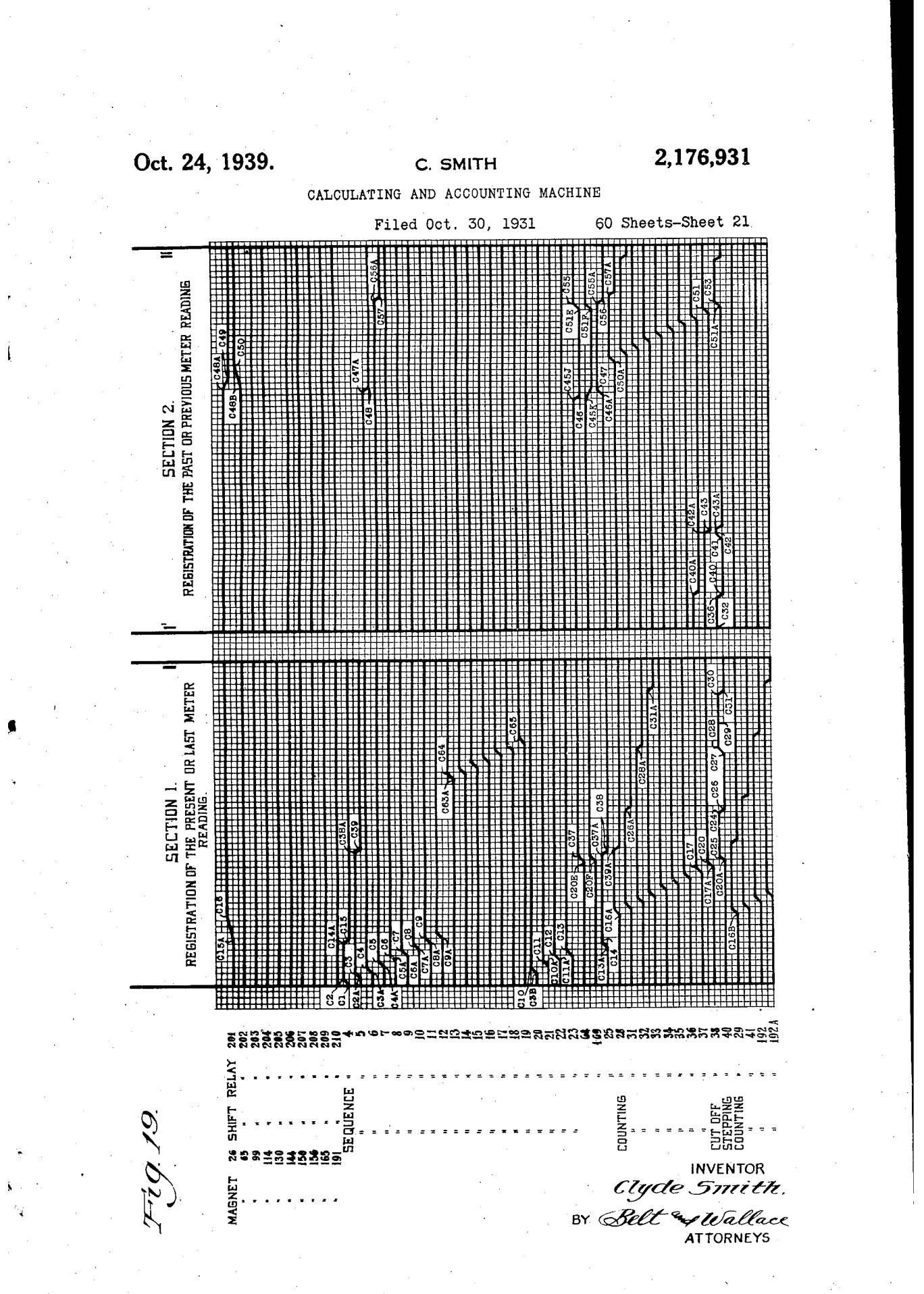

After the perforated card has been positioned, the start key 3 (Fig. 11) is pressed whereupon the sequence relay 4, (Fig. 11) is grounded and it starts to energize as indicated at point C1 in Fig. 19 of the first chart, and thereafter at point C2 the relay 4 is energized closing contact 4G (Fig. 11), whereupon sequence relay 5 is grounded at point C2A. In those instances where two or more operations are initiated or effected simultaneously, the point of initiation of the operation, or the point first referred to, is designated by a reference character without a letter suffix, while all other operations initiated or effected simultaneously are designated by the same reference character with a letter suffix just as here where the energization of relay 4 at point C2 initiates energization of relay 5 at point C2A. When relay 5 completes energization at point C3, contact 5C thereof closes wherefore at point C3A the sequence relay 6 starts to energize.

The sequence relay pairs 4—5, 6—7, 8—9 and 10—11 all have contacts therein similar to the contacts 4G and 5C so that when one relay is completely energized the succeeding relay in the chain starts to energize. Thus when relay 6 is energized at point C4, relay 7 starts to energize at point C4A, and when this relay is energized at point C5, the relay 8 starts to energize at C5A. The energization of relay 8 brings about potentialization of relay 9 at point C6A whereas the energization of relay 9 at point C7 brings about the potentialization of relay 10 at point C7A. The energization of relay 10 at point C8 brings about potentialization of relay 11 at point C8A which, when energized at point C9, brings about the potentialization of relay 12 at point C9A. The relay 12 has a contact 12G that is similar to the contact 4G but the closing of contact 12G when relay 12 energizes does not effect energization of relay 13 for at this time battery is not applied on relay 13, this being effected subsequently in the course of operation, as will be explained.

Upon energization of the relay 5 at point C3 the contact 5E (Fig. 11) closed and grounded relay 20 at point C3B which thereupon started to energize. The energization of relay 20 at point C10 caused the closing of contact 20G which thereby closed a circuit for potentializing relay 21 at C10A, and the energization of relay 21 at C11 caused the closing of contact 21C wherefore thereafter at the points C12 and C13 the relays 22 and 23 are energized.

Upon energization of the relay 23 contact 23X closes whereupon battery is applied to sequence control relay 25 which relay is at this time grounded at contact Y (Fig. 14), said contact Y at this time being closed. Hence the energization of relay 23 at point C13 initiates energization of sequence control relay 25 at point C13A. The sequence control relay includes make-before-break contacts 25B and 25C. Whenever the sequence relay 25 is deenergized the contact 25C is closed whereby a holding circuit to ground is established for the lower relays of the sequence relay pairs. The opening of contact 25C always releases or deenergizes the first lower relay from the left that is locked up or energized. When relay 25 is energized the contact 25C is opened after the contact 25B is closed thereby establishing a holding circuit to ground for the upper relays of the sequence relay pairs. The opening of contact 25B always releases the first upper relay from the left that is locked up.

Thus upon energization of relay 25 at point C14 relay 4 started to deenergize at point C14A, and when relay 4 deenergized at point C15 the contacts 4D and 4E thereof closed. Relay 5 is held energized at contact 25B. Therefore contact 5D thereof is closed. Thus the closing of contact 4E applied ground on conductor 5G (Fig. 11), conductor 5G (Fig. 1), whereupon the present or last meter reading bars 27A, 27B and 27C (Fig. 1) were grounded. The fingers 27D, 27E and 27F, respectively associated with the bars 27A, 27B and 27C, are the only ones of the fingers associated with these bars that are in contact with the bars since perforations are provided in the card in alignment with only these fingers of these sets of fingers. Such perforations are designated 27DD, 27EE and 27FF in Fig. 16. Thus grounding of the aforesaid bars grounds the just enumerated fingers and this also grounds the three conductors 27G, 27H and 27J passing into the cable 68. The conductors reappear from the cable 68 in Fig. 12 where they are connected to contacts 201A, 201B and 201C of the shift relay 201.

Upon the deenergization of relay 4 at point C15, contact 4D closed whereupon ground found at contact 6B was applied to conductor 4X (Fig. 11), conductor 4X (Fig. 12), and shift magnet 26 so that at point C15A said shift magnet started to energize. When the magnet 26 energized at point C16 contacts 201A, 201B and 201C of the shift relay 201 closed as did the other contacts thereon but these just mentioned contacts closed circuit between the grounded fingers 27D, 27E and 27F of Fig. 1 and the central windings of counting relays 28, 29 and 30 (Fig. 13), and these relays thereupon started to energize at points C16A, C16B and C16C, respectively.

The counting relays shown in Fig. 13 are arranged in pairs. The energization of a particular lower counting relay brings about energization of its mate and all other counting relays in the group to the left thereof in Fig. 13. The lower relay of each pair includes a contact as 28B (Fig. 13) which when closed grounds the upper relay of the pair. Each upper relay of the counting relay pairs includes a contact as 31C which when closed grounds the lower relay of the next pair to the left (Fig. 13). Thus just as the energization of the sequence relay 4 successively brought about the energization of the sequence relays 5 to 12, inclusive, the energization of counting relay 28 causes successive energization of the counting relays 31, 32, 33, 34, 35, 36 and 37. The relay pairs in each group of counting relays pertain to the significant digits. The pair at the left-hand end of each group pertains to the digit 1 while the next adjacent pair pertains to the digit 2 and so on so that the pair at the right-hand end pertains to the digit 9. Hence, when a particular counting relay is energized, its mate and all others of lower numerical value are locked up.

Each group of counting relays (Fig. 13) has at the left-hand end thereof a relay as 38 referred to hereinafter as a cut-off relay. Each upper relay of the No. 1 pair of relays includes a contact as 37C which is closed upon the energization of the relay and thereby grounds the associated cut-off relay. Thus when the upper relay 37 of the No. 1 pair of counting relays in the upper group, shown in Fig. 13 and which pertains to the hundreds order, energized at point C17 contact 37C closed wherefore cut-off relay 38 started to energize at C17A.

Likewise when the upper relay 71 of the No. 1 pair of relays in the middle group of relays (Fig. 13) which pertains to the tens order, energized at point C18, contact 71C thereof closed whereupon cut-off relay 43 started to energize at point C18A. And when the upper relay 152C of the No. 1 pair of relays in the lowest group (Fig. 13) which group pertains to the units order, energized at point C19 the contact thereon corresponding to the contacts 37C and 71C closed so that cut-off relay 44 started to energize at point C19A.

At the right-hand end of each group of counting relays, (Fig. 13) stepping relays 40, 45 and 46 are respectively provided. Upon the energization of the cut-off relays as 38 a contact as 38C associated therewith closes whereby ground is applied on a conductor as 40C which leads to the associated stepping relay as 40.

Thus when cut-off relay 38 energized at point C20 contact 38C closed whereupon ground was applied to stepping relay 40 which started to energize at point C20A. In the particular cycle or sequential operation now being described, battery for the stepping relays as 40 is found at clutches as 48A (Fig. 2) of the register 48—49—50 in which the present or last meter reading is to be entered. This circuit is established through the now energized shift relay 201 which, it will therefore be seen, closes circuit between the contact bars and fingers (Fig. 1), the counting relays and between contacts of the associated cut-off relays and the register on which an entry is to be made.

The stepping relay as 40 and clutches as 48A are connected in series. Hence, when cut-off relay 38 energized at point C20 and applied ground to stepping relay 40 at point C20A, ground was also applied to clutch 48A at point C20B so that both the stepping relay 40 and the clutch 48A simultaneously started to energize.

Likewise, when cut-off relay 43 energized at point C21, stepping relay 45 at point C21A and clutch 49A at point C21B started to energize. And when cut-off relay 44 energized at point C22, stepping relay 46 at point C22A and clutch 50A at point C22B started to energize.

In the course of the present operation the present or last meter reading is to not only be entered in the register 48—49—50 but also in the register 56—57—58. This is accomplished by energizing clutches in each of the two registers in such a way that through intermeshed gears as 53 and 56E, 54 and 57E, and 55 and 58E the wheels 56, 57 and 58 of the consumption register 56—57—58 are caused to advance along with the wheels 48, 49 and 50 of the last meter reading register 48—49—50. The clutches which accomplish this are connected in parallel with the clutches as 48A and energize simultaneously therewith. That is, when contact 38C of cut-off relay 38 closes for establishing the above described circuit for energizing the stepping relay 40 and clutch 48A, contacts 38D and 38E also closed establishing circuits through conductors H and J (Figs. 13 and 14) cable 201K (Figs. 14, 13 and 12), contacts HI and JI of shift relay 201, cable 47 (Figs. 12 and 2) and conductors 47H and 47J respectively to clutches 56G and 53A. The clutches 57G, 54A, 58G and 55A are energized by circuits originating with ground respectively at cut-off relay contacts 43D, 43E, 44D and 44E (Fig. 13), and leading through conductors E, F, B and C (Figs. 13 and 14), cable 201K (Figs. 14, 13 and 12), contacts EI, FI, BI and CI of shift relay 201, cable 47 (Figs. 12 and 2), and conductors 47E, 47F, 47B and 47C respectively to said clutches and the battery at the other side thereof.

Thus when clutch 48A started to energize at point C20B the clutches 53A and 56G, Fig. 2, started to energize at points C20C and C20D. Furthermore, the clutches 54A and 57G started to energize at points C21C and C21D along with the clutch 49A, and the clutches 55A and 58G started to energize at points C22C and C22D along with the clutch 50A.

In the above described operation, potentialization of counting relay 28 at point C16A and potentialization of counting relays 29 and 30 at points C16B and C16C occurred simultaneously, but the consequent subsequent energization of cut-off relay 38 did not occur simultaneously with the consequent subsequent energization of cut-off relays 43 and 44, which latter relays do energize simultaneously. The reason for this is that the number of pairs of counting relays in each group to be energized or locked up corresponds to the digital value to be represented. Thus in the present instance where 455 is to be represented, only four pairs of counting relays are locked up in the hundreds order whereas five pairs of counting relays are locked up in the tens and units orders. Inasmuch as the counting relays lock up sequentially it takes longer to lock up five pairs to represent the digit 5 than it does to lock up four pairs to represent the digit 4. Thus the cut-off relay 38 started to energize at point C17A two spaces prior to the potentialization of the cut-off relays 43 and 44 at points C18A and C19A, since, in the present instance, one space longitudinally of the chart is representative of the energizing time of a relay, and two more relays were locked up in the tens and units order to which the cut-off relays 43 and 44 respectively pertain than were locked up in the hundreds order to which the cut-off relay 38 pertains.

It is the energization of the cut-off relays that initiates energization of the clutches. Thus since the cut-off relay 38 for the hundreds order energized prior to the energization of the cut-off relays 43 and 44 for the tens and units orders, respectively, the clutches 48A, 53A and 56G pertaining to the hundreds order started to energize before the clutches 49A, 54A and 57G and the clutches 50A, 55A and 58G respectively pertaining to the tens and units order.

The shaft 51 on which the register 48—49—50 is mounted and the shaft 322 on which the register 75—76—77 is mounted are rotated constantly by the motor 52 (Fig. 2) during operation of the machine. The shaft 59 also rotates continuously but so far as entries into the register 56—57—58 mounted on this shaft are concerned such rotation of the shaft has no effect.

As best shown in Fig. 15, the male portion of each clutch, such as those shown in Fig. 2, is fast on the shaft on which the register is mounted while the female portion of each clutch is fast to the particular wheel unit of the register with which it is associated. Thus energization of a clutch connects its associated wheel unit to the shaft on which the wheel unit is mounted for rotation therewith.

It will be seen from the foregoing that it is the energization of the cut-off relay for a particular order that initiates entry in the wheel unit for the same order in the register being controlled by the counting relays. Hence, the entry on each wheel unit proceeds independently of the entries in the other wheel units of the register. The manner in which entries are effected on the wheel units of the various registers, except the register 56—57—58, is identical and for this reason only the entry on the wheel unit 48 pertaining to the hundreds order in the register 48—49—50 will be described in detail.

Subsequent to the potentialization of the clutch 48A this clutch energizes at point C23, and simultaneously the clutches 53A and 56G energize at points C23A and C23B, respectively. It is when these clutches are fully energized as at the point C23 that the wheel unit is connected to the shaft on which it is mounted and starts to rotate therewith. Thus the wheel unit 48 starts to rotate at the point C23.

Each wheel unit as 48 includes a shunting wheel as 48C which in construction and operation is like the contact closing or shunting wheel 57F (Fig. 15). In the side elevation of wheel 57F in Fig. 15 it is shown that this wheel has a lobe intermediate each digital position, the digital positions of this wheel being at the bottoms of the depressions intermediate the lobes. Associated with each shunting wheel as 48C or 57F is a shunting contact as 48D or 57L. One leg of each such shunting contact, as shown in Fig. 2, is connected to the conductor leading to the clutch of the wheel unit intermediate this clutch and the stepping relay as 40 (Fig. 13) in series therewith. The other leg of each such shunting contact is connected to ground.

Now when the wheel unit 48 starts to rotate with the shaft 51 at point C23 the shunting wheel 48C of this wheel unit also starts to rotate. Shortly after the shunting wheel starts its rotation a lobe on the shunting wheel 48C will have so advanced relative to the associated shunting contact 48D that the contact is out of a depression and riding on the ascending slope of said lobe. At a point spaced from the bottom of said depression the shunting contact 48D closes whereby ground is applied to the conductor interconnecting the clutch 48A and stepping relay 40. It will be recalled that battery for stepping relay 40 is found beyond clutch 48A. When ground is thus applied intermediate stepping relay 40 and its source of battery, the stepping relay 40 is freed from battery or shunted out and starts to deenergize. This shunting out occurs at the time indicated by point C24 on the chart line pertaining to stepping relay and at which time the stepping relay 40 starts to deenergize.

Each stepping relay as 40 includes make-before-break contacts as 40A and 40B. So long as such relays are deenergized their contacts as 40A remain closed to establish a stick or holding circuit for relays in the lower row of associated counting relays. When, however, such a stepping relay is energized, its contact as 40B closes before its contact as 40A opens and in this way a stick or holding circuit for the relays in the upper row of associated counting relays is established, whereas the stick or holding circuit for the relays in the lower row is broken. It is such energization of relay 40 and the opening of contact 40A that permits deenergization of the first locked-up relay in the lower row from right to left in Fig. 13. However, each time a stepping relay as 40 is deenergized the contact 40A is closed before the contact 40B opens, but when the contact 40B opens the stick or holding circuit for the relays in the upper row is broken and thereupon the first locked-up relay from right to left in Fig. 13 in the upper row releases.

It will be recalled that upon the energization of cut-off relay 38 at point C20 stepping relay 40 started to energize at point C20A. This relay was completely energized at point C25 and thereupon contact 40B closed before contact 40A opened. This, however, is the only time that the opening of a contact as 40A does not effect deenergization of the first locked up counting relay from right to left in Fig. 13. It will be recalled that the counting relay 28 was initially locked up by reason of the engagement of the finger 27D (Fig. 1) with the contact bar 27A through card perforation 27DD (Fig. 16) representative of the digit 4 in the hundreds order. When the contact 40A opened, upon energization of relay 40 at point C25, ground was still applied to the bars 27A, 27B and 27C from contact 4E (Fig. 11) so that although the stick or holding circuit through contact 40A for relay 28 was broken, this relay remained energized. However, relay 28 is permitted to deenergize shortly after energization of cut-off relay 40 at point C25. This deenergization of counting relay 28 is effected by the deenergization of sequence relay 5 which latter deenergization is indirectly brought about by the closing of the contact 38F upon energization of the cut-off relay 38 at point C20. Closing of the contact 38C grounds conductor 64X (Figs. 13 and 14) whereupon control relays 64 and 169 (Fig. 14) are grounded and therefore start to energize at points C20E and C20F. The energization of relay 64 at point C37 causes contact Y to open wherefore sequence control relay 25 starts to deenergize at point C37A. When sequence control relay 25 is deenergized at point C38 sequence relay 5 starts to deenergize at point C38A. The deenergization of relay 5 at point C39 frees bars 27A, 27B and 27C (Fig. 1) of ground whereupon the central windings of the initially locked up counting relays 28, 29 and 30 are freed of ground, wherefore the sequence relay 28 starts to deenergize at point C39A since the holding circuit therefor at contact 40A was broken when relay 40 energized at point C25.

Insofar as the counting relays 29 and 30 are concerned, since their central windings are also freed of ground by the deenergization of relay 5 at point C39, they begin deenergization when their stick circuits are broken soon thereafter by the opening of contacts 45A and 46A upon the energization of stepping relays 45 and 46 at points C59 and C60, respectively.

The first of the cut-off relays as 38 to energize will, in the indirect manner above described, free the contact bars as 27A, 27B and 27C from ground and this will always take place prior to any other operation so that the one exception to the depotentialization of the lowest locked up counting relay from right to left in Fig. 13 immediately upon energization of the associated stepping relay, which is the instance explained above, in no way interferes with the intended operation of the machine.

Now when the shunting wheel 48C starts its rotation and subsequently closes the shunting contact 48D at point C24, as explained above, and relay 40 is shunted out to start deenergization at this point; the complete deenergization of relay 40 is effected at point C26. This causes contact 40A to close before contact 40B is opened so that a stick circuit for counting relay 32 is established. When contact 40B opens at point C26 relay 31 starts to deenergize at point C26A, but relay 32 does not deenergize at this time, even though contact 31C opens, because of said stick or holding circuit leading from ground at contact 40A.

Wheel 48 and its shunting wheel 48C continue rotation with the shaft 51 after the closing of shunting contact 48D, and prior to the time the wheel 48 has rotated one-tenth of a revolution to cause the entry of the digit 1 thereon the shunting wheel 48C will have so rotated that the apex of the lobe between the 0 and 1 positions on the wheel 48 will have passed the shunting contact 48D so that the shunting contact 48D is now riding on the descending slope of the lobe. It will be recalled that the bottom of each recess or depression intermediate each lobe is aligned with a digital position on the wheel 48. At the start of the present operation the shunting contact 48D rode out of the bottom of the depression aligned with the 0 position and when the shunting wheel 48C had so rotated that the shunting contact 48D had ridden up the ascending slope of the lobe in a predetermined amount the shunting contact 48D closed. The shunting contact 48D is now riding down the descending slope of the lobe. When a point on the descending slope of the lobe, spaced from the bottom of the depression aligned with the 1 position of the wheel 48 in an amount equal to the spacing up the ascending slope of the lobe to the point where the shunting contact 48D closed, engages the shunting contact, said shunting contact opens. Upon such opening of the shunting contact 48D at point C27 the ground intermediate stepping relay 40 and its source of battery is removed so that the stepping relay starts to energize at said point C27. When this relay thereafter energizes at point C28 shunting contact 40B is closed whereas shunting contact 40A is opened. The opening of contact 40A at point C28 breaks the stick or holding circuit for relay 32 which thereupon starts to deenergize at point C28A.

The wheel 48 continues rotation and at point C29, at which time the shunting contact 48D is at the bottom of the depression aligned with the digital position 1 on the wheel 48, the digit 1 is entered on the wheel 48.

The shunting contact 48D now starts to ride up the lobe intermediate the 1 and 2 positions and when it has ridden up the ascending slope of this lobe a distance corresponding to the distance this contact rode up the lobe between the 0 and 1 positions to be closed, said contact closes, this occurring at the point C30. Closing of the shunting contact 48D at point C30 applies ground intermediate stepping relay 40 and its source of battery at clutch 48A whereupon the stepping relay 40 starts to deenergize and when deenergized at point C31 the contact 40B opens and thereupon counting relay 33 starts to deenergize at point C31A.

The wheel 48 continues rotation and in the gap between vertical chart lines I—I' the digits 2 and 3 are entered on this wheel, said digit 3 being entered on the wheel at a time shortly before the point C32 which appears at the beginning of chart section 2 on the line pertaining to stepping relay 40.

The wheel units 49 and 50 start to rotate at the time the clutches 49A, 54A, 57G, 50A, 55A and 58G are energized respectively at the points C33, C33A, C33B, C33C, C33D and C33E. These wheel units include shunting wheels 49C and 50C which respectively close shunting contacts 49D and 50D to successively deenergize and energize the stepping relays 45 and 46, said stepping relays having started to energize at the points C21A and C22A. In the course of the deenergization and energization of the stepping relays 45 and 46 the counting relays pertaining to the tens and units orders are successively deenergized. The digit 1 is entered on wheel 49 at point C34 and the digit 1 is simultaneously entered on wheel 50 at point C35, these points being shown in the lines pertaining to stepping relays 45 and 46.

Attention is again directed to the fact that in the consumption quantity register 56—57—58 the sleeves 56M, 57M and 58M are normally freely rotatable on the shaft 59, that the number wheels as 56 are permanently attached to their respective sleeves as 56M for rotation therewith, that the gears as 56E are unitarily assembled with their back stop wheels as 56C, carry-over contact closing wheels as 56S, contact closing wheels as 56D and carry-over shunting wheels as 56F and that these unitary assemblies are freely rotatable on their sleeves as 56M but are connectable thereto for rotation therewith by either of their respectively associated clutches as 56G or 56N. The clutches as 53A are adapted, when energized, to connect their associated gears as 53 with the constantly rotating shaft 51. Therefore, while the clutch 48A is energized to cause rotation of the number wheel 48, the concurrently energized clutches 53A and 56G establish for the number wheel 56 a driving train driven from the shaft 51 and including said clutch 53A, gear 53, gear 56E, clutch 56G and the sleeve 56M. Since the gears 53 and 56E are of the same pitch diameter the number wheels 56 and 48 are advanced in unison at the same speed. Clutches 54A and 57G, which in the present sequential operation energize simultaneously with clutch 49A, likewise establish a driving train to cause the number wheel 57 to rotate in unison with the number wheel 49, whereas clutches 55A and 58G establish a driving train to cause the number wheel 58 to rotate in unison with the number wheel 50.

It will be recalled that all of the sequence relays (Fig. 11) were not locked up subsequent to the pressing of the start key 3. The sequence relays which were not locked up are from 13 to 19 inclusive. These relays however lock up soon after the number wheels of the consumption register 56—57—58 start to move from zero. The wheel unit 56 is the first unit to move since only 4 is to be entered in the hundreds order whereas 5 is to be entered in the tens and units orders. Soon after this wheel unit moves off zero, the notch in back step wheel 56C moves out of registry with and thus cams the pin 56X radially outwardly to shift the bar 60 whereupon the contacts 60B close and the contacts 60D open. Closure of the contacts 60B grounds relays 61 and 62 (Fig. 11) at points C61 and C61A and thereupon these relays start to energize. When relay 62 is energized at point C63 its contact 62A closes and supplies battery to sequence relay 13. Sequence relay 12 is already energized and therefore its contact 12G is closed. Consequently when battery is supplied to relay 13 upon the closure of contact 62A relay 13 starts to energize at C63A. The energization of relay 13 at point C64 initiates energization of sequence relay 14 and thereafter in succession the sequence relays 14, 15, 16, 17, 18 and 19 lock up, the energization of relay 19 being completed at point C65. Sequence relay 17 at this time obtains battery from contact 62A over conductor 62X as do sequence relays 15 and 19, although these latter named relays are connected indirectly with said conductor 62X. The second step register 140—141 (Figs. 6A and 7) stands at zero as well as the remainder register 198—159—154 (Figs. 6B and 7) wherefore the zero contacts as 327XX (Fig. 7) in the register 140—141 are closed as are the zero contacts as 334XX (Fig. 7) in the remainder register 198—159—154. Sequence relay 15 is thus enabled to obtain battery over a circuit including conductor 15X (Figs. 11, 10 and 7), said closed contact 327XX (Fig. 7), conductor 62X (Figs. 7, 10 and 11) and contact 62A to battery. Sequence relay 19 obtains battery over a circuit including conductor 19X (Figs. 11, 10 and 7), contact 334XX, conductor 62XX (Fig. 7), conductor 62X (Figs. 7, 10 and 11) and contact 62A to battery.

When contact 60B (Fig. 2) closed, with the above described effect, contact 60D opened to break a circuit including conductor 60E (Figs. 2 and 7), switch contacts 97XX and 97XXX, the zero conductors leading respectively into cables 101A and 101B and emerging from said cable into connection with the zero contact fingers 184E and 184H. In the lower left-hand corner of Fig. 7 conductor 332 connects with conductor 60E to provide a circuit leg including said conductor 332, switch contact 98XX, the zero conductor leading into cable 101C and emerging from said cable into connection with the zero contact finger 184G. Contact fingers 184E, 184H and 184G are permitted to engage the minimum charge bars 184, 184A and 184B through card perforations 184EE, 184HH and 184GG (Fig. 16). Thus at the beginning of this machine operation while contact 60D (Fig. 2) was closed, ground from contact 172X of zero setting relay 172 (Fig. 2) was carried over the above traced circuits to the minimum charge bars (Fig. 7D), thence over conductors 185D and 186D (Figs. 7D and 11) to control relays 185 and 186 and to battery, wherefore these relays were energized. But with the opening of contact 60D in the aforedescribed manner, this energization circuit for relays 185 and 186 was broken and such relays were depotentialized at points C62 and C62A.

*Chart section 2.—Registration of the past or previous meter reading*

In section 2 the line pertaining to stepping relay 40 extends to point C36 which indicates the time at which the shunting contact 48D closes to apply ground intermediate stepping relay 40 and its source of battery, shortly after entry of the third digit 3 on number wheels 48 and 56, so that at this point stepping relay 40 starts to deenergize. Upon the deenergization of stepping relay 40 at point C40 contact 40B opens to depotentialize counting relay 37 at point C40A.

Wheels 48 and 56 continue rotation and prior to the time the bottom of the depression aligned with the digital position 4 on wheel 48 is reached, shunting contact 48D opens at point C41, removing the shunt from stepping relay 40 which is thus caused to energize at point C42 and open contact 40A whereupon cut-off relay 38 is deenergized at point C42A. The deenergization of cut-off relay 38 at point C43 causes contacts 38C, 38E and 38D to open whereupon stepping relay 40 and clutches 48A, 53A and 56G are freed of ground and start to deenergize at points C43A, C43B, C43C and C43D, respectively. When these clutches are completely deenergized at points C44, C44A and C44B, wheels 48 and 56 display the digit 4 inasmuch as during the deenergization of the aforesaid clutches these wheels continue to rotate.

The deenergization of cut-off relay 38 at point C43 resulted in the opening of contact 38F but this did not effect release of relays 64 and 169 since cut-off relays 43 and 44 were still energized and contacts 43F and 44F thereof closed.

Near the entry of the fifth digit 5 on the wheels 49 and 57 and 50 and 58, the shunting contacts 49D and 50D open. The opening of these contacts removes shunt from the stepping relays 45 and 46 which thereupon start to energize at points C66 and C67. The energization of stepping relay 45 at point C68 starts the deenergization of cut-off relay 43 at point C68A. The energization of stepping relay 46 at point C69 starts the deenergization of cut-off relay 44 at point C69A. When cut-off relay 43 deenergizes at point C45 ground is removed from stepping relay 45 which thereupon starts to deenergize at point C45A, and inasmuch as 5 is being entered in both the tens and units orders the cut-off relay 44 is simultaneously deenergized at point C45B. Hence the stepping relay 46 starts to deenergize at point C45C. Simultaneously with the start of deenergization of the stepping relays 45 and 46 the clutches 49A, 54A and 57G and 50A, 55A and 58G start to deenergize at points C45D to C45I, respectively. When these clutches deenergize at points C70A to C70F the digit 5 is entered on the wheels 49 and 57 and 50 and 58.

Therefore at the end of this operation the registers 48—49—50 and 56—57—58 both display the reading 455.

Upon the deenergization of cut-off relays 43 and 44 at points C45 and C45B, the contacts 43F and 44F open whereupon relays 64 and 169 are depotentialized at points C45J and C45K. Upon the release of relay 64 at point C46 contact Y closes, grounding relay 25 which thereupon starts to energize at point C46A. When relay 25 is energized at point C47 contact 25C opens and thereupon relay 6 starts to deenergize at point C47A.

The deenergization of relay 6 at point C48 results in the opening of contact 6B, and thereupon shift relay 201 is freed of ground and starts to deenergize at point C48A. The deenergization of shift relay 201 at point C49 breaks the circuit between the clutches in registers 48—49—50 and 56—57—58 and the contacts of cut-off relays associated with the counting relays of Fig. 13.

Also upon the deenergization of relay 6 at point C48, contact 6E closes and thus through closed contact 7D of relay 7 grounds conductor 7G (Fig. 11) and conductor 7G (Fig. 1) whereby the past or previous meter reading bars 67A, 67B and 67C are grounded. Furthermore, the deenergization of relay 6 at point C48 closes contact 6D and thereupon at point C48B shift relay 202 starts to energize, and when this relay is energized at point C50 circuit is established between the grounded fingers 67D and 67F (Fig. 1) which project through perforations in the card to engage the grounded bars 67A and 67C, and counting relays 28 and 72 (Fig. 13). The past meter reading is 404 and for this reason there is no perforation in alignment with the tens bar 67B (Fig. 1) and no counting relays (Fig. 13) for the tens order are locked up. Counting relays 28 and 72 potentialize at points C50A and C50B upon the closing of contacts 202A and 202B (Fig. 12) when shift relay 202 is energized at point C50.

Shift relay 202, in energizing, closes its auxiliary contact 2X thereby impressing ground through conductor 193 upon the slow relay 194 (Fig. 11) to cause energization of this relay at point C50'. Contact 194A of such relay provides a holding circuit to prevent premature deenergization of sequence relay 22 during a minimum charge operation as is fully explained hereinafter under the sub-heading Operation with no consumption.

As before, the energization of a counting relay in the lower row causes the energization of its mate and all other counting relays in the same group of lower numerical value as well as the cut-off relays of the groups. In this instance the cut-off relays 38 and 44 simultaneously energize at points C51 and C52 inasmuch as counting relays representative of 4 are locked up in both the hundreds and units orders. This energization of cut-off relay 38 initiates energization of stepping relay 40 at point C51A and also initiates energization of clutches 75A, 78A and 56G at points C51B, C51C and C51D, respectively. The energization of cut-off relay 44 at point C52 initiates energization of stepping relay 46 at point C52A and also initiates energization of clutches 77A, 80A and 58G at points C52B, C52C and C52D, respectively.

Here again the energization of stepping relays 40 and 46 at points C53 and C54, respectively, does not depotentialize the initially energized counting relays 28 and 72. The deenergization of these relays is indirectly effected by the simultaneous closing of contacts 38F and 44F upon the energization of cut-off relays 38 and 44 at points C51 and C52, respectively, which grounds control relays 64 and 169 which start to energize at points C51E and C51F, respectively. The energization of relay 64 at point C55 opens contact Y whereupon sequence control relay 25 is freed of ground and thereupon starts to deenergize at point C55A. The deenergization of relay 25 at point C56 opens contact 25B whereupon relay 7 starts to deenergize at point C56A. When relay 7 deenergizes at point C57 the previous reading bars 67A, 67B and 67C are freed of ground wherefore the counting relays 28 and 72 are depotentialized at points C57A and C57B.

The simultaneous energization of clutches 75A, 78A, and 56G and 77A, 80A and 58G at points C58A to C58F causes the wheels 75 and 56 and 77 and 58 to be driven from the constantly rotating shaft 322.

It will be noted that the shaft 322 (Fig. 2) is driven directly from the motor 52 whereas the shaft 51 is driven from a gear 52A on the motor shaft that meshes with a gear 52B fast on the shaft 51. Thus the shaft 51 rotates in one direction while the shaft 322 rotates in the opposite direction. The arrangement of the numbers on the wheels of the register 56—57—58 is such that when this register is driven from the shaft 51 these wheels advance. Hence when these wheels are driven from the shaft 322 they rotate rearwardly. The effect of this operation is that the past or previous meter reading is subtracted from the present or last meter reading already standing on the wheels of the register 56—57—58 when the wheels of this register are driven from the shaft 322.

When the wheels 75 and 77 are clutched to the shaft 322 upon the energization of the clutches 75A and 77A at points C58A and C58D and the wheels 56 and 58 are rotating therewith, shunting wheels 75B and 77B, corresponding to the shunting wheel 48C, successively close and open shunting contacts 75D and 77D so that locked up counting relays are deenergized one by one upon the successive closing and opening of these shunting contacts, section 2 of the chart showing only the initiation of the entry of the digit 1. The completion of the entry of the digit 1 and the complete entry of the digits 2 and 3 and the partial entry of the digit 4 takes place in the gap between the vertical chart lines II—II'.

Chart section 3.—*Determination of first rate step quantity and registration thereof*

The points D1 and D2 on the lines pertaining to the stepping relays 40 and 46 at the start of section 3 of the timing chart indicate periods, during the entry of the digit 4, while the shunting contacts 75D and 77D are closed so that the stepping relays 40 and 46 are deenergized. At a point spaced from the bottoms of the depressions aligned with the digit position 4 on the wheels 75 and 77, the shunting contacts 75D and 77D open whereupon at points D3 and D4 the stepping relays 40 and 46 start to energize. Upon energization of these relays at points D5 and D6 the cut-off relays 38 and 44 start to deenergize at the points D5A and D6A. Upon deenergization of the cut-off relay 38 at point D7 the stepping relay 40 is depotentialed at the point D7A. Also upon denergization of the cut-off relay 38 at the point D7 the clutches 75A, 78A and 56G are depotentialed at the points D7B, D7C and D7D, respectively.

Upon the deenergization of the cut-off relay 44 at point D8 the stepping relay 46 begins deenergization at the point D8A and the clutches 77A, 80A and 58G start deenergization at the points D8B, D8C and D8D, respectively.

When the clutches 75A, 78A and 56G and 77A, 80A and 58G deenergize at the points D9A to D9F, respectively, the digit 4 is entered on each of the wheels 75 and 77, and 404 will have been subtracted from the 455 standing on the wheels 56, 57 and 58 wherefore at the end of this operation the wheels 56, 57 and 58 display 051.

At this stage in the machine operation the register 48—49—50 displays 455, the present or last meter reading. The register 75—76—77 displays 404, the past or previous meter reading. The register 56—57—58 displays 051, the consumption quantity, which is the difference calculated when the aforesaid past meter reading is subtracted from the aforesaid present meter reading.

The machine is now ready to proceed to determine the magnitude of the consumption quantity and also to calculate the charge to be made for this consumption quantity under the rate scale.

The first step in this operation is to determine whether or not the consumption quantity is greater than the first rate step quantity, which first rate step quantity in the present instance is 14.

Upon the simultaneous deenergization of the cut-off relays 38 and 44 at the points D7 and D8, the contacts 38F and 44F thereof opened whereupon the relays 64 and 169 were freed from ground. Again in this phase or sequential operation of the complete machine operation the relay 169 is deenergized without effect. However, the opening of contacts 38F and 44F started deenergization of the relay 64 at the point D7E. Upon the deenergization of the relay 64 at the point D10, contact Y closes whereupon the sequence control relay 25 starts to energize at the point D10A, and when this relay energizes at point D11 the sequence relay 8 starts to deenergize at point D11A.

Deenergization of relay 8 at point D12 opens contact 8B which is the source of ground for shift relay 202 which thereupon starts to deenergize at point D12A. The deenergization of shift relay 202 at point D13 opens the circuit between the counting and cut-off relays (Fig. 13), the bars 67A, 67B and 67C (Fig. 1), and the registers 75—76—77 and 56—57—58 (Fig. 2).

The deenergization of relay 8 at point D12 also closes contact 8D which grounds shift relay 203 from contact 10B and thereupon shift relay 203 starts to energize at D12B.

Upon the deenergization of relay 8 at point D12 contact 8E closed, grounding conductor 9G through closed contact 9L. Conductor 9G passes into cable 211 in Fig. 11 and passes out of cable 211 in Fig. 5A. Such grounding of conductor 9G grounds the first rate step bars 85, 86, 88 and 90 (Figs. 4 and 5).

The bars 81, 82, 83 and 84 pertaining to the hundreds order are also grounded at this time but inasmuch as the first rate step quantity 014 has no significant digit in the hundreds order the control card (Fig. 16) will be provided with no perforations in registry with such bars so the grounding thereof is without effect in this operation. The card shown in Fig. 16 has perforations 85AA to 85HH therein which are aligned with the bar 85. The bar 85 constitutes what is known as the high bar and is intended to have a perforation therein for every digit above any significant digit in the tens order of the first rate step quantity, which in this instance is 014. Thus the perforations 85AA to 85HH pertain to the significant digits from 2 to 9. A card perforation, 86KK, is also provided in alignment with the first step low bar 86, there being such perforations as 86KK provided in alignment with this bar for every digital position below that corresponding to the significant digit to be represented in the tens order. Since the significant digit in this instance is 1 there is only a perforation 86KK for the 0 position which is the only digit below the 1.

There are also perforations 87JJ and 88JJ at positions representative of the digit 1, and respectively aligned with the tens order maximum bar 87 and the tens order equal bar.

In alignment with the high and maximum bar 89 there is a series of perforations above the significant digit 4 to be represented in the units order as well as a perforation in the position corresponding to said significant digit. Furthermore, there are perforations in alignment with the equal and low bar 90 pertaining to said significant digit 4 to be represented in the units order and all lower digits including 0. The foregoing manner of perforating the card is representative of the first rate step quantity 014.

Upon the grounding of the bars 85, 86, 88 and 90 when conductor 9G is grounded, the grounding of bar 85 also grounds the finger 85E which engages the bar through the perforation 85EE pertaining to 5. Other fingers associated with this bar and aligned with perforations 85AA to 85HH are also grounded but only the finger 85E is effective since the contact closing wheel 57D (Figs. 2 and 4) of the register 56—57—58 is standing at 5 and therefore closes only the contacts on the number 5 multiple contact switch (Fig. 4A), which pertains to the digit 5. Conductor 85J leads from said grounded finger 85E to switch contact 85K (Fig. 4A) and conductor 85L leads from contact 85K to conductor 85M which in turn leads to relay 312. Contact 311D of relay 311 (Fig. 3) is connected with the other side of relay 312 and with battery. The foregoing circuit is closed upon the aforesaid grounding of the conductor 9G and therefore the relay 312 starts to energize at point D12C, battery for said relay being found at said contact 311D since relay 311 is deenergized at this time.

Relay 312 when energizing at point D75 closes contacts 312A and 312B whereupon ground is applied to bars 87 and 89. It will be recalled that a card perforation 87JJ (Fig. 16) is associated with the bar 87. Hence finger 87J contacts bar 87 through this perforation and the grounded bar 87 is thus effective for grounding conductor 100A (Figs. 4 and 4A) which passes into cable 100 (Figs. 4A, 5A and 12). Said conductor 100A passes out of the cable 100 in Fig. 12 and into connection with contact 203A. Upon energization of relay 203 at point D76 contact 203A closes, completing a circuit from said grounded conductor 100A to counting relay 70 in the No. 1 pair of counting relays in the tens group, wherefore at point D76A the counting relay 70 starts to energize. The grounding of bar 89 (Fig. 5), upon the energization of relay 312 at point D75 and the closing of contacts 312A and 312B, also grounded finger 89Q which is engaged with the bar through card perforation 89QQ, and this grounds conductor 100B which also passes into cable 100 in Fig. 5A and out of said cable in Fig. 12 to be connected with contact 203B of shift relay 203. Contact 203B completes the circuit to relay 72 of the No. 4 pair of counting relays in the units order upon the energization of relay 203 at point D76 so that counting relay 72 starts to energize at point D76B.

The grounding of conductor 9G (Fig. 5), by grounding the bar 90, establishes a circuit through the contact finger 90J, which engages said bar through card perforation 90JJ (Fig. 16), conductor 321A, contact 321B of the number 1 switch pertaining to the units order of the consumption quantity register, conductor 321C and through conductor 321D (Figs. 5 and 5A) which has the digital significance of 1 in the group of nine vertical conductors of which it forms a part. In Fig. 5A conductor 321D leads into cable 100 from which it emerges in Fig. 12 and connects with contact 203D of shift relay 203. When the contacts of shift relay 203 are closed upon the energization of this relay at point D76 contact 203D closed to extend the above traced circuit through a conductor in cable 201H to counting relay 152B (Fig. 13) whereupon this counting relay is potentialized at point D76C concurrently with the potentialization of counting relays 70 and 72 at points D76A and D76B.

When relay 70 energizes at point D14 its mate 71 starts to energize and upon the energization of relay 71 at point D15 the cut-off relay 43 is potentialized at point D15A and immediately thereafter energizes at point D18. Further, upon the energization of relay 152B at point D16, its mate 152C and all relays of lower numerical value in the units order group successively energize. The cut-off relay 44 for this group in turn energizes at point D17. Upon the energization of relay 72 at point D16' the units order counting relays of lower numerical value began successive energization whereby subsequently the relay 152A energizes at point D70.

Since relays 70 and 152B, pertaining to the digit 1 in their respective orders, energize simultaneously at points D14 and D16, the cut-off relays 43 and 44 eventually energized simultaneously at points D18 and D17 wherefore contacts 43F and 44F closed simultaneously to impress ground upon control relays 64 and 169 which were thus potentialized at points D18A and D18B. The energization of relay 64 at point D19 results in the opening of contact Y to remove ground from sequence control relay 25 which is thus depotentialized at point D19A. The consequent deenergization of relay 25 at point D20 opens contact 25B whereupon, at point D20A, sequence relay 9 is depotentialized. The consequent deenergization of relay 9 at point D21 results in the opening of contact 9G whereupon conductor 9G is freed from ground as are the first rate step bars 85, 86, 88 and 90 so that at point D21A the relay 312 (grounded through bar 85 and contact finger 85E) is depotentialized. Relay 152B which obtained ground from bar 90 is also depotentialized, at point D21B, upon the deenergization of sequence relay 9 at point D21, such depotentialization being possible because stepping relay 46 is then energized to break the stick circuit for relay 152B. With the deenergization of relay 312 at point D22 and the opening of contacts 312A and 312B, the bars 87 and 89 are freed from ground wherefore the central windings of relays 70 and 72 are freed from ground. Since at this time the stepping relays 45 and 46 have energized, breaking the stick circuits for counting relays 70 and 72, these counting relays are depotentialized concurrently with the depotentialization of their central windings at points D22A and D22B. The relays 70 and 72 respectively complete deenergization at points D71 and D72. Counting relay 152B deenergized slightly sooner at point D80.

Counting relay 152A of higher numerical value than the relay 152B and as hereinabove mentioned, energizes at point D70 wherefore the left-hand contact of relay 152A establishes an energization circuit for the relay 152B which is thus potentialized at point D81 and reenergized at point D73. Relay 152B being thus energized, completes the chain of energized relays including relay 152C, cut-off relay 44 and the stepping relay 46.

The result of the foregoing is that 1 is locked up in the tens order of counting relays and 4 is locked up in the units order of counting relays so that the locked up counting relays are representative of 14 which constitutes the selected first rate step amount.

The fact that in the units order group of locked up counting relays the relays 152B and 72 were energized simultaneously at points D16 and D16' is of no material consequence in the operation of the machine. The relays of lower numerical value locking up following energization of the counting relay 72, which pertains to the relay pair representative of the digit 4, are regarded as the primary chain of locked up relays, whereas the relays locking up following the energization of relay 152B at point D16 are regarded as an ancillary chain of relays. Following energization of relay 152A, however, at point D70 and the reenergization of relay 152B at point D73, the ancillary chain of relays becomes merged with the primary chain, and it will be understood therefore that the register number wheel caused to rotate under control of the locked up units order counting relays will necessarily need to rotate the same distance to cause deenergization of the primary chain of locked up relays as though the merged portion of that chain were originally successively locked up following the energization of relay 152A at point D70. An immaterial change in the operation of the machine is the fact that because of the earlier energization of counting relay 152B at point D16, the cut-off relay 44 in consequently energizing at the point D17 does so earlier than if the orginial energization of relay 152B was initiated by the energization of relay 152A, and therefore the circuits, described immediately herebelow, established by the closing of contacts 44C and 44D on the cut-off relay 44 for causing rotation of register number wheels, causes those number wheels to begin rotation slightly sooner than otherwise. But since in the rotation of these number wheels the primary chain of counting relays are successively deenergized incident to the digital advance of such number wheels, the relay chain will be completely deenergized more quickly. The ultimate result is simply that the period of time during which the number wheels rotate is shifted forward in point of time although the digital advance is unaltered for this is determined by the total number of locked up counting relays.

So long as the relay as 152B which initiates energization of the ancillary chain of relays is of lower numerical value than the relay as 72 which initiate energization of the primary chain of relays, the primary chain will predominate; that is, the intended digital entry represented by the relay pair heading the primary chain of relays will actually be set up or represented by such relays and caused to be entered on the register number wheels. The ancillary relay chain could only cause a misentry if the relay as 152B heading such ancillary chain were of greater numerical value than the relay 72 heading the primary chain. But this condition cannot exist because the relay as 152B heading the ancillary chain is always energized, if at all, from a contact finger as 90J (Fig. 5) which is permitted to engage the bar 90 through a card perforation as 90JJ (Fig. 16). The relay as 152B which is thus energized is always of the same digital significance as the contact finger as 90J which is effective for closing the circuit to cause its energization. It will be recalled that the perforations as 90JJ (Fig. 16) are always equal to or of lower numerical value than the card perforation as 89QQ (Fig. 16) which corresponds to and determines the numerical value of the relay as 72 which heads the primary chain of counting relays.

When cut-off relay 43 energizes at point D18, stepping relay 45 is potentialized at point D18A, and clutches 97A and 103A (Fig. 6) associated with the tens order of the first step quantity register 97—98 are potentialized at points D18B and D18C. The circuits for causing potentialization of the stepping relay 45 and the clutch 97A originates with ground at contact 43C and includes conductor 45C (Fig. 13), said relay 45, conductor D (Figs. 13 and 14), cable 201K (Figs. 14, 13 and 12), contact D3 of shift relay 203, cable 102 (Figs. 12 and 6), conductor 102D, the clutch 97A and battery. The circuit for potentializing the clutch 103A begins with ground at contact 43D and includes conductor E (Figs. 13 and 14) which extends through cable 201K (Figs. 14, 13 and 12) to closed contact E3 of shift relay 203 from which the circuit is continued through a conductor in the cable 102 (Figs. 12 and 6), and conductor 102E (Fig. 6) to said clutch 103A and battery. When the clutches 97A and 103A energize at points D23 and D24 the number wheel 97 takes motion from the constantly rotating shaft 322D as does the gear 97C which drives the gear 103. This energization of the clutch 103A, simultaneously with energization of the clutch 97A, connects the wheel 103 with the shaft 103C which is then effective, through the gears 105A, 54 and 57E (Fig. 2) to cause the part of the register 56—57—58 in which the contact closing wheel 57D is mounted to take motion. This contact closing wheel 57D will in this operation move from association with the multiple contact switch (Fig. 4) representative of the digit 5 into association with and for closing the multiple contact switch representative of the digit 4. The tens counting relays 70, 71, the cut-off relay 43 and the stepping relay 45 operate in the manner previously explained to cause the tens order contact closing wheel 57D to move in this manner and also to cause the tens order wheel 97 of the register 97—98 to move to a position representative of 1.

The energization of cut-off relay 44 at point

D17 concurrently grounds stepping relay 46 and clutches 98A and 108A at point D17A, D17B and D17C, respectively. Thereafter, under control of the counting relays in the units order, the wheel 98 is caused to advance four digital positions from 0 to 4 and at this same time, by means of the power train established by the energized clutch 108A, the contact closing wheel 58D is driven backwardly four digital positions from 1 through 0 to 7 and therefore moves from association with the multiple contact switch (Fig. 5) representative of 1 into association with the multiple contact switch (Fig. 5A) representative of 7. Point D18 on the line pertaining to stepping relay 46 indicates the time the contact closing wheel 58D is moved subtractively from 1 to 0 and point D19 indicates the time said wheel reaches 9 in its subtractive movement. While the wheel unit of which the contact closing wheel 58D is a part runs backwardly or in a subtractive manner, and specifically while it passes from 0 to 9, the lobe on the carry-over wheel 58S closes carry-over contact 58K to ground carry-over relay 110, (Fig. 14) at point D25. The circuit for thus grounding and potentializing the relay 110 originates with ground at said contact 58K and includes conductor 109L (Fig. 2), cable 109 (Figs. 2 and 12), contact L3 of shift relay 203, cable 201K (Figs. 12, 13 and 14), conductor L (Fig. 14) and said relay 110 to battery. Upon the energization of relay 110 at point D26, carry-over relay 111 starts to energize and when this relay is energized at point D27, cut-off relay 113 starts to energize. The consequent energization of cut-off relay 113, however, at point D28 does not energize stepping relay 112 for circuit through this relay is now open at contact 64A of relay 64 which is energized at this time. The energization of cut-off relay 113 at point D28 opens contacts X and XX which are in series with the contact Y.

Upon the deenergization of relay 9 at point D12 contact 9E closed, as stated heretofore, and not only was ground applied to conductor 9G through closed contact 9L of relay 9 but ground was also applied to conductor 9H (Fig. 11) through closed contact 9D of relay 9. Conductor 9H leads to the first rate step bar 115 (Fig. 10) so that the grounding of conductor 9H also grounds first rate step bar 115.

Finger 115C associated with the bar 115 passes through a perforation in the card representative of the digit 4. Hence when bar 115 is grounded finger 115C and conductor 115F connected thereto are grounded. Conductor 115F leads to the multiplier relay 275 of the No. 4 pair of the upper group of multiplier relays (Fig. 10) wherefore relay 275 started to energize at point D12D. The groups of multiplier relays shown in Fig. 10 are similar to the counting relays of Fig. 13, except that a different arrangement is associated with these multiplier relays in so far as stepping and cut-off relays are concerned, as will be explained presently. When relay 275 energized at point D30 its mate 276 and all other relays of lower numerical value in this group energized, the upper relay 281 of the No. 1 pair of relays of this group being energized at point D31. Relay 281 when energizing at point D31 closes contact 281X which grounds conductor 12J to provide a stick or holding circuit for relay 12, (Fig. 11) for a purpose which will be explained presently.

Intermediate the vertical lines III—III' the digits 2 and 3 are entered on number wheel 98 and the entry of the digit 4 on such wheel is commenced.

Sections 4 to 7—First rate step multiplication

Inasmuch as only one digit is being entered in the tens order while four digits are being entered in the units order, the entry in the tens order will be completed prior to the time the entry in the units order is completed. The cut-off relay 43 (chart section 3) for the tens order deenergizes at point D32 and thereupon the clutches 97A and 103A are freed from ground at points D32A and D32B, and when these clutches thereafter deenergize at points D33 and D34 the digit 1 is completely entered in the tens order of the first step quantity register 97—98 (Fig. 6) and the contact closing wheel 57D in the tens order of the consumption quantity register 56—57—58 (Fig. 2) is moved subtractively from 5 to 4.

The cut-off relay 44 for the units order, however, does not deenergize until point D29, but when deenergized at this point the contact 44F thereof opens and thereupon at points D29A and D29B the relays 64 and 169 are depotentialized. The deenergization of relay 64 at point D35 and the resultant closing of contact Y does not cause potentialization of sequence control relay 25 for the circuit is open at the contact X of energized carry-over cut-off relay 113. And when relay 64 deenergizes, closing contact Y, a circuit is completed through contact Z of relay 113 for reenergizing relay 169 at point D29B'.

When the amount 14 was set up on the first step quantity register 97—98 and the contact closing wheels 57D and 58D of the consumption quantity register (Fig. 2) were concurrently moved backwardly respectively 1 and 4 digital positions, such contact closing wheels which previously stood at 51 would consequently stand at 47. These contact closing wheels are supposed to stand at 37, the difference between 51 and 14, and therefore the contact closing wheel 57D is to be subtractively moved one additional digital position from 4 to 3. This operation is effected under control of the locked up carry-over relays 110 and 111 and proceeds as follows.

The release of relay 64 at point D35 closes contact 64A whereupon at point D35A stepping relay 112 is potentialized. The energization of stepping relay 112 at point D36 opens contact 112A whereupon the stick or holding circuit for relay 110 is broken and this relay starts to deenergize at point D36A. When contact 64A closed and initiated energization of relay 112 at point D35A the clutch 79B (Fig. 2), which is in series with the relay 112 in a circuit including contact K3 of shift relay 203 (Fig. 12), also started to energize at point D35B. The clutch 79B is completely energized at point D37 and therefore the shunting wheel 79D takes motion and in a manner similar to the shunting wheel 48C closes and opens shunting contact 79E to successively deenergize and energize stepping relay 112. Following the first deenergization of stepping relay 112 counting relay 111 deenergizes at point D38, and upon the subsequent reenergization of stepping relay 112 cut-off relay 113 is depotentialized at point D39. When cut-off relay 113 is deenergized at point D40 contact 113C thereof opens, breaking the energization circuit for clutch 79B which therefore starts to deenergize at point D40A. When this clutch is fully deenergized at point D41 the contact closing wheel 57D stands at 3 to close the multiple contact switch (Fig. 4) representative of the digit 3 in the tens order.

Therefore at this time the number wheels 56, 57 and 58 of the consumption quantity register (Fig. 2) display 051 whereas the contact closing wheels 56D, 57D and 58D of such register stand in positions to close multiple contact switches (Figs. 3, 4 and 5A) representative of 037.

Upon the deenergization of carry-over cut-off relay 113 at point D40 the contact X closes and thereupon at point D40B sequence control relay 25 starts to energize and when energized at point D42 contact 25C opens wherefore at point D42A sequence relay 10 is depotentialized.

When sequence relay 10 deenergizes at point D43 contact 10E closes, impressing ground on contact 11D, conductor 11K (Figs. 11 and 10), conductor 282 (Figs. 10 and 7) and contact 325 of the No. 1 multiple contact switch associated with the tens order contact closing wheel 97B (Figs. 6 and 7) of the first step quantity register. Since this register stands at 14, the lobe 97X on the wheel 97B will be in position for closing said No. 1 multiple contact switch wherefore the above traced circuit is extended through said switch contact 325 and conductor 325A which leads through cable 101 (Figs. 7 and 12) to contact 204A on shift relay 204. In the lower left-hand part of Fig. 7 a lateral 332 leads from grounded conductor 282 to contact 326 of the No. 4 multiple contact switch associated with the units order contact closing wheel 98B (Figs. 6 and 7) of the first step quantity register, and since this wheel now stands at 4 said contact 326 is closed and the circuit is continued through said contact and conductor 326A which leads through cable 101 to shift relay contact 204B (Fig. 12). Shift relay contacts 204A and 204B, thus grounded are representative of the digits 1 and 4. Also upon the deenergization of relay 10 at point D43, contact 10B opens, depotentializing shift relay 203 at point D43A. Contact 3X of this shift relay is thus opened and depotentializes the slow relay 194 in Fig. 11 at point D43'. Said slow relay which is functional only during a minimum charge operation subsequently deenergizes at point D43" without effect.

Contact 10D of deenergized sequence relay 10 also closes, potentializing shift relay 204 at point D43B, and when this relay energizes at point D44 the said contacts 204A and 204B thereof are closed to connect the aforedescribed circuits leading through cable 101 thereto with the central windings of counting relays 70 and 72 which are thus potentialized at points D44A and D44B. The counting relays of lower numerical value successively energize to be followed by energization of the respectively associated cut-off relays 43 and 44.

The cut-off relay 43 will energize prior to the cut-off relay 44 because one pair of counting relays representing the digit 1 is locked up in the tens order whereas four pairs of counting relays representing the digit 4 are locked up in the units order. Thus the energization of cut-off relay 43 at point D45 closes contact 43F whereupon relays 64 and 169 start to energize at points D45A and D45B, the relay 169 having been previously depotentialized at point D40C when carry-over cut-off relay opened contact Z at point D40. The energization of relay 169 at point D46 closes contact 169A grounding conductor 169B (Fig. 14) conductor 169B (Fig. 12) where it grounds closed contact 4X to which conductor 4XX is connected. Conductor 4XX (Fig. 10) leads to relay contact 281C (Fig. 10) which is closed at this time inasmuch as relay 281 is energized. Contact 281C is connected to a conductor extending between relays 278 and 283 (Fig. 10). Hence the energization of relay 169 at point D46 grounded relays 278 and 283 which started to energize at points D46A and D46B. The energization of relay 278 at point D47 opens contact 278A which breaks a stick or holding circuit for multiplier relay 275 which thereupon starts to deenergize at point D47A.

The energization of relay 64 at point D48 opened contact Y freeing relay 25 of ground which thereupon started to deenergize at point D48A. The deenergization of relay 25 at point D49 opens contact 25B whereupon relay 11 is freed from ground at point D49A and later deenergizes at point D50. The deenergization of relay 11 at point D50 opens contact 11D to free conductor 11K from ground and this frees contact 325 (Fig. 7) of ground so that counting relay 70 is depotentialized at point D50A. Contact 326 (Fig. 7) is similarly freed of ground at this time but this does not effect release of relay 72 which is still held energized by the stick or holding circuit from contact 46A of now unenergized stepping relay 46.

The energization of cut-off relay 43 at point D45 grounds stepping relay 45 at point D45C and also grounds clutch 128A in the tens order of the money register 127—128—129 (Fig. 8) at point D45D. The subsequent energization of cut-off relay 44 at point D51 grounds stepping relay 46 at point D51A and clutch 129A in the units order of said register at point D51B.

With the energization of clutch 128A at point D52 the wheel unit including the number wheel 128 takes motion, and with the energization of the clutch 129A at point D53 the wheel unit including the number wheel 129 takes motion. These wheel units advance under control of the locked-up counting relays (Fig. 13) and their associated cut-off and stepping relays. In the gap intermediate vertical lines IV—IV' the digit 1 is entered on the wheel 128, the clutch 128A releasing in this gap, and the digits 1, 2 and 3 are entered on the wheel 129 and the entry of the digit 4 on this wheel is nearly completed. When the shunting contact 129E opens in a manner similar to that in which the shunting contact 48D opens (as hereinabove described) near the end of each digital entry, the stepping relay 46 starts to energize as at point D54 near completion of entry of the digit 4 on the number wheel 129. Upon the energization of this stepping relay at point D55 the cut-off relay 44 starts to deenergize at point D55A. When this cut-off relay deenergizes at point D56 the stepping relay 46, at point D56A, and the clutch 129A, at point D56B, are freed of ground. Upon the deenergization of clutch 129A at point D57 the wheel 129 displays 4.

Upon the deenergization of relay 44 at point D56 contact 44F opened and thereupon at points D56C and D56D the relays 64 and 169 started to deenergize. The deenergization of relay 64 at point D58 closes contact Y and thereupon sequence control relay 25 starts to energize at point D58A. The energization of relay 25 at point D59 opens contact 25C but this does not effect the release of relay 12 which at this time is held energized by a stick or holding circuit established at relay contact 281X (Fig. 10) which extends through conductor 12J (Fig. 10) and conductor 12J (Fig. 11). Relay 281 which maintains contact 281X closed will be the last of the multiplier relays to deenergize in the course of this multiplying operation and therefore sequence control relay 12 will be prevented from deenergizing until the completion of such multiplying operation.

Relay 169 is a slow-to-release relay and when it deenergizes at point D60 contact 169A thereof opens freeing relays 278 and 283 of ground whereupon these relays start to deenergize at points D60A and D60B. Upon the deenergization of relay 278 at point D61 contact 278B opens freeing multiplier relay 276 of ground at point D61A.

Relay 278 includes a contact 278C as well as contacts 278B and 278A. The contacts 278A and 278B are make-before-break contacts and one or the other of these contacts is opened upon complete energization or deenergization of relay 278. However, the contact 278C does not close instantaneously upon the complete deenergization of relay 278 at point D61. Hence, in accordance with the well understood practice in the art, the contacts of the relay 278 are arranged for sequential closing upon deenergization of the relay 278. Thus, subsequent to the deenergization of the relay 278 at point D61 the contact 278C closes with the effect of grounding the contacts 325 and 326 (Fig. 7) to again ground the counting relays 70 and 72 at the points D62 and D62A. Such ground is obtained through conductor 278D which is grounded from contact 281X (Fig. 10), the circuit being continued through closed contacts 278C and 283A and conductor 282. It will be recalled that conductor 282 was grounded from contact 10E for energizing the counting relays 70 and 72 in the first round of multiplication. Contact 283A is controlled by slow-to-release relay 283 which relay deenergizes at point D67 and breaks the circuit which initially grounds the counting relays 70 and 72 in this instance for the second round of multiplication.

The mates of the relays 70 and 72 and, in the case of the relay 72, those in the same group of lower value lock up as do the associated cut-off relays and stepping relays. Cut-off relay 43 energizes at point D63. Upon energization of the cut-off relay 43 at point D63 contact 43C closes to ground stepping relay 45 and clutch 128A at points D63A and D63D as in the first round of multiplication. Simultaneously, contact 43F closes to ground relays 64 and 169 at points D63B and D63C.

The energization of relay 64 at point D65 opens contact Y and frees relay 25 of ground at point D65A. The deenergization of relay 25 at point D66 is without effect however, inasmuch as relay 13 is held energized through closed contact 12G.

The energization of relay 169 at point D64A grounded conductor 169B (Figs. 14 and 12), contact 4X, conductor 4XX (Figs. 12, 12A, 11 and 10) which through closed contact 281C grounds the relays 278 and 283 which therefore start to energize at points D64C and D64D. When the relay 278 is energized at point D68 contact 278A is opened, breaking the stick circuit for multiplier relay 280 which is thus depotentialized at point D68B. The energization of relay 278 at point D68 results in the opening of contact 278C and thus precludes reapplication of ground to the contacts 325 and 326 through the circuit including contact 283A when relay 283 energizes at point D68C. By this time the counting relay 70 had already been depotentialized at point D64B pursuant to the energization of stepping relay 45 at point D64.

When the cut-off relay 43 energized at point D63 it not only grounded stepping relay 45 at point D63A but it also grounded clutch 128A at point D63D, as stated above. When cut-off relay 44 energized at point D71 it grounded stepping relay 46 at point D71A and clutch 129A at point D71B. The clutches 128A and 129A are completely energized at points D72 and D73 and in the gap between the vertical chart lines V—V' the digit 1 is added onto the wheel 128 and the clutch 128A releases so that the wheel 128 now displays 2. Likewise in this gap the digits 1, 2 and 3 are added to the 4 already standing on wheel 129 and the completion of the entry of the fourth digit 8 thereon is nearly completed.

Thus the shunting contact 129E is permitted to open near the end of the entry of this fourth digit 8 so that at point E1 shunt is removed from stepping relay 46 which thereafter energizes at point E2 to thereupon initiate deenergization of cut-off relay 44 at point E2A. The cut-off relay 44 by deenergizing at point E3 opens its contact 44C thereby opening the series energization circuit for the stepping relay 46 and the clutch 129A, wherefore these parts are depotentialized at points E3A and E3B. When this clutch subsequently deenergizes the number wheel 29 displays 8.

In the course of this second entry operation 14 was added onto the 14 already standing on the wheels 128 and 129 so that now the wheels display 28, the sum of 14 plus 14 or the product of 14 times 2.

The deenergization of cut-off relay 44 at point E3 also opens contact 44F whereupon relays 64 and 169 start to deenergize at points E3C and E3D. The deenergization of relay 64 again causes the closing of contact Y with the effect as before of energizing sequence control relay 25 without effect since sequence relay 12 is held energized from ground at contact 281X (Fig. 10). Deenergized relay 169 opens contact 169A which indirectly deenergizes the mate of relay 280 just as in the prior operation relay 276 was deenergized. That is, the opening of contact 169A depotentialized relays 278 and 283 (Fig. 10) at points E4A and E4B, and when relay 278 deenergized at point E5 contact 278B opened, breaking the stick circuit for multiplier relay 280A which consequently depotentialized at point E5A. Furthermore, subsequent to the deenergization of relay 278 at point E5, contact 278C closes with the effect as before of grounding conductor 282 (Figs. 10 and 7) and the contacts 325 and 326 (Fig. 7) to again initiate energization of counting relays 70 and 72 at points E6 and E6A.

The subsequent energization of counting relays 70 and 72 brings about energization of their mates and in the case of the relay 72 all other counting relays of lower numerical value in the same group with the result that cut-off relays 43 and 44 again energize to again, in the course of operation, bring about the energization of the clutch 128A at the point E7 and energization of the clutch 129A at the point E8.

The number wheels 128 and 129 again take motion and in the course of this operation another digit 1 is entered on the wheel 128 so that when this wheel comes to rest upon the release of clutch 128A at point E9 the wheel 128 displays 3. Four more digits will be added to the digit 8 already standing on the wheel 129 so that when this wheel comes to rest upon the release of clutch 129A at point E10 this wheel displays 2.

During the advance of the number wheel 129 from 8 to 2 it passed from 9 to 0 and in so doing the lobe on the carry-over wheel 129H associated therewith closed the carry-over contact 129J to ground the conductor 126L (Fig. 8) which, through the now energized shift relay 204, is connected with conductor L (Fig. 14) and with carry-over relay 110. Hence when carry-over wheel 129H closed the aforesaid contact the relay 110 started to energize at point E11 and therefore in succession relays 111 and 113 energized and locked up. However, as before, the stepping relay 112 does not energize at this time inasmuch as relay 64 is energized and the relay contacts 64A and Y are open. But shortly prior to the time the clutch 129A deenergizes at the point E10, the cut-off relay 44 deenergizes at point E13 and as a consequence of this at the point E14 the relay 64 subsequently deenergizes, closing contacts 64A and Y whereupon at point E14A relay 112 starts to energize inasmuch as the energization circuit is thus completed therefor. Simultaneously, the clutch 128A, which is in series with the energization circuit for the stepping relay 112, starts to energize at point E14B.

Upon complete energization of the clutch 128A at the point E15, the wheel 128 takes motion in the course of which the shunting contact 128E closes and opens to successively deenergize the relays 111 and 113, the stepping relay 110 deenergizing at the point E16A following the first energization of the stepping relay 112 at the point E16.

When cut-off relay 113 deenergizes at point E17 the stepping relay 112 and the clutch 128A are depotentialized, the clutch later deenergizing at point E17' when the number wheel 128 has been advanced one digital position from 3 to 4 and the money register 127—128—129 (Fig. 8) reads 042.

Upon the deenergization of cut-off relay 44 at point E13, the relays 64 and 169 started to deenergize at the points E13A and E13B. The relay 64 deenergized at point E14 but inasmuch as the relay 169 is a slow-to-release relay it did not deenergize at this time. When relay 64 deenergized at point E14 it closed contact Y which, through conductor 25D, is connected with the contact Z and since this contact is now closed due to the energization of relay 113 the circuit continues on from contact Z to one winding of relay 169. Hence when contact Y closed upon the deenergization of relay 64 at point E14, before complete deenergization of the relay 169, the closing of the above traced circuit caught the relay 169 and completely reenergized it to maintain contact 169A closed.

However, upon the deenergization of carry-over cut-off relay 113 at point E17 the contact Z opens so that at the point E17A the slow-to-release relay 169 starts deenergization that is completed at point E18.

Referring back to chart section 4, it will be seen that the relay 64 caught the relay 169 in the manner similar to which this relay catches the relay 169 in section 7, although the relay 169 was not effective in the operation proceeding in section 4. The relay 169 pertains only to multiplication and as can be seen by reference to Figs. 12 and 12A the conductor 169B, which is grounded upon the deenergization of relay 169 and the consequent closing of contact 169A, is associated only with the contacts 4X, 7X and 9X that are provided in the shift relays 204, 207 and 209 pertaining to multiplication but in no others. During the referred to part of the operation shown graphically in chart section 4, only shift relay 203 was energized.

Upon the deenergization of relay 169 at point E18 the contact 169A opens to depotentialize relay 278 at point E18A. Subsequent to the consequent deenergization of relay 278 at point E20 the contact 278C thereof closes which, as described heretofore, results in the grounding of counting relays 70 and 72 which start to energize at points E19 and E19A.

The relay 278 in deenergizing at point E20 opens contact 278B and thus initiates deenergization of the upper relay 280C of the No. 2 pair of multiplier relays in the upper group (Fig. 10), the lower relay 280B of this pair having been deenergized following the energization of relay 278 when contact 169A closed near the start of the present cycle of operation in chart section 6.

The energization of the counting relays 70 and 72 at points E21 and E21A is followed by the energization of the other relays in the groups in which these relays are included, in the manner above described, and this is followed by the energization of cut-off relay 43 at point E22 and the energization of cut-off relay 44 at point E23.

Relay 43 in energizing at point E22 grounds clutch 128A at point E22A which subsequently energizes at point E24 to set wheel 128 in motion, and during the course of this operation the fifth digit 5 is entered on the wheel 128. The energization of cut-off relay 44 at point E23 causes the grounding of clutch 129A at point E23A, and when this clutch is energized at point E25 the wheel 129 takes motion in the course of which four additional digits are entered thereon. Upon the energization of cut-off relay 43 at point E22 the relays 64 and 169 were again energized and the energization of relay 169, with the consequent closing of contact 169A, reenergized the relays 278 and 283 wherefore the multiplier relay 280D was released at point E26.

*Chart section 8—Second step registration*

In the gap intermediate the vertical lines VII—VII' the fifth digit (including one carry) is entered on the number wheel 128 which comes to rest in a position to display 5. That is, such 5 is the sum of the four digits entered on this number wheel under control of the counting relays (Fig. 13) and the single carry entered thereon under control of the relays 110 and 111 as shown in chart section 7. Also in this gap the first, second and third digits of this entry operation are entered on the number wheel 129 and the entry of the fourth digit thereon is well under way. Near the end of the entry of the fourth digit the shunting contact 129E opens to remove shunt from the stepping relay 46 which therefore starts to energize at the point E27. When this relay is energized at the point E28 the cut-off relay 44 is depotentialized at the point E28A and this relay consequently deenergizes at the point E30. This deenergization of cut-off relay 44 at point E30 causes the opening of contact 44F whereupon at the points E30A and E30B the relays 64 and 169 are depotentialized. The deenergization of relay 64 at the point E31 results in the closing of contact Y whereupon at the point E31A the sequence control relay 25 starts to energize. The energization of the sequence control relay 25 at the point E32 is without effect at this time inasmuch as the multiplier relay 281 (Fig. 10) is still energized so that its contact 281X is still closed and ground is still maintained on conductor 12J. However, this energization of relay 25 at point E32 does open contact 25C so that when subsequently the contact 281X does open the relay 12 will start to deenergize.

Upon the deenergization of relay 169 at point E33 ground is removed from conductor 169B (Figs. 14, 13 and 12), shift relay contact 4X, conductor 4XX (Figs. 12, 12A, 11 and 10), contact 281C and the relays 278 and 283 which thereupon start deenergization at the points E33A and E33B. Upon the deenergization of relay 278 (with respect to effective attraction for contact 278B) at point E34 the contact 278B opens, breaking the stick or holding circuit for relay 281 which thereupon starts to deenergize at point E34A. Relay 281 thereafter deenergizes at point E35 whereupon its contact 281X opens. Subsequent to the opening of contact 281X at the point E35 the contact 278C closes at the point E36 on the line pertaining to the relay 278 in chart section 8. Thus, by the time the contact 278C closes, the contact 281X is opened. The source of ground for conductor 282 (Fig. 10), through which ground is supplied to the contacts as 325 and 326 intermediate successive rounds of multiplication, is broken at the open contact 281X. Thus the opening of contact 281X prior to the closing of contact 278C prevents a repeat multiplying operation.

Clutch 129A was depotentialized at point E30C when cut-off relay 44 deenergized at point E30 and opened contact 44C. Upon the deenergization of clutch 129A at point E37 the wheel 129 displays 6.

Therefore at this stage of the operation the register 48—49—50 displays 455; the register 75—76—77 displays 404, the register 56—57—58 displays 051; on contact closing wheels 56D, 57D and 58D are closed contacts representative of 037; the register 97—98 displays 14 and the register 127—128—129 displays 56. Thus this far the machine has determined that the consumption quantity of 051 is greater than the first rate step quantity 14 and that a charge of 56 ($0.56) for the first rate step quantity 14 should have been made and this quantity has been entered in the product or consumption charge register.

The machine is therefore now ready to perform the comparison operation for the second rate step and to determine whether or not the remaining quantity of consumption is greater than the second rate step quantity. If in the course of operation this is found to be true then the second rate step quantity is to be entered in the second rate step quantity register 140—141 and this quantity is to be multiplied by the selected rate for the second rate step quantity and the resulting product is to be added to the product already standing in the register 127—128—129. The action of machine parts entailed in the second rate step comparing and registering operations is similar to that hereinabove described, except that different quantities are involved, and this operation proceeds under the control of different sequence and shift relays and a different row of multiplier relays is used in this instance.

When the relay 281 deenergized at point E35 and opened the contact 281X, conductor 12J was freed from ground and thereupon sequence control relay 12 started to deenergize at point E35A. Upon the deenergization of relay 12 at point E40 and the opening of contact 12B the shift relay 204 started to deenergize at the point E40A. Contact 12D closed wherefore the shift relay 206 started to energize at the point E40B.

Also when sequence relay 12 deenergized at point E40 contact 12E thereof closed grounding conductor 13G through closed contact 13L of sequence relay 13. Thus grounded conductor 13G leads into cable 211 in Fig. 11 and emerges from such cable 211 in Fig. 5A to extend into connection with and ground the second rate step comparison bars 300, 301 and 303 (Fig. 3), 304, 305 and 307 (Fig. 4) and 309 (Fig. 5). Since the selected second rate step quantity 025 has no significant digit in the hundreds order, the control card is left unperforated at points in registry with the hundreds order bars 300, 301 and 303, and consequently the grounding of these bars is without effect in the present operation. Furthermore, in this part of the present operation the bar 309 (Fig. 5) which corresponds to the units order first step comparison bar 90 (Fig. 5) is ineffective for, although grounded, all contact fingers engaged therewith are connected with now dead-ended conductors. That is, the fingers No. 1 to 5 which are permitted to engage this bar 309 through card perforations (Fig. 16) lead respectively to contacts on the No. 1 to 5 multiple contact switches (Figs. 5 and 5A), which switches are now open. Only the No. 7 of these switches is closed since the contact closing wheels 56D, 57D and 58D (Figs. 2, 3, 4, and 5) were moved backwardly from 051 to 037 while the first step quantity 014 was entered in the register 97—98 (Fig. 6).

In the tens order of multiple contact switches (Figs. 4 and 4A), and since the No. 3 switch is closed, the No. 3 contact finger associated with the comparison bar 304 will constitute a part in an effective circuit now to be traced. In Fig. 16 it will be seen that the control card is perforated in registry with the bar 304 at all digital positions above that corresponding to the tens order digit in the selected second step quantity 25. Therefore, from the bar 304 which was grounded through conductor 13G when sequence relay 12 deenergized at point E40, a circuit is traceable through the No. 3 contact finger 304G, vertical conductor 304B, switch contact 304C, vertical conductor 304D, relay 315 and closed relay contact 314D (Fig. 3) to battery. Relay 315 is therefore potentialized at point E40C upon the deenergization of sequence relay 12. When relay 315 energizes at point E42, contact 315A closes and impresses ground on bar 308 (Fig. 5) which is engaged by the No. 5 finger 308P whereby ground is impressed on the No. 5 vertical conductor 138B leading into cable 138 (Fig. 5A). Contact 315B by closing when relay 315 energizes at point E42, impresses ground on the maximum bar 306. From this bar the circuit is continued through the No. 2 contact finger 306H and through the No. 2 vertical conductor 138A which leads into cable 138 in Fig. 4A. These grounded vertical conductors 138A and 138B leading into cable 138 respectively in Figs. 4A and 5A have the numerical significance of 25 (the amount of the selected second rate step quantity), and emerge from said cable in Fig. 12A where they connect with shift relay contacts 206A and 206B of like numerical significance. When shift relay 206 is energized at point E41 these contacts are effective to connect the above traced circuits leading thereto respectively wtih counting relays 139 and 30 (Fig. 13) which pertain to 2 in the tens order and to 5 in the units order.

The energization of counting relays 139 and 30 is eventually followed by energization of their associated cut-off relays 43 and 44 at the points E43 and E44, respectively.

The deenergization of relay 12 at point E40 and the consequent closing of contact 12E grounded conductor 13H (Fig. 11) and conductor 13H (Fig. 10) whereupon the contact bar 115A was grounded. The No. 3 finger 115D associated with this bar is engaged therewith through a perforation in the card representative of 3 and this finger 115D is connected with multiplier relay 284 which therefore starts to energize at point E40D. The energization of relay 284 is followed by the sequential energization of the other multiplier relays of lower numerical significance in the same group or pertaining to the same multiplication operation. Upon the energization of the cut-off relay 43 at point E43 circuit is closed to the clutches 140A and 142A (Fig. 6A) whereupon, when these clutches are completely energized at points E45 and E46, the number wheel 140 and the contact closing wheel 57D take motion, the wheel 140 taking forward movement and the wheel 57D backward movement.

Upon the energization of cut-off relay 44 at point E44 the clutches 141A and 143A are grounded at points E44A and E44B, and when these clutches thereafter energize at points E47 and E48 the wheel 141 and the contact closing wheel 58D take respective forward and backward motion.

Then in the course of operation under control of the locked-up counting relays in the tens and units orders 2 is entered on the wheel 140 and 5 is entered on the wheel 141. Furthermore, the contact closing wheel 56D is run backwardly the amount of two digits so that at the end of this operation it is closing the No. 1 multiple contact switch (Fig. 4). Also the wheel 141 advances to display 5 and concurrently with this the contact closing wheel 58D run backwardly from its position closing multiple contact switch No. 7 (Fig. 5A) to the position where it closes the No. 2 multiple contact switch (Fig. 5).

The completion of the entry of 2 on the wheel 140 and the above described positioning of the contact closing wheel 57D is completed during the gap between the vertical lines VIII—VIII'. Furthermore, the digits 1, 2, 3 and 4 are entered on the wheel 141 in the gap between the just-mentioned vertical lines and the entry of the fifth digit is well under way in said gap. Of course, at this same time the contact closing wheel 58D is moved rearwardly in digital amounts corresponding to the advance of the wheel 141.

Near the end of the entry of the fifth digit 5 on the wheel 141 the shunting contact 141E (Fig. 6A) opens whereupon stepping relay 46 starts to energize at point E49. Upon the complete energization of this relay at point E50 cut-off relay 44 starts deenergization at point E50A. When the cut-off relay 44 deenergizes at the point E51 ground is removed from the clutches 141A and 143A which start to deenergize at the points E51A and E51B, and when these clutches deenergize at the points E52 and E52A the wheel 141 and the contact closing wheel 58D are positioned, as above described, respectively at 5 and 2.

Upon the energization of the cut-off relay 43 at the points E43 (chart section 8) the relays 64 and 169 started to energize at the points E43A and E43B. When the relay 64 energized at the point E53 the contact Y opened and thereupon at the point E53A the sequence control relay 25 started to deenergize. The relay 25 thereafter deenergized at the point E54 to open the contact 25B for depotentializing sequence relay 13.

Incident to the deenergization of the relay 44 at the point E51 (chart section 9) the contact 44F opened and thereupon the relays 64 and 169 started to deenergize at the points E51C and E51D. Upon deenergization of the relay 64 at the point E55 the contact Y closed whereupon the sequence control relay 25 started to energize at the point E55A. When this relay was energized at the point E56 the sequence relay 14 started to deenergize at the point E56A.

Concurrently with the deenergization of relay 14 at point E57 the contact 14B thereof opens whereupon the shift relay 206 starts deenergization at the point E57A. Simultaneously with this the contact 14D closes whereupon at the point E57B the shift relay 207 starts to energize.

*Chart sections 9 to 11—Second rate step multiplication*

The ground from contact 14E of now deenergized sequence relay 14 is applied to contacts (Fig. 7) associated with contact closing wheels 140B and 141B of the register 140—141, which register at this time displays 25 so that it is the contacts 327 and 328 that are closed and hence effective. Upon energization of the shift relay 207 at point E58, circuits from these grounded contacts 327 and 328 are completed through shift relay contacts 207A and 207B to counting relays 139 and 30 which therefore start to energize at points E58A and E58B. Eventually the cut-off relay 43 energizes, closing contact 43F to potentialize relays 64 and 169. The consequent energization of relay 64 at point E59 opens contact Y whereupon at point E59A sequence control relay 25 is depotentialized. When sequence control relay 25 deenergizes at point E60 contact 25B thereof opens, freeing relay 15 of ground at point E60A wherefore this relay deenergizes at point E61.

The energization of relay 169 at point E62 grounds conductor 169B (Figs. 14, 13, 12 and 12A), the now closed shift relay contact 7X, conductor 7XX (Figs. 12A, 11 and 10), whereupon control relays 287 and 288 (Fig. 10) start to energize at points E62A and E62B. The energization of relay 287 at point E63 opens contact 287A to depotentialize multiplier relay 284.

Multiplication now proceeds in the same manner as in the first step multiplication and the successive opening and closing of the make-before-break contacts associated with relay 287 successively releases the multiplier relays in the middle group of Fig. 10. Furthermore, the closing of the contact 287C (associated with relay 287 and corresponding to the contact 278C associated with the relay 278) effects grounding of the counting relays 139 and 30 at the initiation of each round of multiplication. In the first round of this multiplication five digits are added to the 6 already standing on wheel 129 in the money register 127—128—129 (Fig. 8) and two digits are added to the 5 already standing on wheel 128. In the course of the entry of the aforesaid five digits on the wheel 129 this wheel advances from 6 to 1 and in so doing passes from 9 to 0. That is, when the clutch 129A energizes at point E63' the number wheel 129 starts moving off 6. At the times indicated at points E63a, E63b, E63c and E63d, on the line pertaining to stepping relay 46, the digits 7, 8, 9 and 0 are respectively entered on the number wheel 129. As this number wheel passes from 9 to 0 a lobe on the wheel 129H, of the wheel unit of which the number wheel 129 is a part, closes the carry-over contact 129J associated therewith at the time indicated at point E63e. When this contact closes, ground is applied to carry-over relay 110 at point E64 which thereupon starts to energize. The energization of carry-over counting relay 110 is followed by the successive energization of relays 111 and 113. The energization of the carry-over cut-off relay 113 at point E65 results in the closing of contact Z to maintain relay 169 energized in order that the necessary carry-over can be made at the end of the first round of multiplication and prior to the initiation of the second round of multiplication. Near the end of the carry-over entry of 1 on the number wheel 128 to advance this wheel from 7 to 8, the carry-over cut-off relay is permitted to deenergize, opening contact Z and thus permitting deenergization of relay 169 whereby contact 169A opens to depotentialize relay 287 (Fig. 10) so that contact 287B thereof opens to depotentialize multiplier relay 285 and contact 287C thereof closes to cause reenergization of the counting relays 139 and 30 for the second round of multiplication.

There is a carry-over intermediate each round of multiplication in the present multiplication of the second rate step quantity 25 by the selected rate 3 therefor. During the second round of multiplication 2 is added to the 8 standing on the wheel 128. Hence at the end of the second round of multiplication the wheel 128 displays 0. In the course of advancing into this position and particularly while advancing from 9 to 0, a lobe on the carry-over wheel 128H, of the wheel unit of which number wheel 128 is a part, closed the contact 128J with the effect of grounding the carry-over relay 160 (Fig. 14) at the point E66. Thereafter the relays 161 and 163 locked up, and upon energization of the relay 163 contact ZZ closed and which near the end of the second round of multiplication maintains the relay 169 energized until after the carry-over is effected just as did the contact Z in the previously described carry-over operations. When such carry-over has been effected the contact ZZ will have been opened permitting deenergization of said relay 169 whereby the relays 287 and 288 (Fig. 10) are deenergized to cause deenergization of multiplier relay 285B and to cause reenergization of the counting relays 139 and 30 for the third and last round of multiplication pertaining to the second rate step quantity 25.

Thereafter said third round of multiplication proceeds until at a time in chart section 12 during the entry of the digit 1 on the wheel 129 the shunting contact 129E opens to remove ground from the stepping relay 46 which then starts to energize at the point E67. Upon the resulting energization of stepping relay 46 at point E68 cut-off relay 44 starts to deenergize at point E68A. When the cut-off relay 44 is deenergized at the point E69 the clutch 129A is freed of ground at the point E69A. When this clutch is deenergized at the point E90 the wheel 129 displays 1. However, in the course of the entry of the five digits on the wheel 129 in this third round of multiplication, the wheel 129 advanced from 9 to 0 and in so doing a lobe on the wheel 129H closed its associated contact whereupon the carry-over counting relay 110 started to energize at the point E71. Energization of relays 111 and 113 followed and upon energization of the relay 113 at the point E72 the contact Z closed and the contact X opened.

When the cut-off relay 44 deenergized at point E69 and opened contact 44F, relay 64 started to deenergize at point E69B. The complete deenergization of this relay at point E70 resulted in the closing of contact Y but without effect since the circuit to relay 25 was open at contact X. However, this closure of contact Y grounds conductor 25D and through contact Z relay 169 is caught and held energized. Furthermore, the deenergization of relay 64 at point E70 closed contact 64A wherefore at point E70A relay 112 started to energize. Upon the complete energization of relay 112 at point E73 relay 110 is depotentialized at point E73A. The initiation of energization of relay 112 at point E70A is accompanied with the initiation of energization of clutch 128A at point E70B. When clutch 128A is completely energized at point E74 the wheel unit of which number wheel 128 is a part takes motion in the course of which the shunting contact 128E is closed and opened to successively effect deenergization of relays 111 and 113. Upon the deenergization of relay 113 at point E75 the contact Z opens and thereupon at point E75A slow-to-release relay 169 starts deenergization. Concurrently contact X closes so that at point E75B sequence control relay 25 starts to energize. Upon the energization of relay 25 at point E76 contact 25C opens but this is without effect at this time inasmuch as relay 16 is held energized through conductor 16J (Figs. 11 and 10) which is now grounded at contact 286X.

Upon the deenergization of slow-to-release relay 169 at point E77 relays 287 and 288 start to release at points E77A and E77B. When relay 287 deenergizes at point E88 the multiplier relay 286 starts deenergization at point E88A. This relay 286 deenergizes at point E89 and opens contact 286X and thereupon at point E89A sequence relay 16 is depotentialized. Subsequently the contact 287C associated with relay 287 closes at point E90' at the spot indicated on the line pertaining to relay 287, but by this time contact 286X is opened and therefore no ground is found for the circuit previously established through the contact 287C for reenergizing the counting relays.

*Chart section 12—Third or remainder rate step registration*

Upon the release of sequence relay 16 at point F1 the sequence control relay 207 starts to deenergize at the point F1A. Simultaneously at the point F1B the shift relay 208 starts to energize. Energized shift relay 208 completes circuits for placing multiple contact switches (Figs. 3, 3A, 4, 4A, 5 and 5A), which are under control of the contact closing wheels 56D, 57D and 58D, in circuit with the counting relays, and said shift relay completes other circuits for placing contacts of the cut-off relays (Fig. 13) in circuit with the register 198—159—154 (Fig. 6B). When sequence relay 16 deenergized at point F1, ground from contact 16E was impressed through contact 17L upon conductor 17G (Figs. 11 and 5A). Conductor branches 195 and 196 (Fig. 5A) lead from this grounded conductor 17G respectively to switch contacts on the multiple contact switches pertaining to the tens and units orders (Figs. 4, 4A, 5 and 5A), and since the No. 1 switch is now closed in the tens order and the No. 2 switch is now closed in the units order the switch contacts 195B and 196A will be effective for impressing such ground on conductors 151A and 151B leading into cable 151 (Figs. 4A and 5A). Conductors 151A and 151B lead through cable 151 respectively to contacts 208A and 208B of shift relay 208 (Fig. 12A) which have the numerical significance of 12. Therefore, when shift relay 208 energizes at point F3 the counting relays 70 and 152, representative of 12, are simultaneously potentialized at points F3A and F3B. Eventually the cut-off relays 43 and 44 energize. Following this the clutches 159A and 154A of the remainder step quantity register (Fig. 6B) energize at points F4 and F5 and the clutches 197A and 155A respectively simultaneously energize at points F4A and F5A to cause the number wheels 159 and 154 to be advanced to 12 and the contact closing wheels 57D and 58D of the consumption quantity register (Fig. 2) to be moved backwardly from 12 to 0.

Upon the energization of cut-off relay 43 at point F7 contact 43F closed, initiating energization of relay 64 at point F7A. Later, with the energization of relay 64 at point F8, contact Y opened whereupon at point F8A sequence control relay 25 started to deenergize. When relay 25 deenergized at point F9 sequence relay 17 started to deenergize at point F9A.

*Chart sections 13 and 14—Third or remainder rate step multiplication*

Shortly prior to the completion of the entry of 12 on the number wheels 159 and 154 (Fig. 6B) cut-off relay 44 deenergized at point F10 and opened contact 44F whereupon at point F10A relay 64 started to deenergize. When this relay is completely deenergized at point F11 contact Y closes wherefore at point F11A sequence control relay 25 is potentialized. When this relay is energized at point F13 contact 25C is opened whereupon relay 18 is depotentialized at point F13A.

When the wheel units of which the contact closing wheels 57D and 58D (Fig. 2) are a part complete their subtractive movement and therefore stand at 0, the pins 56X, 57X and 58X all align with their respective notches in their back stop wheels as 58C so that the bar 60 shifts to close the contacts 60D (Fig. 2) and to open the contacts 60B (Fig. 2).

Closing of the contacts 60D at this time is without effect of immediate consequence. The conductor 60E grounded by such closing of these contacts leads to contacts on the multiple contact switches (Fig. 7) which are adapted to be actuated by the wheels 97B and 98B of the first step quantity register. And since this register is now displaying the first step quantity 14 only the contacts of the No. 1 tens order switch and the No. 4 units order switch will be closed. Therefore, the circuit is extended through contact 326A of the units No. 4 switch and the No. 4 conductor in cable 101C to the No. 4 finger 184L (Fig. 7D), but since there is no card perforation in registry with this finger (see Fig. 16) the bar 184B is not grounded thereby wherefore the conductor 186D (Figs. 7D and 11) is not grounded and control relay 186 (Fig. 11) remains unenergized. The circuit from grounded conductor 60E in Fig. 7 is also continued through contacts 329 and 330 of the No. 1 tens order switch, and the No. 1 conductor in each of cables 101A and 101B to the No. 1 fingers associated with the bars 184 and 184A in Fig. 7D. As will be seen in Fig. 16, a perforation 184CC is provided whereby the No. 1 finger 184C is permitted to engage and ground the bar 184. A grounded circuit is thus completed through conductor 185D (Figs. 7D and 11) to control relay 185 so that this relay is potentialized at point FX the instant contact 60D closes. Subsequent energization of control relay 185 at point XY causes closing of contacts 185A and 185B, but without effect so long as relay 186 remains unenergized and its contacts 186A and 186B open.

The opening of contact 60B frees conductor 60C (Figs. 2 and 11) from ground whereupon the relay 62 (Fig. 2) is isolated from its source of ground and starts to deenergize at point F6. Contact 62A in opening when relay 62 deenergizes at point F16, removes battery from sequence relays 13 and 17 and from contacts as 327XX and 334XX of the zero switches closable by the contact closing wheels (Fig. 7) of the second rate step register and of the remainder register.

Incident to the deenergization of sequence relay 18 at point F14 shift relay 208 begins deenergization at point F14A and shift relay 209 begins energization at point F14B. Upon the energization of shift relay 209 at point F15 the first round of multiplication for the third or remainder rate step is initiated. That is, prior to such energization of shift relay 209, when sequence relay 18 deenergized at point F14, contact 18E impressed ground through contact 19D upon conductor 19K (Figs. 11 and 10), conductor 294 (Fig. 10) and conductors 294, 294A and 294B (Fig. 7). Since the remainder step quantity register (Fig. 6B) now stands at 12 the contact closing wheels 159B and 154B thereof (Figs. 6B and 7) will respectively close the No. 1 multiple contact switch (Fig. 7) pertaining to the tens order and the No. 2 multiple contact switch pertaining to the units order. Therefore the conductors 294A and 294B (Fig. 7) are effective through closed contacts 333 and 334 to respectively ground conductors 333A and 334A which lead through cable 166 into respective connection with contacts 209A and 209B of shift relay (Fig. 12A). These contacts, when the shift relay 209 energizes at point F15 to close them, are effective to extend the just traced grounded circuits through cable 201H to the counting relays 70 and 152 (Fig. 13) which thereupon begin energization for controlling entry of the first round of multiplication.

The deenergization of relay 16 at point F1 (chart section 12) closed contact 16E and grounded conductor 17H to ground rate bar 115B which is engaged by finger 115E pertaining to the digit 2. The finger 115E is in circuit with multiplier relay 290 in the lower group of multiplier relays (Fig. 10) which relay pertains to the digit or multiplier 2.

In the manner heretofore described the first and second rounds of multiplication for the third or remainder rate step quantity take place and in this instance 12 is twice entered on the number wheels 128 and 129. Neither of these multiplicaiton entries entails a carry-over. In the course of the first round of such multiplication sequence control relay 25 deenergizes at point F13 causing deenergization of sequence relay 19 at point F15 whereby at contact 19D the initial energization circuit for counting relays 70 and 152 is broken so that relay 70 is depotentialized at point F15A since stepping relay 45 is then energized.

It should be noted at this time that sequence relay 19, prior to the entry of 12 in the remainder quantity register of which the contact closing wheels 198B, 159B and 154B are shown in Fig. 7, obtained battery from contact 62A of control relay 62 (Fig. 11) through conductor 62C (Fig. 11), conductor 62X (Figs. 10 and 7), contacts as 334XX and conductor 19X. When the entry was under way in the remainder register the lobes on contact closing wheels 159B and 154B were removed from the zero position and permitted the closing of contacts as 334X so that the local battery 334Y was connected with conductor 19X and said relay 19. Each time a remainder entry is made in the remainder register the local battery 334Y will thus become effective to take the place of the battery at relay contact 62A preparatory to maintaining sequence relay 19 energized following deenergization of control relay 62 as at point F16 because of the back stop wheels of the consumption quantity register 56—57—58 (Fig. 2) being returned to zero.

In the course of this remainder step multiplication a conductor 20J, corresponding to the conductors 12J and 16J and grounded from contact 293X of energized multiplier relay 293 (Fig. 10), maintains relay 20 energized. Near the end of such multiplying operation the relay 293 is deenergized at point F17 whereby contact 293X is opened and sequence relay 20 is freed of its holding circuit and thereupon starts to deenergize at point F17A. The deenergization of sequence relay 20 at point F18 starts the deenergization of shift relay 209 at point F18A and, concurrently with this, shift relay 210 starts to energize at point F18B, ground being obtained through contact 20D from contact 22B.

Upon the initial energization of sequence relay 21, chart section 1, contact 21X closed whereupon at point C11B relay 168 started energization which was completed at point C71. The relay 168 continues energized throughout all of the above described operations but, upon the deenergization of sequence relay 20 at point F18, slow to release relay 168 starts deenergization at point F18C. Also upon the deenergization of sequence relay 20 at point F18, contact 20E established a circuit from ground and through contact 21D and conductor 21F (Figs. 11 and 9) to the contacts associated with the contact closing wheels 127B, 128B and 129B shown in Fig. 8. At this time these wheels stand at 155 with the number wheels 127, 128 and 129.

The control card (Fig. 16) associated with the contact bars and fingers shown in Fig. 9A is perforated for a high of 675 and a low of 125 in the manner explained hereinabove. Therefore, as fully explained hereinafter under the heading entitled Operation with designation for high and under the sub-heading entitled Operation with designation for low, if the number of wheels of Fig. 9 had stood at some amount above 675 or at some amount below 125 instead of at 155, selected of the fingers shown in Fig. 9A would have been grounded with the result that selected of the bars shown in Fig. 9A would have been grounded. The set of relays shown at the bottom of Fig. 13 below the three groups of counting relays include relays in circuit with the bars shown in Fig. 9A, and if the bars had been grounded in the manner just described selected of these relays would have been energized at this time, and if selected of these relays had been energized the unit including the wheel 435 (Fig. 8) would have been set in operation. Then, depending upon whether the amount to which the wheels shown in Fig. 9 were set was below 125 or above 675, the wheel 435 would have been advanced to display an L or an H to indicate that the computed charge was lower or higher than that usually computed for the customer to which the card under control of which the machine is operating pertains. In this instance however the amount 155 is within the range between the low of 125 and the high of 675 and hence none of the relays shown at the bottom of Fig. 13 is energized.

Incidentally it may be well to point out at this time that if a minimum charge operation had been instituted the wheel 435 would have been operated to display "Min." This alternative operation is fully described hereinafter under the sub-heading entitled Operation for minimum charge.

If any of the relays shown at the bottom of Fig. 13 had been locked up the sequence control relay 25 would have been placed under control of cut-off relay 427 (Fig. 13) and relay 64. Relay 64 would have energized upon the energization of relay 427 and thus the relay 25 would have ben deenergized to open contact 25B and deenergize sequence relay 21. While the relay 25 was thus deenergized, the control relay 168 would have deenergized at point F20, but obviously without effect upon said deenergized relay 25. Then following the entry of H, L or MIN upon the wheel 435 (Fig. 8) the cut-off relay 427 would deenergize, deenergizing relay 64 and thereby effecting energization of relay 25. In turn the energized relay 25 would cause deenergization of sequence relay 22 for initiating the next sequential operation, namely, that for holding the number wheels for reading and then returning them to zero.

It will be seen that the sequence relays 21 and 22 were deenergized incident to the just referred to contingent sequential operation preparatory to beginning the register reading and zero-setting operation. It is the function of slow-to-release relay 168 to cause deenergization of these two sequence relays during the principal operation of the machine when such contingent sequential operation does not occur, and so the machine will proceed immediately to the sequential operation of register reading and zero-setting. Thus, in the present instance where the cut-off relay 427 is not energized, the slow-to-release relay 168 by deenergizing at point F20 opens contact 168A to depotentialize sequence control relay 25 at point F20A. Upon the deenergization of relay 25 at point F21 sequence control relay 21 starts to release at point F21A.

The sequence control relay 25 deenergized while the movable contact of relay 168 was moving from engagement with contact 168A toward the contact 168B. Later, when this movable contact engages contact 168B, relay 25 starts to reenergize at point F22 and when relay 25 is reenergized at point F23 sequence relay 22 starts deenergization at point F23A. Relay 22 in deenergizing at point F24 closes contact 22E thereof whereby ground is applied through closed contact 23C to the winding of solenoid 170 which thereupon at point F24A begins energization completed at point F25.

*Chart sections 15 and 16—Register reading and zero-setting*

The solenoid 170 is so constructed that upon energization thereof its plunger 170AA descends slowly toward the movable switch element 170D, said plunger starting toward said element upon complete energization of the solenoid at point F25. During the time the plunger is so descending the various registers set up in the manner previously described are read. The standing of the registers at the time of reading in the present instance is as follows: The register 48—49—50 stands at 455; the register 75—76—77 stands at 404; the register 56—57—58 stands at 051; the register 97—98 stands at 14; the register 140—141 stands at 25; the register 198—159—154 stands at 012; and the register 127—128—129 stands at 155.

When the plunger of the solenoid 170 nears completion of its downward movement it first opens the contact 170A to break the energization circuit for sequence control relay 25 which therefore starts to deenergize at the point F26. Upon deenergization of the relay 25 at point F27 the contact 25B thereof opens causing deenergization of the relay 23 at point F27', whereupon the contact 23X opens so that the source of battery for relay 25 is isolated. All of the sequence relays shown in Fig. 11 are now deenergized.

Deenergized relay 23 also opens contact 23M to remove ground from the stick circuit for relay 61 which is thus caused to deenergize at point F28' and remain in this condition preparatory to a succeeding machine operation under control of a different record card or cards.

Subsequent to the opening of upper contact 170A by the plunger 170AA, the lower contact 170B is closed whereupon battery is applied through conductor 170C to relay 171, Fig. 6, which thereupon starts to energize at point F28. Upon energization of relay 171 at point F29, its contact 171B closes to establish a stick or holding circuit therefor, said relay 171 being thus held energized so long as any number wheel of any register is off zero. When sequence relay 23 deenergized at point F27', contact 23C opened to break the circuit for solenoid 170 which therefore at point F30 started deenergization that is completed at point F31. The plunger of thus deenergized solenoid 170 therefore started upwardly to open contact 170B and break the initial energization circuit for the master zero-setting relay 171, but since at this time contact 171B is closed, said relay 171 remains energized.

The energization of relay 171 at point F29 closed contact 171A thereof whereupon relay 172, (Fig. 2), relay 173 (Figs. 6A), and relay 174 (Fig. 8) started to energize at points F29A, F29B and F29C. The energization of relay 172 at point F32 causes the opening of contact 172X and the removing of the source of ground from conductor 172Y.

Also upon the energization of relay 172 those clutches as 48A associated with the number wheels as 48 in Fig. 2 standing off their zero positions, and which are thus connected through closed zero-setting contacts as 48E with contacts as 172Z of the relay 172, start to energize. Therefore, in the present instance, the clutches 48A, 49A, 50A, 57A, 58A, 75A and 77A start to energize at the points F32A to F32G, respectively.

Similarly, when the relay 173 (Fig. 6A) energizes at point F33, the clutches 97A, 98A, 140A, 141A, 159A and 154A start to energize at points F33A to F33F, respectively. Likewise, the clutches 127A, 128A and 129A, under control of relay 174 (Fig. 8), start to energize at the points F34A, F34B and F34C, respectively.

The foregoing are all of the clutches associated with number wheels that stand off their zero positions. The circuit to each of these clutches is established from ground at one side of the winding of the master zero-setting relay 171 (Fig. 6), through the winding of said relay, relay contact 171B, conductor 175, a contact as 172Z of the associated ancillary zero-setting relay as 172, the associated zero-setting contact as 48E and through the clutch as 48A to battery. Therefore, the relay 171 will remain energized so long as any of these number wheels is still off zero during the zero-setting sequential operation. The clutches as 48A associated with number wheels as 48 which are of zero energize and cause the units including such number wheels and zero-setting wheels as 48B to take rotative movement, and they continue such movement until near the time they attain their zero positions at which time the zero contacts as 48E associated therewith open and the clutches start to deenergize.

The number wheels 56, 57 and 58 of the consumption quantity register, unlike the wheels of the other registers, are rotated backwardly when being returned to zero. Thus the wheel 58 which is standing at 1 will, in the present instance, be the first wheel to attain zero position, the zero contact 58H opening at point F37 to depotentialize the clutch 58A, and upon deenergization of this clutch at the point F38 the wheel 58 stands at zero. It so happens that the next wheels to reach their zero positions are those that had stood at 5, these being the wheels 49, 50, 57, 141, 128 and 129. Shortly before these number wheels reach zero their respective zero contacts as 49E open, wherefore at the points F39A to F39F the clutches 49A, 50A, 57A, 141A, 128A and 129A are depotentialized, and at the points F40A to F40F these clutchces deenergize when the wheel units pertaining to said number wheels stand at zero.

Next, as the wheels 48, 75, 77 and 98, which stood at 4, approach their zero positions the zero contacts associated therewith open and initiate deenergization of the clutches 48A, 75A, 77A and 98A at points F41A to F41D, respectively. These clutches are therefore deenergized at points F49A to F49D at which time the wheel units of said number wheels stand at zero.

Next the wheels 140 and 154 approach their zero positions wherefore at the points F42A and F42B the zero contacts associated with these wheels open to depotentialize clutches 140A and 154A and cause their deenergization at the points F43A and F43B.

Lastly, the wheels 97, 159 and 127 approach their zero positions and when the zero contacts associated with these wheels open, the clutches 97A, 159A and 127A start to deenergize at points F44A to F44C. Upon the deenergization of these clutches at points F45A to F45C all registers will have returned to zero.

When the last wheels to approach their zero positions cause their associated zero contacts as 97C to open, battery is thus removed from the conductor 175 wherefore the master zero-setting relay 171 starts to release at the point F44D. The relay 171 deenergizes at the point F46 to open its contact 171A so that at the points F46A to F46C the relays 172, 173 and 174 are respectively depotentialized, and when these relays deenergize at the points F47A to F47C they are in condition for the start of a succeeding machine operation.

It will be recalled that at the time the contact closing wheel 58D was returned to zero, this being the last of such wheels of the consumption quantity register to return to zero, the contacts 60D were closed and completed a circuit from ground at contact 172X (Fig. 2) through conductor 60E (Figs. 2 and 7), contact 329 of the No. 1 switch in the 507 group of switches (Fig. 7), the No. 1 contact finger 184C (Fig. 7D), bar 184, conductor 185D and relay 185 (Fig. 11) to battery and thus caused the relay 185 to energize at point XY in chart section 13. Therefore, when the relay 172 energized at point F32 and opened the contact 172X the relay 185 was depotentialized at the point F32H. By the time the relay 172 was deenergized at the point F47A the first step register (Fig. 6) had been returned to zero so that the contact closing wheels 97B and 98B thereof (Fig. 7) stood at zero, and hence the reimpression of ground from contact 172X upon the conductor 60E was effective through then closed contacts 97X, 97XXX and 98XX (Fig. 7), the zero contact fingers 184E, 184H and 184G (Fig. 7D), the bars 184, 184A and 184B, and the conductors 185D and 186D for causing energization of the relays 185 and 186 at the points F51 and F52 preparatory to a subsequent machine operation under control of a different record card or cards.

Carry-over in consumption quantity subtraction

When it happens that the previous meter reading involves a digit of higher numerical significance than the digit in the same order of the last meter reading, the second sequential operation of the machine will necessarily entail the entry of a negative carry-over to enable the consumption quantity register 56—57—58 to finally display the true difference between the meter readings. The example used to explain such an action occurring during operation of the machine assumes a last meter reading of 455 and a previous meter reading of 436. During the first sequential operation of the machine the amount 455 will be entered additively upon the number wheels in the registers 48—49—50 and 56—57—58. During the second sequential operation, incident to entering the previous meter reading 436, the number wheels of the previous meter reading register 75—76—77 will be advanced by the amount of such meter reading whereas the number wheels of the consumption quantity register 56—57—58 will be moved subtractively the same amount.

At the end of these two sequential operations the consumption quantity register should stand at 019, but if it were not for the negative carry-over operation now to be explained, the number wheel 58 which was first advanced to 5 and later rotated subtractively from 5 through 0 to 9, would stand at 9, whereas number wheel 57 which was first advanced 5 and then rotated subtractively three digital positions would stand at 2. The number wheel 56 which was first advanced from 0 to 4 and later rotated subtractively four digital positions would stand at 0. In other words, the consumption quantity register would read 029. The purpose of the negative carry-over operation, in this instance, is to subtractively rotate the tens order number wheel 57 and its associated parts one digital position so that the register will display the corrected reading 019.

Referring now to the timing chart shown in Fig. 43 the point G1 upon the line pertaining to stepping relay 46 indicates the time that 0 is entered on the number wheel 58 during the aforementioned time while the number wheel 58 is being rotated subtractively from 5 through 0 to 9. It will be understood from the preceding part of this specification that such subtractive rotation of the number wheel 58 is accomplished by energizing the clutches 80A and 58G whereby said number wheel is driven from the constantly rotating shaft 322. Therefore, the clutches 80A and 58G are shown energized at the point where the machine operation is picked up by the chart in Fig. 43. Number wheel 77 of the previous reading register is also being rotated at this time and so the clutch 77A is also shown energized during energization of the clutches 80A and 58G.

At the beginning of this sequential operation, when the cut-off relay 44 energized and closed contact 44F, relays 64 and 169 energized and this energization of the relay 64 caused deenergization of sequence control relay 25. Therefore, in the left-hand section of the chart (Fig. 43) relays 64 and 169 are shown energized while the relay 25 is shown deenergized. Sequence relays 8 and 9, which pertain to the third sequential operation will still be energized as shown in the left-hand section of the chart. And it will be understood that shift relay 202 pertaining to the second sequential operation will be energized, whereas the shift relay 203 will yet be unenergized. By the time the digit 0 is entered upon the number wheel 58 at said point G1 the counting relay 152B, and all units order counting relays of higher numerical value will have been deenergized.

Shortly following such entry of the digit 0 upon the number wheel 58, the shunting contact 77D is closed by a lobe upon the shunting wheel 77B whereby ground is impressed upon conductor 74A (Fig. 2) and stepping relay 46 (Fig. 13) is thus caused to deenergize at point G2. Thus counting relay 152C is depotentialized at point G2A. Shortly before the number wheel 77 is advanced the six digital positions and the number wheel 58 is rotated subtractively the six digital positions, shunt is removed at the shunting contact 77D, permitting reenergization of stepping relay 46 at point G3 to cause deenergization of cut-off relay 44 at point G4. Deenergized cut-off relay 44 opens contacts 44C, 44D and 44E to break the energization circuits for stepping relay 46 and clutch 77A, and clutches 58G and 80A, which parts begin deenergization respectively at points G4A, G4B, G4C, and G4D. When the clutches 58G and 80A deenergize at points G5 and G5A the number wheel 58 will come to rest while displaying the digit 9. When the clutch 77A deenergizes at point G5B the number wheel 77 will come to rest at 6.

The point G6 upon the line pertaining to stepping relay 46 indicates a time midway between the entry of the digit 0 at point G1 and the entry of the digit 9 at the point G7. At the time indicated by the point G6 the lobe on carry-over wheel 58W (Fig. 2) passed beneath and momentarily closed carry-over contact 58J, impressing ground upon conductor 74L. This grounded circuit of which the conductor 74L is a part continues through cable 74 (Figs. 2 and 12), closed shift relay contact L2, a conductor in cable 201K, conductor L (Fig. 14) and carry-over relay 110 to battery. In this manner the carry-over counting relays 110, 111 and the carry-over cut-off relay 113 are caused to successively energize at the points G8, G9 and G10.

When the cut-off relay 44 deenergized at point G4, the contact 44F thereof in opening depotentialized the relays 64 and 169 at points G4E and G4F. The relay 64 therefore deenergized at point G11, closing all of its contacts. The contact Y then established a circuit through conductor 25D, contact Z of now energized carry-over cut-off relay 113 and conductor 169C to the left-hand winding of the relay 169 and battery wherefore at point G11A the relay 169 was picked up before deenergizing and caused to become again fully energized at the point G12. Deenergized relay 64 in closing its contacts also established a circuit from ground at contact Y through contact 113C, carry-over stepping relay 112, contact 64A and conductor K. Ground from the contact Y was also impressed through contacts 113D and 113E upon conductors N and M which also lead into the cable 201K. These grounded conductors K, N and M are parts of respective circuits which include conductors in the cable 201K, contacts K2, N2 and M2 of shift relay 202 (Fig. 12), conductors in the cable 74 (Figs. 12 and 2), and conductors 74K, 74N and 74M which lead to the clutch 57N, one side of shunting contact 57L and to the clutch 79C. Thus ground is provided for the shunting contact 57L, and the clutches 57N and 79C are potentialized at points G11A and G11B. The carry-over stepping relay 112 which is in series with the circuit including the clutch 57N is simultaneously potentialized at point G11C.

When the clutches 57N and 79C energize at points G13 and G13A a driving connection will be established between the constantly rotating shaft 322 and both the right-hand and left-hand assemblies of the unit pertaining to the number wheel 57 whereby said unit begins backward rotation. During this rotation the grounded shunting contact 57L is effective for shunting out and permitting reenergization of the carry-over stepping relay 112, in the manner hereinabove described with respect to other shunting contacts, so that the carry-over counting relays are caused to successively deenergize. And in turn, shortly before the number wheel 57 is moved backwardly one digital position, the carry-over cut-off relay 113 is caused to deenergize at point G15, opening contacts 113C, 113D and 113E whereby the clutches 57N and 79C are depotentialized at point G15A and G15B and ground is removed from the shunting contact 57L. The carry-over stepping relay 112 is depotentialized at point G15C. When the clutches 57N and 79C eventually deenergize at points G16 and G16A the entire unit pertaining to the number wheel 57 will have been moved backwardly one digital position wherefore the number wheel 57 then displays the digit 1 and the consumption quantity register 56—57—58 displays the reading 019 which is the difference between the last meter reading 455 and the previous meter reading 436.

The carry-over cut-off relay 113 in deenergizing at point G15 closed contact X, to complete the circuit from ground at contact Y whereby the sequence control relay 25 is caused to energize at point G18 to in turn bring about the deenergization of sequence relay 8 at point G19, the depotentialization of shift relay 202 at point G19 and the potentialization of shift relay 203 at point G19B incident to starting the succeeding sequential operation of the machine, which in this instance would be the sensing of the first rate step quantity 14 and entering this amount in the first step register 97—98 (Fig. 6).

*Operation for minimum charge*

The minimum charge operation of the machine is initiated during the third sequential operation of the machine if the consumption quantity is equal to or below a selected quantity. The illustration now to be given, with reference to the timing chart appearing in Figs. 44 and 45, assumes a control card with the same office perforations as that employed during the principal operation of the machine first described. However, the meter card is perforated for a last reading of 455 and a previous reading of 443 to give a consumption of 12. It will be recalled that the office card is perforated for effecting a minimum charge operation when the consumption quantity is 12 or less. The minimum money charge is 48 as represented by the perforations in the office card (Fig. 16).

The chart (Figs. 44 and 45) picks up the machine operation during the third sequential operation at the time indicated by the vertical chart line H. The machine will have operated during the first sequential operation to have set up the amount 455 in the last meter reading register 48—49—50 and in the consumption quantity register 56—57—58. During the second sequential operation the machine will have functioned to enter the amount 443 in the previous meter reading register 75—76—77 and to move the number wheels of the consumption quantity register 56—57—58 subtractively in the amount 443, so that at the end of this second sequential operation the consumption quantity register will read 012.

During the third sequential operation the amount of the consumption quantity 12 is entered upon the first step register 97—98 (Fig. 6) while the contact closing wheels of the consumption quantity register are set backwardly by the amount 12 to zero. Inasmuch as the wheels 98 and 58D are moved two digital positions whereas the wheels 97 and 57D are moved but one digital position, the clutches 98A and 108A, which are energized to cause such movement of the wheels 98 and 58D, will be the last to deenergize, such deenergization occurring at points H1 and H1A (Fig. 45) concurrently with the contact closing wheel 58D reaching zero. Shortly prior to this, the shunting contact 98E had removed ground from conductor 102A (Fig. 6) and thus permitted reenergization of the units order stepping relay 46 at the point H2, this being subsequent to the deenergization of the units order counting relays in Fig. 13. Therefore, when the stepping relay 46 energized at point H2 the cut-off relay 44 was depotentialized at point H2A and later deenergized at point H3 to cause depotentialization of the stepping relay 46 at point H3A and of the clutches 98A and 108A at the points H3B and H3C.

So long as the cut-off relay 44 had remained energized and the contact 44F thereof closed, ground was impressed upon the relays 64 and 169, holding the same energized, but when cut-off relay 44 deenergized at the point H3 this source of ground was removed whereupon the relays 64 and 169 depotentialized at points H3D and H3E. When relay 64 deenergized at point H4, contact Y closed, causing energization of sequence control relay 25 at point H5.

It will be understood that the sequence relays 8 and 9 will have been deenergized near the beginning of the third sequential operation pursuant to which the entry of 12 is effected in the first step register (Fig. 6). Therefore, upon the energization of sequence control relay 25 at point H5 the next even numbered sequence relay, 10, will be depotentialized at point H5A. When sequence relay 10 deenergizes at point H6, it opens contact 10B to depotentialize shift relay 203 at point H6A, and closes contact 10D to establish a circuit for potentializing the shift relay 204 at point H6B. This shift relay 204 which is for establishing circuits for effecting the first rate step multiplication is not to be effective in the present operation and therefore will be subsequently deenergized before the circuits controlled through contacts thereof become operative. This deenergization of the shift relay 204 is brought about automatically in the manner presently to be described. It will be apparent that the shift relay 205, which has to do with the minimum charge operation, is to be energized instead of the shift relay 204, and the means for causing energization of the shift relay 205 will also be explained shortly.

When the consumption quantity register wheel 58D is returned to zero at the time indicated by the point H1A on the line pertaining to the clutch 108A, all of the back stop wheels 56C, 57C and 58C will have been returned to their zero positions with the notches in their peripheries in registry with the back stop lugs as 58X whereby the back stop bar 60 is permitted to move radially inwardly of such wheels for opening the contacts 60B and closing the contacts 60D. This opening of the contacts 60B removes ground from conductor 60C (Figs. 2 and 11) whereby the right-hand winding of control relay 61 is depotentialized and the control relay 62 is depotentialized at the time indicated by the point H1B. When relay 62 deenergizes at point H8 contact 62A thereof in opening removes battery from sequence relays 13, 15, 17 and 19 which are thus depotentialized at the points H8A to H8D, inclusive. The battery at contact 62A was directly supplied to the relays 13 and 17 through conductor 62C, and indirectly to the relays 15 and 19 through the conductor 62X (Figs. 11, 10 and 7), conductor 62XX (Fig. 7), contacts as 327XX and 334XX (Fig. 7), the contact closing wheels as 141 and 154 of the second step register in the remainder register now standing at zero, and conductors 15X and 19X (Figs. 7, 10 and 11).

The contacts 60D (Fig. 2) in closing impress ground upon conductor 60E (Figs. 2 and 7), and since at this time the contact closing wheels 97B and 98B of the first step register stand respectively at 1 and 2, the grounded conductor 60E will complete circuits through contacts 329, 330 and 331 of the multiple contact switches in Fig. 7. From the contacts 329 and 330 circuits are extended through conductors 329A and 330A which respectively connect with No. 1 conductors in cables 101A and 101B whereby the No. 1 fingers 184C and 184K (Fig. 7D) are grounded. Since a perforation 184CC (Fig. 16) is aligned with finger 184C, the bar 184 will be grounded. No perforation is aligned with the finger 184K which in this instance is therefore ineffective. The circuit from said switch contact 331 is continued through conductor 331A and through the No. 2 conductor in cable 101C to the No. 2 contact finger 184D which is permitted to engage the bar 184B through card perforation 184DD (Fig. 16), and thus the bar 184B is grounded. The grounded bars 184 and 184B ground conductors 185D and 186D (Figs. 7D and 11) wherefore the control relays 185 and 186 are potentialized at points H1C and H1D concurrently with the wheel 58D (Fig. 2) arriving at zero and with the contacts 60D (Fig. 2) being closed. When relays 185 and 186 energize at points H9 and H9A a circuit is completed from battery through contacts 186A and 185A, through relay 187 and contacts 61A and 62B to ground, relay 62 having previously deenergized at point H8. Thus relay 187 is caused to energize at point H10. This relay 187 when energizing opens contact 187A, removing battery from sequence relays 11 and 21 which therefore deenergize at points H11 and H11A. Since sequence control relay 25 is energized at this time and since the other sequence relays as 19 having contacts for grounding the conductor 20F are deenergized, the deenergization of sequence relay 11 causes the deenergization of sequence relays 12 and 20 at points H12 and H12A. Previously, when the relays 13, 15 and 17 deenergized at points H13, H13A and H13B, while the sequence control relay 25 was energized, the even numbered sequence relays 14, 16 and 18 were caused to deenergize at points H14, H14A and H14B. Therefore, after the deenergization of sequence relay 20 at point H12A the only sequence relays remaining energized are the relays 22 and 23, relay 22 being held energized from contact 194A of slow relay 194 which was energized from contact 3X (Fig. 2) of the shift relay 203 when such shift relay was energized.

The closing of contact 187D of energized relay 187 causes the impression of battery upon control relay 188 which thereafter energizes at point H15 and locks up through its contact 188A and conductor 188C to battery at contact 23E of sequence relay 23. Contact 188B is opened, breaking the circuit from ground at contact 23M for the left-hand winding of control relay 61, wherefore this relay begins deenergization at point H15A and later deenergizes at point H16.

Referring again to control relay 187, such relay upon its energization at point H10 also opened contact 187X to remove ground from conductor 279 (Figs. 11 and 10) and from contact 278A and from the right-hand contacts of the multiplier relays in the lower row of such relays as 275 for controlling first step multiplication. Such removal of ground from the contact 278A causes deenergization of multiplier relay 275 at point H17. And the removal of ground from the right-hand contacts of said lower row of relays as 275 causes simultaneous deenergization of the energized relays in the upper row of said multiplier relays at the points H17A to H17D, respectively. Deenergized multiplier relay 276 in opening its left-hand contact breaks the holding circuit for multiplier relay 280 which is therefore caused to deenergize at point H18. Similarly, the multiplier relays 280A and 280C open their left-hand contacts and cause the simultaneous deenergization of multiplier relays 280B and 280D at the points H18A and H18B. When the multiplier relay 281 deenergized at point H17D its left-hand armature 281X removed ground from conductor 20J to break the holding circuit for sequence relay 20 whereby this relay was permitted to deenergize at point H12A following the deenergization of sequence relay 11 at point H11 as explained above.

When sequence relay 18 deenergized at point H14B, contact 18D in closing completed the energization circuit for and started energization of shift relay 209 at point H14C, but prior to the complete energization of this shift relay, it is depotentialized at point H12B when the relay 20 deenergizes at point H12A and consequently the contacts of this shift relay are not closed and play no part in the present machine operation. Likewise, the shift relay 204, which is for closing circuits used only during a normal fourth sequential operation for first rate step multiplication, is depotentialized at point H12C upon the deenergization of sequence relay 12 at point H12 and the opening of contact 12B. It will be noted that the shift relay 204 completed energization at point H19, thereby closing contact 4X, but without energizing the multiplier control relays 283 and 278 in Fig. 10 because the circuit closed by the contact 4X is open both at contact 169A of deenergized relay 169 (Fig. 14) and at contact 281C of the multiplier relay 281 (Fig. 10).

Referring again to the relay 187 which energized at point H10, contact 187C of said relay in closing impressed ground from contact 62B upon conductor 187F (Figs. 11 and 1) and bars 189, 189A, 189B and 189E. A perforation 189GG (Fig. 16) in the control card permits the finger 189G (Fig. 1) to engage the bar 189E and thus impress ground upon the conductor 189H (Figs. 1 and 13) wherefore the counting relay 425 is energized at point H20. In turn the counting relay 426 and the cut-off relay 427 successively energize at points H21 and H22 in the manner now well understood.

Card perforations 189CC and 189DD representative of the minimum charge monetary amount $0.48 permit the fingers 189C and 189D to engage the grounded bars 189A and 189B whereby conductors within the cable 190 (Figs. 1 and 12) are grounded and ground the contacts 205A and 205B of shift relay 205. Subsequently the contacts of shift relay 205 are closed upon the energization of shift relay 205 at point H23, such energization of the shift relay having been initiated at point H24B when contact 91A of control relay 91 (Fig. 11) closed. Control relay 91 was potentialized upon energization of relays 185 and 186 and ultimately energized at point H24. Energized relay 91 was also effective for opening contact 91B thereby breaking the circuit for shift relay 210 so that such shift relay failed to energize upon the closing of contact 20D when sequence relay 20 deenergized at point H12A.

When the sequence relay 205 energized at point H23 and closed its several contacts the grounded contacts 205A and 205B were effective for grounding conductors in the cable 201H for energizing counting relays 192 and 124 (Fig. 13) which are representative of the numerical amount 48, these relays energizing at the points H25 and H26. Counting relays of lower numerical value than the relays 192 and 124 successively lock up as do the cut-off relays 43, and 44 at the points H27 and H28. But prior to the energization of the cut-off relays 43 and 44 the cut-off relay 427 energized at point H22, closing contact 427F and thereby impressing ground upon the conductor 64X and the relays 64 and 169 which were thus caused to energize at the points H29 and H30. Thus energized relay 64 caused deenergization of sequence control relay 25 at point H31.

Deenergized sequence control relay 25 through its contact 25C now provides a holding circuit for sequence relay 22, wherefore the slow relay 194, which began deenergization at point H32 upon the deenergization of the shift relay 203, deenergizes at point H33 without effect, it having served its purpose of holding relay 22 energized while the relay 25 was energized.

Contact 427C of cut-off relays 427 (Fig. 13) in closing prepared a circuit from ground through stepping relay 428, conductor T (Figs. 13 and 14), a conductor in the cable 201K, contact T5 of shift relay 205, a conductor in the cable 126 (Figs. 12 and 8), conductor 126T and the clutch 435A to battery, resulting in simultaneous potentialization of the stepping relay 428 and the clutch 435A at the points H23A and H23B at the time the shift relay 205 energizes at point H23 to complete said circuit. Rotation of the indicator wheel 435 commences upon the energization of the clutch 435A at point H34 and during rotation of this wheel unit the shunting wheel 435D thereof co-acts with the shunting contact 435E for momentarily impressing ground upon the conductor 126T and thus deenergizing and permitting reenergization of the stepping relay 428 in the manner previously described for causing successive deenergization of the counting relay 426 and the cut-off relay 427. In this manner the clutch 435A is eventually caused to deenergize at the point H35 concurrently with the indicator wheel 435 having been advanced one position to display the indicator character MIN.

The money register 127—128—129 (Fig. 8) is controlled from the contacts of the cut-off relays 43 and 44. Cut-off relay 43 when energizing at point H27 closes its contact 43C thereby impressing ground upon a circuit including the conductor 45C, stepping relay 45 and conductor D. Cut-off relay 44 in energizing at point H28 closes contact 44C, thus impressing ground upon a circuit including conductor 46C, stepping relay 46 and conductor A. These circuits including the conductors A and D (Figs. 13 and 14) are continued through conductors in the cable 201K, contacts A5 and D5 of shift relay 205, conductors in cable 126 (Figs. 12 and 8), conductors 126A and 126D and clutches 129A and 128A to battery. Therefore, the stepping relay 45 and the clutch 128A are simultaneously potentialized at points H27A and H27B upon the energization of the cut-off relay 43 at point H27, and the stepping relay 46 and the clutch 129A are simultaneously potentialized at points H28A and H28B upon the energization of the cut-off relay 44 at point H28. Then as hereinabove described the number wheel units pertaining to the number wheels 128 and 129 are caused to rotate under control of the counting relays locked up in the tens and units orders. The number wheel 128 is advanced four digital positions because of there being four pairs of relays locked up in the tens order, the number wheel ceasing rotation incident to the deenergization of the clutch 128A during the period of time represented by the space between vertical chart lines AA and BB. Following the eventual deenergization of cut-off relay 44 at point H36, the stepping relay 46 and the clutch 129A are depotentialized at points H36A and H36B wherefore said clutch is caused to deenergize at point H37 concurrently with the number wheel 129 reaching 8.

At this time the money register 127—128—129 will read 048 which reading has the monetary significance of $0.48; and the indicator wheel 435 will display the character MIN to show that an entry of minimum charge has been made in the money register.

Returning now to the first section of the minimum charge chart (Figs. 44 and 45) it will be noted that upon deenergization of the relay 61 at point H16 and the opening of the contact 61A that the relay 187 was depotentialized at point H38, opening contact 187C whereby ground was removed from the bars 189, 189A, 189B and 189E (Fig. 1) to permit deenergization of the counting relays under control of their respectively associated stepping relays as 45. Contact 187D of thus deenergized relay 187 removed battery from relay 188 which remained energized through its holding circuit including the contact 188A. Still referring to said first chart section it will be seen that at point H39 the slow relay 168 was depotentialized upon the deenergization of sequence relay 21 and the opening of contact 21X. Subsequently the relay 168 deenergized at point H40, opening contact 168A and closing contact 168B. It will be recalled that during the principal operation of the machine described hereinabove with reference to the first chart that this opening of the contact 168A was effective for causing deenergization of sequence control relay 25 and subsequent energization of that relay when contact 168B closed. In the principal operation of the machine this deenergization and reenergization of the relay 25 occurred following deenergization of sequence relay 20 and was for the purpose of causing deenergization of the sequence relays 21 and 22, but during the present operation involving entry of a minimum charge the relay 21 is already deenergized as is the relay 25 so that the breaking of the energization circuit for the relay 25 by opening the contact 168A is without effect as is also the reestablishing of that circuit by the closing of the contact 168B.

Referring now to the second section of the minimum charge chart, it will be seen that deenergized cut-off relay 44 is the last of the cut-off relays to deenergize and in so doing opens contact 44F to remove ground from relays 64 and 169 which are thus caused to deenergize at points H41 and H42. Contact Y is thus closed causing energization of sequence control relay 25 at point H43 wherefore sequence relay 22 is deenergized at point H44.

Contact 22E of deenergized relay 22 closes, establishing the energization circuit for the winding in timed delay solenoid 170 which, therefore, at point H44A, begins energization later completed at point H45. Ultimately, as explained hereinabove, the plunger 170AA of the solenoid 170 is lowered sufficiently far to cause the opening of contact 170A and break the energization circuit for sequence control relay 25 which therefore deenergizes at point H46 to cause deenergization of the last of the sequence relay 23 at point H47. When the relay 23 deenergizes at point H47 contact 23E opens, breaking the energization circuit for control relay 91 which therefore deenergizes at point H48, opening contact 91A and breaking the energization circuit for shift relay 205 which is thus depotentialized at point H48A. Likewise, the opening of contact 23E breaks the holding circuit for relay 188 which therefore deenergizes at point H49.

When the plunger 170AA reaches the lower limit of its stroke the contact 170B will be closed completing a circuit for the primary zero setting relay 171 (Fig. 6) which is therefore caused to energize at point H50 to cause energization of the auxiliary zero setting relays 172, 173 and 174 at the points H51, H51A and H51B in the manner hereinabove described for initiating the zero setting operation. The zero setting operation then takes place in the manner identical with that already described.

*Operation with no consumption*

When the control card (Fig. 16) is perforated for a minimum money charge, the amount of this charge will be entered in the machine when the consumption quantity is below an amount indicated by the minimum consumption perforations in said card for registry with the minimum consumption bars (Fig. 7D). In the present instance this minimum consumption quantity is 12 consumption units so that whenever the consumption is 12 or less, including zero, the minimum charge amount represented by card perforations in registry with the minimum charge bars 189, 189A and 189B (Fig. 1) will be caused to be entered in the register in Fig. 8.

It may be assumed for the present illustration that the last meter reading was 455 and that the previous meter reading was also 455 wherefore the consumption will be zero. The operation is illustrated in the timing chart shown in Figs. 46 and 47, which timing chart picks up the machine operation during the second sequential operation shortly prior to the entry of the previous reading 455 in the previous reading register 75—76—77 and in the consumption quantity register 56—57—58, the amount 455 being negatively entered in said consumption quantity register. Since the digits 5 are being entered in the tens and units orders of these registers, whereas the digits 4 are being entered in the hundreds orders thereof, the cut-off relays 43 and 44 (Fig. 13) pertaining to the tens and units orders will be the last to deenergize near the end of the entry operation, as indicated at points J1 and J1A. This deenergization of the cut-off relays 43 and 44 results in the deenergization of their respectively associated stepping relays 45 and 46 at the points J2 and J2A. Deenergized cut-off relay 43, as will now be clearly understood, also opened the energization circuits for the clutches 57G and 79A which had established the driving connection for the number wheel 57 of the consumption quantity register and the circuit for the clutch 76A which had established the driving connection for the number wheel 76 of the previous reading register, wherefore these clutches were caused to deenergize at the points J3, J3A and J3B. Similarly, the cut-off relay 44 in deenergizing at the point J1A, opened the energization circuits for the clutches 58G and 80A which had established the driving connection for the number wheel 58 in the consumption quantity register and the circuit for the clutch 77A which had established the driving connection for the number wheel 77 in the previous reading register, wherefore these clutches were caused to simultaneously deenergize at the points J3C, J3D and J3E.

Deenergized cut-off relays 43 and 44 broke the energization circuit for relays 64 and 169 which were thus caused to deenergize at points J2B and J4. Deenergized cut-off relay 64 closed contact Y so that sequence control relay 25 was energized at point J5 and in turn caused deenergization of sequence relay 8 at the point J6, it being understood that the sequence relays 4 and 5 were deenergized near the beginning of the first sequential operation and that the sequence relays 6 and 7 were deenergized near the beginning of the second sequential operation.

Contact 8D of deenergized relays 8 impresses ground from contact 10B of sequence relay 10 upon the shift magnet 99 associated with the shift relay 203, causing potentialization of this shift relay at point J6A. It will be noted that this shift relay which is connected for establishing circuits energizable to cause entry of the first step quantity in the register (Fig. 6), is not to be effective during the present operation since there is no first step quantity. Therefore, subsequent to the energization of such shift relay at the point J7, it will be deenergized in the manner presently explained before the circuits momentarily closed thereby have been energized.

Deenergized sequence relay 8 in opening its contact 8B breaks the energization circuit for sequence relay 202 which therefore deenergizes at the point J8. Contact 8E of deenergized relay 8 established a circuit through contact 9L and conductor 9G (Figs. 11, 5A, 5 and 4) to the low bar 86. From the thus grounded bar 86 circuit is extended through contact finger 86K, which is permitted to engage the bar 86 through card perforation 86KK, conductor 86T, contact 86U of the No. 0 multiple contact switch now closed by the contact closing wheel 57D of the consumption quantity register, conductor 86V, vertical conductor 316C, "Low" relay 313, conductor 313X (Figs. 4 and 3) and contact 310D of the relay 310 to battery. In this manner the "Low" relay 313 is potentialized at the point J6A. Since, however, the units order number wheel 58D of the consumption quantity register now stands at 0 the energization of the "Low" relay 313 at point J9 will be without effect.

Contact 8E of deenergized sequence relay 8 also establishes a circuit through contact 9D, conductor 9H (Figs. 11 and 10), contact bar 115, No. 4 contact finger 115C and conductor 115F to the first step multiplier relay 275 of the No. 4 pair of such relays, whereby this relay is potentialized at the point J6B.

The present machine operation differs from the aforedescribed minimum charge operation insofar as the contact closing wheels 57D of the consumption quantity register are returned to zero during the second sequential operation instead of the third sequential operation since the last and previous meter readings are identical. When the contact closing wheels of the consumption quantity register as 57D were returned to zero at the time indicated by the point J3 on the line pertaining to the clutch 57G, all of the notches in the backstop wheels as 57C were aligned with the members as 57X so that the bar 60 was permitted to move radially inwardly of the back stop wheels to close the contacts 60D and to open the contacts 60B.

Contacts 60B upon opening removed ground from conductor 60C (Figs. 2 and 11) to depotentialize the right-hand winding of slow relay 61 and to depotentialize the control relay 62 at the point J3F. In this manner contact 62A was opened to remove the source of ground for the windings of sequence relays 13, 15, 17 and 19, such battery being removed from the relays 13 and 17 directly through the conductor 62C but being removed from the relays 15 and 19 through said conductor 62C, contacts as 327XX and 334XX (Fig. 7) and the conductors 15X and 19X (Figs. 7 and 11), it being understood that the No. 0 multiple contact switches associated with the contact closing wheels as 141B and 154B (Fig. 7) are now closed since the second step register and the remainder register have not been moved off zero. It follows that when the control relay 62 deenergizes at point J10 the relays 13, 15, 17 and 19 are depotentialized at the points J10A to J10D. And since the sequence control relay 25 is now energized, the sequence relays 14, 16 and 18 are depotentialized at points J11, J11A and J11B upon the deenergization of sequence relays 13, 15, and 17. The sequence relay 20 does not deenergize at this time because sequence relays 9 and 11 are still energized and impress ground through their contacts as 9E upon the conductor 20F which provides a holding circuit for the relay 20.

When the contacts 60D (Fig. 2) were closed at the time the contact closing wheels of the consumption quantity register were returned to zero, ground was impressed upon conductor 60E (Figs. 2 and 7) and therefore upon the contacts 97XX and 97XXX and contact 98XX of the No. 0 multiple contact switches associated with the contact closing wheels 97B and 98B of the first step register. And inasmuch as this register now stands at zero these contacts will be closed wherefore ground from the conductor 60E is impressed through the contacts 97XX and 97XXX upon the No. 0 conductors in the cables 101A and 101B (Figs. 7 and 7D) and thence upon the No. 0 fingers 184E and 184H which are permitted to engage the minimum consumption bars 184 and 184A through card perforations 184EE and 184HH of the control card (Fig. 16). Grounded contact 98XX impresses ground through the No. 0 conductor in the cable 101C and the No. 0 contact finger 184G upon the minimum consumption bar 184B (Fig. 7D). The thus grounded bar 184 grounds the conductor 185D while the bars 184A and 184B ground the conductor 186D. The conductors 185D and 186D reappear in Fig. 11 where they are connected with the windings of control relays 185 and 186. It will therefore be seen that upon the return of the contact closing wheels of the consumption quantity register (Fig. 2) to zero, the control relays 185 and 186 will be potentialized at the points J3G and J3H.

When the relays 185 and 186 energize at the points J12 and J12A, a circuit will be closed from battery at the relay 186 through contacts 186A, 185A, relay 187, contact 61A and contact 62B of now deenergized relay 62 to ground whereby the relay 187 is caused to energize at the point J13. Contact 187D of energized relay 187 impresses battery upon the relay 188 which in energizing at the point J14 closes its contact 188A to provide a holding circuit for itself from battery at contact 23E. Contact 188B opens, breaking the holding circuit to contact 61B for the slow relay 61 which therefore begins deenergization at the point J14A. Contact 187A upon opening removes battery from sequence relays 9, 11 and 21 which consequently begin deenergization at the points J13A, J13B and J13C. When the relay 9 subsequently deenergizes at the point J15, it opens contact 9G and breaks the energization circuit for the "Low" relay 313 which then begins deenergization at the point J15A. Contact 9D upon opening breaks the energization circuit for the multiplier relay 275, permitting depotentialization of this relay at the point J15B.

Upon the deenergization of sequence relay 9 at the point J15 the sequence relay 10 was depotentialized, and when this relay deenergized at point J16, contact 10B opened breaking the energization circuit for the shift relay 203 which was therefore depotentialized at the point J16A. When this shift relay 203 subsequently deenergizes at the point J17; its contacts open so that it will be prevented from completing unwanted circuits in the present sequential operation. Deenergized relays 9 and 11 in opening their contacts as 9E removed ground from conductor 20F and thus permitted deenergization of sequence relay 20 at point J18 inasmuch as the sequence relay 25 is now energized. Likewise, since there is no ground on the conductor 12J at this time, the sequence relay 12 is free to deenergize at point J16B following deenergization of the sequence relay 11.

Previously, when the sequence relay 18 deenergized at the point J19 and closed contact 18D, the energization circuit for the shift relay 209 was established and this shift relay began energization at the point J19A, but before this shift relay had time to energize, the sequence relay 20 deenergized at the point J18 to break said energization circuit for said shift relay which was therefore depotentialized at the point J18A. Thus the shift relay 209 is prevented from closing its contacts and establishing unwanted circuits during the present sequential operation.

Returning now to the relay 187 (Fig. 11), when this relay energized at the point J13, it also opened contact 187X to remove ground from conductor 279 (Figs. 11 and 10) and from the contact 278A of the relay 278 and from the right-hand contacts of each of the first step multiplier relays in the lower row of such relays. Such removal of ground from the contact 278A broke the holding circuit for multiplier relay 275, making this relay free to be depotentialized at the point J15D when sequence relay 9 deenergized and removed the initial source of energization for this relay as above described. Removal of ground from the conductor 279 and hence from said right-hand contacts of the lower row of multiplier relays removed the only source of ground from the upper row of such relays as the relay 276 wherefore any energized of such relays, which in this instance is only the relay 276, begin deenergization. The relay 276 is shown as beginning such deenergization at the point J13D. The relay 280A had only begun to energize, following energization of the relay 280, and was depotentialized at the point J13E. Since the source of ground through conductor 279 for the other multiplier relays is removed before they have time to energize, such other relays 280B, 280C, 280D and 281 do not energize.

Relay 187 upon energizing also closed contact 187C to impress ground from contact 62B upon the conductor 187F (Figs. 11 and 1) and upon the minimum charge bars 189, 189A, 189B and the bar 189E. Grounded bar 189E is engaged by contact finger 189G whereby the conductor 189H (Figs. 1 and 13) is grounded to cause successive energization of the relays 425, 426 and 427 at the points J20, J21 and J22. The grounded bars 189A and 189B are engaged by the fingers 189C and 189D to cause grounding of the contacts 205A and 205B of the shift relay 205 in the manner hereinabove described under the subheading Operation for minimum charge. Shift relay 205 is actuated under indirect control of the relays 185 and 186 (Fig. 11) for closing its contacts. When the relays 185 and 186 energize at the points J12 and J12A, their contacts 186B and 185B establish a circuit from ground for potentializing the relay 91 at point J12B, battery for the relay being obtained at contact 23E. When the relay 91 energized at the point J23, and opened contact 91B, the circuit for shift relay 210 was broken so that this shift relay failed to energize when the sequence relay 20 deenergized at point J18 and closed contact 20D. Energized relay 91 in closing its contact 91A completed a circuit for potentializing the minimum charge shift relay 205 at the point J23A, and when this shift relay later energized at the point J24 the contacts 205A and 205B, grounded in the manner above described, completed circuits through the cable 201H to the counting relays 192 and 124. Thus these relays are energized at the points J25 and J25A. Eventually, when the cut-off relay 43 energizes at the point J26, it closes its contact 43C for establishing the hereinabove described circuit through the contact D5 of shift relay 205 and conductor 126D (Fig. 8) to the clutch 128A whereby this clutch is potentialized at the point J26A. Similarly, when the cut-off relay 44 energizes at the point J27, it closes its contact 44C to establish the circuit through contact A5 of the shift relay 205 and the conductor 126A (Fig. 8) to the clutch 129A which is thus potentialized at the point J27A.

In this manner the clutches 128A and 129A are caused to energize at the points J28 and J29 to set the number wheels 128 and 129 of the money register in motion. Since there are four pairs of counting relays locked up in the tens order and eight pairs of such relays locked up in the units order the number wheel 128 will be advanced four digital positions to 4 and the number wheel 129 will be advanced eight digital positions to 8 so that the money register will eventually read 048.

When the shift relay 205 energized at point J24 a circuit was completed from ground at contact 427C of the cut-off relay 427 (Fig. 13), through stepping relay 428, conductor T, contact T5 of shift relay 205 and conductor 126T (Fig. 8) to the clutch 435A which was thus potentialized at the point J24A. When this clutch energized at the point J30 the indicator wheel 435 took motion, and since only the single pair of counting relays, 425 and 426, are energized this indicator wheel will be advanced but one position to display the character MIN.

The slow-to-release relay 61 eventually deenergizes at the point J31, whereupon the contact 61A in opening breaks the energization circuit for control relay 187 which is therefore depotentialized at the point J31A.

When the shift relay 202 deenergized at point J8 and opened its contact 2X, ground was momentarily removed from slow relay 194 (Fig. 11), but prior to any material deenergization of the relay 194, the shift relay 203 energized at point J7, closing its contact 3X and thereby reapplying ground to the relay 194 for maintaining the same fully energized until deenergization of the relay 203 at the point J17, at which time depotentialization of the relay 194 occurs as indicated at the point J17A. This relay 194 subsequently deenergizes at point J32 and breaks the auxiliary holding circuit for sequence relay 22, but after the sequence control relay 25 is deenergized so that the sequence relay 22 remains energized from ground at contact 25C.

It will be noted that when the cut-off relay 427 energized at point J22, its contact 427F closed and completed the circuit through conductor 64X to the relays 64 and 169, causing their energization at the points J33 and J33A. Energized relay 64 opened contact Y removing ground from the energization circuit for sequence control relay 25 which was thus caused to deenergize at the point J34, wherefore subsequent deenergization of the relay 168 (Fig. 11) as will now be explained has no effect thereon.

When the sequence relay 21 deenergized at point J35 its contact 21X broke the energization circuit for slow relay 168 which therefore began deenergization at point J35A and later deenergized at point J36. Pursuant to this deenergization of the relay 168 the contact 168A opened and later the contact 168B closed to first break the energization circuit for sequence control relay 25 and then reestablish such energization circuit so that if the relay 25 had been energized it would have first deenergized and then reenergized. Such deenergization and reenergization of the relay 25 is not needed in the present operation, although it will be recalled that near the end of the first described machine operation, wherein the relay 20 deenergized in regular sequence prior to the relay 21, deenergized relay 20 opened contact 20X as a result of which the relay 168 deenergized while the relay 25 was energized so that the respective opening and closing of the contacts 168A and 168B caused deenergization and reenergization of the relay 25 and hence successive release of the sequence relays 21 and 22.

Now, as explained hereinabove, the apparatus is at the stage of operation where the number wheels 128 and 129 (Fig. 8) of the money register are being advanced, as is also the indicator wheel 435. From this point the operation of the machine continues in the same manner as already described in detail in the preceding section entitled Operation for minimum charge.

*Consumption consisting of first rate step and part of second rate step*

The illustrative machine operation now to be described assumes a first rate step of 14 and a second rate step of 25, as before, and further assumes a consumption quantity of 23. It will be understood that the last and previous meter readings will be entered in the consumption quantity register pursuant to the first two sequential operations; that the first step quantity 14 will be entered in the first step register (Fig. 6) pursuant to the third sequential operation; and that during the fourth sequential operation the amount 14 set up in the first step register will be multiplied four times by over and over addition whereby the money register in Fig. 8 will be caused to register the amount 56.

When the first step register 97—98 (Fig. 6) was advanced to 14 during said third sequential operation, the contact closing wheels 57D and 58D of the consumption quantity register were moved backwardly from 23 to 09, thus leaving the contact closing wheels 56D, 57D and 58D (Figs. 2, 3, 4, and 5) at 009 so that the only multiple contact switch closed in the comparison table will be the units order lowermost switch or the No. 9 switch in Fig. 5A.

The present machine operation, insofar as new action of parts is concerned, is illustrated graphically by the timing chart in Figs. 48 to 51, said chart picking up the operation near the end of the fourth sequential operation. As mentioned above, this fourth sequential operation involves four rounds of multiplication incident to which the amount 14 standing in the first step register is added four times in the register (Fig. 8) under control of the upper group of multiplier relays in Fig. 10. Near the end of the fourth round of multiplication, after the digit 5 has been entered on the number wheel 128 and just prior to entry of the digit 6 on the number wheel 129, the cut-off relay 44 (Fig. 13) is caused to deenergize at the point K1 whereby the stepping relay 46 associated therewith and the clutch 129A for operatively connecting the number wheel 129 to the constantly rotating shaft 322D are depotentialized at the points K1A and K1B. When the clutch 129A eventually deenergizes at the point K2 the number wheel 129 will be released and will stop while displaying the digit 6.

The cut-off relay 44 in deenergizing at the point K1, was the last of the cut-off relays to deenergize and in so doing opened its contact 44F to remove ground from the relays 64 and 169 which were thus depotentialized at points K1C and K1D. Relay 64 is deenergizing at point K3 closed contact Y causing energization of sequence control relay 25 at point K4. Energized relay 25 opened contact 25C, removing this source of energization for sequence relay 12 which remains energized for a short time through conductor 12J, (Figs. 11 and 10) which leads to ground at contact 281X. When the relay 169 deenergizes at point K5 and opens contact 169A, ground is removed from conductor 169B, the contact 4X of shift relay 204 (Fig. 12), conductor 4XX (Figs. 12 and 10), and from the contact 281C and the relays 278 and 283 whereby these relays are depotentialized at the points K5A and K5B. Relay 278 deenergizes at the point K6 and opens its contact 278B, breaking the holding circuit for multiplier relay 281, which is the last of the multiplier relays remaining energized at this time since this is the last round of multiplication being performed, wherefore this relay 281 is caused to deenergize at the point K7 to open its contact 281X for removing ground from the conductor 12J so that the sequence relay 12 is depotentialized at point K7A and later deenergizes at the point K8. As has been explained hereinabove the contact 278C does not close until the time indicated by the point K9 upon the line pertaining to the relay 278, which time is subsequent to the deenergization of the relay 281 and the removal of ground from the conductor 12J so that this closing of the contact 278C fails to impress ground through the contact 283A upon the conductor 282, and hence reenergization of the counting relays for another round of multiplication is precluded.

The sequential relay 12 in deenergizing at the point K8, opened contact 12B to remove ground from the conductor 10X and depotentialize the shift relay 204 at the point K8A. Contact 12D closed, completing the circuit for potentializing the shift relay 206 at the point K8B. Contact 12E in closing impresses ground upon a circuit including contact 13D, conductor 13H (Figs. 11 and 10), second step multiplier bar 115A, the No. 3 contact finger 115D, the number 3 conductor in the cable 115R and the multiplier relay 284 which is the lower relay of the No. 3 pair of such relays for controlling the second step multiplication operation. Thus the relay 284 is potentialized at the point K8C to initiate energization of this relay and cause successive energization of the relays of lower numerical significance in this chain of multiplier relays.

Contact 12E in closing also impresses ground upon a circuit including the contact 13L and the conductor 13G (Figs. 11, 5A, 5, 4 and 3). In Fig. 4 the grounded conductor 13G grounds the "Low" bar 305 and the No. 0 finger 305K which is permitted to engage said bar through the perforation 305KK of the control card (Fig. 16). From this finger 305K the circuit is extended through conductor 305T, contact 86W of the No. 0 multiple contact switch now closed by the contact closing wheel 57D, conductor 305U, vertical conductor 305W, "Low" relay 313' and conductor 313Y (Figs. 4 and 3) to battery at contact Z. In this manner the "Low" relay 313' is potentialized at the point K8D and later energizes at the point K10. Energized relay 313' closes its left-hand contact without effect since only the No. 0 multiple contact switch cooperable with the contact closing wheel 57D is closed. The right-hand contact of the relay 313' establishes a circuit from ground through conductor 313S (Figs. 4 and 5), contact 313R of the units order No. 9 multiple contact switch now closed, and horizontal conductor 313Q to the No. 9 vertical conductor 138C leading into the cable 138.

Ground from the conductor 13G in Fig. 5 is carried through a vertical branch conductor 13T (Figs. 5 and 5A), contact 313N of the units order No. 9 multiple contact switch and conductor 313 (Figs. 5A and 5) to the No. 9 contact finger 308A which is permitted to engage the combined high and maximum bar 308 through perforation 308AA of the control card. Contact finger 308P which engages the thus grounded bar 308 308P through card perforation 308PP grounds the No. 5 vertical conductor 138B (Figs. 5 and 5A) which leads into the cable 138. Therefore, both the No. 5 conductor 138B and the No. 9 conductor 138C leading into the cable 138 (Figs. 5A and 12A) are grounded and ground the units order No. 5 and No. 9 contacts of the shift relay 206. It follows that when the shift relay 206 energizes at the point K11, circuits will be completed through the cable 201H for causing simultaneous energization of the counting relays 30 and 130 (Fig. 13) at the points K11A and K11B.

Following the energization of the counting relay 30, the counting relays of lower numerical value successively lock up in a chain until eventually the cut-off relay 44 in turn energizes at the point K12. Likewise, following the energization of the counting relay 130, the counting relays of lower numerical value associated therewith begin successive energization to lock up in a chain which merges with the chain of relays that started to lock up from the relay 30. It will be noted that by the time the cut-off relay 44 energizes at the point K12 the entire group of units order counting relays will be energized so that nine digits will be entered upon the number wheel to be controlled thereby. An explanation has been given hereinabove with regard to the simultaneous energization of two relays of different numerical value in the same group of counting relays, and it was shown at that time that in no instance will the operation of the machine be significantly affected because of a counting relay of lower numerical value being energized simultaneously with a counting relay of higher numerical value which relay is representative of the amount to be added onto a register wheel. In the present instance the digit 9 is to be entered under control of these units order counting relays and it is immaterial that the relay 30, which has the numerical significance of 5, is energized. The only effect of the premature energization of these No. 5 counting relays is to energize the cut-off relay 44 more quickly than if the relay 30 had energized following energization of the counting relay 124E. The time of the sequential operation is correspondingly shortened.

Energized cut-off relay 44 impresses ground through conductor 64X upon the relays 64 and 169 causing their energization at points K13 and K13A. Contact Y is thus opened causing deenergization of the sequence control relay 25 at the point K14 and consequently the deenergization of the sequence relay 13 at the point K15 whereby the contact 13L is opened to isolate the initial energization source for the counting relays and leave these relays free for deenergization under control of the number wheel assembly associated therewith.

Cut-off relay 44 in energizing at the point K12 closes its contacts 44C and 44D whereby a circuit is established through the stepping relay 46 and conductor A (Figs. 13 and 14), and another circuit through the conductor B (Figs. 13 and 14). The circuits including the conductors A and B are continued through the cable 201K, contacts A6 and B6 of the shift relay 206, conductors in the cable 139 (Figs. 12A and 6A), conductors 139A and 139B respectively to the clutches 141A and 143A. In this manner the stepping relay 46 and the clutches 141A and 143A are simultaneously potentialized at the points K12A, K12B and K12C.

When the clutches 141A and 143A simultaneously energize at the points K13' and K13'A the number wheel 141 in the units order of the second step register will begin forward rotation whereas the units order assembly including the contact closing wheel 58D in the consumption quantity register (Fig. 2) will begin backward rotation, the driving train for said contact closing wheel 58D being through the gears 141C and 143 (Fig. 6A), the clutch 143A; shaft 108C and the gears 105C, 55 and 58E (Fig. 2).

Shortly before the number wheel 141 has been advanced nine digital positions to 9 and the contact closing wheel 58D has been moved backwardly 9 digital positions from 9 to 0, the cut-off relay 44 is deenergized at the point K14 to break the energization circuits for the stepping relay 46 and the clutches 141A and 143A which parts thereafter respectively deenergize at the points K15, K16 and K16A. At the time indicated by the points K16 and K16A the number wheel 141 will cease rotation while displaying the digit 9 and the contact closing wheel 58D will cease rotation in the zero position as will the backstop wheel 58C associated therewith. The machine is now conditioned for performing the first of three rounds of multiplication of the nine consumption units extending into the second step rate. That is, the nine consumption units over and above the first rate step quantity will now be multiplied by three by means of the over and over addition method.

Since the cut-off relay 44 was the only cut-off relay energized prior to its deenergization at the point K14, this deenergization of that relay removes ground from the relays 64 and 169 so that said relays are deenergized at the points K17 and K18. Contact Y is closed effecting energization of the sequence control relay 25 at the point K19 and the consequent deenergization of sequence relay 14 at the point K20.

Deenergized sequence relay 14 opens contact 14B removing the source of energization for the shift relay 206 which is therefore caused to deenergize at the point K21. Contact 14D in closing causes energization of the shift relay 207 at the point K22. Contact 14E in closing impresses ground through contact 15D and conductor 15K (Figs. 11 and 10) upon conductor 289 (Figs. 10 and 7). The conductor 289 in Fig. 7 is connected with the units order No. 9 switch now closed by the contact closing wheel 141B of the second step register so that ground is impressed upon the No. 9 conductor in the cable 106 (Figs. 6 and 12A) and upon the No. 9 units order contact of the shift relay 207. Therefore, when the shift relay 207 closes its contacts at the point K22, a circuit is completed through the cable 201H to the No. 9 counting relay 130 of the units order in Fig. 13 and this relay is caused to energize at the point K23.

Upon the return of the backstop wheel 58C (Fig. 2) to 0 at the time indicated by the point K16A on the line pertaining to the clutch 143A, all of the backstop wheels were aligned with their peripheral notches in registry with the members as 58X upon the bar 60 so that this bar was permitted to move radially inwardly for opening the contacts 60B and closing the contacts 60D.

Contacts 60B upon opening removed ground from the conductor 60C (Figs. 2 and 11) and from the relay 62 which was thus depotentialized at the point K16B. Also the right-hand winding of the slow relay 61 was depotentialized at this time. When the relay 62 deenergized at the point K24 and opened its contact 62A, battery was removed from the conductor 62C and hence from the sequence relays 17 and 19 to depotentialize them at points K24A and K24B. That is, the opening of the contact 62A removed battery from the conductor 62XX (Fig. 7), and since the contact closing wheels 198B, 159B and 154B of the remainder register now stand at zero whereby the contacts as 334X are open and the contacts as 334XX are closed, battery is removed from the conductor 19X (Figs. 7 and 11). Removal of ground from the conductor 62X (Fig. 7) by opening the contact 62A (Fig. 11) had no effect upon the sequence relay 15 inasmuch as the contact closing wheel 141B of the second step register now stands at 9 and hence off zero, so that the contact 328X is closed and battery from this contact is therefore impressed upon the conductor 15X (Figs. 7 and 11) and the sequence relay 15. Since the sequence control relay 25 is now energized, the deenergization of sequence relay 17 at the point K25 results in deenergization of the sequence relay 18 at the point K26. Relay 20 fails to deenergize folowing the deenergization of the relay 19 because of the holding circuit established through conductor 20J from ground at contact 286Y of energized multiplier relay 286 in Fig. 10. Said relay 20 is also held energized through conductor 20F from relay 15.

So much for the opening of the contacts 60B in Fig. 2. Now, when the contacts 60D closed, ground was impressed upon the conductor 60E (Figs. 2 and 7) and hence upon the contacts 329 and 330 of the No. 1 tens order multiple contact switch, now closed by the contact closing wheel 97B of the first step register, and upon the contact 326A of the No. 4 multiple contact switch, now closed, in the units order of such register. Therefore, ground was carried through the contacts 329 and 330, the conductors 329A and 330A and through the No. 1 conductors respectively in the cables 101A and 101B (Figs. 7 and 7D) to the No. 1 contact fingers 184C and 184K. Ground was carried through the contact 326A and the No. 4 conductor in the cable 101C (Figs. 7 and 7D) to the No. 4 contact finger 184L. Of the contact fingers 184C, 184K and 184L, only the contact finger 184C is permitted to engage the bar associated therewith so that only the bar 184 is grounded. Ground is therefore impressed upon the conductor 185D (Figs. 7D and 11) to cause energization of the control relay 185 at the point K27. But since relay 186 remains unenergized, this energization of the relay 185 is without effect.

Following energization of the counting relay 130 at the point K23 and the successive energization of the counting relays of lower numerical value, the cut-off relay 44 eventually energizes at the point K28, closing its contact 44F to cause energization of the relays 64 and 169 at the points K29 and K29A. It follows that the sequence control relay 25 deenergizes at the point K30 to result in the deenergization of the sequence relay 15 at the point K31 and the opening of the contact 15D to remove the initial source of energization from the counting relays so that these relays are free to deenergize under control of the stepping relay 46.

Energized relay 169 closed contact 169A, impressing ground upon the conductor 169B (Figs. 14 and 12A), now closed contact 7X, conductor 7XX (Figs. 12A and 10), contact 286C and the relays 287 and 288 whereby these relays are potentialized at the points K29B and K29C. When the relay 287 energizes at the point K32 contact 287A opens to cause deenergization of the multiplier relay 284 at the point K33.

Energized cut-off relay 44 also closes contact 44C and establishes a circuit through the stepping relay 46, and contact A7 of the shift relay 207, a conductor in cable 126 (Figs. 12A and 8) and the conductor 126A to the clutch 129A, resulting in energization of this clutch at the point K34 and the rotation of the units order number wheel 129 of the money register.

Attention is directed to the fact that the shift relay 209 is also energized at this time, but since the right-hand group of contacts on this shift relay are in multiple with the right-hand group of contacts upon the shift relay 207 with respect to conductors passing through the cable 126, and since the conductors leading from the left-hand group of contacts through the cable 166 are dead-ended at the open switches (Fig. 7) associated with the remainder register which now stands at zero, the fact that the two shift relays 207 and 209 are both energized has no significant effect. Energization of the shift relay 209 was brought about by the deenergization of the sequence relay 18 at the point K26, at which time the contact 18D was closed wherefore ground from contact 20B became available for energizing the shift relay 209 at the point K35.

Before this first round of multiplication began, the money register wheels 128 and 129 stood respectively at 5 and 6. It follows that during entry of the nine additional digits upon the number wheel 129, pursuant to this first round of multiplication, whereby this wheel is advanced from 6 to 5, the carry-over contact 129J is momentarily closed while said number wheel is passing from 9 to 0 to prepare for a carry-over operation which is effective for entering an additional digit, 6, upon the tens order number wheel 128 in the manner now well understood. This carry-over operation takes place during the interval of time represented by the space between the vertical chart lines M and N, and at the end of such operation the register 127—128—129 will display the reading 65, the sum of the amounts 56 and 9.

Near the end of the entry of the digit 5 upon the number wheel 129, following deenergization of the cut-off relay 44, the relay 64 was deenergized, this also taking place during the time period represented by the space between vertical chart lines M and N. Consequently the relay 64 is shown deenergized at the beginning of the chart section to the right of the chart line N. The relay 169, however, did not deenergize because of the holding circuit established from ground at contact Y and extending through now closed contact Z of the carry-over cut-off relay 113 and conductor 169C to the left-hand winding of the relay 169 and battery. The sequence control relay 25 failed to energize because of contact X at the carry-over cut-off relay 113 being open.

Near the entry of the carry-over upon the number wheel 128, the cut-off relay 113 deenergized at the point K36, opening the contact 113C whereby the series circuit including the stepping relay 112 and the clutch 128A is broken, wherefore these parts are depotentialized at the points K36A annd K36B. When the clutch 128A deenergizes at the point K37 the number wheel 128 will have been advanced one digital position from 5 to 6 and it is at this time that the money register reads 65.

Deenergized cut-off relay 113 closes contact X, establishing the circuit for the sequence control relay 25 which then potentializes at the point K36C. Energization of the relay 25 at point K38 would ordinarily cause depotentialization of sequence relay 16, but fails to do so at this time because of the holding circuit through the conductor 16J (Figs. 11 and 10) and contact 286X of now energized multiplier relay 286. Hence this energization of sequence control relay 25 is without effect.

Contact Z of deenergized cut-off relay 113 opens to break the holding circuit for relay 169 so this relay is depotentialized at the point K36D. When the relay 169 deenergizes at point K39 the contact 169A in opening removes ground from the relays 287 and 288 (Fig. 10) so that these relays are depotentialized at the points K39A and K39B. The armature 287B is freed of ground when the relay 287 deenergizes at point K40 and as a consequence the multiplier relay 285 is depotentialized at point K40A. Contact 287C subsequently closes at the point K41 indicated upon the line pertaining to relay 287, and prior to deenergization of the relay 288 as indicated at point K42 so that a circuit is established from the grounded conductor 16J through the contacts 287C and 288A, the conductor 289 (Figs. 10 and 7) and the units order No. 9 switch (Fig. 7) now closed by the contact closing wheel 141B of the second step register, for initiating energization of the counting relay 130 at the point K41A. In this manner the counting relays are energized preparatory to performance of the second round of multiplication.

During this second round of multiplication, the amount 9 will again be entered upon the number wheel 129, and since the number wheel is again moved past 9, a carry-over operation will again take place. At the beginning of this round of multiplication the number wheel 129 stood at 5 and at the end of this operation when 9 is added thereto such wheel will stand at 4, the ninth digit being entered thereon during the period of time represented by the space between vertical chart lines P and Q. The operations taking place between the chart lines P and Q are similar to those that took place between the vertical chart lines M and N. The carry-over operation is complete at the point K43 as indicated on the line pertaining to the clutch 128A, and at which time this clutch is deenergized simultaneously with the number wheel 128 having completed its carry-over advancement of one digital position from 6 to 7.

When the cut-off relay 44 energized at the point K45 shortly before the number wheel 129 began rotation during the second round of multiplication, the contact 44F in closing caused energization of the relays 64 and 169 at the points K46 and K46A. The relay 169 in energizing closed its contact 169A, causing energization of the relays 287 and 288 (Fig. 10) at the points K47 and K47A. The thus energized relay 287 opened contact 287A to depotentialize the multiplier relay 285A at the point K47B.

When the carry-over cut-off relay 113 deenergized at the point K44 and opened its contact Z, the holding circuit for the relay 169 was broken so that this relay deenergized at the point K48. The relay 287 was therefore deenergized at the point K49, opening its contact 287B and depotentializing the multiplier relay 285B at the point K49A. At the point K50, the contact 287C is closed to reimpress ground upon the counting relay 130 to potentialize the same at the point K50A incident to beginning the third and last round of multiplication.

Upon the subsequent energization of the cut-off relay 44 at the point K51, the clutch 129A is again potentialized at the point K51A and later energizes at the point K52 for advancing the number wheel 129 nine additional digits from 4 through zero to 3. While the number wheel 129 moves between the 9 and 0 positions, the contact 129J will be closed again to institute a carry-over into the tens order of the money register, incident to which carry-over operation the clutch 128A is energized for advancing the number wheel 128 an additional position from 7 to 8. Near the end of this carry-over operation the carry-over cut-off relay 113 deenergizes at the point K53, depotentializing the clutch 128A at the point K53A and when this clutch deenergizes at the point K54, the money register will read 083 which is representative of the monetary amount of $0.83.

Referring again to that section of the chart which graphically shows the beginning of the third round of multiplication it will be seen that upon the energization of the cut-off relay 44 at the point K51, the relays 64 and 169 were caused to energize at the points K55 and K55A. Contact Y was opened wherefore the sequence control relay 25 deenergized at the point K56 but without immediate effect since the sequence relay 16 is still held energized through its holding circuit including the conductor 16J, and the sequence relay 20 is held energized from contact 286Y (Fig. 10) through the conductor 20J wherefore contact 20G is grounded and holds the relay 21 energized. And the relay 22 is held energized from contact 21C of the relay 21. Energized relay 169 closes contact 169A to cause energization of the relays 287 and 288, (Fig. 10) at the points K57 and K57A. This energization of the relay 287 results in the opening of the contact 287A and the deenergization of multiplier relay 285C at the point K58. Only the multiplier relay 286 remains energized.

The carry-over cut-off relay 113 is the last of the cut-off relays to deenergize at the end of the third round of multiplication and in doing so at the point K53 opens its contact Z, breaking the holding circuit for relay 169 which therefore deenergizes at the point K59. Relays 287 and 288 are consequently depotentialized at the points K59A and K59B, and when the relay 287 deenergizes at the point K60 and opens its contact 287B, the multiplier relay 286 is depotentialized and caused to deenergize at the point K61. Contact 286X in opening removes ground from the conductor 16J, and since the sequence control relay 25 energized previously at the point K62 following deenergization of the carry-over cut-off relay 113 and the closing of its contact X, the sequence relay 16 is depotentialized at the point K61A upon the opening of said contact 286X. Inasmuch as the contact 287C of the relay 287 fails to close until the time indicated at the point K63 upon the line pertaining to said relay 287, which time is subsequent to the opening of the contact 286X and the removal of ground from the conductor 16J, the closing of said contact 287C does not reimpress ground upon the conductor 289 and therefore the counting relays are not reenergized for an additional round of multiplication.

Deenergized multiplier relay 286 also opened contact 286Y removing ground from the conductor 20J to break the holding circuit for sequence relay 20 which is thus depotentialized at the point K61B. When this sequence relay deenergizes at the point K64 its contact 20B opens, breaking the energization circuit for shift relay 209 which therefore depotentializes at the point K64A. The shift relay 207 which was held energized from ground at contact 16B, was simultaneously depotentialized at the point K65A upon deenergization of the sequence relay 16 at the point K65.

Contact 20D of the deenergized sequence relay 20 upon closing establishes an energization circuit for the shift relay 210 which is potentialized at the point K64B and later energizes at the point K66. Contact 20X in opening removes ground from slow relay 168 which thereupon begins deenergization at the point K64C. Contact 20E closes, impressing ground through contact 21D upon the conductor 21F (Figs. 11 and 9) and upon one side of each of the switches in Fig. 9 which are closable by the contact closing wheels as 128B which are a part of the number wheel assemblies of the money register (Fig. 8). Since this register now stands at 083, the No. 0 switch (uppermost in the hundreds order row of switches) is closed by the contact closing wheel 127B, the No. 8 (second from the bottom) switch is closed by the contact closing wheel 128B and the No. 3 (fourth from the top) is closed by the contact closing wheel 129B. Therefore the contacts 400 and 401 in the hundreds order, the contacts 420A and 420B in the tens order and the contact 422 in the units order are grounded from the conductor 21F. The contacts 400 and 401 ground the No. 0 conductors respectively in the cables 400B and 400C and the No. 0 contacts 407E and 407AA associated with the "Low" bars 407 and 407A (Fig. 9A). Contacts 420A and 420B ground the No. 8 conductors respectively in the cables 420C and 420 D and hence the No. 8 contact fingers 407JJ and 407KK associated with the "Low" bars 407B and 407C. The grounded contact 422 grounds the No. 3 conductor in the cable 422A and hence the No. 3 contact finger 407HH associated with the "Low" bar 407D.

The present example assumes a control card (Fig. 16) so perforated in the field coinciding with the bars 407, 407A, 407B, 407C and 407D as to effect an entry of "Low" on the indicator wheel 435 (Fig. 8) when the monetary charge is equal to or less than the amount 125. The perforations upon the control card in Fig. 16 are arranged, as explained hereinabove, in accordance with such a low charge amount. By examining this control card it will be observed that the grounded zero finger 407AA cooperative with the bar 407A, and No. 8 fingers 407JJ and 407KK cooperative with the bars 407B and 407C have no perforations in registry therewith and hence fail to ground these bars. On the other hand, the contact fingers 407E and 407HH are permitted to engage their respective bars 407 and 407D through the card perforations 407EEE and 407HHH and thereby ground the bars 407 and 407D. The "High" bars 406 to 406D (Fig. 9A) which correspond respectively to the bars 407 to 407D have their associated fingers connected in parallel with the corresponding fingers of the bars 407 to 407D and therefore the No. 0 fingers associated with the bars 406 and 406A, the No. 8 fingers associated with the bars 406B and 406C and the No. 3 finger associated with the bar 406D are all grounded, but inasmuch as of these fingers only the No. 8 finger 406TT is aligned with a card perforation (406TTT in Fig. 16) only the bar 406B of the bars 406 to 406D is grounded. Grounded bar 406B is connected with and caused energization of the relay 410 (Fig. 9A) at the point K66' but without effect because contact 409A of the relay 409 remains open.

The bar 407D which was grounded from the No. 3 finger 407HH impresses such ground upon the relay 417 (Fig. 9A) and thus causes potentialization of this relay at the point K64E when the relay 20 deenergizes at the point K64 and closes its contacts 20E. This relay 417 later energizes at the point K67 but without effect since the contact 416A of the relay thereabove is open. The grounded bar 407 impresses ground upon the relay 413 causing energization thereof at the point K68 and the closing of the contact 413A so that ground from this contact is carried over the conductor 413B (Figs. 9A and 13) to the counting relay 430 wherefore this relay is potentialized at the point K67A. Thereafter the relay 430 and the counting relays of lower numerical significance associated therewith successively energize, and eventually the cut-off relay 427 energizes at the point K69. The contact 427C closes, impressing ground upon the circuit leading through the stepping relay 428, the contact T10 of the shift relay 210 now energized and the conductor 126T (Fig. 8) to the clutch 435A, causing energization of this clutch at the point K70 whereupon the indicator wheel 435 takes motion from the shaft 322D. Inasmuch as there are three pairs of these counting relays locked up in Fig. 13, the wheel 435 will be advanced three positions to display the character L which indicates to the reader of the register that the amount charged the customer is less than that customarily charged.

When the cut-off relay 427 energized at the point K69 the relays 64 and 169 were potentialized at the points K69A and K69B. Upon the subsequent energization of the relay 64 the contact Y opened and sequence control relay 25 was deenergized at the point K71 and opened its contact 25B to bring about deenergization of the sequence relay 21 at the point K72.

The machine now stands with all of the sequence relays deenergized with the exception of the relays 22 and 23 which are for controlling the final sequence operation of holding the number wheels sufficiently long for reading and then returning the same to zero. This final sequential operation is performed in the manner hereinabove fully described, and is initiated near the end of the present sequential operation when the cut-off relay 427 deenergizes to cause deenergization of the relay 64 and consequent energization of the sequence control relay 25 for deenergizing the sequence relay 22.

*Operation with designation for high*

As was explained hereinabove the control card (Fig. 16) is perforated in the field for registration with the bars 406 to 406D (Fig. 9A) to indicate that the upper limit of the normal charge range for the customer is 675. The present illustration assumes that the customer has consumed an amount of the commodity for which the charge is in excess of 675, the exact amount assumed being 693. The billing operation therefore extends into the third or remainder step wherein the multiplication proceeds in the sequential operation controlled by the sequence relays 18 and 19. Shortly after this sequential operation gets under way both the relays 18 and 19 will have been deenergized, leaving the sequence relays 20 to 23 still energized as shown at the beginning of the chart in Fig. 52 wherein the present operation is graphically illustrated.

In this final round of multiplication, the amount 281 is entered on the number wheels of the money register, and inasmuch as the greatest digit 8 is entered on the number wheel 128, the clutch 128A will be the last of the clutches to deenergize as indicated at the point MI. Such deenergization of the clutch 128A was preceded and caused by deenergization of the cut-off relay 43 at the point M2, this cut-off relay 43 being the last of such relays to deenergize removes ground from the relays 64 and 169 which are thus caused to deenergize at the points M3 and M4. Contact Y is closed causing energization of the sequence control relay 25 at the point M5, removing one of the holding circuits for the relay 20 at the contact 25C. Relay 20 remains energized from ground received through the conductor 20J from the contact 293X of the multiplier relay 293 which is energized at this time.

Relay 169 in deenergizing at the point M4 opens its contact 169A, removing ground from the multiplier control relays 291 and 292 (Fig. 10), which relays are therefore depotentialized at the points M4A and M4B. The relay 291 deenergizes at the point M6, opening its contact 291B and depotentializing the multiplier relay 293 at the point M6A. When the relay 293 deenergizes at the point M7 its contact 293X opens to remove ground from the conductor 20J. This removal of ground from the conductor 20J disables the final holding circuit for sequence relay 20 which therefore deenergizes at the point M8.

Contact 20D of deenergized sequence relay 20 upon closing establishes the energization circuit for shift relay 210 so that this relay eventually energizes at the point M9. Contact 20B opens, depotentializing the shift relay 209 at the point M8A. Contact 20X opens to break the energizing circuit for slow relay 168 and depotentialize this relay at the point M8B. Contact 20E in closing impresses ground upon a circuit including contact 21D, conductor 21F (Figs. 11 and 9) and one side of the switch contacts closable by the contact closing wheels as 128B which are part of the number wheel assemblies of the money register. Since these contact closing wheels now stand at 693, the No. 6 contacts 418 and 419 in the hundreds order will be closed and grounded, the No. 9 contacts 420 and 421 in the tens order will be closed and grounded and the No. 3 contact 422 in the units order will be closed and grounded. The contacts 418 and 419 are effective through conductors in the cables 400B and 400C for grounding the No. 6 fingers associated with the bars 406, 407, 406A and 407A in Fig. 9A, of which fingers the finger 406AA is the only one permitted to engage its associated bar so that the bar 406A is grounded. The contacts 420 and 421 are effective through conductors in the cables 420C and 420D to ground the No. 9 contact fingers associated with the bars 406B, 407B, 406C and 407C, but of these fingers only the finger 406BB is permitted to engage its associated bar whereby such bar, 406B, is grounded. The contact 422 is effective through a conductor in the cable 422A for grounding the No. 3 fingers associated with the bars 406D and 407D, but of these fingers only the finger 407HH is permitted to engage its associated bar whereby such bar, 407D, is grounded. The grounded bar 407D is connected with and causes potentialization of the relay 417 (Fig. 9A) at the point M8C. Subsequent energization of this relay, however, is without effect inasmuch as the relay 416 thereabove remains unenergized and its contact 416A open to break the series circuit prepared by the closing of the contact 417A.

The grounded bar 406A is connected with and potentializes the relay 409 at the point M8D; and the grounded bar 406B is connected with and potentializes the relay 410 at the point M8E. When the two relays 409 and 410 energize at the points M10 and M10A, their contacts in closing impress ground upon the conductor 408B (Figs. 9A and 13), potentializing the counting relay 429 at the point M10B. As a result of the relay 429 energizing at the point M11 the counting relays of lower numerical significance successively energize, and the cut-off relay 421 is caused to energize at the point M12. The circuit is thus established for causing energization of the relays 64 and 169 at the points M12' and M12'A so that the sequence control relay 25 is caused to deenergize at the point M13 and the sequence relay 21 is in turn caused to deenergize at the point M14. While the relay 25 is thus deenergized the slow relay 168 deenergizes at the point M15 to break and reestablish the energization circuit for said relay 25 without effect.

The closing of contact 427C of the cut-off relay 427 establishes the circuit through stepping relay 428, contact T10 of now energized shift relay 210 and conductor 126T (Fig. 8) to the clutch 435A to cause energization of this clutch at the point M16. Inasmuch as two pairs of counting relays were energized, the clutch 435A will remain energized long enough to cause advancement of the indicator wheel 435 two positions to display the character H which is the designation for High, meaning that the charge indicated by the money register 127—128—129 is above the normal range of charges for the customer.

Near the end of the entry on the indicator wheel 435 the cut-off relay 427 is deenergized at the point M17 to result in the deenergization of the relays 64 and 169, the subsequent energization of the sequence control relay 25 and therefore deenergization of sequence relay 22 at the point M18, to in this manner initiate the final sequential operation of holding the number wheels for reading and then resetting them to zero.

*Operation with designation for low*

In this illustration of a "Low" registration the operation proceeds under control of the card (Fig. 16) which is perforated to indicate a lower limit of 125 in the area coincident with the low bars 407 to 407D (Fig. 9A). That is, when the money register (Fig. 8) has a final reading of less than 125, the contact closing wheels thereon, shown schematically in Fig. 9, will complete circuits established through contact fingers projecting through the said perforations into contact with the bars 407 to 407D and operable to condition the apparatus for advancing the indicator wheel 435 (Fig. 8) to display the character L, which character has the significance to the reader that the money charge shown by the money register is less than that usually charged the customer.

This operation is illustrated graphically in Fig. 53 where it is assumed that the clutch 129A in deenergizing at the point N1 does so simultaneously with the number wheel 129 (Fig. 8) arriving at 3 at the completion of the entry of the amount 123 upon the money register. This deenergization of the clutch 129 was caused by deenergization of the cut-off relay 44 at the point N2, and this deenergization of the cut-off relay 44 depotentializes the relays 64 and 169 at the points N2A and N2B. Inasmuch as the charge 123 is in excess of the charge 56 made for the first step quantity of 14 and is less than the sum of said first step charge of 56 and the second step charge of 75, which sum is 131, the charge 123 entails an operation wherein there is a charge for the entire first step quantity and a part of the second step quantity. Therefore the contact closing wheels of the consumption quantity register (Fig. 2) were returned to zero simultaneously with the completion of the entry in the second step register, wherefore, prior to the time the operation is picked up by the chart in Fig. 53, the relay 62 (Fig. 11) will have been deenergized to have caused deenergization of the sequence relays 17 and 19. The sequence relay 25 stood energized at the time the relay 62 deenergized, removing one of the holding circuits for relay 18 so that said relay deenergized upon the deenergization of the sequence relay 17. Relays 16 and 20 failed to deenergize because of their holding circuits respectively through the conductors 16J and 20J which were grounded from the left-hand armature of the then energized multiplier relay 286 (Fig. 10). These two relays 16 and 20 are still held energized through the conductors 16J and 20J at the time the sequence control relay 25 energizes at the point N3 following deenergization of the relay 64 and the closing of the contact Y at the point N4, and consequently this energization of the relay 25 is without immediate effect.

At the time the contact closing wheels and the back stop wheels of the consumption quantity register all reached zero, the closing of the contact 60D (Fig. 2) was of inconsequential effect because the circuits (Figs. 7 and 7D), energized from the conductor 60E grounded from said contact 60D, ground only the bar 184 (Fig. 7D) so that of the relays 185 and 186 (Fig. 2) only the relay 185 is energized, and without effect so long as the relay 186 remains unenergized.

The relay 169 deenergizes at the point N5, opening the contact 169A and removing ground from the conductor 7XX (Figs. 12A and 10), contact 286C (Fig. 10) and the relays 287 and 288, depotentializing these relays at the points N5A and N5B. This being the last round of multiplication, the last of the multiplier relays, relay 286, is depotentialized at the point N6A upon deenergization of the relay 287 at the point N6, and when the relay 286 deenergizes at the point N7 the contacts 286A and 286Y are opened, removing ground from the conductors 16J and 20J and depotentializing the sequence relays 16 and 20 at the points N7A and N7B. When these two sequence relays 16 and 20 deenergize at the points N8 and N8A, their contacts 16B and 20B in opening remove ground from and depotentialize the shift relays 207 and 209 at the points N8B and N8C. Contact 286X opens prior to the closing of the contact 287C at the point N9 and thus prevents reenergization of the counting relays for an additional round of multiplication.

Deenergized relay 20 closes contact 20D to potentialize the shift relay 210 at the point N8D. Contact 20X opens, depotentializing the slow relay 168 at the point N8E. Contact 20E is closed, impressing ground upon a circuit including the contact 21D and the conductor 21F which reappears in Fig. 9 where it is connected with the left-hand contacts of the switches associated with the contact closing wheels as 128B (Fig. 9) of the money register (Fig. 8). Since this register now stands at 123, the No. 1 contacts 400A and 401A in the hundreds order will be closed, the No. 2 contacts 403A and 404A in the tens order will be closed and the No. 3 contact 422 in the units order will be closed. The thus grounded contacts 400A and 401A are effective through No. 1 conductors respectively in the cables 400B and 400C for grounding the No. 1 contact fingers associated with the bars 406, 407, 406A and 407A (Fig. 9A). Of these No. 1 fingers, only the No. 1 finger 407FF associated with the bar 407A is permitted to engage its bar and hence said bar 407A is grounded. The grounded contacts 404A and 403A are effective through the No. 2 conductors in the cables 420C and 420D for grounding the No. 2 fingers associated with the bars 406B, 407B, 406C and 407C, and of which fingers only the No. 2 finger 407GG is permitted to engage its associated bar 407C so that this bar is grounded. The grounded contact 422 is effective through the No. 3 conductor in the cable 422A for grounding the No. 3 fingers associated with the bars 406D and 407D of which fingers only the No. 3 finger 407H is permitted to engage its bar 407D whereby this bar is grounded. Thus only the bars 407A, 407C and 407D are grounded. The grounded bar 407A is connected with and causes potentialization of the relay 414 at the point N8F upon deenergization of the sequence relay 20 at the point N8A, whereas the grounded bar 407C likewise causes energization of the relay 416 at the point N8G, and the grounded bar 407D causes potentialization of the relay 417 at the point N8H.

When the relays 414, 416 and 417 energize, a circuit is completed from ground at closed contact 417A through closed contact 416A, closed contact 414B and the conductor 413B (Figs. 9A and 13) to the counting relay 430 which is thereby potentialized at the point N10. Following the energization of the relay 430 at the point N11, the counting relays of lower numerical significance associated therewith successively lock up as does the cut-off relay 427 at the point N12 to cause energization of the clutch 435A (Fig. 8) at the point N13 and energization of the stepping relay 428 at the point N14. Since three pairs of counting relays are locked up, the clutch 435A will remain energized sufficiently long to cause advancement of the indicator wheel 435 three positions to display the character L, the clutch deenergizing and the number wheel displaying such character L at the time indicated by the point N15. The energization circuit for the clutch 435A includes the contact T10 of the shift relay 210 which energized at the point N16.

The cut-off relay 427 in energizing at the point N12, potentialized the relays 64 and 169 so that the relay 64 in energizing resulted in deenergization of the relay 25 at the point N17 and the consequent deenergization of the relay 21 at the point N18. The contact 21D was thus opened, breaking the energization circuit for the relays 414, 416 and 417 (Fig. 9A) which as a consequence deenergized at the points N19, N19A and N19B, breaking the initial energizing circuit for the counting relays and leaving them free to deenergize under control of their stepping relay 428.

When the cut-off relay 427 deenergized at the point N20 near the end of this operation for entering the character L on the indicator wheel 435, ground was removed from the relays 64 and 169 for initiating the aforedescribed final sequential operation during which the number wheels are held a sufficient time for reading and then returned to zero.

*Operation with but one step of consumption*

The present illustrative operation of the machine assumes a condition where the consumption quantity is the amount of the selected first rate step, 14. In this special case operation the machine will set up the amount 14 in the first step register and will thereafter multiply this amount by 4 to eventually cause the amount 56 to stand upon the money register (Fig. 8). And, inasmuch as the amount 56 is less than the lower limit, 125, of the range within which the charges of this customer ordinarily fall, the high-low comparison operation at the end of the multiplying operation will result in the energization of the lower bank of counting relays in Fig. 13 to cause advancement of the indicator wheel 435, (Fig. 8) three positions to display the character L, which indicates to the reader that a lower than normal charge is being made to the customer.

The chart in Figs. 54 and 55 picks up the operation near the end of the third sequential operation during which the amount 14 is entered upon the first step register 97—98 (Fig. 6). Since only a single digit is entered in the tens order and four digits are entered in the units order, the clutches 98A and 108A (Fig. 6) will be the last to deenergize, this occurring at the points R1 and R1A (Fig. 55) at the time of completion of this entry. The units order cut-off relay 44 will have just previously deenergized at the point R2 to have caused such deenergization of the clutches 98A and 108A, and to have caused deenergization of the relays 64 and 169 at the points R3 and R4. Contact Y of the relay 64 was closed, resulting in energization of the sequence control relay 25 at the point R5 and the consequent deenergization of sequence relay 10 at the point R6 to initiate the sequential operation during which the entry of 14 upon the first step register is to be multiplied by 4. Deenergized sequence relay 10 in opening its contact 10B caused deenergization of shift relay 203 at the point R7, and which sequence relay was effective during the third or next previous sequential operation for completing energizing circuits to the first step register. Contact 10D in closing established the circuit for causing energization of the shift relay 204 at the point R8. This shift relay 204 establishes circuits through which the counting relays are effective during the present or fourth sequential operation for energizing the clutches of the money register (Fig. 8).

When the clutches 98A and 108A deenergized at the points R1 and R1A the contact closing wheel 58D in the units order of the consumption quantity register (Fig. 2) was simultaneously returned to zero, this being the last of the contact closing wheels of such register to be returned to zero. Also the back stop wheels as 58C of said register were at that time stationed at zero whereby the contact 60D was closed and the contact 60B was opened.

Contact 60D in closing impressed ground through conductor 60E (Figs. 2 and 7) upon the contacts as 325 of the multiple contact switches closable by the contact closing wheels 97B and 98B of the first step register. This register now stands at 14 so that the tens order No. 1 contacts 329 and 330 are closed and grounded from said conductor 60E as well as is the units order No. 4 contact 326A. Said switch contacts 329, 330 and 326A are connected through conductors in the cables 101A, 101B and 101C respectively with the No. 1 contact finger 184C, the No. 1 contact finger 184K and the No. 4 contact finger 184L (Fig. 7D), but since only the finger 184C registers with a card perforation the bar 184 is the only one of three bars grounded. Hence the conductor 185D (Figs. 7D and 2) is grounded and causes energization of the control relay 185 at the point R8' but without effect inasmuch as the conductor 186D (Figs. 7D and 2) is not grounded and the control relay 186 remains unenergized.

Contact 60B (Fig. 2) in opening removed ground from the conductor 60C (Figs. 2 and 11) and the relay 62 so that this relay is deenergized at the point R9. Contact 62A was thus opened, removing battery from the sequence relays 13, 15, 17 and 19, such battery being removed from the relays 13 and 17 directly through the conductor 62C, but being removed from the relays 15 and 19 indirectly through the conductors 62X and 62XX (Fig. 7), contacts as 327XX and 334XX and the conductors 15X and 19X (Figs. 7 and 11), inasmuch as the second step register and the remainder register whose number wheels as 141B and 154B in Fig. 7 now stand at zero and hold open the contacts as 328X and 334X. Therefore the relays 13, 15, 17 and 19 are depotentialized at the points R9A to R9D. Relay 25 is energized at this time so that upon the deenergization of the relays 13, 15 and 17, the relays 14, 16 and 18 are depotentialized and caused to deenergize at the points R11, R11A and R11B. Conductors 12J and 20J are grounded at this time from the left-hand armature of now energized multiplier relay 281 (Fig. 10) whereby sequence relays 12 and 20 are prevented from deenergizing.

Sequence relay 11, which is held energized from energized relay 25, is effective through its contact 11D for impressing ground from contact 10E of deenergized sequence relay 10 upon the conductor 11K (Figs. 11 and 10), conductor 282 (Figs. 10 and 7) and upon the left-hand contact of each of the multiple contact switches representative of significant digits and associated with the contact closing wheels 97B and 98B (Fig. 7) of the first step register. Since this register now stands at 14, the contact 325 of the tens order No. 1 switch will be closed and impress ground upon the conductor 325A, and the contact 326 of the No. 4 units order switch will be closed and impress ground upon the conductor 326A. Said conductors 325A and 326A lead through the cable 101 (Figs. 7 and 12) to the contacts 204A and 204B of the shift relay 204 so that when this shift relay closed its contacts at the point R8 the circuits through the contacts 204A and 204B were completed to the counting relays 70 and 72 which are representative of the amount 14 and are potentialized at the points R8A and R8B. Following energization of said counting relays 70 and 72 the counting relays associated therewith of lower numerical significance successively lock up preparatory to controlling entry of the first of four rounds of multiplication. That is, during the preceding third sequential operation when the sequence relay 8 deenergized, its contact 8E was closed to impress ground upon a circuit including the contact 9D, conductor 9H (Figs. 11 and 10) and the bar 115. The control card, (Fig. 16) is perforated at 115CC in the No. 4 position to predetermine said four rounds of multiplication. The perforation 115CC permits the No. 4 contact finger 115C (Fig. 10) to engage the bar and be grounded thereby whereby the multiplier relay 275 of the No. 4 pair of relays 275 and 276 was energized and caused energization of the associated multiplier relays of lower numerical significance. These multiplier relays are therefore shown energized at the beginning of the present chart.

When the sequence relay 18 deenergized at the point R11B, its contact 18D was closed to potentialize shift relay 209 at the point R11C, and subsequently this shift relay energized at the point R12. The point R12 occurs at substantially the same time as the point R13 when the cut-off relay 43 energizes so that the circuit prepared by the closing of the contact 43C and including the stepping relay 45 is completed through the parallel connection of the contacts D9 and D4 of the shift relays 209 and 204, a conductor in the cable 126 (Figs. 12 and 8) and the conductor 126D to the clutch 128A and battery. Therefore, the stepping relay 45 and the clutch 128A are potentialized at the points R13A and R13B. Subsequently the cut-off relay 44 energizes at the point R14 so as to potentialize stepping relay 46 and the clutch 129A at the points R14A and R14B. The clutches 128A and 129A respectively energize at the points R15 and R16, and since one pair of counting relays is locked up in the tens order and four pairs of said relays are locked up in the units order, the number wheel 128 will be advanced one digital position and the number wheel 129 four digital positions, wherefore the money register will read 014 at the end of the first round of multiplication.

Cut-off relay 43 was the first to energize at the point R13 and in so doing caused energization of the relays 64 and 169 at the points R17 and R17A. Contact Y of relay 64 is opened to cause depotentialization of the relay 25 at the point R18 and the consequent deenergization of sequence relay 11 at the point R19. At this time only the sequence relays 12 and 20 to 23 inclusive remain energized, the relay pair 20 and 21 being for the control of the sequential operation pursuant to which a comparison is made of the ultimate reading upon the money register to ascertain whether the reading falls within the normal charge range for the customer and to effect an entry of high or low on indicator wheel 435 (Fig. 8) if the reading should be above or below said normal range, and the relay pair 22 and 23 being for controlling the sequential operation wherein the number wheels are held for reading and finally returned to zero.

The slow relay 194 which was depotentialized at the point R7A when the shift relay 203 deenergized and opened its contact 3X, deenergizes at the point R20 to leave the sequence relay 22 free for deenergization in the course of the machine operation under control of the relays 21 and 25.

The relay 169 which is for indirectly controlling the successive release of the locked up multiplier relays in Fig. 10, closes its contact 169A upon energizing at the point R17A to cause energization of the relays 278 and 283 (Fig. 10) at the points R21 and R21A. The contact 278A in opening breaks the only holding circuit for the multiplier relay 275 which is therefore potentialized at the point R21B. Near the end of the first round of multiplication, the relay 169 will be deenergized to cause deenergization of the relays 278 and 283 wherefore the multiplier relay 276 will be deenergized and ground will be impressed from the conductor 12J through the contacts 278C and 283A upon the conductor 282 for again energizing the counting relays in the arrangement representative of the amount 14 incident to effecting the second round of multiplication in the manner hereinabove fully described. As an incident to each round of multiplication a pair of the locked multiplier relays as 275 and 276 will be similarly deenergized.

The first three rounds of multiplication are completed during the period of time represented by the space between the heavy vertical chart lines, and the fourth round of multiplication is completed when the clutch 129A deenergizes at the point R22. At this time the money register (Fig. 8) will have had the amount 14 entered therein four times and will stand at 056. Near the end of the sequential operation involving said four rounds of multiplication, the cut-off relay 44 deenergized at the point R23 to cause such depotentialization of the clutch 129A at the point R22 and to initiate the succeeding sequential operation of analyzing the reading standing upon the money register and causing entry of the high or low indicator characters upon indicator wheel 435 if such reading falls above or below the customary charge range of the customer. In the present instance the amount 56 is below the lower limit, 125, of the usual charge range of the customer, wherefore circuits will be established to cause the entry of the character L upon the indicator wheel 435.

Deenergized cut-off relay 44, by being the last of the cut-off relays to deenergize at the point R23, causes deenergization of the relays 64 and 169 at the points R24 and R25. Deenergized relay 169 opens its contact 169A, resulting in deenergization of the relays 278 and 283 at the points R26 and R27. The thus deenergized relay 278 breaks the holding circuit for and permits deenergization of the multiplier relay 281 at the point R28 whereby ground is taken from the conductor 12J so that when the contact 278C subsequently closes at the point R29, no ground is available for impression through the contact 283A upon the conductor 282 for causing an additional round of multiplication.

When the relay 64 deenergized at the point R24, the contact Y was closed effecting energization of the relay 25 at the point R30. Therefore, when the multiplier relay 281 subsequently deenergized at the point R28, to open its contacts 281X and 281Y and remove ground from the conductors 12J and 20J, the sequence relays 12 and 20 were depotentialized at the points R28A and R28B. Sequence relays 12 and 20 deenergize at the points R31 and R31A to respectively depotentialize the shift relays 204 and 209 at the points R31B and R31C.

Contact 20D of the relay 20 in closing completed a circuit for energizing the shift relay 210 at the point R32. Contact 20X in opening broke the holding circuit for and depotentialized the slow relay 168 at the point R31D. Contact 20E in closing impressed ground through a circuit including the contact 21D and the conductor 21F (Figs. 11 and 9) whereby, in the manner hereinabove fully described in that part of the specification appearing under the sub-heading Operation with designation for low, circuits are completed through the closed contacts associated with the contact closing wheels 127B, 128B and 129B and certain of the contact fingers (Fig. 9A) for energizing such of the relays in the lower right-hand corner of Fig. 9A as will establish the energization circuit through conductor 413B (Figs. 9A and 13) to energize the counting relay 430 at the point R33. In this manner all three pairs of the counting relays of the fourth and lower bank of counting relays in Fig. 13 are energized and result in the entry of the character L upon the indicator wheel 435 in Fig. 8. The operation proceeds as explained in detail under the sub-heading Operation with designation for low and therefore is not now repeated.

Comparison of numbers

To meet commercial requirements in computing bills for such a commodity as electricity, two special provisions are necessary: that for a minimum charge for a predetermined low consumption quantity or less; and in a sliding scale of rates, that for a maximum quantity at a certain rate, with one or more like limited quantities above preceding portions at certain other rates. The varying quantities of consumption—which may range within the extremes of machine capacity—must be compared with minimum and maximum amounts; and only when the consumption quantity is between the other two amounts is it to be registered for a final multiplication.

Comparisons can obviously be effected between numerically positioned electrical contacts in a single series, as from 0 to 9, or between positions of number wheels that are moved through all numerical values by driving the units wheel. When a number for comparison contains a plurality of digits and the number wheels are moved separately each to its final position in the result the problem must be differently met.

The provision of contacts and circuit combinations for the comparison of numbers, as herein described in preferred forms, is an application of the numerical principle that of two numbers each containing a plurality of digits the greater is that one which is greater in the highest order of digits, or with equality between the two in the highest order that one which is greater in the highest order in which there is inequality; and conversely as to the smaller number. The application is through the provision of circuits potentially electrifiable through contacts for all numbers (within the predetermined range of comparison), and the closing of such contacts from a numerically positioned, or standard, contact-closing device for one of the numbers, and also from the numerical position, as might be taken at random, of a movable contact-closing device for the other number, all systematically arranged for the selection of electrical paths according to the coincidence of the closing of the several contacts.

The mechanism includes conventional contact bars and fingers, brought into electrical contact through card perforations, for the number with which comparison is to be made, and contact-closing studs on conventional number wheels, for the number which is to be compared, with circuits closable by such studs in each numerical position (including zero), and extending, in the main, to particular contact fingers and bars and to numerically positioned relays capable of starting or producing a desired operation. The particular operations selectively effected through the mechanisms and circuit illustrated are those of the registration of numbers or characters. It should be apparent that other operations, of any sort that can be produced or started through an electrical circuit, are within the scope of the comparison effects.

In the preceding descriptions of Apparatus and Operation, there are two classes of results obtained through comparison. Those for the minimum and High and Low are of the same class: according to the relative values of the numbers compared, a predetermined registering action either does or does not take place. Those for the first and second steps are of the other class: according to the relative values of the numbers compared, one or another registering action takes place—either a predetermined registration of the standard number, or a registration of the comparison number whatever it may be. Such alternative registration requires more of the special contact bars; it is made the subject of further definition and examples. With the various comparisons, in the machine as above described, are associated various concomitant actions not essential to the comparing actions.

The operations described include two alternative actions, as relating to numbers higher and lower than the standard number. With these it is immaterial whether the equal number takes one course or the other. It should be apparent that a third action could be governed by the equal number, through the provision of a third circuit path independent of the other two though of like nature.

The principle of comparison for testing for and designating a higher number, as is illustrated with reference to the high comparison bars of Fig. 9A, is applied for each order of numbers above units through two bars, each with an associated relay and its set of contact fingers in numerical positions. The fingers are permitted physical contact with their bars, through perforations arranged for the one of such bars in every position above that of the standard figure with which comparison is to be made, and for the other of such bars in the position of such standard figure. Electrification of one of the higher contacts in the highest order through a contact of a closed switch corresponding in numerical significance with the digit to be compared, causes energization of the one relay to set up a circuit that designates the comparison number including such digit as a higher number than the standard number regardless of what digits are in the lower orders. If there is electrification of the contact in the equal position in the highest order, there may or may not be figures in the orders below to determine that the comparison number is the higher; such contact through the bar relay transfers the control of the designating circuit to the next order below. There the condition is repeated. In the units order, if there is equality in every order above, comparison is effected through one bar and its contacting fingers in the positions above the standard.

The effective relay combinations are those of energization from a higher contact in the highest order, or from a higher contact in any lower order together with energization from equal contacts in every order above.

For such a comparison for a higher number, if there is no electrification of either bar in the highest order, the comparison number must be the lower. No combination of energized relays is effective unles it includes one or the other in the highest order; or, unless including that energized from the equal position in the highest order it includes also one energized from a higher position in the next order below, or includes an unbroken succession from higher to lower orders of relays energized from equal positions followed by one from a higher position.

For comparison for a lower number, as will be seen with reference to the low comparison bars in Fig. 9A the arrangements are reversed.

It is considered that the comparing functions of the kind herein contemplated can be achieved only through like arrangements of bars or contacts or their equivalents, though particular relay and circuit connections may be varied for the same or different effects. Thus the minimum consumption comparison in two orders is illustrated in Figs. 7D and 16 with the additional perforations in the tens equal bar 184 so as to ground it with every grounding of the tens low bar 184A, and to permit one relay to serve for both bars; that is, the relay 185 (Fig. 11) is energized through the tens equal bar 184 when the tens digit of the comparison number is equal to the tens digit of the standard number, and since the card is also perforated in the low position on the tens equal bar such relays also energized from this same bar when the tens digit of the comparison number is low. Hence in the example of perforations (Fig. 16) for a minimum of 12, if the consumption were 02 the units bar would be grounded to cause energization of relay 186 in Fig. 11 and the tens equal bar would be grounded to cause energization of the relay 185 as a low relay. A third relay as 185 is not now needed for the tens low bar 184A.

It will be observed that if it were desired to have every registration designated either High, Low, or Equal, this would be merely a matter of arrangement, according to the same principles.

In practice, referring again to the high and low bars in Fig. 9A, comparisons might be simplified by the use of one hundreds bar each for High and Low, with perforations for, say, 7 and 1, or respectively in position 7, 8, 9, and 1, 0, each bar being connected with a relay and circuit to the proper counting relay. Then the money charges from $7.00 up would operate the designation wheel for H, and form $1.99 down for L. For comparisons in hundreds and tens there would be required two hundreds bars and one tens bar, each for High and Low.

In the sequence of operations, sequence relay 20 is always released by sequence control relay 25, and grounds the conductor through which the path for a High or Low designation is effective when there is such a coincidence of wheel and bar contacts as produces such a path throughout. If there is such a path, the due designating operation proceeds; if not, the other sequence relay of the pair is immediately released and the final operation proceeds.

The minimum consumption comparison as previously described does not vary in principle. It can be initiated only by the return of the contact-closing wheels to zero in a sequence of operation that is always effective for alternative actions; and its completion terminates this sequence and eliminates all intervening sequences to the last.

In the comparison (with reference to the circuits shown in Figs. 3, 3A, 4, 4A, 5, 5A) which provides for the registration of a number predetermined as the maximum for a given rate step, or alternatively of a lesser number if such is represented on the consumption contact-closing wheels, like bars in the different orders, with like perforations and like relay connections, are utilized for the comparison, with additional bars with special perforations and connections for the alternative registrations. These latter include what I have termed the maximum bars and the low bars.

The grounding of the bar with the higher perforations in the highest order has the effect of registration through the maximum bar of the order, which has one contacting finger in the position of the standard figure and thereby a closed circuit to the counting relays, and likewise through such bars of the lower orders. The grounding of the bar with the perforation in the position of the standard figure provides for its registration and also transfers control for the lower orders to the order next below. When the contact-closing coincides on the bar in the highest order with the lower perforations, the energized relay permits the registration for all figures through contact-closing wheel circuits according to their positions. A like effect is had in any lower order when the control is transferred to its bars as indicated.

Comprehensive examples are taken relating to a quantity of 324, as in the first step, in lieu of the 14 of the description preceding. The perforations are specially illustrated in Figure 17, on the same principle as detailed in connection with Figures 3 . . . 5A. The bars indicated in Figure 17 and as here referred to are given the same reference characters as in the several figures just mentioned; the relay, contact, and conductor characters are generally found in the same figures. In the operations to be described, the number 324 and any higher number, represented by the contact-closing wheels when they come to a stand, is to cause the registration of the amount 324 on the first step registering wheels, through counting relay action; any number smaller than 324 is to be registered as such on said first step registering wheels.

The examples include seven comparison numbers: 400, higher in the hundreds order and hence greater than the standard, 324; 332, higher in the tens with equality in the hundreds, and hence greater; 326, higher in the units with equality in the hundreds and tens, and hence greater; 262, lower in the hundreds and hence smaller; 316, lower in the tens with equality in the hundreds, and hence smaller; 321, lower in the units with equality in the hundreds and tens, and hence smaller; and 324, equal in all orders.

These examples are illustrative of all possibilities, including comparison numbers in one or two digits, since the zero position produces a positive effect through the hundreds and tens low bars. Only examples of like character, to be compared by an extension of like means, could be found in orders higher than hundreds.

*First example.*—With number 324 standing on the contact-closing wheels, the circuits are: Bars 81, 82, 84, 85, 86, 88, 90 are grounded (as in every example) from contact 8E of sequence relay 8, contact 9L, conductor 9G. For the hundreds, equal bar 84 is effective, and through finger 84G, perforation 84GG, conductor 324B, contact 324C, conductor 324D, the circuit is completed through shift relay 203 to the No. 3 hundreds counting relay, to effect energization of lower relays and registration of 3 in the manner repeatedly described. For the tens, equal bar 88 is effective; and through finger 88H, perforation 88HH, conductor 324F, contact 324G, conductor 324H, the circuit is extended to the No. 2 tens counting relay. For the units, combination bar 90 is effective; and through finger 90F, perforation 90FF, conductor 324J, contact 324K, conductor 324L, the circuit is extended to the No. 4 units counting relay. The complete registration is therefore 324.

*Second example.*—With number 400 on the contact-closing wheels, the circuits are: High bar 81, finger 81F, perforation 81FF, conductor 81G, contact 81H, conductor 81J, energizing relay 310, grounding contacts 310A, 310B, 310C, and opening contact 310D. Contact 310A grounds maximum bar 83; and through perforation 83GG finger 83G is grounded, extending the circuit to the No. 3 hundreds counting relay. Contact 310C grounds maximum bar 87, which is thus made effective for the tens; finger 87H is grounded through perforation 87HH, and energizes the No. 2 tens relay. Contact 310B grounds maximum bar 89 for the units, which grounds finger 89Q through perforation 89QQ, and energizes the No. 4 units relay. Registration, 324.

*Third example.*—With number 332, the circuits are: For the hundreds, the same as detailed for 324. For the tens, high bar 85, perforation 85GG, finger 85G, conductor 352A, contact 352B, conductor 352C, relay 312, contact 311D; energization of relay 312 grounds its contacts 312A and 312B; contact 312B grounds maximum bar 87, finger 87H through perforation 87HH, energizing the No. 2 tens relay; contact 312A grounds bar 89, finger 89Q through perforation 89QQ, energizing the No. 4 units relay. Registration, 324.

*Fourth example.*—With number 326, the circuits for the hundreds and tens are the same as detailed for 324. For the units, the circuit is: sequence relay contact 9L, conductor 9G, conductor 326A, contact 326B, conductor 326C, finger 89D, perforation 89DD, bar 89, finger 89Q, to the No. 4 units relay. Registration, 324.

*Fifth example.*—With number 321, the circuits for the hundreds and tens are the same as for 324. For the units, the circuit is: bar 90, perforation 90JJ, finger 90J, conductor 321A, contact 321B, conductor 321C, to the No. 1 units relay. Registration, 321.

*Sixth example.*—With number 316, the hundreds circuit is the same as for 324. For the tens, the circuit is: low bar 86 is effective, and through finger 86J, conductor 316A, contact 316B, conductor 216C, relay 313 is energized, grounding its contacts 313A and 313B; 313A grounds conductor 316G, contact 316H, conductor 316M, extending the circuit to the No. 1 tens relay. Contact 313B grounds conductors 313W and 316J, contact 316K, and through conductor 316L energizes the No. 6 units relay. Registration, 316.

*Seventh example.*—With number 262, the circuits are: For the hundreds low bar 82, finger 82H, perforation 82HH, conductor 262A, contact 262B, conductor 262C, energizing relay 311, grounding its contacts 311A, 311B, 311C, and opening contact 311D; contact 311A grounds conductor 311E and contact 311F, conductor 311G, energizing the No. 2 hundreds relay. Contact 311G grounds conductors 311J, 311K, contact 311L, and conductor 311M, energizing the No. 6 tens relay. Contact 311B grounds conductors 311N, 311P, contact 311Q, to the No. 2 units relay. Registration, 262.

The alternatives of registration described are of peculiar utility in such a machine. As an illustration of alternatives that would be useful in other relations may be taken the registration of all numbers lower than the standard on one register, all higher on another, and the standard itself on a third. For such purposes, there would be three registers governed by counting relays; high, low, and equal, though not maximum, bars in each order, with fingers, subject to grounding as described; the relays of the high and low bars; and the special card perforations. From contact-closing wheels would extend circuits to the counting relays; the function of the low bars and their relays to make these circuits effective, as described, would be the function of the high bars and their relays as well; and according to which might be energized would the proper register be operated. For equal registration, there would be the unique combination of fingers grounding through the three equal bars, with no high or low bar effective, which could obviously be applied to the third register.

It should be apparent that with the arrangement for High and Low designations, registrations as just mentioned (in lieu of those confined to the designation wheel) could be effected, in the absence of the high and low bars of the preceding paragraph, provided the bars for each comparison were grounded in a different sequence.

As appears in the description of Operation for minimum charge, when this operation is effective minimum control relays 185 and 186 are energized and relay 187 through its energization releases sequence relay 11; on the other hand, if these control relays are not energized through the minimum charge bars, sequence relays 10 and 11 start the first step multiplying through a circuit previously prepared.

Thus a result desired by the comparison which finds the comparison number greater than the standard number is herein shown as obtainable in either of two ways, positive or negative.

The High and Low money charge comparisons are designed to substitute automaticity for the practice of checking gas and electric bills for noteworthy departures from normal. As relating to other commodities, and to all sorts of accounts and statistics, searchers are constant and extensive, for production, sales, service, and accounting departments, to discover the irregular, unexpected, suggestive, promising, in the fluctuations of figures. It should be apparent that such standards as are set up for High and Low could be set up in different degrees, as for high, very high, enormous, through mere modifications and additions of the equipment described, which could thus be made adaptable for many uses. The comparison circuits illustrated for operating registers could be made to serve other desirable purposes, as in operating a sorting device.

GENERAL STATEMENTS

It will now be well understood that the automatic operation of the machine in its transfer from each sequential operation to the next is initated by an energization and deenergization of the control relay 64 in Fig. 14. Said control relay 64, in the course of the execution of a sequential operation and following the energization of one or more chains of counting relays and the cut-off relay or relays associated therewith is caused to energize and permit deenergization of the sequence control relay 25 in Fig. 11. Thereafter, near the end of the sequential operation, the succeeding sequential operations dependent upon the deenergization of the relay 64. Such deenergization of the relay 64 normally occurs following the deenergization of the last of the cut-off relays to deenergize whereupon the contact Y is closed and the sequence control relay 25 is caused to energize for deenergizing the even numbered sequence relay as 6 which upon its deenergization conditions circuits for initiating the next sequential operation.

It will be conceived therefore, that if one of the meter readings should be zero, and for the purpose of illustration it will be presumed that the last meter reading is zero, the machine would fail to operate. In such an instance, upon the deenergization of the sequence relay 4 in commencing the first sequential operation, the application of ground through contact 5D and the conductor 5G (Figs. 11 and 1) upon the last reading bars 27A, 27B and 27C would have no effect, since none of the contact fingers associated with these bars would be in contact therewith, only the significant digits from 1 to 9 being represented by perforations. Consequently, no circuits would be established through the left-hand group of contacts on the shift relay 201 (Fig. 12) for causing energization of counting relays in Fig. 13. It follows that none of the cut-off relays as 44 would energize; there would be no source of ground for causing energization of the control relay 64 in Fig. 14; contact Y would remain closed; and the sequence control relay 25 would remain energized and ineffective for successively deenergizing sequence relays 5 and 6 for conditioning the machine for beginning the next sequential operation.

The operating capacity of the machine is not intended to be of a scope that will handle meter readings of which the digits in each order are zero. Such instances where either of the meter readings consists entirely of zeros is extremely rare. And inasmuch as the control cards are perforated by a hand operation, the operator can set aside the cards in those rare instances where one of the meter readings consists entirely of zeros, so that the customer's bill may be computed by some other means than that of the present machine.

The essential character of the equipment described is that of a machine designed to receive in prepared form the elements of a variety of computations and conditions for computing and to carry them through to due results without further human guidance. It is described in the form of a specialized billing machine, though its new combinations could be utilized in many other ways.

A field of usefulness, employing several of the same elements, may be illustrated in pay roll compilation. Wage systems may include different hourly rates for different tasks upon which a workman may be engaged, or for straight time and overtime. In a bonus system of wage payments, there may be a minimum time payment and extra payments for units of product of different kinds and rates, with a sliding scale for each kind. With the proper rate perforations on a pay card and periodical punchings for time and products, the machine could record the time by classes and compute the amount due. Such cards could be used, furthermore, with some machine adaptations, for a variety of classifications and accumulations.

While in the specific descriptions, the multiplicands are amounts set or the differences of a subtractive process, it will be apparent that they could as well be the sums of addition. While the contacts are shown as effective through perforated cards, which can be placed and removed automatically and preserved, it will be plain that like computative results could be had by the manipulation of keys of the usual adding machine type. It will also be evident that the results herein shown as set up on number wheels could be conveyed to type-bars for printing and in more than one place, as for bill stubs and for cards or sheets for accounting.

In the broader aspects of my invention, I do not desire to be understood as limiting its embodiment to the forms herein described, in view of the variety of mechanisms that may be adopted and modifications that may be made, within the scope of the appended claims, nor to be understood as limiting the uses of the machine and its elements to such as are herein mentioned, in view of the variety within the scope of the invention.

I claim:

1. In an electrical accounting machine, a minimum charge selective system including the combination of a numerically positionable register with contact-closing instrumentalities, contacts of numerical significance closable in accordance with the numerical position of said instrumentalities, a settable contact-closing device for the units order of a predetermined minimum number, two of said settable devices for the tens order of said number, each settable device including a contact bar and contact fingers arranged for closing thereon in numerical positions, the units order device having closed fingers corresponding to the units digit of said minimum number and to all other digits of less value, one of the device bars associated with the tens order having closed fingers in every position of equal and less value than the tens digit of the minimum number and the other device bar associated with the tens order having closed fingers in every position of less value than the tens digit of the minimum number, a minimum charge registering circuit, and means for selecting said circuit through contacts closed in numerical coincidence by the register and a minimum position closed finger on each bar in the tens order or a minimum position closed finger on the units bar together with a minimum position closed finger on the tens bar which is engaged by fingers in every position of equal and less value than the tens digit of said minimum number.

2. In an electrical calculating machine, the combination of, a register with contacts closable in numerical positions, a register drivable subtractively and equivalently by the first register, a contact closable at the zero position of said second register, comparison contact bars with closable contacts in predetermined numerical positions, a circuit in combination between the first register and said contacts and bars adapted to control an alternative action in event the bar contacts are closed in numerical positions representative of as great value as are the closed contacts of the first register, and a circuit adapted to condition the aforesaid circuit for operation when closed by the zero contact of the second register.

3. In a calculating machine, a plurality of sequence control devices normally conditioned upon the start of a machine operation preparatory to initiating sequential operations of said machine, a consumption quantity register, a rate step register, a cost accumulating register, entry effecting means for said registers, means associated with said rate step register and operative thereby pursuant to an entry therein for subtractively moving a portion of the consumption quantity register by the amount of such entry to correspondingly diminish the amount in said register portion, rate step comparison means comprising means settable to represent a predetermined rate step quantity and means adjustable by said register portion in accordance with the amount standing therein, one of said sequence control devices being operative to condition the rate step comparison means for causing an entry in the rate step register, said rate step comparison means when so conditioned while the entry in said register portion is not exceeded by the rate step quantity for which the rate step comparison means is set causing the entry in said rate step register to be the equal of said rate step quantity and when so conditioned while the entry in said register portion is exceeded by said rate step quantity causing the entry in the rate step register to be the equal of the entry in said register portion wherefore the means for subtractively moving said register portion will have moved such register portion to zero, minimum charge amount determining means settable to represent a predetermined minimum charge amount, minimum consumption determining means settable to represent a predetermined minimum consumption quantity, means effective upon movement of said register portion to zero and under control of said rate step register, said minimum consumption determining means and said minimum charge amount determining means for causing the entry of said selected minimum charge amount in the cost accumulator register when the entry in the rate step register does not exceed the quantity for which the minimum consumption determining means is set, numerical value transferring means set in accordance with and under control of said rate step register, another of said sequence control devices when the entry in the rate step register exceeds the quantity for which the minimum consumption determining means is set conditioning said numerical value transferring means for causing an entry in the cost accumulating register equal to that in said rate step register, and multiplying control means settable to successively and similarly condition said numerical value transferring means a predetermined number of additional times to obtain a like number of such additional entries in the cost accumulator register.

4. In an accounting machine, a quantity representing register, minimum quantity representing means settable to represent a predetermined minimum quantity, minimum charge amount representing means settable to represent a predetermined minimum charge amount, a cost accumulating register, and means operable under control of the aforementioned quantity representing register and said predetermined minimum quantity determining means for causing entry in said accumulating register of the amount set upon the minimum charge amount representing means when the amount in said quantity representing register does not exceed the amount set upon the minimum quantity representing means.

5. In an accounting machine, a quantity indicating register, an electrical circuit including a comparison quantity determining means settable to represent a predetermined standard quantity and a group of electrical switches of numerical significance, means for closing said switches in arrangements respectively corresponding to entries in said register, said circuit being completed and hence energizable only when the switches are closed in an arrangement corresponding to a quantity indicating register setting not exceeding the quantity for which the comparison quantity determining means is set, charge amount determining means settable to represent a predetermined charge amount, a charge amount indicating register, and means energizable through the energization of said circuit and operable under control of said charge amount determining means for effecting an entry in the charge amount indicating register.

6. A machine according to claim 5, wherein record controlled actuating devices are provided for entering amounts in the quantity indicating register, and wherein the comparison quantity determining means and the charge amount determining means are conditioned in accordance with representations in a record.

7. In a number comparing system, the combination of, a triple group of contact-closers of numerical significance and settable in numerical positions in relation to a predetermined digit, severally, in such positions of greater numerical value as may be to and including 9, in such positions of less numerical value as may be to and including 0, and in the equal position; a single group of multiple contact switches of numerical significance and closable in any numerical position from 0 to 9; circuits connecting the contacts of the two groups according to their respective numerical positions; circuits severally related to the triple group of contacts, and means for electrifying the respective one of the latter circuits according to the coincidence of closure of one of the single group of contacts and the contact in the corresponding position in the triple group.

8. In an electrical accounting machine, the combination of, contact-closing wheels numerically positionable, a register and means for numerically positioning such register according to closed electrical contacts, a contact bar for each numerical order and a single contact closable on such bar in the numerical position represented by the digit in such order of a number predetermined for registration, another such contact bar and such contacts so closable for each such order, circuits extending from such contacts to the register-positioning means, a contact bar for each numerical order and a series of contacts closable thereon in all numerical positions represented by digits of greater value than the digit in such order of the predetermined number, and means for selecting said circuits and effecting registration through contacts closed in numerical coincidence by the first-mentioned contact-closing wheels and any of said series of contacts in the highest order or in such coincidence in any lower order combined with coincidence with the single contacts in every order higher.

9. In an electrical accounting machine, the combination of contact-closing means representative of a comparison number, contact-closing means representative of a standard number, electrical circuits closable and operative through coinciding closure of contacts in both of said contact-closing means, an alternative electrical circuit, and sequence relay means for electrifying any of the first said circuits if closed and alternatively for electrifying the second said circuit if the first are open.

10. In an electrical accounting machine, the combination of contact-closing means representative of a comparison number, contact-closing means representative of a standard number, electrical circuits closable and operative through coinciding closure of contacts in both of said contact-closing means, an alternative electrical circuit, and means for electrifying the first said circuits if closed and alternatively for electrifying the second said circuit if the first are open.

11. In an electrical calculating machine, a system for the comparison of numbers and for detecting whether a comparison number brought electrically into comparison with a standard number of a plurality of digits is less than the standard number, including, in combination: contacts closable in the respective numerical positions representative of digits in different decimal orders of such comparison number, and contact bars and associated electrical circuits numerically closable to represent a standard number, including an "equal" bar and a contact closable in the position of the standard digit in each order, a "low" bar and contacts closable in the position of every digit less than the standard digit in each order, and circuits comprising conductors of numerical significance electrifiable in an arrangement to represent said comparison number, said circuits being under control of said contacts and bars and electrifiable through contacts of digital coincidence closed among the first said contacts and on the low bar in the highest order, said circuit being closable also on any low bar in any lower order together with the equal bar in every order higher.

12. In an electrical calculating machine, a system for the comparison of numbers and for detecting whether a comparison number brought electrically into comparison with a standard number of a plurality of digits is greater than the standard number, including, in combination: contacts closable in the respective numerical positions representative of the digits in the different decimal orders of such comparison number, and contact bars and associated electrical circuits numerically closable to represent a standard number, including an "equal" bar and a contact closable in the position of the standard digit in each order, a "high" bar and contacts closable in the position of every digit greater than the standard digit in each order, and circuits comprising conductors of numerical significance electrifiable in an arrangement representative of said standard number, said circuits being under control of said contacts and bars and electrifiable through contacts closed among the first said contacts and on the high bar in the highest order, said circuit being closable also on any high bar in any lower order together with the equal bar in every order higher.

13. In an electrical calculating machine, a system for indicating that a register number is higher than a standard number, including, in combination: a first set of contacts positioned according to every number above the standard in a decimal order of numbers, and a second contact in position corresponding to said standard number, a third set of contacts positioned according to every number above the standard in the next lower order of numbers; a register, and contacts severally closable by said register according to its numerical position in each order; and electrical circuits adapted for indicating a higher register number in event of coincidence between a closed register contact for the higher order of numbers and any of said first set of contacts, and for like indication in event of coincidence between such a register contact and said second contact and also a register contact in the lower order and any of said third set of contacts.

14. In an electrical calculating machine, a system for indicating that a register number is lower than a standard number, including, in combination: a first set of contacts positioned according to every number below the standard in a decimal order of numbers, and a second contact in position corresponding to said standard number; a third set of contacts positioned according to every number below the standard in the next lower order of numbers; a register, and contacts severally closable by said register according to its numerical position in each order; and electrical circuits adapted for indicating a lower register number in event of coincidence between a closed register contact for the higher order of numbers and any of said first set of contacts, and for like indication in event of coincidence between such a register contact and said second contact and also a register contact in the lower order and any of said third set of contacts.

15. In an electrical calculating machine, a system for indicating that a register number is higher or lower than a standard predetermined multi-digit number, including, in combination: a first set of contacts positioned according to every digit of a notation above the standard digit for one denomination of the standard number, a second contact in a position corresponding to said digit of said denomination in said standard member, a third set of contacts positioned according to every digit of a notation below said digit of said denomination in said standard number; a fourth set of contacts positioned according to every digit of a notation above the standard digit of a notation in the next lower denomination of the standard number, a fifth contact in a position corresponding to said digit of said next lower denomination in said standard member, a sixth set of contacts positioned according to every digit of a notation below said digit of said next lower denomination in said standard number; a register, denominational contacts severally closable by said register according to its numerical position; and electrical circuits under control of said contacts and energizable therethrough to represent a higher register number in event of coincidence between a closed register contact for the higher denomination of numbers and any of said first set of contacts, and for like indication in event of coincidence between such a register contact and said second contact and also a register contact in said lower denomination and any of said fourth set of contacts; said circuits also being alternatively energizable through predetermined of said register closed contacts to represent a lower register number in event of coincidence between a closed register contact for the higher denomination of numbers and any of said third set of contacts, and for like indication in event of coincidence between such a register contact and said second contact and also a register contact in the lower denomination and any of said sixth set of contacts.

16. In a calculating machine, a consumption quantity register, a rate step quantity register, a cost accumulating register, entry effecting means for such registers, a number comparison device comprising means settable to represent a selectively predetermined number and means adjustable by the consumption quantity register in accordance with the entry therein, and said number comparison device being operative when so adjusted pursuant to a consumption quantity register entry not exceeded by said selected number to condition said entry effecting means for causing an entry in the rate step quantity register equal to said selectively predetermined number, a numerical value transferring means adjustable by the rate step quantity register in accordance with the entry therein, said numerical value transferring means being energizable to condition the entry effecting means for causing an entry in the cost accumulating register equal to the entry in the rate step quantity register, and multiplying control means settable to effec a selected number of repeat energizations of the said value determining means and a corresponding number of repeat accumulations in the cost accumulating register of an amount equal to the entry in the rate step quantity register, and sequence control means operable to successively initiate the entries in the aforesaid rate step register and in the aforesaid cost accumulating register.

17. In an electrical calculating machine, a system for the comparison of numbers and for selecting alternative circuits according to whether a number brought electrically into comparison with a standard number of a plurality of digits is less or not less, including, in combination: contacts closable in the respective numerical positions of the digits in the different denominational orders of a comparison number, contact-closing devices for each denominational order of a standard number, including an "equal" contact bar and a contact settable for closing thereon in the numerical position according to the standard digit in each denominational order and a "high" bar and contacts settable for closing thereon for each denominational order above units in positions corresponding to all digits of greater value than the standard digit in each denominational order, a circuit electrifiable through contacts closed in numerical coincidence among the first said contacts and on the high bar in the highest order or on any high bar in any lower order together with the equal bar in every order higher; a circuit electrifiable alternatively with the circuit aforesaid through contacts closed by lack of said numerical coincidence, and a register controllable by either of said circuits and controlled variantly according to the identity of the circuit selected.

18. In an electrical calculating machine, contacts closable to represent digits in denominational orders of a comparison number; contact bars, further contacts closable on said bars to represent all digits of each order of said comparison number, said further contacts including "equal" contacts closable to represent only the digits of a standard digit in each order, "greater" contacts closable to represent every digit greater than the standard in each order, and "lesser" contacts closable to represent every digit less than standard in each order; a first circuit electrifiable by control of said contacts and said "greater" further contacts in the highest denominational order when coincidence of closure occurs for such of these contacts as are of identical digital significance, or variantly by control of said contacts and any of said "greater" further contacts in any denominational order together with said "equal" further contacts in all higher orders when a corresponding coincidence of contact closure occurs, and a second circuit electrifiable by control of said contacts and said "lesser" further contacts in the highest denominational order when a corresponding coincidence of contact closure occurs, or variantly by control of said contacts and any of said "lesser" further contacts in any denominational order together with said "equal" further contacts in all higher orders when a corresponding coincidence of contact closure occurs, or variantly by control of all "equal" contacts when a corresponding coincidence of contact closure occurs, said first and second circuits being one or the other electrifiable by the closing of said contacts to represent any comparison number.

19. In a calculating machine, a plurality of sequence control devices normally conditioned upon the start of a machine operation preparatory to initiating sequential operations of said machine, a consumption quantity register, a plurality of rate step registers, a cost accumulating register, entry effecting means for said registers, means associated with each of said rate step registers and operable thereby incident to entries therein for subtractively moving a portion of the consumption quantity register by the amount of such entries to leave diminished entries on said register portion, rate step comparison means comprising means settable to represent a plurality of selectable rate step quantities and means adjustable by said portion of the consumption quantity register in accordance with the amount standing thereon, one of said sequence control devices when the entry in said portion of the consumption quantity register is not exceeded by a certain of the rate step quantities for which the rate step comparison means is set being operative to condition said rate step comparison means for causing an entry equal to said certain rate step quantity in one of said rate step registers, numerical value transferring means settable by and in accordance with said rate step register, another of said sequence control devices being operable to condition said numerical value transferring means for entering in the cost accumulating register an amount equal to the entry in said rate step register, multiplying control means settable to successively and similarly condition the said numerical value transferring means a selected number of additional times to obtain a like number of additional entries in the cost accumulator register, another of said sequence control devices when the diminished amount on said register portion is not exceeded by the next rate step quantity for which the rate step comparison means is set being operative to condition said rate step comparison means for causing an entry equal to said second rate step quantity in another of said rate step registers, a second numerical value transferring means settable by and in accordance with such second rate step register, another of said sequence control devices being operable to condition said second numerical value transferring means for entering in the cost accumulating register an amount equal to the entry in said second rate step register, further multiplying control means settable to successively and similarly condition the second numerical value transferring means a selected number of additional times to obtain a like number of additional entries in the cost accumulator register, a further of said sequence control devices when a remainder entry exists on said portion of the consumption quantity register being operative to condition said rate step comparison means for causing an entry equal to said remainder in a still further of said rate step registers, a third numerical value transferring means settable by and in accordance with said still further register, a still further of said sequence control devices being operable to condition said third numerical value transferring means for entering in the cost accumulating register an amount equal to the entry in said still further rate step register, and still further multiplying control means settable to successively and similarly condition the third numerical value transferring means a selected number of additional times to obtain a like number of additional entries in the cost accumulating register.

20. In a calculating machine, a first register, means for adjusting said first register in accordance with an amount, means conditioned according to a predetermined schedule and cooperating with said register for breaking down said amount into component amounts, means for respectively receiving each of said component amounts, factor representing means for representing predetermined factors, one for each of said component amounts, means for multiplying each of said component amounts by its corresponding factors, a register for accumulating all of the products of the several multiplications, means for entering the products of multiplication in said last register, and sequentially operable means for causing the successive operations of the breaking down means, of the multiplying means and of said entering means.

21. In a calculating machine, a first register, means for adjusting said register in accordance with a primary amount, comparing means comprising means conditioned according to a pre-scheduled amount and means conditionable by said register to ascertain the relative magnitude of the primary amount in said register and said pre-scheduled amount, said comparing means including instrumentalities to represent an alternative amount which is equal to said primary amount when the latter fails to exceed the scheduled amount and which is equal to said scheduled amount when the latter is exceeded by said primary amount, entry storage means for receiving said alternative amount, factor representing means for representing a predetermined factor, a product accumulating register, means for entering said alternative amount in said entry storage means and operable under control of said factor representing means and said entry storage means for entering said alternative amount in the product accumulating register a number of times corresponding to the value of said predetermined factor, and sequentially operable means for causing operation of said comparing means, said factor representing means and said entering means.

22. In a calculating machine, an electrical number comparing system for selecting a number to be registered and comprising an electrical circuit embodying in series means for selectively representing a comparison number and other means for selectively representing a standard number, a register, and register setting means in said circuit and under control of the number representing means therein, and means for closing said circuit through said number representing means to said register setting means under control of the one of said number representing means representing the smaller of the two numbers represented whereby the register setting means operates to set said register to the smaller of the two numbers represented.

23. In a calculating machine, an electrical number comparing system for selecting a number and comprising an electrical circuit embodying in series means for selectively representing a comparison number and other means for selectively representing a standard number, a register, register setting means, entry effecting means under control of said circuit for effecting operation of said register setting means to set said register to a predetermined number, and means for closing said circuit through said number representing means to place said register setting means under control of said entry effecting means to effect entry of said predetermined number on said register when the number represented by the comparison number representing means is smaller than the number represented by the standard number representing means.

24. In an electrical calculating machine, the combination of, a register with contacts closable in numerical positions, a contact closable at the zero position of said register, a second register with contacts closable in numerical positions, a set of comparison contact bars with closable contacts in predetermined numerical positions, a circuit in combination between the first register and said set of contacts and bars adapted for alternative registration according to whether the contacts closed by the first register are representative of a number greater or less than that represented by the contacts closed on said bars, means for registering on the second register according to said alternatives, means for driving the first register subtractively and equivalently by the second register, a second set of comparison contact bars with closable contacts in predetermined numerical positions, a circuit in combination between the second register and said second set of contacts and bars adapted to control an alternative action in event the bar contacts are closed in numerical positions representative of no less value than are the closed register contacts, and a circuit adapted to condition the last-mentioned circuit for operation when closed by the zero contact of the first register.

25. In a calculating machine, means settable to indicate a quantity, means settable to indicate a maximum quantity for determining a minimum charge, means for comparing said quantities, a register means to indicate a determined amount, and means to enter said determined amount in said register, said last named means being effective under control of said comparing means when the quantity indicated by said first named means is equal to or less than the quantity indicated by said second named means.

26. In a calculating machine, a plurality of sequence control devices normally conditioned upon the start of a machine operation preparatory to initiating sequential operations of said machine, a consumption quantity register, a plurality of rate step registers, a cost accumulating register, entry effecting means for said registers, means associated with each of said rate step registers and operative thereby as entries are effected therein for subtractively moving a portion of the consumption quantity register by the amount of such entries to correspondingly diminish the amount in said register portion, rate step comparison means comprising means settable to represent a plurality of selectively predetermined rate step quantities and means adjustable by said portion of the consumption quantity register in accordance with the amount standing thereon, one of said sequence control devices when the amount in said portion of the consumption quantity register is not exceeded by the first rate step quantity for which the rate step comparison means is set being operative to condition said rate step comparison means for causing an entry equal to said first rate step quantity in one of said rate step registers, numerical value transferring means settable by and in accordance with said rate step register, another of said sequence control devices being operable to condition said numerical value transferring means for entering in the cost accumulating register an amount equal to the entry in said rate step register, multiplying control means settable to successively and similarly condition said numerical value transferring means a selectable number of additional times to obtain a like number of additional entries in the cost accumulator register, another of said rate step comparison means when so conditioned while the diminished amount in said portion of the consumption quantity register is not exceeded by a second rate step quantity for which the rate step comparison means is set causing said entry in the second rate step register to be the equal of such second rate step quantity and being adapted when so conditioned while the diminished amount in said register portion is exceeded by said second rate step quantity to cause said entry in the second rate step register to be the equal of said diminished entry in said register portion, a second numerical value transferring means settable by and in accordance with said second rate step register, still another of said sequence control devices being operable to condition such second numerical value transferring means for entering in the cost accumulating register an amount equal to the entry in said second rate step register, and additional multiplying control means being settable to successively and similarly condition the second numerical value transferring means a selectable number of additional times to obtain a like number of additional entries in said cost accumulating register.

27. In an electrical calculating machine, a plurality of settable means normally set at the beginning of a machine operation and being thus adapted to sequentially initiate respective sequential operations of the machine, each of said means being restorable to a status wherein it is ineffective for initiating its respective sequential operation, a register for receiving an entry pursuant to a sequential operation initiated by an earlier acting of the settable means, a variable electric circuit adjusted in accordance with the entry in said register, a selectively settable amount comparing means constituting an element of such circuit and effective for completing said circuit when the entry in said register does not exceed the setting of said amount comparing means, and means controlled by and effective upon completion of said circuit for initiating a machine action not entailing the sequential operations adapted to be normally initiated by certain of the later acting of said settable means, said last named means also being operative upon the completion of said circuit for causing the restoration of said certain of the settable means.

28. In a record controlled calculating machine the combination of an accumulator for representing a primary amount, a purality of receiving devices for receiving amounts, a plurality of record controlled means for determining the magnitudes of said last amounts, means set according to the setting of said accumulator and cooperating with said record controlled means for determining whether or not entries into certain of said receiving devices are to be effected, means for sequentially entering said record determined amounts into said receiving devices, and means cooperating with said entering means to cause successive subtractions of amounts entered into said registers from said accumulator.

29. In an accounting machine, a quantity indicating register, product accumulating means, multiplying means including means settable to represent a factor, and which when set is operative to control an operation of the multiplying means, means for performing an operation alternative to an operation of the multiplying means that is controlled by a setting of said settable means, control means including means arranged to represent a determined quantity and which coacts with said register to compare the setting of the arranged means and the setting of the register whereby the control means operates to select for operation the multiplying means or the means for performing the alternative operation, and entry effecting means for said register and said product accumulating means and operable under conjoint control of said multiplying means and said register to enter in said accumulating means the product of an amount said register is set to represent times a factor said settable means is set to represent when the control means selects the multiplying means for operation, and means operable to sequentially cause operation of said control means, said multiplying means and said entry effecting means.

30. In an electrical calculating machine, the combination of, a register with contacts closable in numerical positions, a contact closable at the zero position of said register, a second register with contacts closable in numerical positions, a set of comparison contact bars with closable contacts in predetermined numbering positions, a circuit in combination between the first register and said set of contacts and bars adapted for alternative registration according to whether the contacts closed by the first register are representative of a number greater or less than that represented by the contacts closed on said bars, means for registering on the second register according to said alternatives, means for driving the first register subtractively and equivalently by the second register, a second set of comparison contact bars with closable contacts in predetermined numerical positions, a circuit in combination between the second register and said second set of contacts and bars adapted to control an alternative action in event the bar contacts are closed in numerical positions representative of no less value than are the closed register contacts, a circuit adapted to condition the last-mentioned circuit for operation when closed by the zero contact of the first register, and register means including relays energizable in numbers commensurate with a number selected by coincidence or differentiation of contacts closed by said registers and closed bar contacts and adapted to control registration according to such number.

31. In a record controlled calculating machine the combination of an accumulator for representing a primary amount which is to be broken into secondary amounts, a plurality of record controlled means for determining the magnitudes of said secondary amounts, a plurality of receiving devices each for receiving a secondary amount under control of corresponding record controlled means, means for entering said secondary amounts into said receiving devices, means actuated by said entering means for successively subtracting said secondary amounts from said accumulator, a remainder amount receiving device, means for entering a remainder represented on said accumulator following the successive subtraction of said secondary amounts from the primary amount, means actuated by said last means for subtracting said remainder from said accumulator, and sequence control instrumentalities for causing successive entries into the secondary amount receiving means and into the remainder receiving device.

32. In an electrical calculating machine, the combination of: a quantity register, contacts adapted to be set by said register to indicate the quantity registered, contact means settable to represent a standard number, electrical comparison circuits controlled through coincidence of contemporaneous set conditions of said contacts and of said contact means, a money charge register, means for indicating a determined charge amount, means for entering said determined amount in said money charge register, a sequence-controlled circuit for controlling computations and entries in said register, and means controlled by said comparison circuits for enabling alternatively either said determined amount entering means or said circuit for controlling computation.

33. A machine according to claim 28 including sequence control means for normally controlling sequential entries into all of said receiving devices, and means controlled by said accumulator upon subtraction of the originally represented primary amount therefrom for varying the normal operation of said sequence control means.

34. In a calculating machine, the combination of means for registering a principal amount as minuend, means for registering a plurality of amounts each predetermined as a subtrahend, means for registering a final remainder, means for sequentially entering said predetermined amounts and said remainder amount in the respective registering means, means for driving subtractively the minuend registering means from each of the subtrahend and final registering means as entries are made therein and means for controlling the sequence of operation of the entering means.

35. In a record controlled calculating machine the combination of an accumulator for representing a primary amount which is to be broken into secondary amounts, a plurality of record controlled means for determining the magnitudes of said secondary amounts, a plurality of receiving devices each for receiving a secondary amount under control of corresponding record controlled means, means for entering said secondary amounts into said receiving devices, means cooperating with said entering means for successively subtracting said secondary amounts from said accumulator, means set according to the setting of said accumulator and cooperating with said record controlled means for determining whether or not entries into certain of said receiving devices are to be effected, a further amount receiving device, means for entering a remainder represented on said accumulator following the successive subtraction of said secondary amounts from the primary amount, and means cooperating with said last means for subtracting said remainder from said accumulator.

36. In a calculating machine, the combination of means for registering a principal amount, means for registering a series of amounts each predetermined as a subtrahend and multiplicand, means for registering an amount as a final remainder and multiplicand, means settable for a respective series of multipliers including a multiplier for a final remainder, means for driving subtractively the registering means for the principal amount by each of the subtrahend and final remainder registering means in sequence, means for multiplying in sequence by its respective multiplier each of the subtrahends and the final remainder, and means controlled by the subtracting and multiplying means for controlling the sequence of subtracting and multiplying operations.

37. In an electrical calculating machine, the combination of, a register with contacts closable in numerical positions and with a common contact for its full zero position, a second register with contacts closable in numerical positions, selective means for driving the second register forwardly to the numerical position represented by the closed contacts on the first register or alternatively to a predetermined position of less numerical value, means for driving the first register backwardly and equivalently by the second register, means for computing according to the numerical position taken by the numerical contacts of the second register and additional means for computing according to any remainder number that may be represented by the numerical contacts of the first register, a sequence circuit adapted to control said additional computing means, selective means controlling the first computing means or alternatively a predetermined registration, and circuits related to the zero position of the first register and adapted to condition the last-mentioned selective means for operation and to disable said sequence circuit.

38. In an electrical calculating machine, settable means for selecting alternative electrical circuits through number comparison, comprising, in combination, a set of settable electrical contacts representative of a number, a set of other electrical contacts settable in positions representative of a range of numbers, electrical circuits connecting such contacts in respective numerical positions, and electrical circuits selectively energizable under control of closed contacts in said sets according to coincidence or non-coincidence of the numerical settings in one and the other of said settable sets of contacts and their circuit connections.

39. In an electrical calculating machine, the combination of a register, electrical contacts severally closable by said register according to its numerical position, a set of electrical contacts positioned according to numbers above a predetermined limit, a second set of electrical contacts positioned according to numbers below a predetermined limit, and electrical circuits energizable selectively under control of closed contacts in said sets according to numerical coincidence of a closed register contact and a contact in either of said sets of contacts.

40. In an automatic machine having a chain of energized sequence relays governing the sequence of operations, the combination of a sub-chain of such sequence relays corresponding respectively to a sub-chain of operations subject to contingent completion, means for stopping a given operation in such sub-chain upon either its normal or its contingent completion, and means for starting the following operation in the sub-chain through its sequence relay energization upon normal completion, or, alternatively upon contingent completion, for deenergizing the remaining sequence relays in the sub-chain and starting the following operation in the main chain through its relay energization, substantially as described.

41. In an electrical calculating machine, the combination of, means for effecting operations of registering and computing in certain sequence, means for effecting operations of registering and computing in contingent sequence, means for restoring such registering and computing means to normal as a certain final operation, sequence control means including a sequence relay chain energizable preliminarily in relay pairs respectively for starting the various operations in potential sequence upon their controlled deenergization in turn, and means for energizing the sequence relay pair related to the said final operation directly from the first relay pair in the chain, and for immediately deenergizing it for starting the final operation upon completion of all due registering and computing operations.

42. In an electrical calculating machine, the combination of, sequence relays energizable in a chain and thereby prepared to govern a sequence of necessary initial and final operations with intermediate contingent operations; a sequence control relay adapted to control the sequence relays respectively governing said operations; a circuit adapted to energize directly through a relay related to an initial operation the sequence relays governing the final operation and to energize through such sequence relays the sequence control relay; and a circuit adapted to start the initial operation through the energization of the sequence control relay dependent solely upon the sequence relays governing the initial and final operations.

43. In a calculating machine adapted for a succession of operations contingent upon the numerical position of a register, the combination of sequence relays adapted to control respective operations, means for energizing such relays upon the movement of said register from its zero position, and means controlled by the return of said register to its zero position for deenergizing such relays as may be energized for control of contingent following operations.

44. In a calculating machine adapted for a succession of operations severally including simultaneous and unsynchronized actions, the combination of, sequence control means comprising relays energizable in a chain of pairs corresponding to the respective operations and each pair adapted to start an operation upon deenergization of one of the pair, a control circuit including a series of contacts related to each operation and adapted to be opened each by the starting of an action included in such operation and to be closed by the completion of such action, and a control relay in said circuit adapted to be deenergized upon the opening of any one of such contacts and energized upon the closure of all, and adapted by its deenergization to deenergize the second relay of the pair and thereby to remove the starting circuit condition, and adapted by its energization to start immediately the next operation in sequence.

45. In an electrical calculating machine having means for effecting operations of registering and computing in sequence including necessary initial and final operations and sundry intermediate operations contingent upon the numerical positions of a quantity register, the combination of, sequence relays in pairs energizable in a chain and thereby prepared to govern the sequence of operations, including a pair specially adapted to govern the final operation, a circuit adapted to energize said pair from the initial pair, a circuit related to the zero position of the quantity register and adapted to deenergize all relays prepared to govern intermediate operations, and thereby to transfer the next ensuing operation to the action of the final pair.

46. In an electrical calculating machine functioning in a plurality of sequential steps of operation, means for controlling sequential operations of said machine, means for conditioning the sequence controlling means upon initiation of a machine cycle, a register for receiving an amount involved in a calculation, means for reducing the amount entered in said register as steps of sequential operation proceed, and means for rendering ineffective selective ones of the conditioned sequence controlling means when the register attains a predetermined setting.

CLYDE SMITH.

CERTIFICATE OF CORRECTION.

Patent No. 2,176,931.                                                October 24, 1939.

CLYDE SMITH.

It is hereby certified that error appears in the printed specification of the above numbered patent requiring correction as follows: Page 12, first column, line 8, for the reference numeral "12" read 21; page 61, first column, line 8, claim 16, for "effec" read effect; page 65, first column, line 20, beginning with "42. In an electrical" strike out all to and including the word and period "operations." in line 35, and insert instead the following -

> 42. In an accounting machine, a quantity indicating register, a cost accumulating register, entry effecting means for said registers, a numerical value representing means conditioned by said quantity indicating register to represent the number entered in said quantity indicating register, multiplying means comprising means settable to represent a factor, comparison number receiving means settable to represent a comparison number of predetermined magnitude, means for comparing the number in said comparison number receiving means with the number represented by said numerical value representing means, said entry effecting means being operable under control of said multiplying means and said value representing means for entering in said cost accumulating register the product of the amount in said quantity indicating register and the amount of said entered factor, when the entry in said quantity indicating register exceeds said comparison number in value, and means operable to sequentially cause operation of the comparing means, the setting of said multiplier means and the operation of said entry effecting means.;

same page and column, line 46, beginning with "44. In a calculating" strike out all to and including "setting." in line 46, second column, comprising claims 44, 45 and 46, and insert instead the following -

> 44. In a calculating machine, the combination of means potentially capable of registering a principal amount as minuend, means potentially capable of registering a plurality of amounts each predetermined as a subtrahend, means potentially capable of registering a final remainder, means for driving subtractively the minuend registering means by each of the subtrahend and final registering means in sequence, means for controlling the sequence of subtracting actions, and means controlled by the minuend registering means at its zero position for terminating the subtracting and subtrahend or final remainder registering actions at their then due numerical positions.

45. In a calculating machine, a first register, means for adjusting said register in accordance with a primary amount, comparing means comprising means conditioned according to a pre-scheduled amount and means conditionable by said register to determine the relative magnitude of the primary and pre-scheduled amounts, said comparing means including instrumentalities to represent an alternative amount which is equal to said primary amount when the latter fails to exceed the scheduled amount and which is equal to the scheduled amount when the latter is exceeded by said primary amount, entry storage means for receiving said alternative amount, factor representing means for representing a predetermined factor, a minimum quantity representing means settable to represent a predetermined minimum quantity, minimum charge amount representing means settable to represent a predetermined minimum charge amount, a cost accumulating register, entry effecting means operable under control of said instrumentalities for effecting an entry in said storage means, operable under control of said factor representing means and said entry storage means for entering said alternative amount in the cost accumulating register a number of times corresponding to the value of said factor when the alternative amount exceeds the minimum quantity and operable under control of said minimum charge amount representing means for entering the minimum charge amount in the cost accumulating register when said alternative amount fails to exceed said predetermined minimum quantity, and means sequentially operable for causing operation of said comparing means, said factor representing means and said entry effecting means.

46. In a calculating machine, the combination of, means for registering a principal amount, means capable of registering a plurality of amounts each predetermined as a subtrahend and multiplicand, means for registering an amount as a final remainder and a multiplicand, means settable for a respective series of multipliers including a multiplier for the final remainder, means for driving subtractively the registering means for the principal amount by each of the subtrahend and final remainder registering means in sequence, means for multiplying in sequence by its respective multiplier each of the subtrahends and the final remainder, means controlled by the subtracting and multiplying means for controlling the sequence of subtracting and multiplying actions, and means controlled by the registering means for the principal amount at its zero position for terminating the subtracting and multiplying actions at their then due numerical positions.;

and that the said Letters Patent should be read with this correction therein that the same may conform to the record of the case in the Patent Office.

Signed and sealed this 12th day of December, A. D. 1939.

(Seal)

Henry Van Arsdale,
Acting Commissioner of Patents.